United States Patent
Reddy et al.

(10) Patent No.: US 12,479,844 B2
(45) Date of Patent: Nov. 25, 2025

(54) ION CHANNEL MODULATORS

(71) Applicant: Praxis Precision Medicines, Inc., Cambridge, MA (US)

(72) Inventors: Kiran Reddy, Boston, MA (US); Gabriel Martinez Botella, Wayland, MA (US); Andrew Mark Griffin, L'lle Bizard (CA); Brian Edward Marron, Ada, MI (US)

(73) Assignee: Praxis Precision Medicines, Inc., Boston, MA (US)

( * ) Notice: Subject to any disclaimer, the term of this patent is extended or adjusted under 35 U.S.C. 154(b) by 858 days.

(21) Appl. No.: 17/280,485

(22) PCT Filed: Sep. 27, 2019

(86) PCT No.: PCT/US2019/053467
§ 371 (c)(1),
(2) Date: Mar. 26, 2021

(87) PCT Pub. No.: WO2020/069322
PCT Pub. Date: Apr. 2, 2020

(65) Prior Publication Data
US 2021/0403476 A1  Dec. 30, 2021

Related U.S. Application Data

(60) Provisional application No. 62/738,508, filed on Sep. 28, 2018.

(51) Int. Cl.
*C07D 487/04* (2006.01)
*C07D 498/04* (2006.01)

(52) U.S. Cl.
CPC .................. *C07D 487/04* (2013.01)

(58) Field of Classification Search
CPC ..... C07D 487/04; C07D 498/04; A61P 25/08; A61P 29/00; A61P 25/00; A61K 31/4985; A61K 31/5025
See application file for complete search history.

(56) References Cited

U.S. PATENT DOCUMENTS

| | | |
|---|---|---|
| 3,845,770 A | 11/1974 | Theeuwes et al. |
| 4,112,095 A | 9/1978 | Allen, Jr. et al. |
| 4,230,705 A | 10/1980 | Allen, Jr. et al. |
| 4,242,515 A | 12/1980 | Trust et al. |
| 4,326,525 A | 4/1982 | Swanson et al. |
| 4,902,514 A | 2/1990 | Barclay et al. |
| 4,992,445 A | 2/1991 | Lawter et al. |
| 5,001,139 A | 3/1991 | Lawter et al. |
| 5,023,252 A | 6/1991 | Hsieh et al. |
| 5,616,345 A | 4/1997 | Geoghegan et al. |
| 5,905,079 A | 5/1999 | Sargent et al. |
| 6,589,952 B2 | 7/2003 | Bakthavatchalam et al. |
| 7,863,279 B2 | 1/2011 | Even et al. |
| 8,030,305 B2 | 10/2011 | Lu et al. |
| 8,173,654 B2 | 5/2012 | Lu et al. |
| 8,198,448 B2 | 6/2012 | Albrecht et al. |
| 8,212,041 B2 | 7/2012 | Albrecht et al. |
| 8,217,177 B2 | 7/2012 | Albrecht et al. |
| 8,524,900 B2 | 9/2013 | Albrecht et al. |
| 8,937,060 B2 | 1/2015 | Cid-Nunez et al. |
| 8,952,034 B2 | 2/2015 | Corkey et al. |
| 9,066,954 B2 | 6/2015 | Albrecht et al. |
| 9,371,329 B2 | 6/2016 | Corkey et al. |
| 10,280,184 B2 | 5/2019 | Friedman et al. |
| 11,014,931 B2 | 5/2021 | Griffin et al. |
| 11,261,188 B2 | 3/2022 | Reddy et al. |
| 11,278,535 B2 | 3/2022 | Reddy et al. |
| 11,279,700 B2 | 3/2022 | Griffin et al. |
| 2002/0049208 A1 | 4/2002 | Bakthavatchalam et al. |
| 2009/0124609 A1 | 5/2009 | Albrecht et al. |
| 2009/0203707 A1 | 8/2009 | Rajamani et al. |
| 2010/0088778 A1 | 4/2010 | Mulley et al. |
| 2011/0021521 A1 | 1/2011 | Corkey et al. |
| 2012/0010192 A1 | 1/2012 | Kobayashi et al. |
| 2012/0065191 A1 | 3/2012 | Kiss et al. |
| 2012/0245164 A1 | 9/2012 | Auger et al. |
| 2012/0245165 A1 | 9/2012 | Kang et al. |
| 2013/0315895 A1 | 11/2013 | Farrell et al. |

(Continued)

FOREIGN PATENT DOCUMENTS

| CA | 1080712 A | 7/1980 |
|---|---|---|
| CN | 102725290 A | 10/2012 |

(Continued)

OTHER PUBLICATIONS

US 8,754,103 B2, 06/2014, Corkey et al. (withdrawn)
Albright et al. "Synthesis and anxiolytic activity of 6-(substituted-phenyl)-1,2,4-triazolo[4,3-b]pyridazines," J. Med. Chem. (1981) vol. 24, 592-600.
Anderson et al. "Unexpected efficacy of a novel sodium channel modulator in Dravet Syndrome," Scientific Reports, 2017, 9 pages.
Anderson et al., "Antiepileptic activity of preferential inhibitors of persistent sodium current," Epilepsia (2014), 55(8), 1274-1283.
Baker et al. "The novel sodium channel modulator GS-458967 (GS967) is an effective treatment in a mouse model of SCN8A encephalopathy," Epilepsia, 2018, 1166-1176, 19 pages.

(Continued)

*Primary Examiner* — Jeffrey H Murray
*Assistant Examiner* — Kevin S Martin
(74) *Attorney, Agent, or Firm* — McCarter & English, LLP; Jonathan M. Sparks; Yelena Margolin

(57) ABSTRACT

The present invention is directed to, in part, fused heteroaryl compounds and compositions useful for preventing and/or treating a disease or condition relating to aberrant function of a voltage-gated, sodium ion channel, for example, abnormal late/persistent sodium current. Methods of treating a disease or condition relating to aberrant function of a sodium ion channel including neurological disorders (e.g., Dravet syndrome, epilepsy), pain, and neuromuscular disorders are also provided herein.

2 Claims, No Drawings

(56) References Cited

U.S. PATENT DOCUMENTS

| | | |
|---|---|---|
| 2014/0066443 A1 | 3/2014 | Beshore et al. |
| 2014/0303158 A1 | 10/2014 | Corkey et al. |
| 2015/0038503 A1 | 2/2015 | Bourotte et al. |
| 2015/0344457 A1 | 12/2015 | Duncan et al. |
| 2016/0159801 A1 | 6/2016 | Quinn et al. |
| 2016/0235718 A1 | 8/2016 | Baraban |
| 2016/0297799 A1 | 10/2016 | Brookings et al. |
| 2016/0317536 A1 | 11/2016 | Reich et al. |
| 2019/0308938 A1 | 10/2019 | McCormack et al. |
| 2019/0389868 A1 | 12/2019 | Reddy et al. |
| 2020/0179358 A1 | 6/2020 | Reddy et al. |
| 2020/0247793 A1 | 8/2020 | Reddy et al. |
| 2020/0377499 A1 | 12/2020 | Griffin et al. |
| 2020/0377506 A1 | 12/2020 | Reddy et al. |
| 2020/0377507 A1 | 12/2020 | Griffin et al. |
| 2021/0087197 A1 | 3/2021 | Griffin et al. |
| 2021/0163488 A1 | 6/2021 | Griffin et al. |
| 2021/0171530 A1 | 6/2021 | Reddy et al. |
| 2021/0188839 A1 | 6/2021 | Reddy et al. |
| 2021/0188852 A1 | 6/2021 | Reddy et al. |
| 2021/0355118 A1 | 11/2021 | Reddy et al. |
| 2022/0024930 A1 | 1/2022 | Griffin et al. |
| 2022/0220118 A1 | 7/2022 | Griffin et al. |
| 2023/0322790 A1 | 10/2023 | Reddy et al. |
| 2023/0348466 A1 | 11/2023 | Martinez Botella et al. |
| 2024/0132501 A1 | 4/2024 | Griffin et al. |

FOREIGN PATENT DOCUMENTS

| | | | |
|---|---|---|---|
| EA | 201290121 A1 | 10/2012 | |
| EA | 201991306 A1 | 3/2020 | |
| JP | S5340798 A | 4/1978 | |
| JP | 11-503437 A | 3/1999 | |
| JP | 2017001991 A | 1/2017 | |
| JP | 7495962 B2 | 6/2024 | |
| TW | 201116528 A | 5/2011 | |
| WO | WO-2006061428 A2 | 6/2006 | |
| WO | WO-2007075567 A1 | 7/2007 | |
| WO | WO-2008008539 A2 | 1/2008 | |
| WO | WO-2010053757 A1 | 5/2010 | |
| WO | WO-2010056865 A1 | 5/2010 | |
| WO | WO-2010074807 A1 | 7/2010 | |
| WO | WO-2011014462 A1 | 2/2011 | |
| WO | WO-2011056985 A2 | 5/2011 | |
| WO | WO-2012003392 A1 | 1/2012 | |
| WO | WO-2012065546 A1 | 5/2012 | |
| WO | WO-2012154760 A1 | 11/2012 | |
| WO | WO-2013006463 A1 | 1/2013 | |
| WO | WO-2013043925 A1 | 3/2013 | |
| WO | WO-2014179492 A1 | 11/2014 | |
| WO | WO-2015095370 A1 | 6/2015 | |
| WO | WO-2015158283 A1 | 10/2015 | |
| WO | WO-2015194670 A1 | 12/2015 | |
| WO | WO-2015197567 A1 | 12/2015 | |
| WO | WO-2018067786 A1 | 4/2018 | |
| WO | WO-2018098491 A1 | 5/2018 | |
| WO | WO-2018098499 A1 * | 5/2018 | ......... A61K 31/4985 |
| WO | WO-2018098500 A1 | 5/2018 | |
| WO | WO-2018148745 A1 | 8/2018 | |
| WO | WO-2018187480 A1 | 10/2018 | |
| WO | WO-2019035951 A1 | 2/2019 | |
| WO | WO-2019232209 A1 | 12/2019 | |
| WO | WO-2020069322 A1 | 4/2020 | |
| WO | WO-2021108513 A1 | 6/2021 | |
| WO | WO-2021108625 A1 | 6/2021 | |

OTHER PUBLICATIONS

Barbieri et al. "Late sodium current blocker GS967 inhibits persistent currents induced by familial hemiplegic migraine type 3 mutations of the SCN1A gene," The Journal of Headache and Pain (2019) vol. 20, No. 107, pp. 1-13.

Belardinelli et al. "A Novel, Potent, and Selective Inhibitor of Cardiac Late Sodium Current Suppresses Experimental Arrhythmias," J. Pharmacol. Exp. Ther. (2013) vol. 344, pp. 23-32.

Berge et al., (1977). "Pharmaceutical salts," J. Pharmaceutical Sciences, 66(1):1-19.

Burbano et al., (2018). "Characterization of a Novel Knock-in Mouse Model of KCNT1 Epileptic Encephalopathy (P2.273)," Neurology, 90(15 Supplement), 2 pages. Abstract Only.

Cannon, J. G., (1995). "Chapter Nineteen: Analog Design," Burger's Medicinal Chemistry and Drug Discovery, Fifth Edition, vol. I: Principles and Practice, Wiley-Interscience, pp. 783-802.

Chaplan et al., (1994). "Quantitative assessment of tactile allodynia in the rat paw," J Neurosci Meth., 53:55-63.

Dorwald, F. Z., (2005). "Side Reactions in Organic Synthesis," Wiley: VCH, Weinheim, 37 pages.

Flynn et al., (1972). "Correlation and Prediction of Mass Transport across Membranes I: Influence of Alkyl Chain Length on Flux-Determining Properties of Barrier and Diffusant," Journal of Pharmaceutical Sciences, 61(6):838-852.

Fukaya et al., (2013). "Identification of a Novel Benzoxazolone Derivative as a Selective, Orally Active 18 kDa Translocator Protein (TSPO) Ligand," J. of Med. Chem., 56(20):8191-8195.

Guan et al. "Synthesis and anticonvulsant activity of a new 6-alkoxy-[1,2,4]-triazolo[4,3-b]pyridazine," Eur. J. Med. Chem. (2010) vol. 45, pp. 1746-1752.

Hackam et al., (2006). "Translation of research evidence from animals to humans," JAMA, 296(14):1731-1732.

Jordan et al., (2003). "Tamoxifen: a most unlikely pioneering medicine," Nat Rev Drug Discov., 2(3):205-213.

Kearney et al., (2001). "A gain-of-function mutation in the sodium channel gene Scn2a results in seizures and behavioral abnormalities," Neuroscience, 702(2):307-317. Abstract Only.

Kim et al., (1992). "An experimental model for peripheral neuropathy produced by segmental spinal nerve ligation in the rat," Pain, 50:355-363.

Koltun et al. "Discovery of triazolopyridinone GS-462808, a late sodium current inhibitor (Late $I_{Na}i$) of the cardiac Nav1.5 channel with improved efficacy and potency relative to ranolazine," Bioorg. Med. Chem. Lett. (2016) vol. 26, pp. 3207-3211.

Li et al., (2018). "Antisense oligonucleotide therapy for SCN2A gain-of-function epilepsies," American Epilepsy Society, 28 pages.

Patel et al., (2019). "Neuropathy following spinal nerve injury shares features with the irritable nociceptor phenotype: A back-translational study of oxcarbazepine," Eur J Pain, 23:183-197.

Petrou et al., (2018). "Abstract: Antisense oligonucleotide therapy for SCN2A gain-of-function epilepsies," American Epilepsy Society, available online at <https://www.aesnet.org/abstractslisting/antisense-oligonucleotide-therapy-for-scn2a-gain-of-function-epilepsies>, 2 pages.

Pubchem-CID 58763997 Create Date: Aug. 19, 2012 (14 pages).

Pubchem-CID 597467 Create Date: Mar. 27, 2005 (15 pages).

Pubchem-CID 82381512 Create Date: Oct. 20, 2014 (10 pages).

Pubchem-CID 89077556 Create Date: Feb. 13, 2015 (11 pages).

Venkatesh et al., (2000). "Role of the development scientist in compound lead selection and optimization," J Pharm Sci., 89(2):145-54.

Wagnon et al., (2015). "Convulsive seizures and SUDEP in a mouse model of SCN8A epileptic encephalopathy," Human Molecular Genetics, 24(2):506-515.

Wengert et al. "Prax330 reduces persistent and resurgent sodium channel currents and neuronal hyperexcitability of subiculum neurons in a mouse model of SCN8A epileptic encephalopathy," Neuropharmacology (2019) vol. 158, No. 107699, 26 pages.

Wilen et al., (1977). "Strategies in optical resolutions," Tetrahedron, 33(21):2725-2736.

Woodland et al., (2015). "Discovery of Inhibitors of Trypanosoma brucei by Phenotypic Screening of a Focused Protein Kinase Library," ChemMedChem, 10(11): 1809-1820.

Zablocki et al. "Discovery of Dihydrobenzoxazepinone (GS-6615) Late Sodium Current Inhibitor (Late $I_{Na}i$), a Phase II Agent with Demonstrated Preclinical Anti-Ischemic and Antiarrhythmic Properties," Journal of Medicinal Chemistry (2016) vol. 59, pp. 9005-9017.

Zaza et al., (2008). "Pathophysiology and pharmacology of the cardiac 'late sodium current'," Pharmacology & Therapeutics, 119(3):326-339.

(56) References Cited

OTHER PUBLICATIONS

Final Office Action received for U.S. Appl. No. 16/638,725 mailed on Apr. 2, 2021, 8 pages.
International Preliminary Report on Patentability for International Patent Application No. PCT/US2018/018044 filed on Feb. 13, 2018, 7 pages.
International Preliminary Report on Patentability for International Patent Application No. PCT/US2018/026099 filed on Apr. 4, 2018, 6 pages.
International Preliminary Report on Patentability for International Patent Application No. PCT/US2017/063507 filed on Nov. 28, 2017, 6 pages.
International Preliminary Report on Patentability for International Patent Application No. PCT/US2017/063534 filed on Nov. 28, 2017, 8 pages.
International Preliminary Report on Patentability for International Patent Application No. PCT/US2018/000224 filed on Aug. 15, 2018, 6 pages.
International Search Report and Written Opinion mailed on Feb. 25, 2021, for PCT Application No. PCT/US2020/062179 filed on Nov. 25, 2020, 7 pages.
International Search Report and Written Opinion received for International Patent Application No. PCT/US2020/062317 mailed on Apr. 6, 2021, 14 pages.
Non-Final Office Action received for U.S. Appl. No. 16/638,725 mailed on Dec. 11, 2020, 16 pages.
Non-Final Office Action received for U.S. Appl. No. 16/887,906 mailed on Jun. 10, 2021, 18 pages.
Non-Final Office Action received for U.S. Appl. No. 16/464,483 mailed on Jun. 30, 2021, 22 pages.
Non-Final Office Action received for U.S. Appl. No. 16/485,581 mailed on Mar. 10, 2021, 8 pages.
Non-Final Office Action received for U.S. Appl. No. 17/102,586 mailed on Jan. 26, 2021, 14 pages.
Written Opinion of the International Searching Authority and International Search Report for PCT/US2017/063507 mailed Mar. 29, 2018 (9 pages).
Written Opinion of the International Searching Authority and International Search Report for PCT/US2017/063533 mailed Mar. 29, 2019 (10 pages).
Written Opinion of the International Searching Authority and International Search Report for PCT/US2017/063534 mailed Mar. 28, 2018 (11 pages).
Written Opinion of the International Searching Authority and International Search Report for PCT/US2018/00224 mailed Nov. 5, 2018 (8 pages).
Written Opinion of the International Searching Authority and International Search Report for PCT/US2018/018044 mailed May 24, 2018 (10 pages).
Written Opinion of the International Searching Authority and International Search Report for PCT/US2018/026099 mailed Aug. 10, 2018 (9 pages).
Written Opinion of the International Searching Authority and International Search Report for PCT/US2019/034653 mailed Aug. 9, 2019 (9 pages).
Written Opinion of the International Searching Authority and International Search Report for PCT/US2019/053467 mailed Jan. 14, 2020 (9 pages).
Eurasian Office Action issued in Eurasian Patent Application No. 202092908 dated Feb. 21, 2022, with English language translation (7 pages).
Wei, Chen (Authorized Officer), Singapore Search Report and Written Opinion issued in Singapore Patent Application No. 11202011879R dated May 6, 2022, (10 pages).
File Registry on STN, RN 1347643-11-1, Entered STN: Dec. 2, 2011.
Non-Final Office Action received for U.S. Appl. No. 16/500,795 mailed on Apr. 13, 2022, 18 pages.
Non-Final Office Action received for U.S. Appl. No. 16/885,605 mailed on Jan. 28, 2022, 10 pages.
Restriction Requirement received for U.S. Appl. No. 16/500,795 mailed on Dec. 16, 2021, 12 pages.
European Communication to Rule 62 EPC issued in European Patent Application No. 19810530.6 dated Jan. 31, 2022 (9 pages).
European Communication to Rules 70(2) and 70a(2) EPC issued in European Patent Application No. 19810530.6 dated Feb. 17, 2022 (1 page).
THAKUR (Controller), Indian First Examination Report issued in Indian Patent Application No. 202017056206 dated Jun. 14, 2022, with English language translation (7 pages).
Chinese Office Action issued in Chinese Patent Application No. 201780084790.8 dated Mar. 9, 2022, with English language translation (23 pages).
Japanese Notice of Reasons for Refusal issued in Japanese Patent Application No. 2019-548536 dated Oct. 21, 2021, with English language translation (8 pages).
Eurasian Office Action issued in Eurasian Patent Application No. 201991306 dated Aug. 24, 2021, with English language translation (6 pages).
Eurasian Office Action issued in Eurasian Patent Application No. 201991306 dated Feb. 25, 2021, with English language translation (8 pages).
De Lera Ruiz et al., Voltage-Gated Sodium Channels: Structure, Function, Pharmacology, and Clinical Indications. J Med Chem. Sep. 24, 2015;58(18):7093-118.
STN Chemical Structure Search Results, 102 pages, May 18, 2016.
STN Chemical Structure Search Results, 107 pages, Nov. 1, 2017.
STN Chemical Structure Search Results, 123 pages, Nov. 6, 2017.
STN Chemical Structure Search Results, 22 pages, Jan. 15, 2020.
STN Chemical Structure Search Results, 23 pages, Jan. 2018.
STN Chemical Structure Search Results, 264 pages, Mar. 20, 2018.
STN Chemical Structure Search Results, 29 pages, Feb. 2018.
STN Chemical Structure Search Results, 36 pages, Apr. 14, 2019.
STN Chemical Structure Search Results, 45 pages, Apr. 23, 2019.
STN Chemical Structure Search Results, 480 pages, Mar. 6, 2017.
STN Chemical Structure Search Results, 511 pages, Mar. 6, 2017.
STN Chemical Structure Search Results, 55 pages, Apr. 2018.
STN Chemical Structure Search Results, 57 pages, Nov. 3, 2017.
STN Chemical Structure Search Results, 7 pages, Nov. 6, 2017.
STN Chemical Structure Search Results, 83 pages, Mar. 20, 2018.
STN Chemical Structure Search Results, 85 pages, Nov. 21, 2017.
Wang et al., Multiple Nav1.5 isoforms are functionally expressed in the brain and present distinct expression patterns compared with cardiac Nav1.5. Mol Med Rep. Jul. 2017;16(1):719-729.
Chinese Office Action for Application No. 201780084790.8, dated Mar. 9, 2022, 23 pages.
European Office Action for Application No. 19810530.3, dated Feb. 23, 2023, 8 pages.
International Preliminary Report on Patentability for Application No. PCT/US2017/063533, dated Jun. 6, 2019, 8 pages.
International Preliminary Report on Patentability for Application No. PCT/US2019/034653, dated Dec. 10, 2020, 8 pages.
International Preliminary Report on Patentability for Application No. PCT/US2019/053467, dated Apr. 8, 2021, 7 pages.
International Preliminary Report on Patentability for Application No. PCT/US2020/062179, dated Jun. 9, 2022, 6 pages.
International Preliminary Report on Patentability for Application No. PCT/Us2020/062317, dated Jun. 9, 2022, 12 pages.
U.S. Appl. No. 16/464,468, filed May 28, 2019, U.S. Pat. No. 11,629,146, Issued.
U.S. Appl. No. 18/119,963, filed Mar. 10, 2023, 2023-0322790, Published.
U.S. Appl. No. 17/058,187, filed Nov. 24, 2020, U.S. Pat. No. 11,866,439, Issued.
U.S. Appl. No. 17/102,586, filed Nov. 24, 2020, U.S. Pat. No. 11,014,931, Issued.
U.S. Appl. No. 17/214,343, filed Mar. 26, 2021, U.S. Pat. No. 11,731,976, Issued.
U.S. Appl. No. 17/702,518, filed Mar. 23, 2022, U.S. Pat. No. 11,731,978, Issued.
U.S. Appl. No. 18/236,156, filed Aug. 21, 2023, 2024-0132501, Published.

(56) References Cited

OTHER PUBLICATIONS

U.S. Appl. No. 17/780,570, filed May 27, 2022, 2023-0348466, Published.

* cited by examiner

ION CHANNEL MODULATORS

CROSS REFERENCE TO RELATED APPLICATIONS

This application is the national stage of International (PCT) Patent Application Serial Number PCT/US2019/053467, filed Sep. 27, 2019, which claims priority to and the benefit of U.S. Provisional Patent Application No. 62/738,508, filed Sep. 28, 2018, each of which is incorporated herein by reference in its entirety.

BACKGROUND

Sodium ion (Na+) channels primarily open in a transient manner and are quickly inactivated, thereby generating a fast Na+ current to initiate the action potential. The late or persistent sodium current (INaL) is a sustained component of the fast Na+ current of cardiac myocytes and neurons. Many common neurological and cardiac conditions are associated with abnormal INaL enhancement, which contributes to the pathogenesis of both electrical and contractile dysfunction in mammals (see, e.g., *Pharmacol Ther* (2008) 119:326-339).

Accordingly, pharmaceutical compounds that selectively modulate sodium channel activity, e.g., abnormal INaL, are useful in treating such disease states.

SUMMARY

Described herein are fused heteroaryl compounds and compositions useful for preventing and/or treating a disease, disorder, or condition, e.g., a disease, disorder, or condition relating to aberrant function of a sodium ion channel, e.g., abnormal late sodium current (INaL).

In one aspect, the present invention provides a compound having the Formula I:

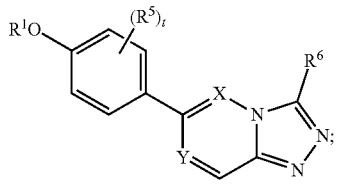

(I)

or a pharmaceutically acceptable salt thereof, wherein
X and Y are each independently $CR^d$ or N;
$R^1$ is

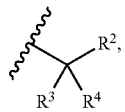

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;
$R^2$ is hydrogen, $C_{1-4}$haloalkyl or monocyclic $C_{3-6}$ cycloalkyl optionally substituted with one or more $R^b$;
$R^3$ is hydrogen, $C_{1-4}$alkyl, or $C_{1-4}$haloalkyl;
$R^4$ is hydrogen or $C_{1-4}$alkyl;
$R^5$ is halo, $C_{3-6}$ cycloalkyl or $C_{1-4}$alkyl optionally substituted with O—$C_{1-4}$alkyl or O—$C_{3-6}$ cycloalkyl;
$R^6$ is $C_{1-4}$alkyl or $C_{1-4}$haloalkyl, wherein the $C_{1-4}$alkyl or $C_{1-4}$haloalkyl is each substituted with $OR^c$;
t is 1 or 2;
$R^a$ and $R^b$ are each independently selected from is selected from halo, $C_{1-4}$alkyl, $C_{1-4}$haloalkyl, $C_{1-4}$alkoxy, and $C_{1-4}$haloalkoxy;
$R^c$ is $C_{1-4}$alkyl optionally substituted with $C_{3-6}$ cycloalkyl or phenyl, or $C_{3-6}$ cycloalkyl; and
$R^d$ is hydrogen or $C_{1-4}$alkyl.

In another aspect, the present disclosure provides a compound having the Formula II.

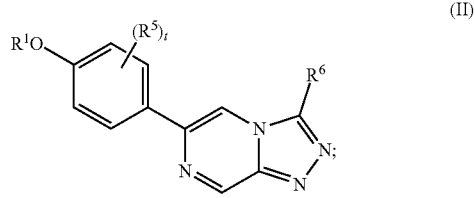

(II)

or a pharmaceutically acceptable salt thereof, wherein
$R^1$ is

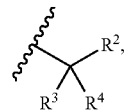

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;
$R^2$ is hydrogen, $C_{1-4}$haloalkyl or monocyclic $C_{3-6}$ cycloalkyl optionally substituted with one or more $R^b$;
$R^3$ is hydrogen, $C_{1-4}$alkyl, or $C_{1-4}$haloalkyl;
$R^4$ is hydrogen or $C_{1-4}$alkyl;
$R^5$ is halo, $C_{3-6}$ cycloalkyl or $C_{1-4}$alkyl optionally substituted with O—$C_{1-4}$alkyl or O—$C_{3-6}$ cycloalkyl;
$R^6$ is $C_{1-4}$alkyl or $C_{1-4}$haloalkyl, wherein said $C_{1-4}$alkyl or $C_{1-4}$haloalkyl are each substituted with $OR^c$;
t is 1 or 2;
$R^a$ and $R^b$ are each independently selected from is selected from halo, $C_{1-4}$alkyl, $C_{1-4}$haloalkyl, $C_{1-4}$alkoxy, and $C_{1-4}$haloalkoxy; and
$R^c$ is $C_{1-4}$alkyl optionally substituted with $C_{3-6}$ cycloalkyl or phenyl, or $C_{3-6}$ cycloalkyl.

In another aspect, the present disclosure provides a compound having the Formula III:

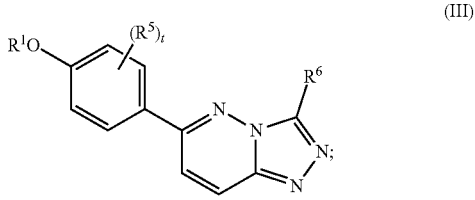

(III)

or a pharmaceutically acceptable salt thereof, wherein $R^1$ is

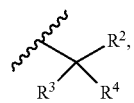

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;

$R^2$ is hydrogen, $C_{1-4}$haloalkyl or monocyclic $C_{3-6}$ cycloalkyl optionally substituted with one or more $R^b$;

$R^3$ is hydrogen, $C_{1-4}$alkyl, or $C_{1-4}$haloalkyl;

$R^4$ is hydrogen or $C_{1-4}$alkyl;

$R^5$ is halo, $C_{3-6}$ cycloalkyl or $C_{1-4}$alkyl optionally substituted with O—$C_{1-4}$alkyl or O—$C_{3-6}$ cycloalkyl;

$R^6$ is $C_{1-4}$alkyl or $C_{1-4}$haloalkyl, wherein the $C_{1-4}$alkyl or $C_{1-4}$haloalkyl is each substituted with $OR^c$;

t is 1 or 2;

$R^a$ and $R^b$ are each independently selected from is selected from halo, $C_{1-4}$alkyl, $C_{1-4}$haloalkyl, $C_{1-4}$alkoxy, and $C_{1-4}$haloalkoxy; and $R^c$ is $C_{1-4}$alkyl optionally substituted with $C_{3-6}$ cycloalkyl or phenyl, or $C_{3-6}$ cycloalkyl.

In another aspect, the present disclosure provides a compound having the Formula IV:

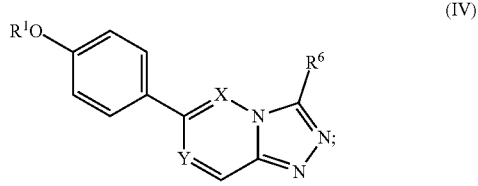

(IV)

or a pharmaceutically acceptable salt thereof, wherein

X and Y are each independently $CR^d$ or N;

$R^1$ is

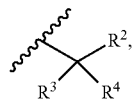

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;

$R^2$ is hydrogen, $C_{1-4}$haloalkyl or monocyclic $C_{3-6}$ cycloalkyl optionally substituted with one or more $R^b$;

$R^3$ is hydrogen, $C_{1-4}$alkyl, or $C_{1-4}$haloalkyl;

$R^4$ is hydrogen or $C_{1-4}$alkyl;

$R^6$ is $C_{1-4}$alkyl or $C_{1-4}$haloalkyl, wherein the $C_{1-4}$alkyl or $C_{1-4}$haloalkyl is each substituted with $OR^c$;

$R^a$ and $R^b$ are each independently selected from is selected from halo, $C_{1-4}$alkyl, $C_{1-4}$haloalkyl, $C_{1-4}$alkoxy, and $C_{1-4}$haloalkoxy;

$R^c$ is $C_{1-4}$alkyl optionally substituted with $C_{3-6}$ cycloalkyl or phenyl, or $C_{3-6}$ cycloalkyl; and $R^d$ is hydrogen or $C_{1-4}$alkyl;

provided that the compound is not

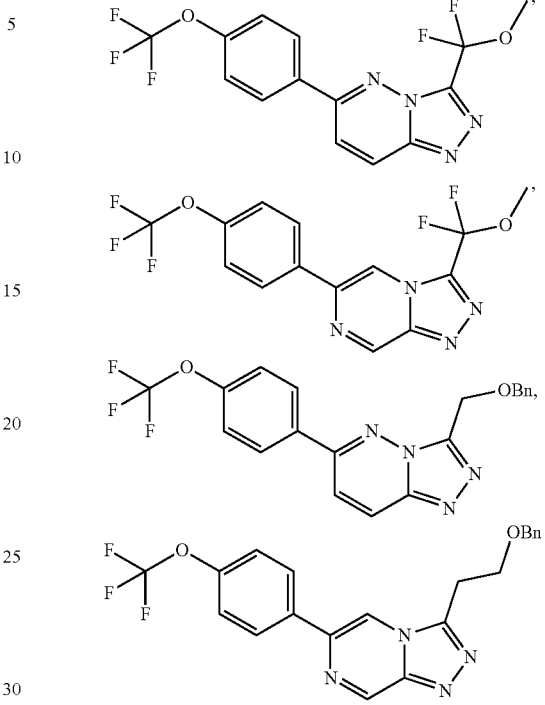

or a pharmaceutically acceptable salt thereof.

Also provided herein is a pharmaceutical composition comprising a compound disclosed herein (e.g., a compound of Formula I, II, III, or IV), or a pharmaceutically acceptable salt thereof, and a pharmaceutically acceptable carrier.

In another aspect, provided herein is a method of treating a condition relating to aberrant function of a sodium ion channel in a subject in need thereof, comprising administering to the subject a therapeutically effective amount of a compound disclosed herein (e.g., a compound of Formula I, II, III, or IV), or a pharmaceutically acceptable salt thereof, or a pharmaceutical composition disclosed herein.

In some embodiments, the condition is a neurological or psychiatric disorder. In some embodiments, the condition is epilepsy or an epilepsy syndrome. In some embodiments, the condition is a genetic epilepsy or a genetic epilepsy syndrome. In some embodiments, the condition is a pediatric epilepsy or a pediatric epilepsy syndrome. In some embodiments, the condition is epileptic encephalopathy. In some embodiments, the epileptic encephalopathy is selected from the group consisting of Dravet syndrome, infantile spasms, or Lennox-Gastaut syndrome.

In some embodiments, the condition is selected from the group consisting of epileptic encephalopathy, epileptic encephalopathy with SCN1A, SCN2A, SCN8A mutations, early infantile epileptic encephalopathy, Dravet syndrome, Dravet syndrome with SCN1A mutation, generalized epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden expected death in epilepsy (SUDEP), KCNQ2 epileptic encephalopathy, and KCNT1 epileptic encephalopathy.

In another aspect, provided herein is a method of treating a neurological disorder or a psychiatric disorder, wherein the method comprises administering to a subject in need thereof the compound disclosed herein (e.g., a compound of Formula I, II, III, or IV), or the pharmaceutically acceptable salt thereof, or a pharmaceutical composition disclosed herein.

In another aspect, provided herein is a method of treating a pain, wherein the method comprises administering to a subject in need thereof a compound disclosed herein (e.g., a compound of Formula I, II, III, or IV), or a pharmaceutically acceptable salt thereof, or a pharmaceutical composition disclosed herein.

Other objects and advantages will become apparent to those skilled in the art from consideration of the ensuing Detailed Description, Examples, and Claims.

DETAILED DESCRIPTION

As generally described herein, the present invention provides compounds and compositions useful for preventing and/or treating a disease, disorder, or condition described herein, e.g., a disease, disorder, or condition relating to aberrant function of a sodium ion channel, such as abnormal late sodium current (INaL). Exemplary diseases, disorders, or conditions include a neurological disorder (e.g., epilepsy or an epilepsy syndrome, a neurodevelopmental disorder or a neuromuscular disorder), a psychiatric disorder, pain, or a gastrointestinal disorder.

Definitions

Chemical Definitions

Definitions of specific functional groups and chemical terms are described in more detail below. The chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in Thomas Sorrell, *Organic Chemistry, University Science Books, Sausalito,* 1999; Smith and March, *March's Advanced Organic Chemistry,* 5$^{th}$ Edition, John Wiley & Sons, Inc., New York, 2001; Larock, *Comprehensive Organic Transformations,* VCH Publishers, Inc., New York, 1989; and Carruthers, *Some Modern Methods of Organic Synthesis,* 3$^{rd}$ Edition, Cambridge University Press, Cambridge, 1987.

Compounds described herein can comprise one or more asymmetric centers, and thus can exist in various isomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., Enantiomers, Racemates and Resolutions (Wiley Interscience, New York, 1981); Wilen et al., *Tetrahedron* 33:2725 (1977); Eliel, *Stereochemistry of Carbon Compounds* (McGraw-Hill, N Y, 1962); and Wilen, *Tables of Resolving Agents and Optical Resolutions* p. 268 (E. L. Eliel, Ed., Univ. of Notre Dame Press, Notre Dame, IN 1972). The invention additionally encompasses compounds described herein as individual isomers substantially free of other isomers, and alternatively, as mixtures of various isomers.

As used herein a pure enantiomeric compound is substantially free from other enantiomers or stereoisomers of the compound (i.e., in enantiomeric excess). In other words, an "S" form of the compound is substantially free from the "R" form of the compound and is, thus, in enantiomeric excess of the "R" form. The term "enantiomerically pure" or "pure enantiomer" denotes that the compound comprises more than 75% by weight, more than 80% by weight, more than 85% by weight, more than 90% by weight, more than 91% by weight, more than 92% by weight, more than 93% by weight, more than 94% by weight, more than 95% by weight, more than 96% by weight, more than 97% by weight, more than 98% by weight, more than 98.5% by weight, more than 99% by weight, more than 99.2% by weight, more than 99.5% by weight, more than 99.6% by weight, more than 99.7% by weight, more than 99.8% by weight or more than 99.9% by weight, of the enantiomer. In certain embodiments, the weights are based upon total weight of all enantiomers or stereoisomers of the compound.

In the compositions provided herein, an enantiomerically pure compound can be present with other active or inactive ingredients. For example, a pharmaceutical composition comprising enantiomerically pure R-compound can comprise, for example, about 90% excipient and about 10% enantiomerically pure R-compound. In certain embodiments, the enantiomerically pure R-compound in such compositions can, for example, comprise, at least about 95% by weight R-compound and at most about 5% by weight S-compound, by total weight of the compound. For example, a pharmaceutical composition comprising enantiomerically pure S-compound can comprise, for example, about 90% excipient and about 10% enantiomerically pure S-compound. In certain embodiments, the enantiomerically pure S-compound in such compositions can, for example, comprise, at least about 95% by weight S-compound and at most about 5% by weight R-compound, by total weight of the compound. In certain embodiments, the active ingredient can be formulated with little or no excipient or carrier.

Compound described herein may also comprise one or more isotopic substitutions. For example, H may be in any isotopic form, including $^1$H, $^2$H (D or deuterium), and $^3$H (T or tritium); C may be in any isotopic form, including $^{12}$C, $^{13}$C, and $^{14}$C; O may be in any isotopic form, including $^{16}$O and $^{18}$O; F may be in any isotopic form, including $^{18}$F and $^{19}$F; and the like.

The following terms are intended to have the meanings presented therewith below and are useful in understanding the description and intended scope of the present invention. When describing the invention, which may include compounds and pharmaceutically acceptable salts thereof, pharmaceutical compositions containing such compounds and methods of using such compounds and compositions, the following terms, if present, have the following meanings unless otherwise indicated. It should also be understood that when described herein any of the moieties defined forth below may be substituted with a variety of substituents, and that the respective definitions are intended to include such substituted moieties within their scope as set out below. Unless otherwise stated, the term "substituted" is to be defined as set out below. It should be further understood that the terms "groups" and "radicals" can be considered interchangeable when used herein. The articles "a" and "an" may be used herein to refer to one or to more than one (i.e. at least one) of the grammatical objects of the article. By way of example "an analogue" means one analogue or more than one analogue.

When a range of values is listed, it is intended to encompass each value and sub-range within the range. For example, "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

As used herein, "alkyl" refers to a radical of a straight-chain or branched saturated hydrocarbon group, e.g., having 1 to 20 carbon atoms ("$C_{1-20}$ alkyl"). In some embodiments, an alkyl group has 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). Examples of $C_{1-6}$ alkyl groups include methyl, ethyl, propyl, isopropyl, butyl, isobutyl, pentyl, hexyl, and the like.

As used herein, "alkenyl" refers to a radical of a straight-chain or branched hydrocarbon group having from 2 to 20 carbon atoms, one or more carbon-carbon double bonds (e.g., 1, 2, 3, or 4 carbon-carbon double bonds), and optionally one or more carbon-carbon triple bonds (e.g., 1, 2, 3, or 4 carbon-carbon triple bonds) ("$C_{2-20}$ alkenyl"). In certain embodiments, alkenyl does not contain any triple bonds. In some embodiments, an alkenyl group has 2 to 10 carbon atoms ("$C_{2-10}$ alkenyl"). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like.

As used herein, "alkynyl" refers to a radical of a straight-chain or branched hydrocarbon group having from 2 to 20 carbon atoms, one or more carbon-carbon triple bonds (e.g., 1, 2, 3, or 4 carbon-carbon triple bonds), and optionally one or more carbon-carbon double bonds (e.g., 1, 2, 3, or 4 carbon-carbon double bonds) ("$C_{2-20}$ alkynyl"). In certain embodiments, alkynyl does not contain any double bonds. In some embodiments, an alkynyl group has 2 to 10 carbon atoms ("$C_{2-10}$ alkynyl"). In some embodiments, an alkynyl group has 2 to 9 carbon atoms ("$C_{2-9}$ alkynyl"). In some embodiments, an alkynyl group has 2 to 8 carbon atoms ("$C_{2-8}$ alkynyl"). In some embodiments, an alkynyl group has 2 to 7 carbon atoms ("$C_{2-7}$ alkynyl"). In some embodiments, an alkynyl group has 2 to 6 carbon atoms ("$C_{2-6}$ alkynyl"). In some embodiments, an alkynyl group has 2 to 5 carbon atoms ("$C_{2-5}$ alkynyl"). In some embodiments, an alkynyl group has 2 to 4 carbon atoms ("$C_{2-4}$ alkynyl"). In some embodiments, an alkynyl group has 2 to 3 carbon atoms ("$C_{2-3}$ alkynyl"). In some embodiments, an alkynyl group has 2 carbon atoms ("$C_2$ alkynyl"). The one or more carbon-carbon triple bonds can be internal (such as in 2-butynyl) or terminal (such as in 1-butynyl). Examples of $C_{2-4}$ alkynyl groups include, without limitation, ethynyl ($C_2$), 1-propynyl ($C_3$), 2-propynyl ($C_3$), 1-butynyl ($C_4$), 2-butynyl ($C_4$), and the like. Examples of $C_{2-6}$ alkenyl groups include the aforementioned $C_{2-4}$ alkynyl groups as well as pentynyl ($C_5$), hexynyl ($C_6$), and the like. Additional examples of alkynyl include heptynyl ($C_7$), octynyl ($C_8$), and the like.

As used herein, "alkylene," "alkenylene," and "alkynylene," refer to a divalent radical of an alkyl, alkenyl, and alkynyl group respectively. When a range or number of carbons is provided for a particular "alkylene," "alkenylene," or "alkynylene," group, it is understood that the range or number refers to the range or number of carbons in the linear carbon divalent chain. "Alkylene," "alkenylene," and "alkynylene," groups may be substituted or unsubstituted with one or more substituents as described herein.

As used herein, "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has six ring carbon atoms ("$C_6$ aryl"; e.g., phenyl). In some embodiments, an aryl group has ten ring carbon atoms ("$C_{10}$ aryl"; e.g., naphthyl such as 1-naphthyl and 2-naphthyl). In some embodiments, an aryl group has fourteen ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, and trinaphthalene. Particularly aryl groups include phenyl, naphthyl, indenyl, and tetrahydronaphthyl.

As used herein, "heteroaryl" refers to a radical of a 5-10 membered monocyclic or bicyclic 4n+2 aromatic ring system (e.g., having 6 or 10 electrons shared in a cyclic array) having ring carbon atoms and 1-4 ring heteroatoms provided in the aromatic ring system, wherein each heteroatom is independently selected from nitrogen, oxygen and sulfur ("5-10 membered heteroaryl"). In heteroaryl groups that contain one or more nitrogen atoms, the point of attachment can be a carbon or nitrogen atom, as valency permits. Heteroaryl bicyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused (aryl/heteroaryl) ring system. Bicyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur.

Exemplary 5-membered heteroaryl groups containing one heteroatom include, without limitation, pyrrolyl, furanyl and thiophenyl. Exemplary 5-membered heteroaryl groups containing two heteroatoms include, without limitation, imidazolyl, pyrazolyl, oxazolyl, isoxazolyl, thiazolyl, and isothiazolyl. Exemplary 5-membered heteroaryl groups containing three heteroatoms include, without limitation, triazolyl, oxadiazolyl, and thiadiazolyl. Exemplary 5-membered heteroaryl groups containing four heteroatoms include, without limitation, tetrazolyl. Exemplary 6-membered heteroaryl groups containing one heteroatom include, without limitation, pyridinyl. Exemplary 6-membered heteroaryl groups containing two heteroatoms include, without limitation, pyridazinyl, pyrimidinyl, and pyrazinyl. Exemplary 6-membered heteroaryl groups containing three or four heteroatoms include, without limitation, triazinyl and tetrazinyl, respectively. Exemplary 7-membered heteroaryl groups containing one heteroatom include, without limitation, azepinyl, oxepinyl, and thiepinyl. Exemplary 5,6-bicyclic heteroaryl groups include, without limitation, indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include, without limitation, naphthyridinyl, pteridinyl, quinolinyl, isoquinolinyl, cinnolinyl, quinoxalinyl, phthalazinyl, and quinazolinyl.

Examples of representative heteroaryls include the following.

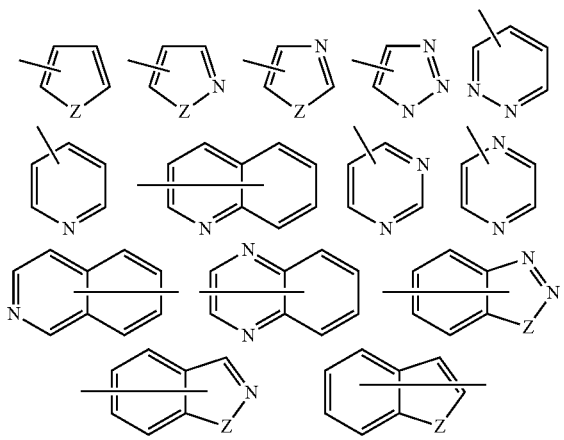

wherein each Z is selected from carbonyl, N, NR$^{65}$, O, and S; and R$^{65}$ is independently hydrogen, $C_{1-8}$ alkyl, $C_{3-10}$ carbocyclyl, 4-10 membered heterocyclyl, $C_6$-$C_{10}$ aryl, and 5-10 membered heteroaryl.

As used herein, "carbocyclyl" or "carbocyclic" refers to a radical of a non-aromatic cyclic hydrocarbon group having from 3 to 10 ring carbon atoms ("$C_{3-10}$ carbocyclyl") and zero heteroatoms in the non-aromatic ring system. In some embodiments, a carbocyclyl group has 3 to 8 ring carbon atoms ("$C_{3-8}$ carbocyclyl"). In some embodiments, a carbocyclyl group has 3 to 7 ring carbon atoms ("$C_{3-7}$ carbocycyl"). In some embodiments, a carbocyclyl group has 3 to 6 ring carbon atoms ("$C_{3-6}$ carbocyclyl"). In some embodiments, a carbocyclyl group has 5 to 10 ring carbon atoms ("$C_{5-10}$ carbocyclyl"). Exemplary $C_{3-6}$ carbocyclyl groups include, without limitation, cyclopropyl ($C_3$), cyclobutyl ($C_4$), cyclobutenyl ($C_4$), cyclopentyl ($C_5$), cyclopentenyl (C), cyclohexyl ($C_6$), cyclohexenyl ($C_6$), cyclohexadienyl ($C_6$), and the like. Exemplary $C_{3-8}$ carbocyclyl groups include, without limitation, the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptanyl ($C_7$), bicyclo[2.2.2]octanyl ($C_8$), and the like. Exemplary $C_{3-10}$ carbocyclyl groups include, without limitation, the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. As the foregoing examples illustrate, in certain embodiments, the carbocyclyl group is either monocyclic ("monocyclic carbocyclyl") or contain a fused, bridged or spiro ring system such as a bicyclic system ("bicyclic carbocyclyl") and can be saturated or can be partially unsaturated. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system.

The term "cycloalkyl" refers to a monovalent saturated cyclic, bicyclic, or bridged cyclic (e.g., adamantyl) hydrocarbon group of 3-12, 3-8, 4-8, or 4-6 carbons, referred to herein, e.g., as "$C_{4-8}$cycloalkyl," derived from a cycloalkane. Exemplary cycloalkyl groups include, but are not limited to, cyclohexanes, cyclopentanes, cyclobutanes and cyclopropanes.

As used herein, "$C_{3-6}$ monocyclic cycloalkyl" or "monocyclic $C_{3-6}$ cycloalkyl" refers to a 3- to 7-membered monocyclic hydrocarbon ring system that is saturated. 3- to 7-membered monocyclic cycloalkyl groups include, without limitation, cyclopropyl, cyclobutyl, cyclopentyl, and cyclohexyl. Where specified as being optionally substituted or substituted, substituents on a cycloalkyl (e.g., in the case of an optionally substituted cycloalkyl) may be present on any substitutable position and, include, e.g., the position at which the cycloalkyl group is attached.

As used herein, "heterocyclyl" or "heterocyclic" refers to a radical of a 3- to 10-membered non-aromatic ring system having ring carbon atoms and 1 to 4 ring heteroatoms, wherein each heteroatom is independently selected from nitrogen, oxygen, sulfur, boron, phosphorus, and silicon ("3-10 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or a fused, bridged or spiro ring system such as a bicyclic system ("bicyclic heterocyclyl"), and can be saturated or can be partially unsaturated. Heterocyclyl bicyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. The terms "heterocycle," "heterocyclyl," "heterocyclyl ring," "heterocyclic group," "heterocyclic moiety," and "heterocyclic radical," may be used interchangeably.

In some embodiments, a heterocyclyl group is a 4-7 membered non-aromatic ring system having ring carbon atoms and 1-4 ring heteroatoms, wherein each heteroatom is independently selected from nitrogen, oxygen, and sulfur ("4-7 membered heterocyclyl"). In some embodiments, a heterocyclyl group is a 5-10 membered non-aromatic ring system having ring carbon atoms and 1-4 ring heteroatoms, wherein each heteroatom is independently selected from nitrogen, oxygen, sulfur, boron, phosphorus, and silicon ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has one ring heteroatom selected from nitrogen, oxygen, and sulfur.

Exemplary 3-membered heterocyclyl groups containing one heteroatom include, without limitation, azirdinyl, oxiranyl, thiorenyl. Exemplary 4-membered heterocyclyl groups containing one heteroatom include, without limitation, azetidinyl, oxetanyl and thietanyl. Exemplary 5-membered heterocyclyl groups containing one heteroatom include, without limitation, tetrahydrofuranyl, dihydrofuranyl, tetrahydrothiophenyl, dihydrothiophenyl, pyrrolidinyl, dihydropyrrolyl and pyrrolyl-2,5-dione. Exemplary 5-membered heterocyclyl groups containing two heteroatoms include, without limitation, dioxolanyl, oxasulfuranyl, disulfuranyl, and oxazolidin-2-one. Exemplary 5-membered heterocyclyl groups containing three heteroatoms include, without limitation, triazolinyl, oxadiazolinyl, and thiadiazolinyl. Exemplary 6-membered heterocyclyl groups containing one heteroatom include, without limitation, piperidinyl, tetrahydropyranyl, dihydropyridinyl, and thianyl. Exemplary 6-membered heterocyclyl groups containing two heteroatoms include, without limitation, piperazinyl, morpholinyl, dithianyl, dioxanyl. Exemplary 6-membered heterocyclyl groups containing two heteroatoms include, without limitation, triazinanyl. Exemplary 7-membered heterocyclyl groups containing one heteroatom include, without limitation, azepanyl, oxepanyl and thiepanyl. Exemplary 8-membered heterocyclyl groups containing one heteroatom include, without limitation, azocanyl, oxecanyl and thiocanyl. Exemplary 5-membered heterocyclyl groups fused to a $C_6$ aryl ring (also referred to herein as a 5,6-bicyclic heterocyclic ring) include, without limitation, indolinyl, isoindolinyl, dihydrobenzofuranyl, dihydrobenzothienyl, benzoxazolinonyl, and the like. Exemplary 6-membered heterocyclyl groups fused to an aryl ring (also referred to herein as a 6,6-bicyclic heterocyclic ring) include, without limitation, tetrahydroquinolinyl, tetrahydroisoquinolinyl, and the like.

Examples of saturated or partially unsaturated heterocyclic radicals include, without limitation, tetrahydrofuranyl, tetrahydrothienyl, terahydropyranyl, pyrrolidinyl, pyridinonyl, pyrrolidonyl, piperidinyl, oxazolidinyl, piperazinyl, dioxanyl, dioxolanyl, morpholinyl, dihydrofuranyl, dihydropyranyl, dihydropyridinyl, tetrahydropyridinyl, dihydropyrimidinyl, oxetanyl, azetidinyl and tetrahydropyrimidinyl. Where specified as being optionally substituted or substituted, substituents on a heterocyclyl (e.g., in the case of an optionally substituted heterocyclyl) may be present on any substitutable position and, include, e.g., the position at which the heterocyclyl group is attached.

"Hetero" when used to describe a compound or a group present on a compound means that one or more carbon atoms in the compound or group have been replaced by a nitrogen, oxygen, or sulfur heteroatom. Hetero may be applied to any of the hydrocarbyl groups described above such as alkyl, e.g., heteroalkyl; carbocyclyl, e.g., heterocyclyl; aryl, e.g., heteroaryl; and the like having from 1 to 5, and particularly from 1 to 3 heteroatoms.

As used herein, "cyano" refers to —CN.

The terms "halo" and "halogen" as used herein refer to an atom selected from fluorine (fluoro, —F), chlorine (chloro, —Cl), bromine (bromo, —Br), and iodine (iodo, —I). In certain embodiments, the halo group is either fluoro or chloro.

The term "alkoxy," as used herein, refers to an alkyl group which is attached to another moiety via an oxygen atom (—O(alkyl)). Non-limiting examples include e.g., methoxy, ethoxy, propoxy, and butoxy.

"Haloalkoxy" is a haloalkyl group which is attached to another moiety via an oxygen atom such as, e.g., but are not limited to —OCHCF$_2$ or —OCF$_3$.

The term "haloalkyl" includes mono, poly, and perhaloalkyl groups substituted with one or more halogen atoms where the halogens are independently selected from fluorine, chlorine, bromine, and iodine. For the group $C_{1-4}$haloalkyl-O—$C_{1-4}$alkyl, the point of attachment occurs on the alkyl moiety which is halogenated.

As used herein, "nitro" refers to —$NO_2$.

As used herein, "oxo" refers to —C=O.

In general, the term "substituted", whether preceded by the term "optionally" or not, means that at least one hydrogen present on a group (e.g., a carbon or nitrogen atom) is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position.

Nitrogen atoms can be substituted or unsubstituted as valency permits, and include primary, secondary, tertiary, and quarternary nitrogen atoms. Exemplary nitrogen atom substitutents include, but are not limited to, hydrogen, —OH, —$OR^{aa}$, —$N(R^{cc})_2$, —CN, —C(=O)$R^{aa}$, —C(=O)N($R^{cc}$)$_2$, —$CO_2R^{aa}$, —$SO_2R^{aa}$, —C(=$NR^{bb}$)$R^{aa}$, —C(=$NR^{cc}$)$OR^{aa}$, —C(=$NR^{cc}$)N($R^{cc}$)$_2$, —$SO_2N(R^{cc})_2$, —$SO_2R^{cc}$, —$SO_2OR^{cc}$, —$SOR^{aa}$, —C(=S)N($R^{cc}$)$_2$, —C(=O)$SR^{cc}$, —C(=S)$SR^{cc}$, —P(=O)$_2R^{aa}$, —P(=O)($R^{aa}$)$_2$, —P(=O)$_2N(R^{cc})_2$, —P(=O)($NR^{cc}$)$_2$, $C_{1-10}$ alkyl, $C_{1-10}$ perhaloalkyl, $C_{2-10}$ alkenyl, $C_{2-10}$ alkynyl, $C_{3-10}$ carbocyclyl, 3-14 membered heterocyclyl, $C_{6-14}$ aryl, and 5-14 membered heteroaryl, or two $R^{cc}$ groups attached to a nitrogen atom are joined to form a 3-14 membered heterocyclyl or 5-14 membered heteroaryl ring, wherein each alkyl, alkenyl, alkynyl, carbocyclyl, heterocyclyl, aryl, and heteroaryl is independently substituted with 0, 1, 2, 3, 4, or 5 $R^{dd}$ groups, and wherein $R^{aa}$, $R^{bb}$, $R^{cc}$ and $R^{dd}$ are as defined above.

These and other exemplary substituents are described in more detail in the Detailed Description, Examples, and Claims. The invention is not intended to be limited in any manner by the above exemplary listing of substituents.

Other Definitions

As used herein, "pharmaceutically acceptable carrier" refers to a non-toxic carrier, adjuvant, or vehicle that does not destroy the pharmacological activity of the compound with which it is formulated. Pharmaceutically acceptable carriers, adjuvants or vehicles that may be used in the compositions described herein include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

As used herein, "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known in the art. For example, Berge et al., describes pharmaceutically acceptable salts in detail in *J. Pharmaceutical Sciences* (1977) 66:1-19. Pharmaceutically acceptable salts of the compounds of this invention include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Pharmaceutically acceptable salts derived from appropriate bases include alkali metal, alkaline earth metal, ammonium and $N^+(C_{1-4}alkyl)_4$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

As used herein, a "subject" to which administration is contemplated includes, but is not limited to, humans (i.e., a male or female of any age group, e.g., a pediatric subject (e.g, infant, child, adolescent) or adult subject (e.g., young adult, middle-aged adult or senior adult)) and/or a non-human animal, e.g., a mammal such as primates (e.g., cynomolgus monkeys, rhesus monkeys), cattle, pigs, horses, sheep, goats, rodents, cats, and/or dogs. In certain embodiments, the subject is a human. In certain embodiments, the subject is a non-human animal. The terms "human," "patient," and "subject" are used interchangeably herein.

Disease, disorder, and condition are used interchangeably herein.

As used herein, and unless otherwise specified, the terms "treat," "treating" and "treatment" contemplate an action that occurs while a subject is suffering from the specified disease, disorder or condition, which reduces the severity of the disease, disorder or condition, or retards or slows the progression of the disease, disorder or condition ("therapeutic treatment"), and also contemplates an action that occurs before a subject begins to suffer from the specified disease, disorder or condition ("prophylactic treatment").

As used herein, the "effective amount" of a compound refers to an amount sufficient to elicit the desired biological response. As will be appreciated by those of ordinary skill in this art, the effective amount of a compound of the invention may vary depending on such factors as the desired biological endpoint, the pharmacokinetics of the compound, the disease being treated, the mode of administration, and the age, health, and condition of the subject. An effective amount encompasses therapeutic and prophylactic treatment.

As used herein, and unless otherwise specified, a "therapeutically effective amount" of a compound is an amount sufficient to provide a therapeutic benefit in the treatment of a disease, disorder or condition, or to delay or minimize one or more symptoms associated with the disease, disorder or condition. A therapeutically effective amount of a compound means an amount of therapeutic agent, alone or in combination with other therapies, which provides a therapeutic benefit in the treatment of the disease, disorder or condition. The term "therapeutically effective amount" can encompass an amount that improves overall therapy, reduces or avoids symptoms or causes of disease or condition, or enhances the therapeutic efficacy of another therapeutic agent.

Compounds

In one aspect, the present invention provides a compound having the Formula I.

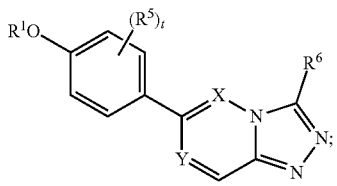
(I)

or a pharmaceutically acceptable salt thereof, wherein
X and Y are each independently $CR^d$ or N;
$R^1$ is

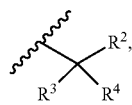

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;
$R^2$ is hydrogen, $C_{1-4}$haloalkyl or monocyclic $C_{3-6}$ cycloalkyl optionally substituted with one or more $R^b$;
$R^3$ is hydrogen, $C_{1-4}$alkyl, or $C_{1-4}$haloalkyl;
$R^4$ is hydrogen or $C_{1-4}$alkyl;
$R^5$ is halo, $C_{3-6}$ cycloalkyl or $C_{1-4}$alkyl optionally substituted with O—$C_{1-4}$alkyl or O—$C_{3-6}$ cycloalkyl;
$R^6$ is $C_{1-4}$alkyl or $C_{1-4}$haloalkyl, wherein the $C_{1-4}$alkyl or $C_{1-4}$haloalkyl is each substituted with $OR^O$;
t is 1 or 2;
$R^a$ and $R^b$ are each independently selected from is selected from halo, $C_{1-4}$alkyl, $C_{1-4}$haloalkyl, $C_{1-4}$alkoxy, and $C_{1-4}$haloalkoxy;
$R^c$ is $C_{1-4}$alkyl optionally substituted with $C_{3-6}$ cycloalkyl or phenyl, or $C_{3-6}$ cycloalkyl; and
$R^d$ is hydrogen or $C_{1-4}$alkyl.

In another aspect, the present disclosure provides a compound having the Formula II.

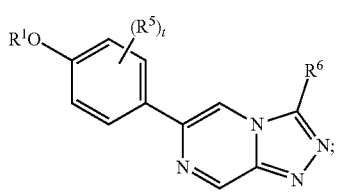
(II)

or a pharmaceutically acceptable salt thereof, wherein
$R^1$ is

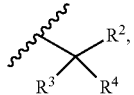

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;
$R^2$ is hydrogen, $C_{1-4}$haloalkyl or monocyclic $C_{3-6}$ cycloalkyl optionally substituted with one or more $R^b$;
$R^3$ is hydrogen, $C_{1-4}$alkyl, or $C_{1-4}$haloalkyl;
$R^4$ is hydrogen or $C_{1-4}$alkyl;
$R^5$ is halo, $C_{3-6}$ cycloalkyl or $C_{1-4}$alkyl optionally substituted with O—$C_{1-4}$alkyl or O—$C_{3-6}$ cycloalkyl;
$R^6$ is $C_{1-4}$alkyl or $C_{1-4}$haloalkyl, wherein said $C_{1-4}$alkyl or $C_{1-4}$haloalkyl are each substituted with $OR^c$;
t is 1 or 2;
$R^a$ and $R^b$ are each independently selected from is selected from halo, $C_{1-4}$alkyl, $C_{1-4}$haloalkyl, $C_{1-4}$alkoxy, and $C_{1-4}$haloalkoxy; and
$R^c$ is $C_{1-4}$alkyl optionally substituted with $C_{3-6}$ cycloalkyl or phenyl, or $C_{3-6}$ cycloalkyl.

In another aspect, the present disclosure provides a compound having the Formula III:

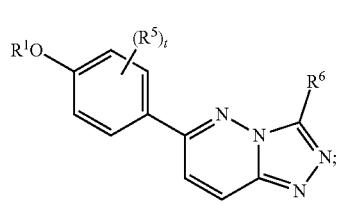
(III)

or a pharmaceutically acceptable salt thereof, wherein
$R^1$ is

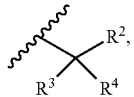

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;
$R^2$ is hydrogen, $C_{1-4}$haloalkyl or monocyclic $C_{3-6}$ cycloalkyl optionally substituted with one or more $R^b$;
$R^3$ is hydrogen, $C_{1-4}$alkyl, or $C_{1-4}$haloalkyl;
$R^4$ is hydrogen or $C_{1-4}$alkyl;
$R^5$ is halo, $C_{3-6}$ cycloalkyl or $C_{1-4}$alkyl optionally substituted with O—$C_{1-4}$alkyl or O—$C_{3-6}$ cycloalkyl;
$R^6$ is $C_{1-4}$alkyl or $C_{1-4}$haloalkyl, wherein the $C_{1-4}$alkyl or $C_{1-4}$haloalkyl is each substituted with $OR^c$;
t is 1 or 2;
$R^a$ and $R^b$ are each independently selected from is selected from halo, $C_{1-4}$alkyl, $C_{1-4}$haloalkyl, $C_{1-4}$alkoxy, and $C_{1-4}$haloalkoxy; and
$R^c$ is $C_{1-4}$alkyl optionally substituted with $C_{3-6}$ cycloalkyl or phenyl, or $C_{3-6}$ cycloalkyl.

In another aspect, the present disclosure provides a compound having the Formula IV:

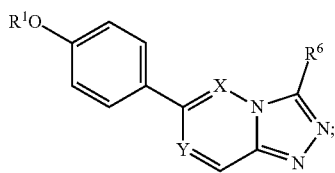

(IV)

or a pharmaceutically acceptable salt thereof, wherein
X and Y are each independently $CR^d$ or N;
$R^1$ is

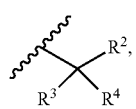

$CF_3$, monocyclic $C_{3-6}$ cycloalkyl, or 4- to 7-membered monocyclic heterocyclyl, wherein the cycloalkyl and heterocyclyl are optionally substituted with one or more $R^a$;

$R^2$ is hydrogen, $C_{1-4}$haloalkyl or monocyclic $C_{3-6}$ cycloalkyl optionally substituted with one or more $R^b$;

$R^3$ is hydrogen, $C_{1-4}$alkyl, or $C_{1-4}$haloalkyl;

$R^4$ is hydrogen or $C_{1-4}$alkyl;

$R^6$ is $C_{1-4}$alkyl or $C_{1-4}$haloalkyl, wherein the $C_{1-4}$alkyl or $C_{1-4}$haloalkyl is each substituted with $OR^c$;

$R^a$ and $R^b$ are each independently selected from is selected from halo, $C_{1-4}$alkyl, $C_{1-4}$haloalkyl, $C_{1-4}$alkoxy, and $C_{1-4}$haloalkoxy;

$R^c$ is $C_{1-4}$alkyl optionally substituted with $C_{3-6}$ cycloalkyl or phenyl, or $C_{3-6}$ cycloalkyl; and $R^d$ is hydrogen or $C_{1-4}$alkyl;
provided that the compound is not N

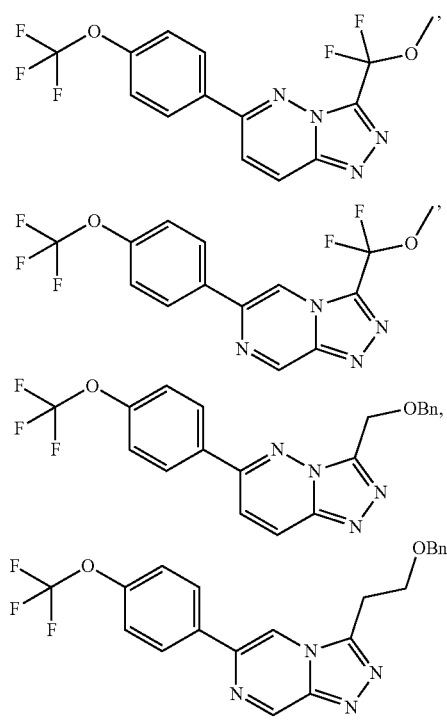

or a pharmaceutically acceptable salt thereof.

In some embodiments, X is N and Y is $CR^d$. In some embodiments, X is $CR^d$ and Y is N.

In some embodiments, $R^1$ is

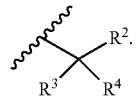

In some embodiments, $R^1$ is cyclobutyl optionally substituted with one or more $R^a$. In some embodiments, $R^1$ is $CF_3$.

In some embodiments, $R^2$ is $C_{1-4}$haloalkyl. In some embodiments, $R^2$ is $CF_3$. In some embodiments, $R^2$ is hydrogen.

In some embodiments, $R^3$ is $C_{1-4}$alkyl and $R^4$ is hydrogen or $C_{1-4}$alkyl. In some embodiments, $R^3$ and $R^4$ are each $C_{1-4}$alkyl. In some embodiments, $R^3$ and $R^4$ are each methyl. In some embodiments, $R^3$ is methyl and $R^4$ is hydrogen. In some embodiments, $R^3$ and $R^4$ are each hydrogen.

In some embodiments, $R^6$ is $CF_2$—$OR^c$. In some embodiments, $R^c$ is $C_{1-4}$alkyl optionally substituted with cyclopropyl. In some embodiments, $R^c$ is cyclopropyl. In some embodiments, $R^6$ is $CF_2OCH_3$, $CF_2OCH_2CH_3$, $CF_2OCH(CH_3)_2$, or $CF_2OCH_2C_3H_5$.

In some embodiments, $R^6$ is $CH_2$—$OR^c$. In some embodiments, $R^c$ is $C_{1-4}$alkyl optionally substituted with cyclopropyl or phenyl. In some embodiments, $R^c$ is cyclopropyl.

In some embodiments, $R^6$ is $CH_2OCH_3$, $CH_2OCH_2CH_3$, $CH_2OCH_2C_3H_5$, $CH_2OCH_2CH(CH_3)_2$, or $CH_2OCH_2C_6H_5$.

In some embodiments, $R^6$ is $C(CH_3)_2$—$OR^c$. In some embodiments, $R^c$ is $C_{1-4}$alkyl. In some embodiments, $R^6$ is $C(CH_3)_2$—$OCH_2CH_3$.

In some embodiments, $R^a$ is fluoro.

In some embodiments, t is 1. In some embodiments, t is 2.

In some embodiments, $R^5$ is halo or $C_{1-4}$alkyl optionally substituted with $OCH_3$ or $OC_3H_5$. In some embodiments, $R^5$ is fluoro. In some embodiments, $R^5$ is methyl. In some embodiments, $R^5$ is fluoro, $CH_3$, $CH_2CH_3$, $CH_2OCH_3$, $CH(CH_3)OCH_3$, or $CH_2OC_3H_5$.

In some embodiments, $R^d$ is hydrogen.

In some embodiments, the compound is

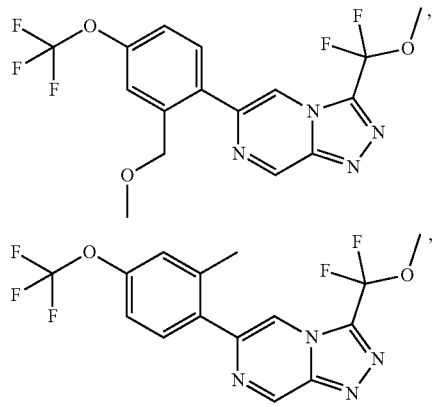

-continued
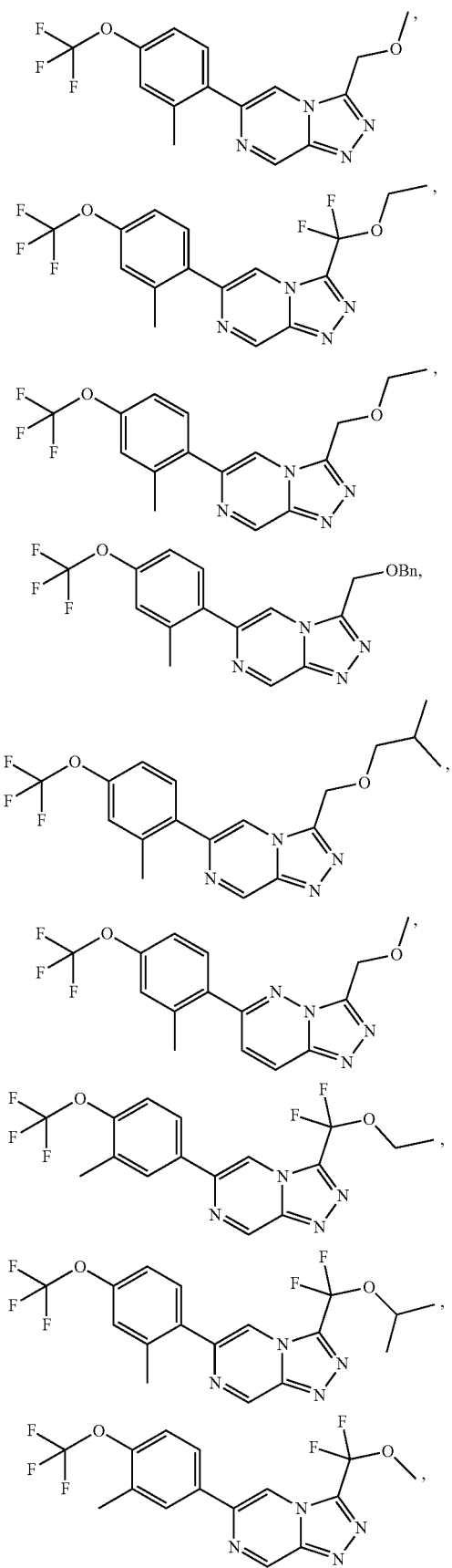
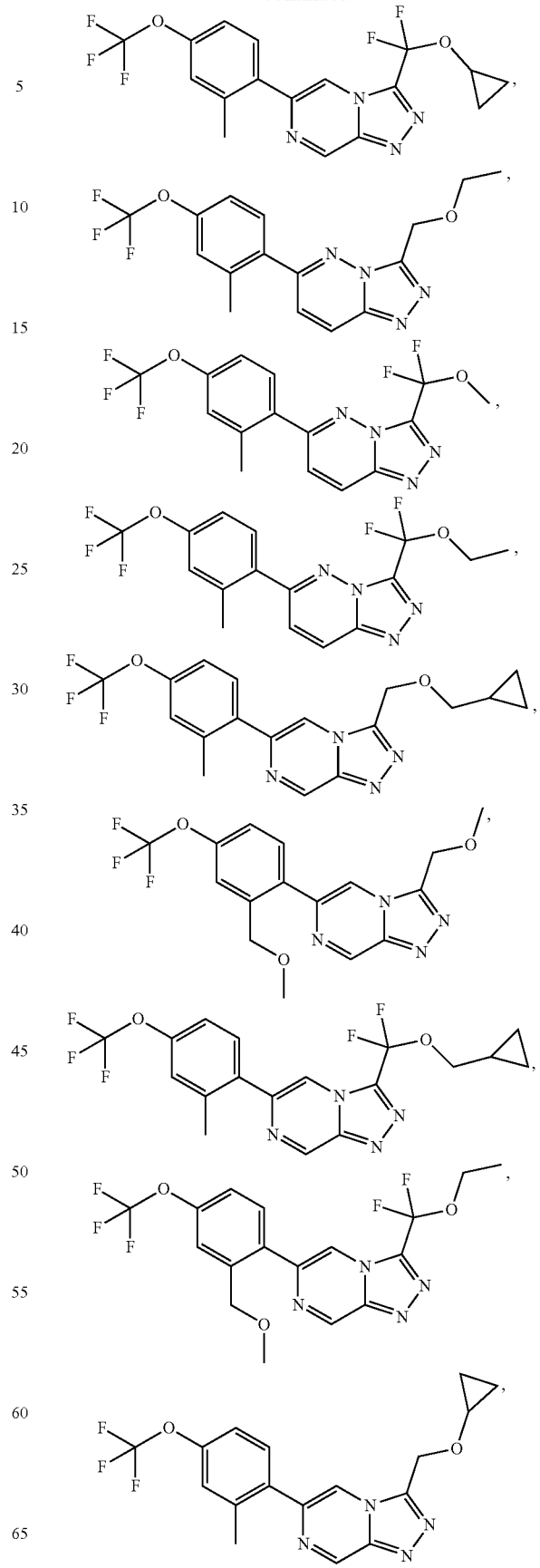

-continued
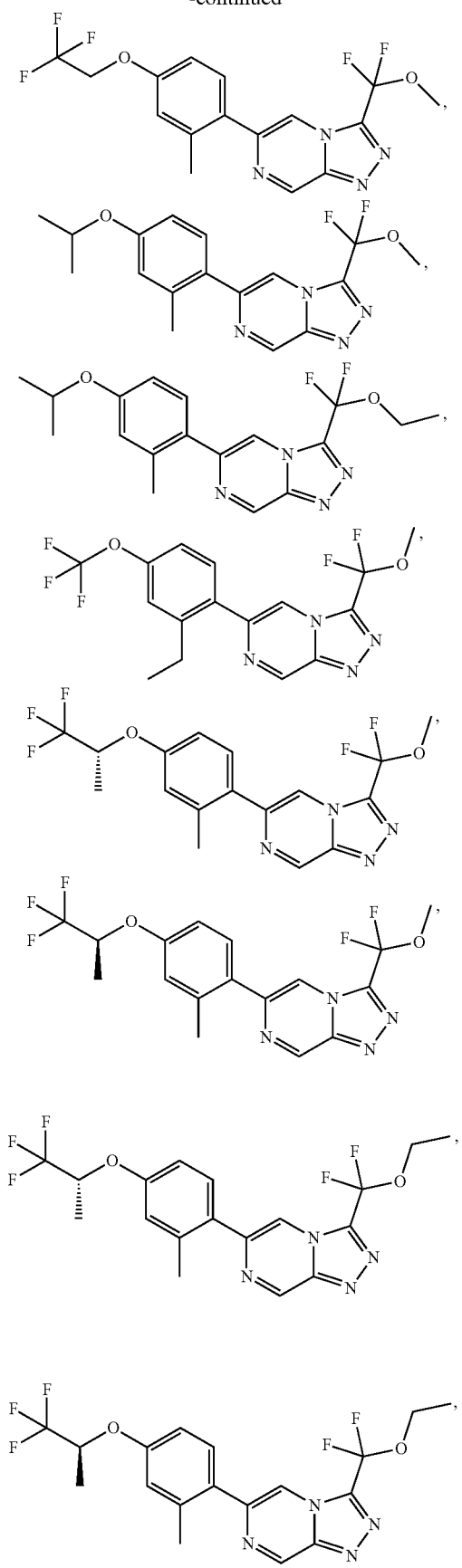
-continued
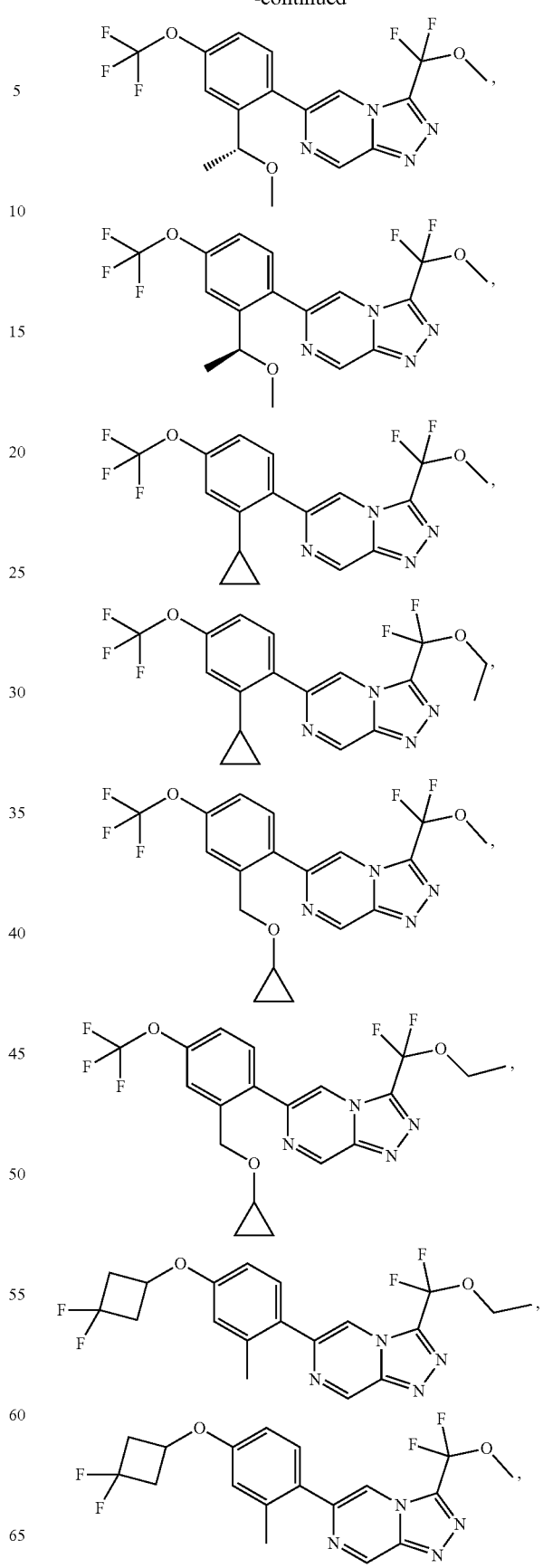

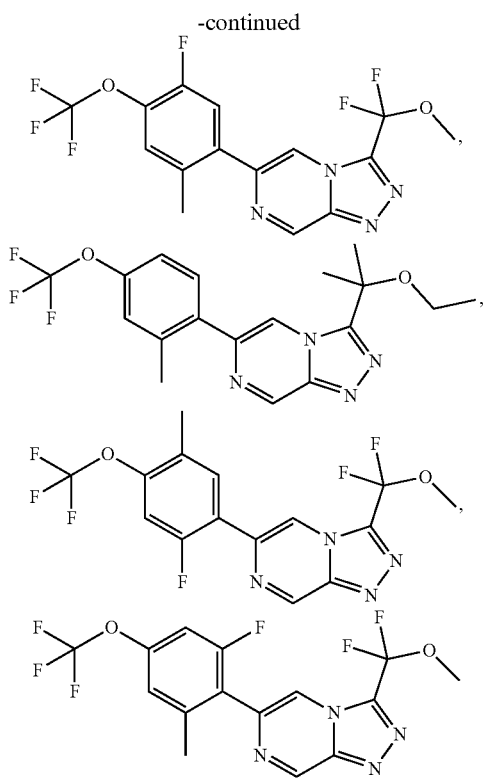

or a pharmaceutically acceptable salt of any of the foregoing.

In some embodiments, the compound is

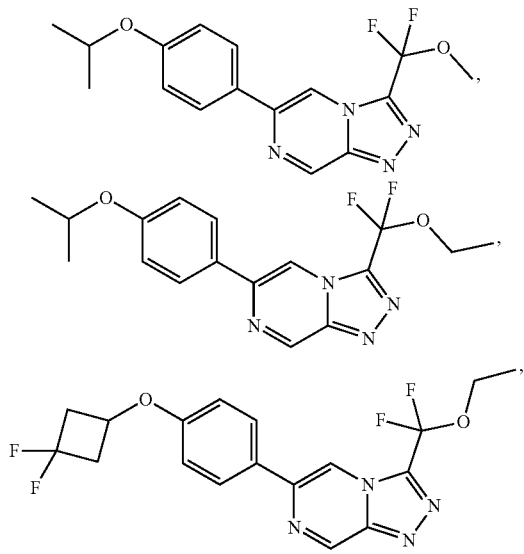

or a pharmaceutically acceptable salt of any of the foregoing.

Pharmaceutical Compositions and Routes of Administration

Compounds provided in accordance with the present invention are usually administered in the form of pharmaceutical compositions. This invention therefore provides pharmaceutical compositions that contain, as the active ingredient, one or more of the compounds described, or a pharmaceutically acceptable salt or ester thereof, and one or more pharmaceutically acceptable excipients, carriers, including inert solid diluents and fillers, diluents, including sterile aqueous solution and various organic solvents, permeation enhancers, solubilizers and adjuvants. The pharmaceutical compositions may be administered alone or in combination with other therapeutic agents. Such compositions are prepared in a manner well known in the pharmaceutical art (see, e.g., Remington's Pharmaceutical Sciences, Mace Publishing Co., Philadelphia, Pa. 17th Ed. (1985); and Modern Pharmaceutics, Marcel Dekker, Inc. 3rd Ed. (G. S. Banker & C. T. Rhodes, Eds.)

The pharmaceutical compositions may be administered in either single or multiple doses by any of the accepted modes of administration of agents having similar utilities, for example as described in those patents and patent applications incorporated by reference, including rectal, buccal, intranasal and transdermal routes, by intra-arterial injection, intravenously, intraperitoneally, parenterally, intramuscularly, subcutaneously, orally, topically, as an inhalant, or via an impregnated or coated device such as a stent, for example, or an artery-inserted cylindrical polymer.

One mode for administration is parenteral, particularly by injection. The forms in which the novel compositions of the present invention may be incorporated for administration by injection include aqueous or oil suspensions, or emulsions, with sesame oil, corn oil, cottonseed oil, or peanut oil, as well as elixirs, mannitol, dextrose, or a sterile aqueous solution, and similar pharmaceutical vehicles. Aqueous solutions in saline are also conventionally used for injection, but less preferred in the context of the present invention. Ethanol, glycerol, propylene glycol, liquid polyethylene glycol, and the like (and suitable mixtures thereof), cyclodextrin derivatives, and vegetable oils may also be employed. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like.

Sterile injectable solutions are prepared by incorporating a compound according to the present invention in the required amount in the appropriate solvent with various other ingredients as enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

Oral administration is another route for administration of compounds in accordance with the invention. Administration may be via capsule or enteric coated tablets, or the like. In making the pharmaceutical compositions that include at least one compound described herein, the active ingredient is usually diluted by an excipient and/or enclosed within such a carrier that can be in the form of a capsule, sachet, paper or other container. When the excipient serves as a diluent, it can be in the form of a solid, semi-solid, or liquid material (as above), which acts as a vehicle, carrier or medium for the active ingredient. Thus, the compositions can be in the form of tablets, pills, powders, lozenges, sachets, cachets, elixirs, suspensions, emulsions, solutions, syrups, aerosols (as a solid or in a liquid medium), ointments containing, for example, up to 10% by weight of the active compound, soft and hard gelatin capsules, sterile injectable solutions, and sterile packaged powders.

Some examples of suitable excipients include lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, sterile water, syrup, and methyl cellulose. The formulations can additionally include: lubricating agents such as talc, magnesium stearate, and mineral oil; wetting agents; emulsifying and suspending agents; preserving agents such as methyl and propylhydroxy-benzoates; sweetening agents; and flavoring agents.

The compositions of the invention can be formulated so as to provide quick, sustained or delayed release of the active ingredient after administration to the patient by employing procedures known in the art. Controlled release drug delivery systems for oral administration include osmotic pump systems and dissolutional systems containing polymer-coated reservoirs or drug-polymer matrix formulations. Examples of controlled release systems are given in U.S. Pat. Nos. 3,845,770; 4,326,525; 4,902,514; and 5,616,345. Another formulation for use in the methods of the present invention employs transdermal delivery devices ("patches"). Such transdermal patches may be used to provide continuous or discontinuous infusion of the compounds of the present invention in controlled amounts. The construction and use of transdermal patches for the delivery of pharmaceutical agents is well known in the art. See, e.g., U.S. Pat. Nos. 5,023,252, 4,992,445 and 5,001,139. Such patches may be constructed for continuous, pulsatile, or on demand delivery of pharmaceutical agents.

The compositions are preferably formulated in a unit dosage form. The term "unit dosage forms" refers to physically discrete units suitable as unitary dosages for human subjects and other mammals, each unit containing a predetermined quantity of active material calculated to produce the desired therapeutic effect, in association with a suitable pharmaceutical excipient (e.g., a tablet, capsule, ampoule). The compounds are generally administered in a pharmaceutically effective amount. Preferably, for oral administration, each dosage unit contains from 1 mg to 2 g of a compound described herein, and for parenteral administration, preferably from 0.1 to 700 mg of a compound a compound described herein. It will be understood, however, that the amount of the compound actually administered usually will be determined by a physician, in the light of the relevant circumstances, including the condition to be treated, the chosen route of administration, the actual compound administered and its relative activity, the age, weight, and response of the individual patient, the severity of the patient's symptoms, and the like.

For preparing solid compositions such as tablets, the principal active ingredient is mixed with a pharmaceutical excipient to form a solid preformulation composition containing a homogeneous mixture of a compound of the present invention. When referring to these preformulation compositions as homogeneous, it is meant that the active ingredient is dispersed evenly throughout the composition so that the composition may be readily subdivided into equally effective unit dosage forms such as tablets, pills and capsules.

The tablets or pills of the present invention may be coated or otherwise compounded to provide a dosage form affording the advantage of prolonged action, or to protect from the acid conditions of the stomach. For example, the tablet or pill can comprise an inner dosage and an outer dosage component, the latter being in the form of an envelope over the former. The two components can be separated by an enteric layer that serves to resist disintegration in the stomach and permit the inner component to pass intact into the duodenum or to be delayed in release. A variety of materials can be used for such enteric layers or coatings, such materials including a number of polymeric acids and mixtures of polymeric acids with such materials as shellac, cetyl alcohol, and cellulose acetate.

Compositions for inhalation or insufflation include solutions and suspensions in pharmaceutically acceptable, aqueous or organic solvents, or mixtures thereof, and powders. The liquid or solid compositions may contain suitable pharmaceutically acceptable excipients as described supra. Preferably, the compositions are administered by the oral or nasal respiratory route for local or systemic effect. Compositions in preferably pharmaceutically acceptable solvents may be nebulized by use of inert gases. Nebulized solutions may be inhaled directly from the nebulizing device or the nebulizing device may be attached to a facemask tent, or intermittent positive pressure breathing machine. Solution, suspension, or powder compositions may be administered, preferably orally or nasally, from devices that deliver the formulation in an appropriate manner.

In some embodiments, a pharmaceutical composition comprises a disclosed compound, or pharmaceutically acceptable salt thereof, and a pharmaceutically acceptable carrier.

Methods of Treatment

Compounds and compositions described herein are generally useful for the modulating the activity of sodium channels and are useful in treating conditions relating to aberrant function of a sodium channel ion channel, e.g., abnormal late sodium (INaL) current. In some embodiments, a compound provided by the present invention is effective in the treatment of epilepsy or an epilepsy syndrome, a neurodevelopmental disorder, pain, or a neuromuscular disorder. A provided compound, pharmaceutically acceptable salt thereof, or composition may also modulate all sodium ion channels, or may be specific to only one or a plurality of sodium ion channels, e.g., Nav 1.1, 1.2, 1.3, 1.4, 1.5, 1.6, 1.7, 1.8, and/or 1.9.

In typical embodiments, the present invention is intended to encompass the compounds disclosed herein, and the pharmaceutically acceptable salts, pharmaceutically acceptable esters, tautomeric forms, polymorphs, and prodrugs of such compounds. In some embodiments, the present invention includes a pharmaceutically acceptable addition salt, a pharmaceutically acceptable ester, a solvate (e.g., hydrate) of an addition salt, a tautomeric form, a polymorph, an enantiomer, a mixture of enantiomers, a stereoisomer or mixture of stereoisomers (pure or as a racemic or non-racemic mixture) of a compound described herein (e.g. a compound of Formula I, II, III, or IV).

Epilepsy and Epilepsy Syndromes

The compounds described herein are useful in the treatment of epilepsy and epilepsy syndromes. Epilepsy is a CNS disorder in which nerve cell activity in the brain becomes disrupted, causing seizures or periods of unusual behavior, sensations and sometimes loss of consciousness. Seizure symptoms will vary widely, from a simple blank stare for a few seconds to repeated twitching of their arms or legs during a seizure.

Epilepsy may involve a generalized seizure or a partial or focal seizure. All areas of the brain are involved in a generalized seizure. A person experiencing a generalized seizure may cry out or make some sound, stiffen for several seconds to a minute a then have rhythmic movements of the arms and legs. The eyes are generally open, the person may appear not to be breathing and may actually turn blue. The return to consciousness is gradual and the person may be confused from minutes to hours. There are six main types of generalized seizures: tonic-clonic, tonic, clonic, myoclonic, absence, and atonic seizures. In a partial or focal seizure, only part of the brain is involved, so only part of the body is affected. Depending on the part of the brain having abnormal electrical activity, symptoms may vary.

Epilepsy, as described herein, includes a generalized, partial, complex partial, tonic clonic, clonic, tonic, refractory seizures, status epilepticus, absence seizures, febrile seizures, or temporal lobe epilepsy.

The compounds described herein (e.g., a compound of Formula I, II, III, or IV) may also be useful in the treatment of epilepsy syndromes. Severe syndromes with diffuse brain dysfunction caused, at least partly, by some aspect of epilepsy, are also referred to as epileptic encephalopathies. These are associated with frequent seizures that are resistant to treatment and severe cognitive dysfunction, for instance West syndrome.

In some embodiments, the epilepsy syndrome comprises an epileptic encephalopathy, such as Dravet syndrome, Angelman syndrome, CDKL5 disorder, frontal lobe epilepsy, infantile spasms, West's syndrome, Juvenile Myoclonic Epilepsy, Landau-Kleffner syndrome, Lennox-Gastaut syndrome, Ohtahara syndrome, PCDH19 epilepsy, or Glut1 deficiency.

In some embodiments, the epilepsy or epilepsy syndrome is a genetic epilepsy or a genetic epilepsy syndrome. In some embodiments, epilepsy or an epilepsy syndrome comprises epileptic encephalopathy, epileptic encephalopathy with SCN1A, SCN2A, SCN8A mutations, early infantile epileptic encephalopathy, Dravet syndrome, Dravet syndrome with SCN1A mutation, generalized epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden expected death in epilepsy (SUDEP), KCNQ2 epileptic encephalopathy, or KCNT1 epileptic encephalopathy.

In some embodiments, the methods described herein further comprise identifying a subject having epilepsy or an epilepsy syndrome (e.g., epileptic encephalopathy, epileptic encephalopathy with SCN1A, SCN2A, SCN8A mutations, early infantile epileptic encephalopathy, Dravet syndrome, Dravet syndrome with SCN1A mutation, generalized Epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden unexpected death in epilepsy (SUDEP), KCNQ2 epileptic encephalopathy, or KCNT1 epileptic encephalopathy) prior to administration of a compound described herein (e.g., a compound of Formula I, II, III, or IV).

In one aspect, the present invention features a method of treating epilepsy or an epilepsy syndrome (e.g., epileptic encephalopathy, epileptic encephalopathy with SCN1A, SCN2A, SCN8A mutations, early infantile epileptic encephalopathy, Dravet syndrome, Dravet syndrome with SCN1A mutation, generalized Epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden expected death in epilepsy (SUDEP), KCNQ2 epileptic encephalopathy, or KCNT1 epileptic encephalopathy) comprising administering to a subject in need thereof a compound of Formula (I):

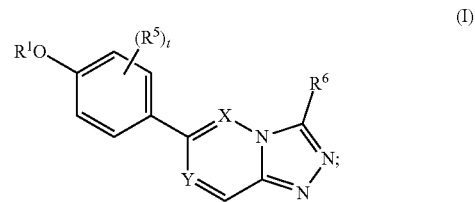

or a pharmaceutically acceptable salt thereof, wherein the variables are as defined herein.

A compound of the present invention (e.g., a compound of Formula I, II, III, or IV) may also be used to treat an epileptic encephalopathy, wherein the subject has a mutation in one or more of ALDH7A1, ALG13, ARHGEF9, ARX, ASAH1, CDKL5, CHD2, CHRNA2, CHRNA4, CHRNB2, CLN8, CNTNAP2, CPA6, CSTB, DEPDC5, DNM1, EEF1A2, EPM2A, EPM2B, GABRA1, GABRB3, GABRG2, GNAO1, GOSR2, GRIN1, GRIN2A, GRIN2B, HCN1, IER3IP1, KCNA2, KCNB1, KCNC1, KCNMA1, KCNQ2, KCNQ3, KCNT1, KCTD7, LGI1, MEF2C, NHLRC1, PCDH19, PLCB1, PINK, PNPO, PRICKLE1, PRICKLE2, PRRT2, RELN, SCARB2, SCN1A, SCN1B, SCN2A, SCN8A, SCN9A, SIAT9, SIK1, SLC13A5, SLC25A22, SLC2A1, SLC35A2, SLC6A1, SNIPI, SPTAN1, SRPX2, ST3GAL3, STRADA, STX1B, STXBP1, SYN1, SYN-GAP1, SZT2, TBC1D24, and WWOX.

In some embodiments, the methods described herein further comprise identifying a subject having a mutation in one or more of ALDH7A1, ALG13, ARHGEF9, ARX, ASAH1, CDKL5, CHD2, CHRNA2, CHRNA4, CHRNB2, CLN8, CNTNAP2, CPA6, CSTB, DEPDC5, DNM1, EEF1A2, EPM2A, EPM2B, GABRA1, GABRB3, GABRG2, GNAO1, GOSR2, GRIN1, GRIN2A, GRIN2B, HCN1, IER3IP1, KCNA2, KCNB1, KCNC1, KCNMA1, KCNQ2, KCNQ3, KCNT1, KCTD7, LGI1, MEF2C, NHLRC1, PCDH19, PLCB1, PNKP, PNPO, PRICKLE1, PRICKLE2, PRRT2, RELN, SCARB2, SCN1A, SCN1B, SCN2A, SCN8A, SCN9A, SIAT9, SIK1, SLC13A5, SLC25A22, SLC2A1, SLC35A2, SLC6A1, SNIPI, SPTAN1, SRPX2, ST3GAL3, STRADA, STX1B, STXBP1, SYN1, SYNGAP1, SZT2, TBC1D24, and WWOX prior to administration of a compound described herein (e.g., a compound of Formula I, II, III, or IV).

Neurodevelopmental Disorders

The compounds described herein may be useful in the treatment of a neurodevelopmental disorder. In some embodiments, the neurodevelopmental disorder comprises autism, autism with epilepsy, tuberous sclerosis, Fragile X syndrome, Rett syndrome, Angelman syndrome, Dup15q syndrome, 22q13.3 Deletion syndrome, Prader-Willi syndrome, velocardiofacial syndrome, Smith-Lemli-Opitz syndrome, or a neurodevelopmental disorder with epilepsy. In some embodiments, the methods described herein further comprise identifying a subject having a neurodevelopmental disorder (e.g., autism, autism with epilepsy, tuberous sclerosis, Fragile X syndrome, Rett syndrome, Angelman syndrome, Dup15q syndrome, 22q13.3 Deletion syndrome, Prader-Willi syndrome, velocardiofacial syndrome, Smith-Lemli-Opitz syndrome, or a neurodevelopmental disorder with epilepsy) prior to administration of a compound described herein (e.g., a compound of Formula I, II, III, or IV).

In one aspect, the present invention features a method of treating a neurodevelopmental disorder (e.g., autism, autism with epilepsy, tuberous sclerosis, Fragile X syndrome, Rett syndrome, Angelman syndrome, Dup15q syndrome, 22q13.3 Deletion syndrome, Prader-Willi syndrome, velocardiofacial syndrome, Smith-Lemli-Opitz syndrome, or a neurodevelopmental disorder with epilepsy) comprising administering to a subject in need thereof a compound of Formula (I):

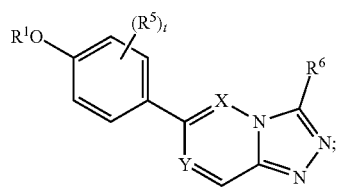

(I)

or a pharmaceutically acceptable salt thereof, wherein the variables are as defined herein.

Pain

The compounds described herein may be useful in the treatment of pain. In some embodiments, the pain comprises neuropathic pain, trigeminal neuralgia, migraine, hemiplegic migraine, familial hemiplegic migraine, familial hemiplegic migraine type 3, cluster headache, trigeminal neuralgia, cerebellar ataxia, or a related headache disorder. In some embodiments, the methods described herein further comprise identifying a subject having pain (e.g., neuropathic pain, trigeminal neuralgia, migraine, hemiplegic migraine, familial hemiplegic migraine, familial hemiplegic migraine type 3, cluster headache, trigeminal neuralgia, cerebellar ataxia, or a related headache disorder) prior to administration of a compound described herein (e.g., a compound of Formula I, II, III, or IV).

In one aspect, the present invention features a method of treating pain (e.g., neuropathic pain, trigeminal neuralgia, migraine, hemiplegic migraine, familial hemiplegic migraine, familial hemiplegic migraine type 3, cluster headache, trigeminal neuralgia, cerebellar ataxia, or a related headache disorder) comprising administering to a subject in need thereof a compound of Formula (I):

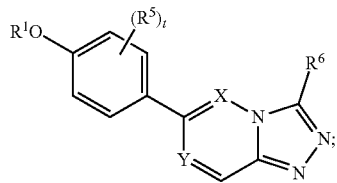

(I)

or a pharmaceutically acceptable salt thereof, wherein the variables are as defined herein.

Neuromuscular Disorders

The compounds described herein may be useful in the treatment of a neuromuscular disorder. In some embodiments, the neuromuscular disorder comprises amyotrophic lateral sclerosis, multiple sclerosism, myotonia, paramyotonia congenita, potassium-aggravated myotonia, periodic paralysis, hyperkalemic periodic paralysis, hypokalemic periodic paralysis, or laryngospasm with SCN4A mutation. In some embodiments, the methods described herein further comprise identifying a subject having a neuromuscular disorder (e.g., amyotrophic lateral sclerosis, multiple sclerosism, myotonia, paramyotonia congenita, potassium-aggravated myotonia, periodic paralysis, hyperkalemic periodic paralysis, hypokalemic periodic paralysis, or laryngospasm with SCN4A mutation) prior to administration of a compound described herein (e.g., a compound of Formula I, II, III, or IV).

In one aspect, the present invention features a method of treating a neuromuscular disorder (e.g., amyotrophic lateral sclerosis, multiple sclerosism, myotonia, paramyotonia congenita, potassium-aggravated myotonia, periodic paralysis, hyperkalemic periodic paralysis, hypokalemic periodic paralysis, or laryngospasm with SCN4A mutation) comprising administering to a subject in need thereof a compound of Formula (I):

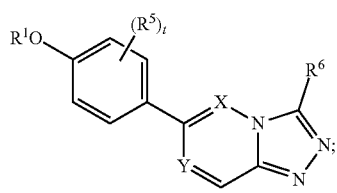

(I)

or a pharmaceutically acceptable salt thereof, wherein the variables are as defined herein.

Other Disorders

In some embodiments, a compound of the present invention (e.g., a compound of Formula I, II, III, or IV) may have appropriate pharmacokinetic properties such that they may be active with regard to the central and/or peripheral nervous system. In some embodiments, the compounds provided herein are used to treat a cardiovascular disease such as atrial and ventricular arrhythmias, including atrial fibrillation, Prinzmetal's (variant) angina, stable angina, unstable angina, ischemia and reperfusion injury in cardiac, kidney, liver and the brain, exercise induced angina, pulmonary hypertension, congestive heart disease including diastolic and systolic heart failure, recurrent ischemia, cerebral ischemia, stroke, renal ischemia, ischemia associated with organ transplant, acute coronary syndrome, peripheral arterial disease, intermittent claudication, and myocardial infarction. In some embodiments, the compounds provided herein may be used in the treatment of diseases affecting the neuromuscular system resulting in itching, seizures, or paralysis, or in the treatment of diabetes or reduced insulin sensitivity, and disease states related to diabetes, such as diabetic peripheral neuropathy. In some embodiments, a disclosed method comprises administering the pharmaceutical composition.

In some embodiments, provided herein is a method of treating a neurological disorder or a psychiatric disorder, wherein the method comprises administering to a subject in need thereof a compound disclosed herein, or a pharmaceutically acceptable salt thereof or a pharmaceutical composition disclosed herein.

Combination Therapy

A compound or composition described herein (e.g., for use in modulating a sodium ion channel, e.g., the late sodium (INaL) current) may be administered in combination with another agent or therapy. A subject to be administered a compound disclosed herein may have a disease, disorder, or condition, or a symptom thereof, that would benefit from treatment with another agent or therapy. These diseases or conditions can relate to epilepsy or an epilepsy syndrome, a neurodevelopmental disorder, pain, or a neuromuscular disorder.

Antiepilepsy Agents

Anti-epilepsy agents include brivaracetam, carbamazepine, clobazam, clonazepam, diazepam, divalproex, eslicarbazepine, ethosuximide, ezogabine, felbamate, gabapentin, lacosamide, lamotrigine, levetiracetam, lorazepam, oxcarbezepine, permpanel, phenobarbital, phenytoin, pregabalin, primidone, rufinamide, tigabine, topiramate, valproic acid, vigabatrin, zonisamide, and cannabidiol.

Cardiovascular Agent Combination Therapy

Cardiovascular related diseases or conditions that can benefit from a combination treatment of the sodium channel blockers of the invention with other therapeutic agents include, without limitation, angina including stable angina, unstable angina (UA), exercised-induced angina, variant angina, arrhythmias, intermittent claudication, myocardial infarction including non-STE myocardial infarction (NSTEMI), pulmonary hypertension including pulmonary arterial hypertension, heart failure including congestive (or chronic) heart failure and diastolic heart failure and heart failure with preserved ejection fraction (diastolic dysfunction), acute heart failure, or recurrent ischemia.

Therapeutic agents suitable for treating cardiovascular related diseases or conditions include anti-anginals, heart failure agents, antithrombotic agents, antiarrhythmic agents, antihypertensive agents, and lipid lowering agents.

The co-administration of the sodium channel blockers of the invention with therapeutic agents suitable for treating cardiovascular related conditions allows enhancement in the standard of care therapy the patient is currently receiving.

Anti-Anginals

Anti-anginals include beta-blockers, calcium channel blockers, and nitrates. Beta blockers reduce the heart's need for oxygen by reducing its workload resulting in a decreased heart rate and less vigorous heart contraction. Examples of beta-blockers include acebutolol (Sectral), atenolol (Tenormin), betaxolol (Kerlone), bisoprolol/hydrochlorothiazide (Ziac), bisoprolol (Zebeta), carteolol (Cartrol), esmolol (Brevibloc), labetalol (Normodyne, Trandate), metoprolol (Lopressor, Toprol XL), nadolol (Corgard), propranolol (Inderal), sotalol (Betapace), and timolol (Blocadren).

Nitrates dilate the arteries and veins thereby increasing coronary blood flow and decreasing blood pressure. Examples of nitrates include nitroglycerin, nitrate patches, isosorbide dinitrate, and isosorbide-5-mononitrate.

Calcium channel blockers prevent the normal flow of calcium into the cells of the heart and blood vessels causing the blood vessels to relax thereby increasing the supply of blood and oxygen to the heart. Examples of calcium channel blockers include amlodipine (Norvasc, Lotrel), bepridil (Vascor), diltiazem (Cardizem, Tiazac), felodipine (Plendil), nifedipine (Adalat, Procardia), nimodipine (Nimotop), nisoldipine (Sular), verapamil (Calan, Isoptin, Verelan), and nicardipine.

Heart Failure Agents

Agents used to treat heart failure include diuretics, ACE inhibitors, vasodilators, and cardiac glycosides. Diuretics eliminate excess fluids in the tissues and circulation thereby relieving many of the symptoms of heart failure. Examples of diuretics include hydrochlorothiazide, metolazone (Zaroxolyn), furosemide (Lasix), bumetanide (Bumex), spironolactone (Aldactone), and eplerenone (Inspra).

Angiotensin converting enzyme (ACE) inhibitors reduce the workload on the heart by expanding the blood vessels and decreasing resistance to blood flow. Examples of ACE inhibitors include benazepril (Lotensin), captopril (Capoten), enalapril (Vasotec), fosinopril (Monopril), lisinopril (Prinivil, Zestril), moexipril (Univasc), perindopril (Aceon), quinapril (Accupril), ramipril (Altace), and trandolapril (Mavik).

Vasodilators reduce pressure on the blood vessels by making them relax and expand. Examples of vasodilators include hydralazine, diazoxide, prazosin, clonidine, and methyldopa. ACE inhibitors, nitrates, potassium channel activators, and calcium channel blockers also act as vasodilators.

Cardiac glycosides are compounds that increase the force of the heart's contractions. These compounds strengthen the pumping capacity of the heart and improve irregular heartbeat activity. Examples of cardiac glycosides include digitalis, digoxin, and digitoxin.

Antithrombotic Agents

Antithrombotics inhibit the clotting ability of the blood. There are three main types of antithrombotics—platelet inhibitors, anticoagulants, and thrombolytic agents.

Platelet inhibitors inhibit the clotting activity of platelets, thereby reducing clotting in the arteries. Examples of platelet inhibitors include acetylsalicylic acid (aspirin), ticlopidine, clopidogrel (plavix), dipyridamole, cilostazol, persantine sulfinpyrazone, dipyridamole, indomethacin, and glycoprotein IIb/IIIa inhibitors, such as abciximab, tirofiban, and eptifibatide (Integrelin). Beta blockers and calcium channel blockers also have a platelet-inhibiting effect.

Anticoagulants prevent blood clots from growing larger and prevent the formation of new clots. Examples of anticoagulants include bivalirudin (Angiomax), warfarin (Coumadin), unfractionated heparin, low molecular weight heparin, danaparoid, lepirudin, and argatroban.

Thrombolytic agents act to break down an existing blood clot. Examples of thrombolytic agents include streptokinase, urokinase, and tenecteplase (TNK), and tissue plasminogen activator (t-PA).

Antiarrhythmic Agents

Antiarrhythmic agents are used to treat disorders of the heart rate and rhythm. Examples of antiarrhythmic agents include amiodarone, dronedarone, quinidine, procainamide, lidocaine, and propafenone. Cardiac glycosides and beta blockers are also used as antiarrhythmic agents.

Combinations with amiodarone and dronedarone are of particular interest given the recently discovered synergistic effects of the sodium channel blocker ranolazine and amioarone and dronedarone.

Antihypertensive Agents

Antihypertensive agents are used to treat hypertension, a condition in which the blood pressure is consistently higher than normal. Hypertension is associated with many aspects of cardiovascular disease, including congestive heart failure, atherosclerosis, and clot for illation. Examples of antihypertensive agents include alpha-1-adrenergic antagonists, such as prazosin (Minipress), doxazosin mesylate (Cardura), prazosin hydrochloride (Minipress), prazosin, polythiazide (Minizide), and terazosin hydrochloride (Hytrin); beta-adrenergic antagonists, such as propranolol (Inderal), nadolol (Corgard), timolol (Blocadren), metoprolol (Lopressor), and pindolol (Visken); central alpha-adrenoceptor agonists, such as clonidine hydrochloride (Catapres), clonidine hydrochloride and chlorthalidone (Clorpres, Combipres), guanabenz Acetate (Wytensin), guanfacine hydrochloride (Tenex), methyldopa (Aldomet), methyldopa and chlorothiazide (Aldoclor), methyldopa and hydrochlorothiazide (Aldoril); combined alpha/beta-adrenergic antagonists, such as labetalol (Normodyne, Trandate), Carvedilol (Coreg); adrenergic neuron blocking agents, such as guanethidine (ismelin), reserpine (Serpasil); central nervous system-acting antihypertensives, such as clonidine (Catapres), methyldopa (Aldomet), guanabenz (Wytensin); anti-angiotensin II agents; ACE inhibitors, such as perindopril (Aceon) captopril (Capoten), enalapril (Vasotec), lisinopril (Prinivil, Zestril); angiotensin-II receptor antagonists, such as Candesartan (Atacand), Eprosartan (Teveten), Irbesartan (Avapro), Losartan (Cozaar), Telmisartan (Micardis), Valsartan (Diovan); calcium channel blockers, such as verapamil (Calan, Isoptin), diltiazem (Cardizem), nifedipine (Adalat, Procardia); diuretics; direct vasodilators, such as nitroprusside (Nipride), diazoxide (Hyperstat IV), hydralazine (Apresoline), minoxidil (Loniten), verapamil; and potassium channel activators, such as aprikalim, bimakalim, cromakalim, emakalim, nicorandil, and pinacidil.

Lipid Lowering Agents

Lipid lowering agents are used to lower the amounts of cholesterol or fatty sugars present in the blood. Examples of lipid lowering agents include bezafibrate (Bezalip), ciprofibrate (Modalim), and statins, such as atorvastatin (Lipitor), fluvastatin (Lescol), lovastatin (Mevacor, Altocor), mevastatin, pitavastatin (Livalo, Pitava) pravastatin (Lipostat), rosuvastatin (Crestor), and simvastatin (Zocor).

In this invention, the patient presenting with an acute coronary disease event often suffers from secondary medical conditions such as one or more of a metabolic disorder, a pulmonary disorder, a peripheral vascular disorder, or a gastrointestinal disorder. Such patients can benefit from treatment of a combination therapy comprising administering to the patient ranolazine in combination with at least one therapeutic agent.

Pulmonary Disorders Combination Therapy

Pulmonary disorder refers to any disease or condition related to the lungs. Examples of pulmonary disorders include, without limitation, asthma, chronic obstructive pulmonary disease (COPD), bronchitis, and emphysema.

Examples of therapeutics agents used to treat pulmonary disorders include bronchodilators including beta2 agonists and anticholinergics, corticosteroids, and electrolyte supplements. Specific examples of therapeutic agents used to treat pulmonary disorders include epinephrine, terbutaline (Brethaire, Bricanyl), albuterol (Proventil), salmeterol (Serevent, Serevent Diskus), theophylline, ipratropium bromide (Atrovent), tiotropium (Spiriva), methylprednisolone (Solu-Medrol, Medrol), magnesium, and potassium.

Metabolic Disorders Combination Therapy

Examples of metabolic disorders include, without limitation, diabetes, including type I and type II diabetes, metabolic syndrome, dyslipidemia, obesity, glucose intolerance, hypertension, elevated serum cholesterol, and elevated triglycerides.

Examples of therapeutic agents used to treat metabolic disorders include antihypertensive agents and lipid lowering agents, as described in the section "Cardiovascular Agent Combination Therapy" above. Additional therapeutic agents used to treat metabolic disorders include insulin, sulfonylureas, biguanides, alpha-glucosidase inhibitors, and incretin mimetics.

Peripheral Vascular Disorders Combination Therapy

Peripheral vascular disorders are disorders related to the blood vessels (arteries and veins) located outside the heart and brain, including, for example peripheral arterial disease (PAD), a condition that develops when the arteries that supply blood to the internal organs, arms, and legs become completely or partially blocked as a result of atherosclerosis.

Gastrointestinal Disorders Combination Therapy

Gastrointestinal disorders refer to diseases and conditions associated with the gastrointestinal tract. Examples of gastrointestinal disorders include gastroesophageal reflux disease (GERD), inflammatory bowel disease (IBD), gastroenteritis, gastritis and peptic ulcer disease, and pancreatitis.

Examples of therapeutic agents used to treat gastrointestinal disorders include proton pump inhibitors, such as pantoprazole (Protonix), lansoprazole (Prevacid), esomeprazole (Nexium), omeprazole (Prilosec), rabeprazole; H2 blockers, such as cimetidine (Tagamet), ranitidine (Zantac), famotidine (Pepcid), nizatidine (Axid); prostaglandins, such as misoprostoL (Cytotec); sucralfate; and antacids.

Antibiotics, Analgesics, Antidepressants and Anti-anxiety Agents Combination Therapy Patients presenting with an acute coronary disease event may exhibit conditions that benefit from administration of therapeutic agent or agents that are antibiotics, analgesics, antidepressant and anti-anxiety agents in combination with ranolazine.

Antibiotics

Antibiotics are therapeutic agents that kill, or stop the growth of, microorganisms, including both bacteria and fungi. Example of antibiotic agents include. beta.-Lactam antibiotics, including penicillins (amoxicillin), cephalosporins, such as cefazolin, cefuroxime, cefadroxil (Duricef), cephalexin (Keflex), cephradine (Velosef), cefaclor (Ceclor), cefuroxime axtel (Ceftin), cefprozil (Cefzil), loracarbef (Lorabid), cefixime (Suprax), cefpodoxime proxetil (Vantin), ceftibuten (Cedax), cefdinir (Omnicef), ceftriaxone (Rocephin), carbapenems, and monobactams; tetracyclines, such as tetracycline; macrolide antibiotics, such as erythromycin; aminoglycosides, such as gentamicin, tobramycin, amikacin; quinolones such as ciprofloxacin; cyclic peptides, such as vancomycin, streptogramins, polymyxins; lincosamides, such as clindamycin; oxazolidinoes, such as linezolid; and sulfa antibiotics, such as sulfisoxazole.

Analgesics

Analgesics are therapeutic agents that are used to relieve pain. Examples of analgesics include opiates and morphinomimetics, such as fentanyl and morphine; paracetamol; NSAIDs, and COX-2 inhibitors. Given the ability of the sodium channel blockers of the invention to treat neuropathic pain via inhibition of the Nav 1.7 and 1.8 sodium channels, combination with analgesics are particularly envisioned. See U.S. Patent Application Publication 20090203707.

Antidepressant and Anti-Anxiety Agents

Antidepressant and anti-anxiety agents include those agents used to treat anxiety disorders, depression, and those used as sedatives and tranquillizers. Examples of antidepressant and anti-anxiety agents include benzodiazepines, such as diazepam, lorazepam, and midazolam; benzodiazepines; barbiturates; glutethimide; chloral hydrate; meprobamate; sertraline (Zoloft, Lustral, Apo-Sertral, Asentra, Gladem, Serlift, Stimuloton); escitalopram (Lexapro, Cipralex); fluoxetine (Prozac, Sarafem, Fluctin, Fontex, Prodep, Fludep, Lovan); venlafaxine (Effexor XR, Efexor); citalopram (Celexa, Cipramil, Talohexane); paroxetine (Paxil, Seroxat, Aropax); trazodone (Desyrel); amitriptyline (Elavil); and bupropion (Wellbutrin, Zyban). Antidepressant and anti-anxiety agents may include neuroactive steroid and ketamine and related NMDA receptor antagonists.

Accordingly, one aspect of the invention provides for a composition comprising the sodium channel blockers of the invention and at least one therapeutic agent. In an alternative embodiment, the composition comprises the sodium channel blockers of the invention and at least two therapeutic agents. In further alternative embodiments, the composition comprises the sodium channel blockers of the invention and at least three therapeutic agents, the sodium channel blockers of the invention and at least four therapeutic agents, or the sodium channel blockers of the invention and at least five therapeutic agents.

The methods of combination therapy include co-administration of a single formulation containing the sodium channel blockers of the invention and therapeutic agent or agents, essentially contemporaneous administration of more than one formulation comprising the sodium channel blocker of the invention and therapeutic agent or agents, and consecutive administration of a sodium channel blocker of the invention and therapeutic agent or agents, in any order, wherein preferably there is a time period where the sodium channel blocker of the invention and therapeutic agent or agents simultaneously exert their therapeutic effect.

EXEMPLIFICATION

The representative examples that follow are intended to help illustrate the invention, and are not intended to, nor should they be construed to, limit the scope of the invention.

The compounds provided herein can be prepared from readily available starting materials using the following general methods and procedures. It will be appreciated that where typical or preferred process conditions (i.e., reaction temperatures, times, mole ratios of reactants, solvents, pressures, etc.) are given, other process conditions can also be used unless otherwise stated. Optimal reaction conditions may vary with the particular reactants or solvent used, but such conditions can be determined by one skilled in the art by routine optimization.

Additionally, as will be apparent to those skilled in the art, conventional protecting groups may be necessary to prevent certain functional groups from undergoing undesired reactions. The choice of a suitable protecting group for a particular functional group as well as suitable conditions for protection and deprotection are well known in the art. For example, numerous protecting groups, and their introduction and removal, are described in T. W. Greene and P. G. M. Wuts, *Protecting Groups in Organic Synthesis*, Second Edition, Wiley, New York, 1991, and references cited therein.

The compounds provided herein may be isolated and purified by known standard procedures. Such procedures include recrystallization, filtration, flash chromatography, trituration, high pressure liquid chromatography (HPLC), or supercritical fluid chromatography (SFC). Note that flash chromatography may either be performed manually or via an automated system. The compounds provided herein may be characterized by known standard procedures, such as nuclear magnetic resonance spectroscopy (NMR) or liquid chromatography mass spectrometry (LCMS). NMR chemical shifts are reported in part per million (ppm) and are generated using methods well known to those of skill in the art.

Exemplary general methods for analytical LCMS include Method A (Xtimate Cis (2.1 mm×30 mm, 3 μm); A=$H_2O$ (0.04% TFA) and B=$CH_3CN$ (0.02% TFA); 50° C.; 1.2 m/min; 10-80% B over 0.9 minutes, then 80% B for 0.6 minutes) and Method B (Chromolith Flash RP-18 end-capped Cis (2 mm×25 mm); A=$H_2O$ (0.04% TFA) and B=$CH_3CN$ (0.02% TFA); 50° C.; 1.5 mL/min; 5-95% B over 0.7 minutes, then 95% B for 0.4 minutes)

LIST OF ABBREVIATIONS

Pd(dppf)$Cl_2$ [1,1'-bis(diphenylphosphino)ferrocene]palladium(II) dichloride
$PdCl_2(PPh_3)_2$ bis(triphenylphosphine)palladium(II) dichloride
$Pd_2(dba)_3$ tris(dibenzylideneacetone)dipalladium(0)
Pd(t-$Bu_3P)_2$ bis(tri-tert-butylphosphine)palladium(0)
TEA triethylamine
AgOTf silver trifluoromethanesulfonate
DMF N,N-dimethylformamide
MeOH methanol
EtOH ethanol
i-$Pr_2O$ diisopropyl ether
THF tetrahydrofuran
DCM dichloromethane
AcN or MeCN acetonitrile
EtOAc ethyl acetate
PE petroleum ether
DMSO dimethyl sulfoxide
AcOH acetic acid
NBS N-bromosuccinimide
MeONa sodium methoxide
EtONa sodium ethoxide
TsOH p-toluenesulfonic acid
DEA N,N-diethylaniline
TFA trifluoroacetic acid
KOAc potassium acetate
TBAI tetrabutylammonium iodide
MsCl methanesulfonyl chloride
$Tf_2O$ trifluoromethanesulfonic anhydride
DIEA N,N-diisopropylethylamine
MeI methyl iodide
TBAB tetrabutylammonium bromide
MeMgBr methyl magnesium bromide
$PCy_3$ tricyclohexylphosphine
$Ph_3P$ triphenylphosphine
BnBr benzyl bromide
XPhos 2-dicyclohexylphosphino-2',4',6'-triisopropylbiphenyl
PyBOP (benzotriazol-1-yloxy)tripyrrolidinophosphonium hexafluorophosphate
$TMSCF_3$ trifluoromethyltrimethylsilane Example 1: Synthesis of Compound 1—(3-[difluoro(methoxy)methyl]-6-[2-(methoxymethyl)-4-(trifluoromethoxy)phenyl]-[1,2,4]triazolo[4,3-a]pyrazine)

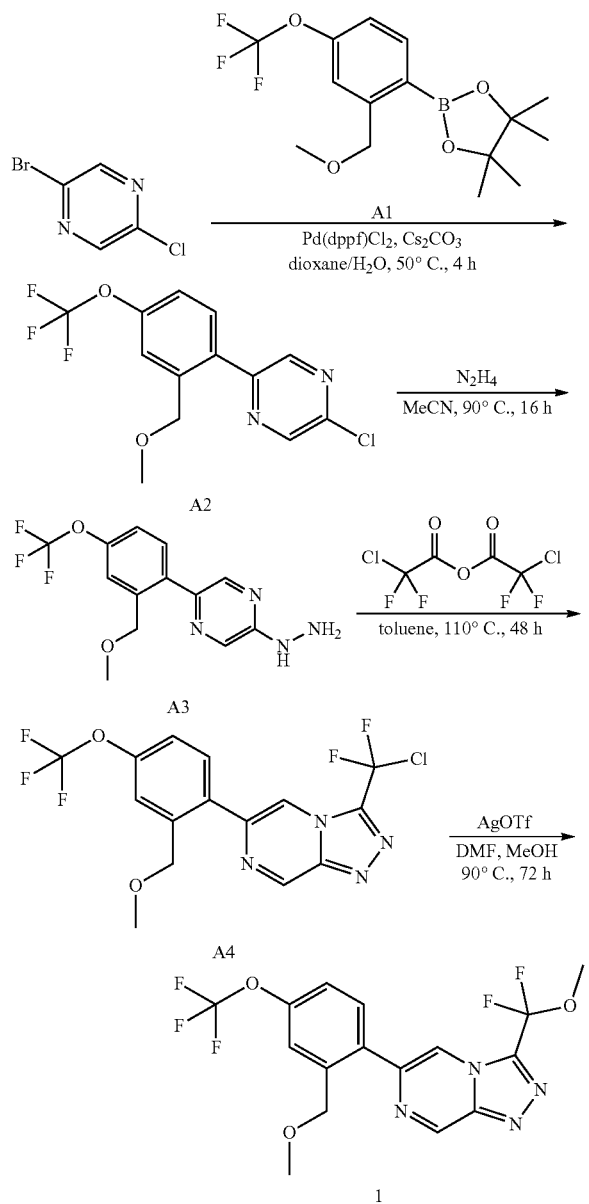

A2: 2-chloro-5-[2-(methoxymethyl)-4-(trifluoromethoxy)phenyl]pyrazine

A mixture of 2-bromo-5-chloro-pyrazine (250 mg, 1.29 mmol), 2-[2-(methoxymethyl)-4-(trifluoromethoxy)phenyl]-4,4,5,5-tetramethyl-1,3,2-dioxaborolane (429.25 mg, 1.29 mmol), cesium carbonate (842.22 mg, 2.58 mmol) and Pd(dppf)Cl$_2$ (141.85 mg, 0.19 mmol) in mixed solvent of 1,4-dioxane (10 mL) and water (2 mL) was stirred at 50° C. for 4 hours. After cooling to RT, the reaction mixture was diluted with water (20 mL), and extracted with EtOAc (20 mL×2). The combined organic phase was washed with brine (15 mL), dried over Na$_2$SO$_4$ and concentrated to give the crude product. The crude product was purified by flash chromatography on silica gel (EtOAc in PE=0% to 10%) to give the product (300 mg, 0.31 mmol, 24% yield) as an oil. LCMS R$_t$=0.95 min in 1.5 min chromatography, 5-95AB, MS ESI calcd. for C$_{13}$H$_{11}$ClF$_3$N$_2$O$_2$ [M+H]$^+$ 319.0, found 319.0.

A3: [5-[2-(methoxymethyl)-4-(trifluoromethoxy)phenyl]pyrazin-2-yl]hydrazine

A mixture of 2-chloro-5-[2-(methoxymethyl)-4-(trifluoromethoxy)phenyl]pyrazine (300 mg, 0.94 mmol) and hydrazine (301.71 mg, 9.41 mmol) in MeCN (8 mL) was heated to 90° C. and stirred for 16 hours. After cooling to RT, the reaction mixture was concentrated to give a residue. Then, the residue was diluted with H$_2$O (15 mL) and extracted with EtOAc (15 mL×2). The combined organic phase was washed with brine (10 mL), dried over Na$_2$SO$_4$, filtered and concentrated to give the product (300 mg, 0.25 mmol, 27% yield) as an oil. LCMS R$_t$=0.74 min in 1.5 min chromatography, 5-95AB, MS ESI calcd. for C$_{13}$H$_{14}$F$_3$N$_4$O$_2$ [M+H]$^+$ 315.1, found 315.1.

A4: 3-[chloro(difluoro)methyl]-6-[2-(methoxymethyl)-4-(trifluoromethoxy)phenyl]-[1,2,4]triazolo[4,3-a]pyrazine To a mixture of [5-[2-(methoxymethyl)-4-(trifluoromethoxy)phenyl]pyrazin-2-yl]hydrazine (300 mg, 0.95 mmol) in toluene (10 mL) was added (2-chloro-2,2-difluoroacetyl) 2-chloro-2,2-difluoro-acetate (0.35 g, 1.43 mmol) and 4A Molecular Sieves (400 mg, 0.95 mmol). The reaction mixture was stirred at 110° C. for 48 hours. After cooling to RT, the reaction mixture was concentrated to give a residue. The residue was diluted with water (20 mL) and the mixture was extracted with EtOAc (20 mL×2). The combined organic phase was washed with brine (15 mL), dried over Na$_2$SO$_4$, filtered and concentrated to give a residue. The residue was purified by flash chromatography on silica gel (EtOAc in PE=0% to 20%) to give the product (154 mg, 0.22 mmol, 23% yield) as an oil. LCMS R$_t$=0.92 min in 1.5 min chromatography, 5-95AB, MS ESI calcd. for C$_{15}$H$_{11}$ClF$_5$N$_4$O$_2$ [M+H]$^+$ 409.0, found 409.1.

Compound 1: 3-[difluoro(methoxy)methyl]-6-[2-(methoxymethyl)-4-(trifluoromethoxy)phenyl]-[1,2,4]triazolo[4,3-a]pyrazine A mixture of 3-[chloro(difluoro)methyl]-6-[2-(methoxymethyl)-4-(trifluoromethoxy)phenyl]-[1,2,4]triazolo[4,3-a]pyrazine (154 mg, 0.38 mmol) and AgOTf (0.97 g, 3.77 mmol) in methanol (1 mL) and DMF (1 mL) was stirred at 90° C. for 72 hours. After cooling to RT, the reaction mixture was treated with brine (15 mL), and the resulting precipitate was filtered. The filtrate was extracted with EtOAc (15 mL×2). The combined organic phase was dried over Na$_2$SO$_4$ and concentrated to give the crude product. The crude product was purified by Prep-HPLC (Waters Xbridge 150 mm×25 mm 5 m) A=H$_2$O (10 mM NH$_4$HCO$_3$) and B=CH$_3$CN; 48-62% B over 8 minutes) to give the product (5.58 mg, 0.01 mmol, 4% yield) as a solid. $^1$H NMR (400 MHz, CDCl$_3$) δ$_H$ 9.52 (d, 1H), 8.63 (s, 1H), 7.71 (d, 1H), 7.46 (s, 1H), 7.35 (d, 1H), 4.48 (s, 2H), 3.94

(s, 3H), 3.45 (s, 3H). LCMS R$_t$=1.21 min in 2 min chromatography, 10-80AB, MS ESI calcd. for C$_{16}$H$_{14}$F$_5$N$_4$O$_3$ [M+H]$^+$ 405.1, found 404.9.

Example 2: Synthesis of Compound 2—(3-[difluoro(methoxy)methyl]-6-[2-methyl-4-(trifluoromethoxy)phenyl]-[1,2,4]triazolo[4,3-a]pyrazine)

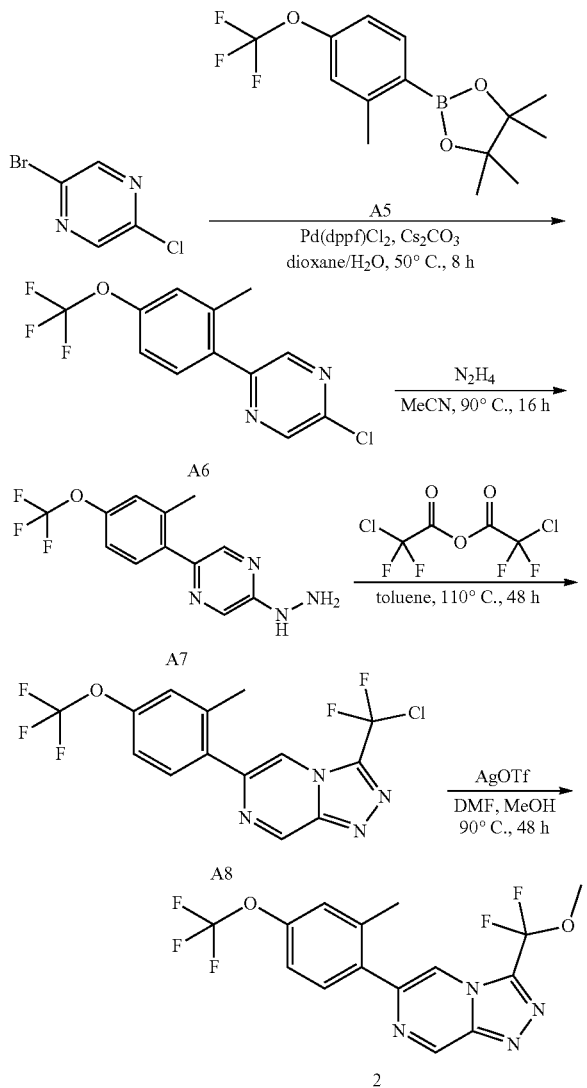

A6: 2-chloro-5-[2-methyl-4-(trifluoromethoxy)phenyl]pyrazine

A mixture of 2-bromo-5-chloro-pyrazine (1000 mg, 5.17 mmol), 4,4,5,5-tetramethyl-2-[2-methyl-4-(trifluoromethoxy)phenyl]-1,3,2-dioxaborolane (1561.81 mg, 5.17 mmol), cesium carbonate (3368.87 mg, 10.34 mmol), Pd(dppf)Cl$_2$ (567.41 mg, 0.78 mmol) in 1,4-dioxane (50 mL) and water (10 mL) was stirred at 50° C. for 8 hours. After cooling to RT, the reaction mixture was diluted with water (30 mL), and extracted with EtOAc (30 mL×2). The combined organic phase was washed with brine (20 mL), dried over Na$_2$SO$_4$ and concentrated to give the crude product. The crude product was purified by flash chromatography on silica gel (EtOAc in PE=0% to 10%) to give the product (1200 mg, 1.75 mmol, 34% yield) as an oil. LCMS R$_t$=0.96 min in 1.5 min chromatography, 5-95AB, MS ESI calcd. for C$_{12}$H$_9$ClF$_3$N$_2$O [M+H]$^+$ 289.0, found 288.9.

A7: [5-[2-methyl-4-(trifluoromethoxy)phenyl]pyrazin-2-yl]hydrazine

A mixture of 2-chloro-5-[2-methyl-4-(trifluoromethoxy)phenyl]pyrazine (1.2 g, 4.16 mmol) and hydrazine (1.33 g, 41.57 mmol) in MeCN (20 mL) was heated to 90° C. and stirred for 16 hours. After cooling to RT, the reaction mixture was concentrated to give a residue. Then, the residue was diluted with H$_2$O (30 mL), and the mixture was extracted with EtOAc (30 mL×2). The combined organic phase was washed with brine (20 mL), dried over Na$_2$SO$_4$, filtered and concentrated to give the crude product (1200 mg, 2.08 mmol, 50% yield) as an oil. LCMS R$_t$=0.73 min in 1.5 min chromatography, 5-95AB, MS ESI calcd. for C$_{12}$H$_{12}$F$_3$N$_4$O [M+H]$^+$ 285.1, found 285.1.

A8: 3-[chloro(difluoro)methyl]-6-[2-methyl-4-(trifluoromethoxy)phenyl]-[1,2,4]triazolo[4,3-a]pyrazine To a mixture of [5-[2-methyl-4-(trifluoromethoxy)phenyl]pyrazin-2-yl]hydrazine (1 g, 3.52 mmol) in toluene (20 mL) was added (2-chloro-2,2-difluoro-acetyl) 2-chloro-2,2-difluoro-acetate (1.28 g, 5.28 mmol) and 4A Molecular Sieves (1000 mg, 3.52 mmol). The reaction mixture was stirred at 110° C. for 48 hours. After cooling to RT, the reaction mixture was concentrated to give a residue. The residue was diluted with saturated aqueous NaHCO$_3$ (30 mL), and the mixture was extracted with EtOAc (30 mL×2). The combined organic phase was washed with brine (20 mL), dried over Na$_2$SO$_4$, filtered and concentrated to give a residue. The residue was purified by flash chromatography on silica gel (EtOAc in PE=0% to 20%) to give the product (900 mg, 1.53 mmol, 44% yield) as a solid. LCMS R$_t$=0.93 min in 1.5 min chromatography, 5-95ABMS ESI calcd. for C$_{14}$H$_9$ClF$_5$N$_4$O [M+H]$^+$ 379.0, found 379.0.

Compound 2: 3-[difluoro(methoxy)methyl]-6-[2-methyl-4-(trifluoromethoxy)phenyl]-[1,2,4]triazolo[4,3-a]pyrazine A mixture of 3-[chloro(difluoro)methyl]-6-[2-methyl-4-(trifluoromethoxy)phenyl]-[1,2,4]triazolo[4,3-a]pyrazine (900 mg, 2.38 mmol) and AgOTf (6.11 g, 23.77 mmol) in methanol (7 mL) and DMF (7 mL) was stirred at 90° C. for 48 hours. After cooling to RT, the reaction mixture was treated with brine (20 mL), and the resulting precipitate was filtered. The filtrate was extracted with EtOAc (20 mL×2). The combined organic phase was dried over Na$_2$SO$_4$ and concentrated to give the crude product. The crude product was purified by Prep-HPLC (Waters Xbridge 150 mm×25 mm 5 μm) A=H$_2$O (10 mM NH$_4$HCO$_3$) and B=CH$_3$CN; 52-62% B over 8 minutes) to give the product (39.44 mg, 0.10 mmol, 4% yield). $^1$H NMR (400 MHz, CDCl$_3$) δ$_H$ 9.51 (d, 1H), 8.22 (d, 1H), 7.47 (d, 1H), 7.25-7.17 (m, 2H), 3.94 (s, 3H), 2.43 (s, 3H). LCMS R$_t$=1.21 min in 2 min chromatography, 10-80ABMS ESI calcd. for C$_{15}$H$_{12}$F$_5$N$_4$O$_2$ [M+H]$^+$ 375.1, found 374.9.

Example 3: Synthesis of Compound 3—(3-(methoxymethyl)-6-[2-methyl-4-(trifluoromethoxy)phenyl]-[1,2,4]triazolo[4,3-a]pyrazine)

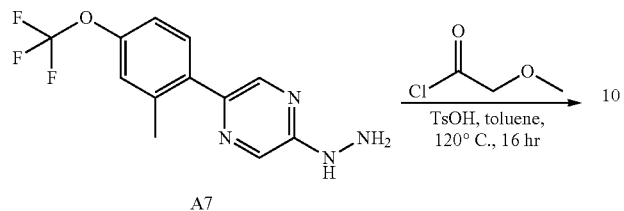

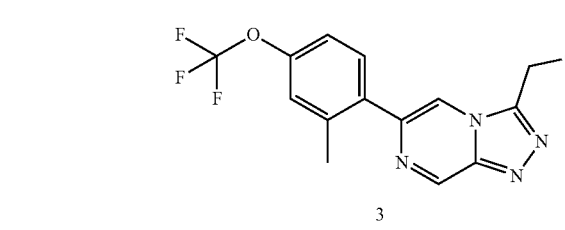

A mixture of [5-[2-methyl-4-(trifluoromethoxy)phenyl]pyrazin-2-yl]hydrazine (1.19 g, 4.19 mmol) and 2-methoxyacetyl chloride (500 mg, 4.61 mmol) in toluene (20 mL) was stirred for 1 hour. Then TsOH (216.38 mg, 1.26 mmol) was added and the mixture was warmed to 120° C. and stirred for 16 hours. After cooling to RT, the mixture was concentrated under reduced pressure. Water (30 mL) was added and the aqueous layer was extracted with EtOAc (30 mL×2). The combined organic phase was washed with brine (30 mL), dried over anhydrous Na$_2$SO$_4$, filtered and concentrated to give the crude product. The crude product was purified by flash chromatography column on silica gel (EtOAc in PE=0% to 60% to 80%) to give the impure product. The impure product was purified by prep-HPLC (Phenomenex Gemini-NX (150 mm×30 mm, 5 μm) A=H$_2$O (0.05% NH$_4$OH) and B=CH$_3$CN; 40-70% B over 8 min) to give the product (190.54 mg, 563.3 μmol, 95% yield) as a solid. 1H NMR (400 MHz, CDCl$_3$) δ$_H$ 9.43 (d, 1H), 8.21 (d, 1H), 7.47 (d, 1H), 7.21-7.19 (m, 2H), 5.10 (s, 2H), 3.45 (s, 3H), 2.44 (s, 3H). LCMS R$_t$=1.19 min in 2 min chromatography, 10-80AB, MS ESI calcd. for C$_{15}$H$_{14}$F$_3$N$_4$O$_2$ [M+H]$^+$ 339.1, found 338.9.

Example 4: Synthesis of Compound 4—(3-[ethoxy(difluoro)methyl]-6-[2-methyl-4-(trifluoromethoxy)phenyl]-[1,2,4]triazolo[4,3-a]pyrazine)

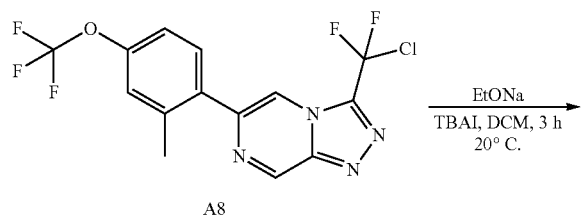

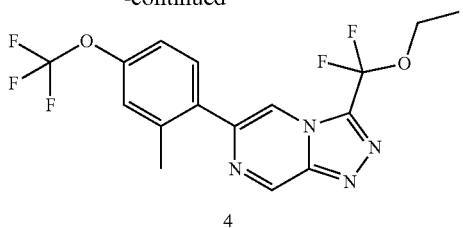

A solution of 3-[chloro(difluoro)methyl]-6-[2-methyl-4-(trifluoromethoxy)phenyl]-[1,2,4]triazolo[4,3-a]pyrazine (500 mg, 1.32 mmol), EtONa (179.7 mg, 2.64 mmol) and TBAI (146.3 mg, 0.79 mmol) in DCM (10 mL) was stirred at 20° C. for 3 hours. The solution was added to saturated aqueous NH$_4$Cl (20 mL). After separating the phases, the organic phase was washed with brine (10 mL), dried over anhydrous Na$_2$SO$_4$, filtered and concentrated to give the crude product. The crude product was purified by prep-HPLC (Waters XBridge (150 mm×25 mm, 5 μm) A=H$_2$O (10 mM NH$_4$HCO$_3$) and B=CH$_3$CN; 45-75% B over 10 minutes) to give the product (96.32 mg, 0.25 mmol, 48% yield) as a solid. $^1$H NMR (400 MHz, CDCl$_3$) δ$_H$=9.51 (d, 1H), 8.24 (d, 1H), 7.49 (d, 1H), 7.25-7.17 (m, 2H), 4.34 (q, 2H), 2.45 (s, 3H), 1.47 (t, 3H). LCMS R$_t$=1.36 min in 2.0 min chromatography, 10-80AB, MS ESI calcd. for C$_{16}$H$_{14}$F$_5$N$_4$O$_2$ [M+H]$^+$ 389.1, found 389.0.

Example 5: Synthesis of Compound 5—(3-(ethoxymethyl)-6-[2-methyl-4-(trifluoromethoxy)phenyl]-[1,2,4]triazolo[4,3-a]pyrazine)

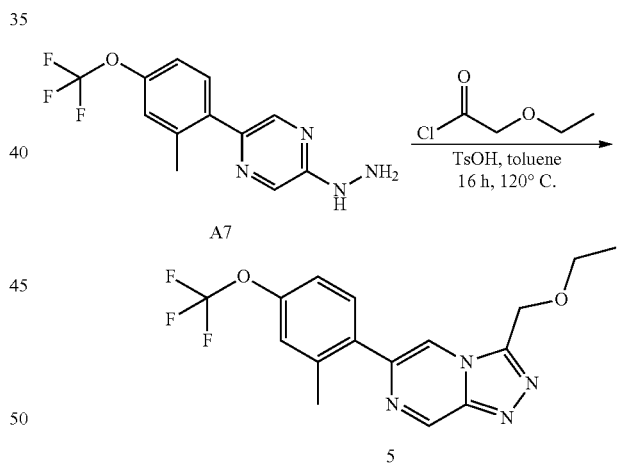

A solution of [5-[2-methyl-4-(trifluoromethoxy)phenyl]pyrazin-2-yl]hydrazine (500 mg, 1.76 mmol) and 2-ethoxyacetyl chloride (237.13 mg, 1.93 mmol) in toluene (20 mL) was stirred at 20° C. for 1 hour. Then to the mixture was added TsOH (90.87 mg, 0.53 mmol), and the mixture was warmed to 120° C. and stirred for 16 hours. After cooling to RT, the mixture was concentrated to give a residue. The reside was diluted with H$_2$O (20 mL) and extracted with EtOAc (20 mL×2). The combined organic phase was washed with brine (20 mL), dried over Na$_2$SO$_4$, filtered and concentrated to give the crude product. The crude product was purified by flash chromatography column on silica gel (EtOAc in PE=0% to 60% to 80%) to give the product (150 mg, 0.38 mmol, 21% yield) as a solid. The product was further purified by prep-HPLC (Phenomenex Gemini-NX (150 mm×30 mm, 5 μm) A=H$_2$O (0.05% NH$_4$OH) and B=CH$_3$CN; 46-76% B over 8 min) to give the product (87.43 mg, 0.25 mmol, 58% yield) as a solid. 1H NMR (400 MHz, CDCl$_3$) δ$_H$ 9.42 (d, 1H), 8.25 (d, 1H), 7.48 (d, 1H), 7.23-7.16 (m, 2H), 5.14 (s, 2H), 3.63 (q, 2H), 2.44 (s, 3H), 1.25 (t, 3H). LCMS R$_t$=1.22 min in 2.0 min chromatography, 10-80AB, MS ESI calcd. for C$_{16}$H$_{16}$F$_3$N$_4$O$_2$ [M+H]$^+$ 353.1, found 353.0.

Examples 6 and 7: Synthesis of Compounds 6 and 7—(3-(benzyloxymethyl)-6-[2-methyl-4-(trifluoromethoxy)phenyl]-[1,2,4]triazolo[4,3-a]pyrazine and 3-(isobutoxymethyl)-6-[2-methyl-4-(trifluoromethoxy)phenyl]-[1,2,4]triazolo[4,3-a]pyrazine)

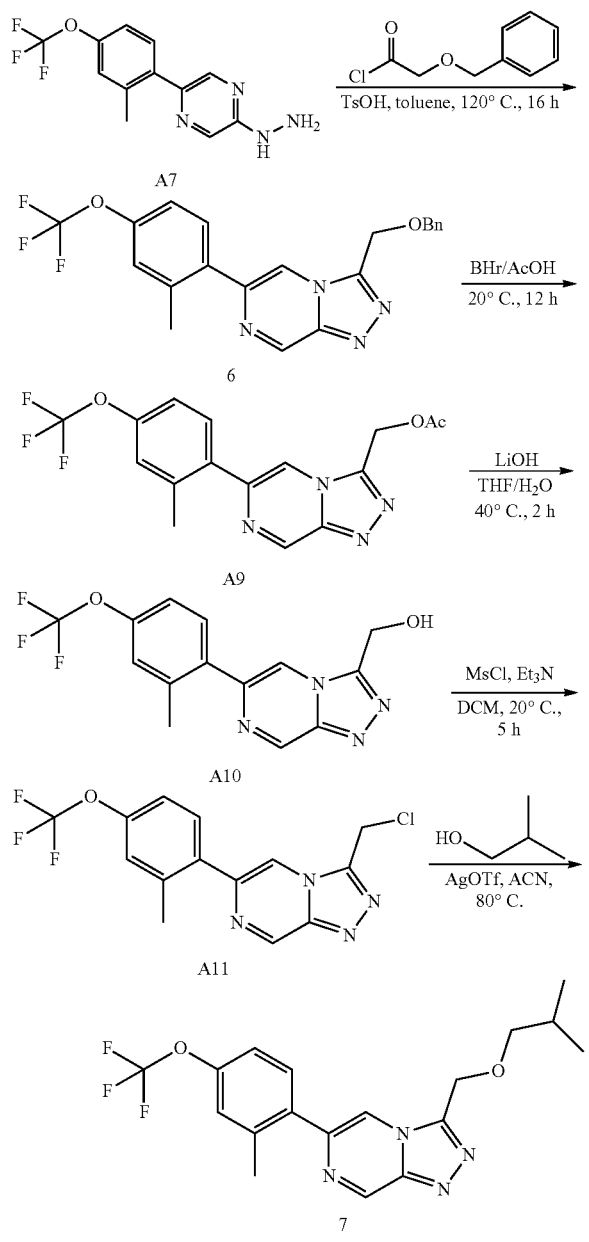

Compound 6: 3-((benzyloxy)methyl)-6-(2-methyl-4-(trifluoromethoxy)phenyl)-[1,2,4]triazolo[4,3-a]pyrazine A solution of [5-[2-methyl-4-(trifluoromethoxy)phenyl]pyrazin-2-yl]hydrazine (4 g, 14.07 mmol) and 2-benzyloxy-acetyl chloride (2.86 g, 15.48 mmol) in toluene (100 mL) was stirred 1 hour. Then, to the mixture was added TsOH (726.99 mg, 4.22 mmol), and the mixture was warmed to 120° C. and stirred for 16 hours. After cooling to RT, the mixture was concentrated to give a residue. The residue was diluted with H$_2$O (100 mL) and extracted with EtOAc (100 mL×2). The combined organic phase was washed with brine (100 mL), dried over Na$_2$SO$_4$, filtered and concentrated to give the crude product. The crude product was purified by flash chromatography column on silica gel (EtOAc in PE=0% to 60% to 80%) to give the product. The product was purified by prep-HPLC (Phenomenex Gemini-NX (150 mm×30 mm, 5 μm) A=H$_2$O (0.05% NH$_4$OH) and B=CH$_3$CN; 49-79% B over 8 min) to give the product (119.34 mg, 0.29 mmol, 75% yield) as a solid. $^1$H NMR (400 MHz, DMSO-d$_6$) δ$_H$ 9.51 (d, 1H), 8.64 (d, 1H), 7.58 (d, 1H), 7.41-7.34 (m, 2H), 7.32-7.24 (m, 5H), 5.16 (s, 2H), 4.62 (s, 2H), 2.38 (s, 3H). LCMS Rt=1.32 min in 2 min chromatography, 10-80AB, MS ESI calcd. C$_{21}$H$_{18}$F$_3$N$_4$O$_2$ [M+H]$^+$ 415.13, found 415.0.

A9: [6-[2-methyl-4-(trifluoromethoxy)phenyl]-[1,2,4]triazolo[4,3-a]pyrazin-3-yl]methyl acetate A solution of 3-(benzyloxymethyl)-6-[2-methyl-4-(trifluoromethoxy)phenyl]-[1,2,4]triazolo[4,3-a]pyrazine (2.5 g, 6.03 mmol) and HBr/AcOH (5 mL, 6.03 mmol) was stirred at 20° C. for 12 hours. The mixture was diluted with H$_2$O (20 mL), extracted with EtOAc (20 mL×2). The combined organic phase was washed with brine (20 mL), dried over Na$_2$SO$_4$, filtered and concentrated to give the crude product (2 g, 3 mmol, 49% yield) as an oil. LCMS Rt=0.84 min in 1.5 min chromatography, 5-95AB, MS ESI calcd. C$_{16}$H$_{14}$F$_3$N$_4$O$_3$ [M+H]$^+$ 367.09, found 367.1.

A10: [6-[2-methyl-4-(trifluoromethoxy)phenyl]-[1,2,4]triazolo[4,3-a]pyrazin-3-yl]methanol A solution of [6-[2-methyl-4-(trifluoromethoxy)phenyl]-[1,2,4]triazolo[4,3-a]pyrazin-3-yl]methyl acetate (2 g, 5.46 mmol) and LiOH·H$_2$O (0.92 g, 21.84 mmol) in THF (5 mL) and water (5 mL) was stirred at 40° C. for 2 hours. After cooling to RT, the mixture was concentrated to give a residue. The residue was diluted with H$_2$O (30 mL) and extracted with EtOAc (30 mL×2). The combined organic phase was washed with brine (30 mL), dried over Na$_2$SO$_4$, filtered and concentrated to give the crude product. The crude product was purified by flash chromatography column on silica gel (EtOAc in PE=0% to 60% to 100%) to give the product (450 mg, 1.35 mmol, 24% yield) as solid. LCMS Rt=0.79 min in 1.5 min chromatography, 5-95AB, MS ESI calcd. C$_{14}$H$_{12}$F$_3$N$_4$O$_2$ [M+H]$^+$ 325.08, found 324.8.

A11: 3-(chloromethyl)-6-[2-methyl-4-(trifluoromethoxy)phenyl]-[1,2,4]triazolo[4,3-a]pyrazine A mixture of [6-[2-methyl-4-(trifluoromethoxy)phenyl]-[1,2,4]triazolo[4,3-a]pyrazin-3-yl]methanol (600 mg, 1.85 mmol), MsCl (0.59 mL, 7.68 mmol) and TEA (0.51 mL, 3.7 mmol) in DCM (10 mL) was stirred at 20° C. for 5 hours. The mixture was concentrated to remove DCM under reduced pressure, and H₂O (20 mL) was added, and then the mixture was extracted with EtOAc (20 mL×2). The combined organic phase was washed with brine (10 mL), dried over Na₂SO₄, filtered and concentrated to give the crude product (550 mg, 1.6 mmol, 87% yield) as a solid. LCMS Rt=0.87 min in 1.5 min chromatography, 5-95AB, MS ESI calcd. $C_{14}H_{11}ClF_3N_4O$ [M+H]⁺ 343.05, found 342.8.

Compound 7: 3-(isobutoxymethyl)-6-(2-methyl-4-(trifluoromethoxy)phenyl)-[1,2,4]triazolo[4,3-a]pyrazine A mixture of 3-(chloromethyl)-6-[2-methyl-4-(trifluoromethoxy)phenyl]-[1,2,4]triazolo[4,3-a]pyrazine (50 mg, 0.15 mmol), isobutanol (5 mL, 16.86 mmol) and AgOTf (374.88 mg, 1.46 mmol) in MeCN (5 mL) was stirred at 80° C. for 16 hours. After cooling to RT, the mixture was concentrated to give a residue. The residue was diluted with H₂O (20 mL) and extracted with EtOAc (20 mL×2). The combined organic phase was washed with brine (20 mL), dried over Na₂SO4, filtered and concentrated to give the crude product. The crude product was purified by flash chromatography column on silica gel (EtOAc in PE=0% to 40% to 60%) to give the product. The product was purified by prep-HPLC (Phenomenex Gemini-NX (150 mm×30 mm, 5 μm) A=H₂O (0.05% NH₄OH) and B=CH₃CN; 51-81% B over 8 min) to give the product (46.35 mg, 0.12 mmol, 46% yield) as a solid. 1H NMR (400 MHz, CDCl₃) $\delta_H$ 9.43 (d, 1H), 8.24 (d, 1H), 7.45 (d, 1H), 7.23-7.16 (m, 2H), 5.14 (s, 2H), 3.31 (d, 2H), 2.43 (s, 3H), 1.95-1.84 (m, 1H), 0.90 (d, 6H). LCMS Rt=1.33 min in 2.0 min chromatography, 10-80AB, MS ESI calcd. $C_{18}H_{20}F_3N_4O_2$ [M+H]⁺ 381.15, found 381.0.

Example 8: Synthesis of Compound 8—(3-(methoxymethyl)-6-[2-methyl-4-(trifluoromethoxy)phenyl]-[1,2,4]triazolo[4,3-b]pyridazine)

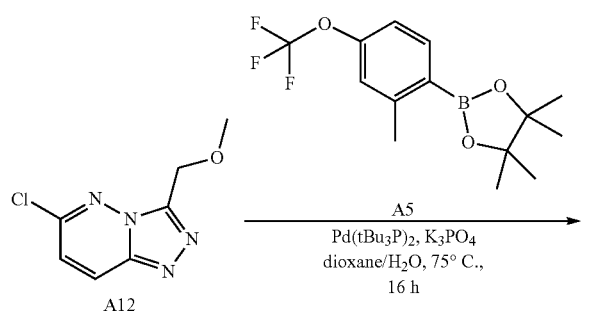

A mixture of 4,4,5,5-tetramethyl-2-[2-methyl-4-(trifluoromethoxy)phenyl]-1,3,2-dioxaborolane (296.61 mg, 0.98 mmol), 6-chloro-3-(methoxymethyl)-[1,2,4]triazolo[4,3-b]pyridazine (150 mg, 0.76 mmol), Pd(t-Bu₃P)₂ (57.90 mg, 0.11 mmol) and K₃PO₄ (320.68 mg, 1.51 mmol) in 1,4-dioxane (7.5 mL) and water (1.5 mL) was stirred at 75° C. under N₂ for 16 hours. The reaction mixture was cooled to RT and filtered through Celite. The filtrate was concentrated to give a residue. To the residue was added water (10 mL) and extracted with EtOAc (20 mL×2). The combined organic phase was dried over anhydrous Na₂SO₄, filtered and concentrated to give the crude product. The crude product was purified by prep-HPLC (Waters XBridge (150 mm×25 mm, 5 μm) A=H₂O (10 mM NH₄HCO₃) and B=CH₃CN; 35-62% B over 9 min) to give the product (76.62 mg, 0.23 mmol, 29% yield) as a solid. ¹H NMR (400 MHz, DMSO-d₆) $\delta_H$ 8.48 (d, 1H), 7.69 (d, 1H), 7.64 (d, 1H), 7.48-7.37 (m, 2H), 4.93 (s, 2H), 3.35 (s, 3H), 2.44 (s, 3H). LCMS $R_t$=1.20 min in 2 min chromatography, 10-80AB, MS ESI calcd. for $C_{15}H_{14}F_3N_4O_2$ [M+H]⁺ 339.1, found 338.9.

Example 9: Synthesis of Compound 9—(3-[ethoxy(difluoro)methyl]-6-[3-methyl-4-(trifluoromethoxy)phenyl]-[1,2,4]triazolo[4,3-a]pyrazine)

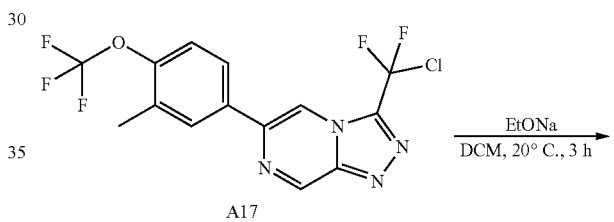

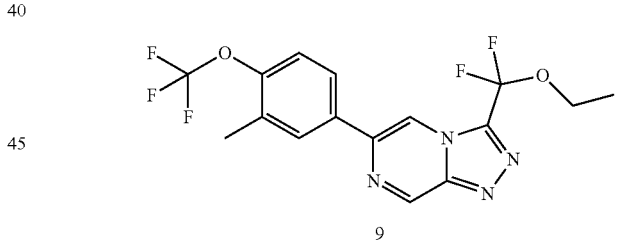

A solution of 3-[chloro(difluoro)methyl]-6-[3-methyl-4-(trifluoromethoxy)phenyl]-[1,2,4]triazolo[4,3-a]pyrazine (500 mg, 1.32 mmol), EtONa (179.7 mg, 2.64 mmol) and TBAI (292.62 mg, 0.79 mmol) in DCM (10 mL) was stirred at 20° C. for 3 hours. To the solution was added to saturated aqueous NH₄Cl (30 mL). After separating the phases, the organic phase was washed with brine (30 mL), dried over anhydrous Na₂SO₄, filtered and concentrated to give the crude product. The crude product was purified by flash chromatography on silica gel (EtOAc in PE=0% to 10% to 20% to 50%) to give the product (61.05 mg, 154.0 μmol, 11% yield) as a solid. ¹H NMR (400 MHz, CDCl₃) $\delta_H$ 9.52 (d, 1H), 8.47 (d, 1H), 7.88 (d, 1H), 7.78 (dd, 1H), 7.37 (dd, 1H), 4.37 (q, 2H), 2.44 (s, 3H), 1.51 (t, 3H). LCMS $R_t$=1.40 min in 2.0 min chromatography, 10-80AB, MS ESI calcd. for $C_{16}H_{14}F_5N_4O_2$ [M+H]⁺ 389.1, found 389.0.

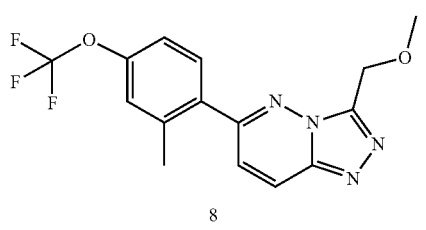

Example 10: Synthesis of Compound 10—(3-(difluoro(isopropoxy)methyl)-6-(2-methyl-4-(trifluoromethoxy)phenyl)-[1,2,4]triazolo[4,3-a]pyrazine)

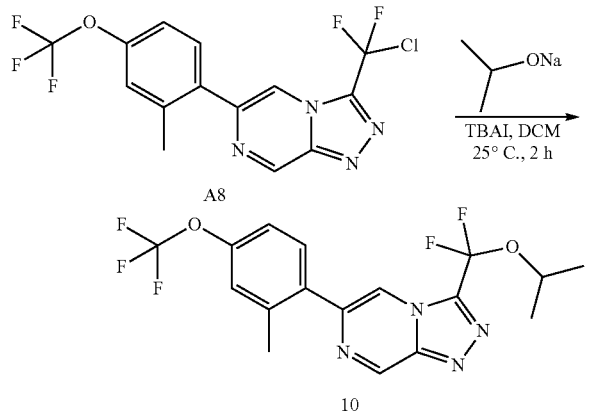

A mixture of 3-[chloro(difluoro)methyl]-6-[2-methyl-4-(trifluoromethoxy)phenyl]-[1,2,4]triazolo[4,3-a]pyrazine (200 mg, 0.53 mmol), sodium propan-2-olate (86.7 mg, 1.06 mmol) and TBAI (117.05 mg, 0.32 mmol) in DCM (2 mL) was stirred at 25° C. for 2 hours. The mixture was diluted with H$_2$O (10 mL) and extracted with EtOAc (20 mL×2). The combined organic phase was washed with brine (10 mL), dried over Na$_2$SO$_4$, filtered and concentrated to give the crude product. The crude product was purified by prep-HPLC (Kromasil Waters XBridge (150 mm×25 mm, 5 μm) A=H$_2$O (10 mM NH$_4$HCO$_3$) and B=CH$_3$CN; 50-80% B over 10 min) to give the product (26.4 mg, 0.07 mmol, 52% yield) as a solid. $^1$H NMR (400 MHz, CDCl$_3$) δ$_H$ 9.51 (d, 1H), 8.23 (d, 1H), 7.50 (d, 1H), 7.25-7.18 (m, 2H), 5.02-4.95 (m, 1H), 2.46 (s, 3H), 1.48 (d, 6H). LCMS Rt=1.39 min in 2.0 min chromatography, 10-80AB, MS ESI calcd. C$_{17}$H$_{16}$F$_5$N$_4$O$_2$ [M+H]$^+$ 403.1, found 403.0

Example 11: Synthesis of Compound 11—(3-[difluoro(methoxy)methyl]-6-[3-methyl-4-(trifluoromethoxy)phenyl]-[1,2,4]triazolo[4,3-a]pyrazine)

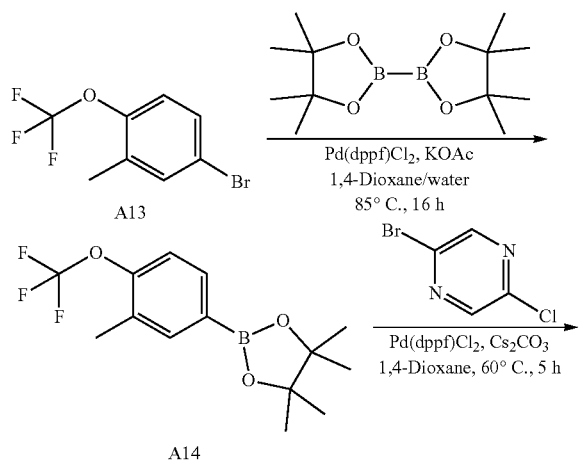

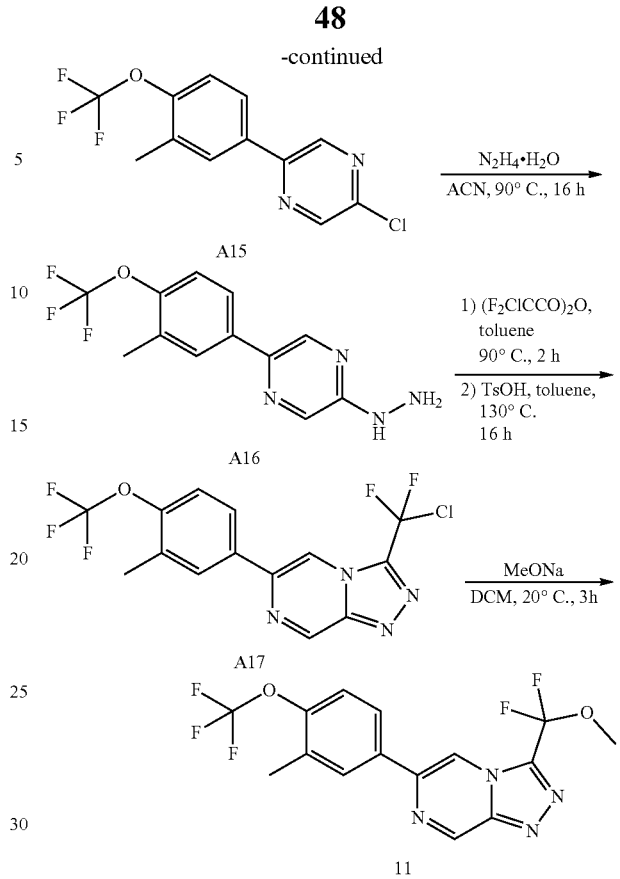

A14: 4,4,5,5-tetramethyl-2-[3-methyl-4-(trifluoromethoxy)phenyl]-1,3,2-dioxaborolane A mixture of 1-bromo-2-methyl-4-(trifluoromethoxy)benzene (5 g, 19.61 mmol), 4,4,5,5-tetramethyl-2-(4,4,5,5-tetramethyl-1,3,2-dioxaborolan-2-yl)-1,3,2-dioxaborolane (14.94 g, 58.82 mmol), KOAc (3.85 g, 39.21 mmol) and Pd(dppf)Cl$_2$ (1.43 g, 1.96 mmol) in 1,4-dioxane (20 mL) was stirred at 85° C. for 16 hours under N$_2$. After cooling to RT, the mixture was concentrated, filtered through Celite and eluted with EtOAc (100 mL×2) and the filtrate was concentrated to give the crude product. The crude product was purified by flash chromatography on silica gel (EtOAc in PE=0% to 3% to 5% to 10%) to give the product (4.56 g, 14.36 mmol, 73% yield) as an oil. $^1$H NMR (400 MHz, CDCl$_3$) δ$_H$ 7.71 (s, 1H), 7.66 (d, 1H), 7.20 (d, 1H), 2.32 (s, 3H), 1.35 (s, 12H).

A15: 2-chloro-5-[3-methyl-4-(trifluoromethoxy)phenyl]pyrazine

A mixture of Pd(dppf)Cl$_2$ (1 g, 1.37 mmol), Cs$_2$CO$_3$ (8.93 g, 27.4 mmol), 4,4,5,5-tetramethyl-2-[3-methyl-4-(trifluoromethoxy)phenyl]-1,3,2-dioxaborolane (4.55 g, 15.05 mmol) and 2-bromo-5-chloro-pyrazine (2.65 g, 13.7 mmol) in 1,4-dioxane (280 mL) and water (28 mL) under N$_2$ was stirred at 60° C. for 5 hours. The mixture was cooled to RT and diluted with EtOAc (40 mL) and then filtered through a Celite pad which was washed with EtOAc (40 mL). The filtrate was concentrated to give the crude product. The crude product was purified by flash chromatography on silica gel (EtOAc in PE=0% to 3% to 5%) to give the product (3.5 g, 12.12 mmol, 88% yield) as a solid. $^1$H NMR (400 MHz, CDCl$_3$) δ$_H$ 8.77 (d, 1H), 8.64 (d, 1H), 7.91 (d, 1H), 7.83 (dd, 1H), 7.35 (dd, 1H), 2.42 (s, 3H).

A16: [5-[3-methyl-4-(trifluoromethoxy)phenyl]pyrazin-2-yl]hydrazine

A mixture of 2-chloro-5-[3-methyl-4-(trifluoromethoxy)phenyl]pyrazine (3.5 g, 12.13 mmol) and N$_2$H$_4$·H$_2$O (7.13 g, 121.25 mmol) in MeCN (50 mL) was stirred at 90° C. for 16 hours under N$_2$. The mixture was cooled to RT, quenched with saturated aqueous NH$_4$Cl (40 mL), and the mixture was extracted with EtOAc (40 mL×2). The combined organic phase was washed with brine (40 mL), dried over Na$_2$SO$_4$, filtered and concentrated to give the crude product. The crude product was purified by flash chromatography column on silica gel (EtOAc in PE=0 to 5% to 10% to 30%) to give the product (2.5 g, 8.79 mmol, 72% yield) as a solid. 1H NMR (400 MHz, CDCl$_3$) δ$_H$ 8.46 (d, 1H), 8.28 (d, 1H), 7.80 (d, 1H), 7.71 (dd, 1H), 7.29 (d, 1H), 6.05 (s, 1H), 3.92 (s, 2H), 2.39 (s, 3H).

A17: 3-[chloro(difluoro)methyl]-6-[3-methyl-4-(trifluoromethoxy)phenyl]-[1,2,4]triazolo[4,3-a]pyrazine A solution of (2-chloro-2,2-difluoro-acetyl) 2-chloro-2,2-difluoro-acetate (1.96 g, 8.08 mmol) and [5-(4-tert-butoxy-3-methyl-phenyl)pyrazin-2-yl]hydrazine (2 g, 7.34 mmol) in toluene (30 mL) was stirred at 90° C. for 2 hours. Then to the mixture was added TsOH (379.36 mg, 2.2 mmol), and the mixture was heated to 130° C. and stirred for 16 hours. After cooling to RT, the mixture was concentrated to give a residue. The residue was diluted with H$_2$O (50 mL), extracted with EtOAc (50 mL×2). The combined organic phase was washed with brine (50 mL), dried over Na$_2$SO$_4$, filtered and concentrated to give the crude product. The crude product was purified by flash chromatography column on silica gel (EtOAc in PE=0% to 10% to 20%) to give the product (600 mg, 1.58 mmol, 21% yield) as an oil. 1H NMR (400 MHz, CDCl$_3$) δ$_H$ 9.58 (s, 1H), 8.43 (s, 1H), 7.89 (s, 1H), 7.82 (d, 1H), 7.38 (d, 1H), 2.45 (s, 3H).

Compound 11: 3-(difluoro(methoxy)methyl)-6-(3-methyl-4-(trifluoromethoxy)phenyl)-[1,2,4]triazolo[4,3-a]pyrazine A solution of 3-[chloro(difluoro)methyl]-6-[3-methyl-4-(trifluoromethoxy)phenyl]-[1,2,4]triazolo[4,3-a]pyrazine (500 mg, 1.32 mmol), MeONa (142.65 mg, 2.64 mmol) and TBAI (292.62 mg, 0.79 mmol) in DCM (10 mL) was stirred at 20° C. for 3 hours. The solution was added to saturated aqueous NH$_4$Cl (40 mL). After separating the phases, the organic phase was washed with brine (40 mL), dried over anhydrous Na$_2$SO$_4$, filtered and concentrated to give the crude product. The crude product was purified by flash chromatography on silica gel (EtOAc in PE=0% to 10% to 20%) to give the product (71.66 mg, 191.5 μmol, 14% yield) as a solid. $^1$H NMR (400 MHz, CDCl$_3$) δ$_H$ 9.53 (d, 1H), 8.45 (d, 1H), 7.88 (d, 1H), 7.79 (dd, 1H), 7.40-7.34 (m, 1H), 3.98 (s, 3H), 2.45 (s, 3H). LCMS R$_t$=1.35 min in 2.0 min chromatography, 10-80AB, MS ESI calcd. for C$_{15}$H$_{12}$F$_5$N$_4$O$_2$ [M+H]$^+$ 375.1, found 375.0.

Example 12: Synthesis of Compound 12—(3-[cyclopropoxy(difluoro)methyl]-6-[2-methyl-4-(trifluoromethoxy)phenyl]-[1,2,4]triazolo[4,3-a]pyrazine)

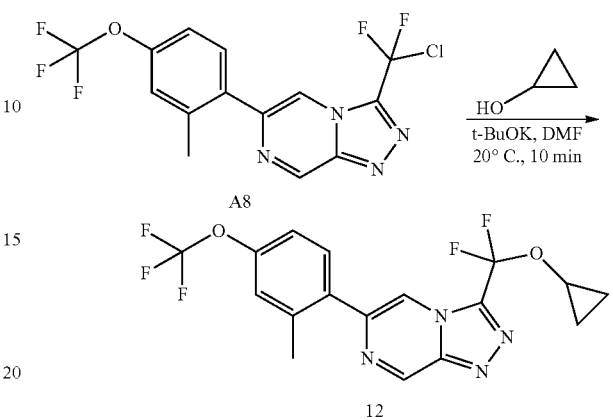

To a mixture of cyclopropanol (70.54 mg, 1.21 mmol), 3-[chloro(difluoro)methyl]-6-[2-methyl-4-(trifluoromethoxy)phenyl]-[1,2,4]triazolo[4,3-a]pyrazine (250 mg, 0.61 mmol) in DMF (3 mL) was added potassium tert-butoxide (272.56 mg, 2.43 mmol). The reaction mixture was stirred at 20° C. for 10 minutes. The mixture was diluted with H$_2$O (10 mL) and extracted with EtOAc (20 mL×2). The combined organic phase was washed with brine (10 mL), dried over Na$_2$SO$_4$, filtered and concentrated to give the crude product. The crude product was purified by prep-HPLC (Welch Xtimate C18 (150 mm×25 mm×5 μm) A=H$_2$O (10 mM NH$_4$HCO$_3$) and B=CH$_3$CN; 60-80% B over 6.5 min) to give the product (18.81 mg, 0.05 mmol, 37% yield) as an oil. $^1$H NMR (400 MHz, CDCl$_3$) δ$_H$ 9.51 (d, 1H), 8.20 (s, 1H), 7.48 (d, 1H), 7.24-7.19 (m, 2H), 4.21-4.11 (m, 1H), 2.44 (s, 3H), 1.01-0.95 (m, 2H), 0.84-0.78 (m, 2H). LCMS R$_t$=1.37 min in 2.0 min chromatography, 10-80AB, MS ESI calcd. C$_{17}$H$_{14}$F$_5$N$_4$O$_2$ [M+H]$^+$ 401.1, found 401.0.

Example 13: Synthesis of Compound 13 (3-(ethoxymethyl)-6-[2-methyl-4-(trifluoromethoxy)phenyl]-[1,2,4]triazolo[4,3-b]pyridazine)

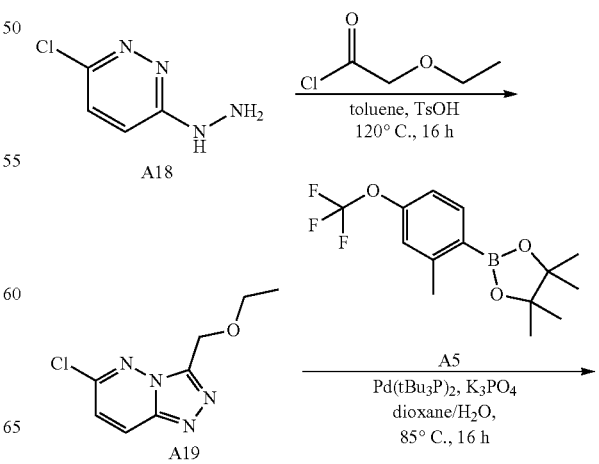

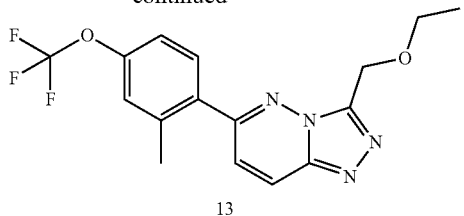

A19: 6-chloro-3-(ethoxymethyl)-[1,2,4]triazolo[4,3-b]pyridazine

To a solution of 2-methoxyacetyl chloride (1.24 g, 11.41 mmol) in toluene (40 mL), (6-chloropyridazin-3-yl)hydrazine (1.5 g, 10.38 mmol) was added dropwise at 25° C. The solution was stirred at 25° C. for 30 min, and TsOH (0.54 g, 3.11 mmol) was added. The mixture was refluxed at 120° C. for 16 hours. After cooling to RT, the mixture was diluted with H$_2$O (40 mL) and extracted with EtOAc (40 mL×2). The combined organic phase was washed with brine (40 mL), dried over Na$_2$S04, filtered and concentrated to give the crude product. The crude product was purified by flash chromatography on silica gel (EtOAc in PE=0% to 90% to 100%) to give the product (1.2 g, 5.64 mmol, 54% yield) as a solid. $^1$H NMR (400 MHz, CDCl$_3$) $\delta_H$ 8.10 (d, 1H), 7.16 (d, 1H), 5.09-5.02 (m, 2H), 3.71 (q, 2H), 1.26 (t, 3H).

Compound 13: 3-(ethoxymethyl)-6-[2-methyl-4-(trifluoromethoxy)phenyl]-[1,2,4]triazolo[4,3-b]pyridazine A mixture of 4,4,5,5-tetramethyl-2-[2-methyl-4-(trifluoromethoxy)phenyl]-1,3,2-dioxaborolane (277.04 mg, 0.92 mmol), Pd(t-Bu$_3$P)$_2$ (54.08 mg, 0.11 mmol), K$_3$PO$_4$ (299.52 mg, 1.41 mmol), and 6-chloro-3-(ethoxymethyl)-[1,2,4]triazolo[4,3-b]pyridazine (150 mg, 0.71 mmol) in 1,4-dioxane (7.5 mL) and water (1.5 mL) was stirred at 85° C. under N$_2$ for 16 hours. The reaction mixture was cooled to RT and filtered through Celite. The filtrate was concentrated to give a residue. To the residue was added water (10 mL) and extracted with EtOAc (20 mL×2). The combined organic phase was dried over anhydrous Na$_2$SO$_4$, filtered and concentrated to give the crude product. The crude product was purified by prep-HPLC (Waters XBridge (150 mm×25 mm, 5 µm) A=H$_2$O (10 mM NH$_4$HCO$_3$) and B=CH$_3$CN; 35-65% B over 10 min) to give the product (172.63 mg, 488.6 µmol, 69% yield) as a solid. $^1$H NMR (400 MHz, DMSO-d$_6$) $\delta_H$=8.48 (d, 1H), 7.69 (d, 1H), 7.63 (d, 1H), 7.45 (s, 1H), 7.41 (d, 1H), 4.97 (s, 2H), 3.59 (q, 2H), 2.45 (s, 3H), 1.11 (t, 3H). LCMS R$_t$=1.24 min in 2.0 min chromatography, 10-80AB, MS ESI calcd. for C$_{16}$H$_{16}$F$_3$N$_4$O$_2$ [M+H]$^+$ 353.1, found 353.0.

Example 14: Synthesis of Compound 14—(3-[difluoro(methoxy)methyl]-6-[2-methyl-4-(trifluoromethoxy)phenyl]-[1,2,4]triazolo[4,3-b]pyridazine)

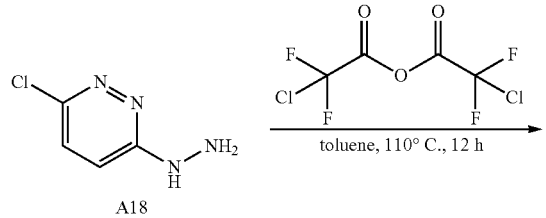

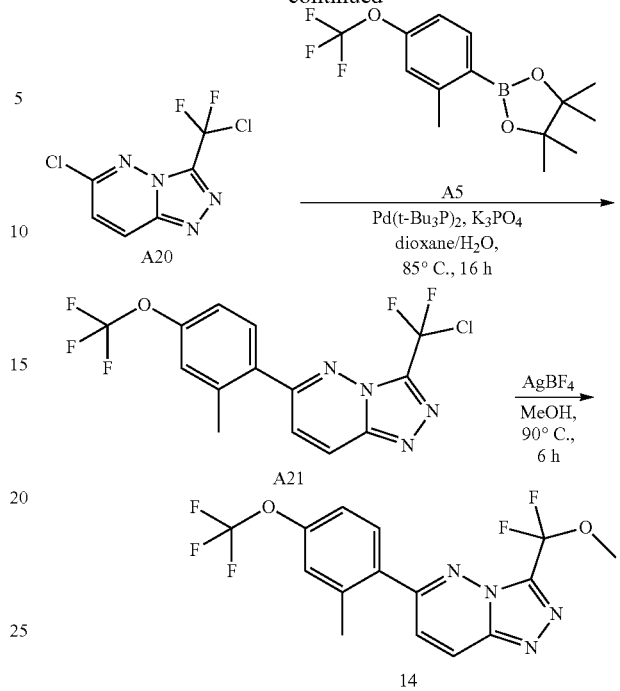

A20: 6-chloro-3-[chloro(difluoro)methyl]-[1,2,4]triazolo[4,3-b]pyridazine

To a mixture of (2-chloro-2,2-difluoro-acetyl) 2-chloro-2,2-difluoro-acetate (20.17 g, 83.01 mmol) in toluene (120 mL) was added (6-chloropyridazin-3-yl)hydrazine (10 g, 69.18 mmol). The reaction mixture was stirred at 110° C. for 12 hours. After cooling to RT, the reaction mixture was concentrated to give a residue. The residue was diluted with saturated aqueous NaHCO$_3$ (100 mL), and the mixture was extracted with EtOAc (100 mL×2). The combined organic phase was washed with brine (100 mL), dried over Na$_2$SO$_4$, filtered and concentrated to give the crude product. The crude product was purified by flash chromatography on silica gel (EtOAc in PE=0% to 50%) to give the product (14 g, 58.6 mmol, 85% yield) as a solid. 1H NMR (400 MHz, CDCl$_3$) $\delta_H$ 8.22 (d, 1H), 7.34 (d, 1H).

A21: 3-[chloro(difluoro)methyl]-6-[2-methyl-4-(trifluoromethoxy)phenyl]-[1,2,4]triazolo[4,3-b]pyridazine A mixture of Pd(t-Bu$_3$P)$_2$ (962.2 mg, 1.88 mmol), K$_3$PO$_4$ (5.33 g, 25.1 mmol), 4,4,5,5-tetramethyl-2-[2-methyl-4-(trifluoromethoxy)phenyl]-1,3,2-dioxaborolane (4.93 g, 16.32 mmol) and 6-chloro-3-[chloro(difluoro)methyl]-[1,2,4]triazolo[4,3-b]pyridazine (3.0 g, 12.55 mmol) in water (25 mL) and 1,4-dioxane (125 mL) was stirred at 85° C. under N$_2$ for 16 hours. The reaction mixture was cooled to RT and filtered through Celite. The filtrate was concentrated to give a residue. To the residue was added water (40 mL), and the mixture was extracted with EtOAc (30 mL×2). The combined organic phase was dried over anhydrous Na$_2$SO$_4$, filtered and concentrated to give the crude product. The crude product was purified by flash chromatography on silica gel (EtOAc in PE=0% to 30% to 50%) to give the product (4 g, 7.43 mmol, 59% yield) as a solid. $^1$H NMR (400 MHz, CDCl₃) δ$_H$ 8.31 (m, 1H), 7.54 (dd, 1H), 7.48 (d, 1H), 7.28-7.17 (m, 2H), 2.53 (s, 3H).

Compound 24: 3-[difluoro(methoxy)methyl]-6-[2-methyl-4-(trifluoromethoxy)phenyl]-[1,2,4]triazolo[4,3-b]pyridazine A mixture of 3-[chloro(difluoro)methyl]-6-[2-methyl-4-(trifluoromethoxy)phenyl]-[1,2,4]triazolo[4,3-b]pyridazine (500 mg, 1.32 mmol) and AgBF₄ (2.57 g, 13.2 mmol) in methanol (5 mL) was stirred at 90° C. for 6 hours in a sealed tube. After cooling to RT, the mixture was quenched with brine (20 mL), diluted with EtOAc (20 mL) and filtered through Celite. The filtrate was separated, and the aqueous phase was extracted with EtOAc (20 mL). The combined organic phase was concentrated to give the crude product. The crude product was purified by flash chromatography on silica gel (EtOAc in PE=0% to 30% to 50%) to give the product. The product was triturated from i-Pr₂O (2 mL) to give the product (81.22 mg, 0.21 mmol, 16% yield) as a solid. ¹H NMR (400 MHz, CDCl₃) δ$_H$ 8.26 (d, 1H), 7.54 (d, 1H), 7.40 (d, 1H), 7.26-7.21 (m, 2H), 3.89 (s, 3H), 2.52 (s, 3H). LCMS R$_t$=1.29 min in 2 min chromatography, 10-80AB, MS ESI calcd. for C₁₅H₁₂F₅N₄O₂ [M+H]⁺ 375.1, found 375.0.

Example 15: Synthesis of Compound 15—(3-[ethoxy(difluoro)methyl]-6-[2-methyl-4-(trifluoromethoxy)phenyl]-[1,2,4]triazolo[4,3-b]pyridazine)

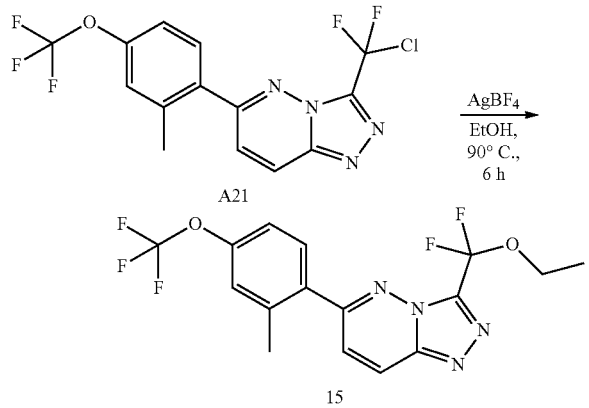

A mixture of AgBF₄ (2.57 g, 13.2 mmol) and 3-[chloro(difluoro)methyl]-6-[2-methyl-4-(trifluoromethoxy)phenyl]-[1,2,4]triazolo[4,3-b]pyridazine (500 mg, 1.32 mmol) in ethanol (5 mL) was stirred at 90° C. for 6 hours in a sealed tube. After cooling to RT, the mixture was quenched with brine (20 mL), diluted with EtOAc (20 mL), and filtered through Celite. After the filtrate was separated, the aqueous phase was extracted with EtOAc (20 mL). The combined organic phase was concentrated to give the crude product. The crude product was purified by flash chromatography on silica gel (EtOAc in PE=0% to 30% to 50%) to give the product. The product was triturated from i-Pr₂O (2 mL) to give the product (39.96 mg, 0.10 mmol, 7% yield) as a solid. ¹H NMR (400 MHz, CDCl₃) δ$_H$ 8.26 (d, 1H), 7.56-7.51 (m, 1H), 7.39 (d, 1H), 7.26-7.20 (m, 2H), 4.29 (q, 2H), 2.52 (s, 3H), 1.43 (t, 3H). LCMS R$_t$=1.33 min in 2 min chromatography, 10-80AB, MS ESI calcd. for C₁₆H₁₄F₅N₄O₂ [M+H]⁺ 389.1, found 389.0.

Example 16: Synthesis of Compound 16—(3-(cyclopropylmethoxymethyl)-6-[2-methyl-4-(trifluoromethoxy)phenyl]-[1,2,4]triazolo[4,3-a]pyrazine)

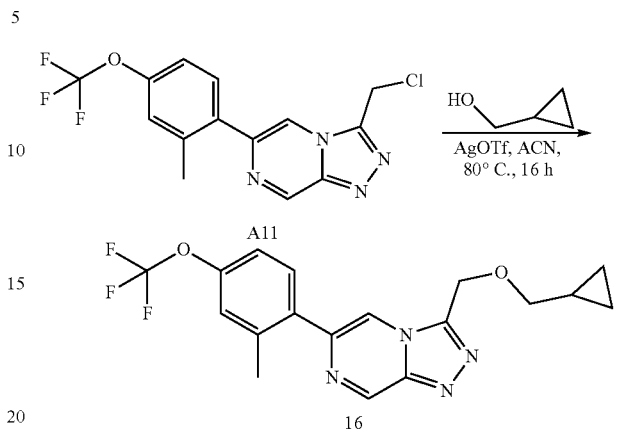

A mixture of 3-(chloromethyl)-6-[2-methyl-4-(trifluoromethoxy)phenyl]-[1,2,4]triazolo[4,3-a]pyrazine (50 mg, 0.15 mmol), cyclopropanemethanol (5 mL, 17.33 mmol) and AgOTf (374.88 mg, 1.46 mmol) in MeCN (5 mL) was stirred at 80° C. for 16 hours. After cooling to RT, the mixture was concentrated to give a residue. The residue was diluted with H₂O (10 mL), and the mixture was extracted with EtOAc (10 mL×2). The combined organic phase was washed with brine (10 mL), dried over Na₂SO₄, filtered and concentrated to give the crude product. The crude product was purified by flash chromatography column on silica gel (EtOAc in PE=0% to 40% to 60%) to give the crude product. The crude product was purified by prep-HPLC (Phenomenex Gemini-NX (150 mm×30 mm, 5 μm) A=H₂O (0.05% NH₄OH) and B=CH₃CN; 45-75% B over 8 min) to give the product (32.55 mg, 0.09 mmol, 32% yield) as a solid. ¹H NMR (400 MHz, CDCl₃) δ$_H$ 9.42 (d, 1H), 8.29 (d, 1H), 7.48 (d, 1H), 7.23-7.16 (m, 2H), 5.19 (s, 2H), 3.41 (d, 2H), 2.45 (s, 3H), 1.11-1.00 (m, 1H), 0.59-0.52 (m, 2H), 0.23-0.17 (m, 2H). LCMS Rt=1.27 min in 2 min chromatography, 10-80AB, MS ESI calcd. C₁₈H₁₈F₃N₄O₂ [M+H]⁺ 379.13, found 379.0

Example 17: Synthesis of Compound 17—(3-(methoxymethyl)-6-[2-(methoxymethyl)-4-(trifluoromethoxy) phenyl]-[1,2,4] triazolo[4,3-a]pyrazine)

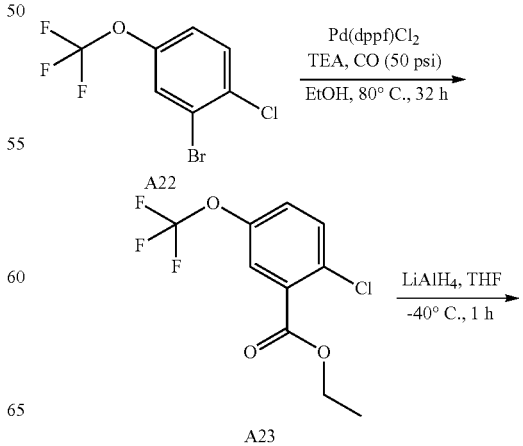

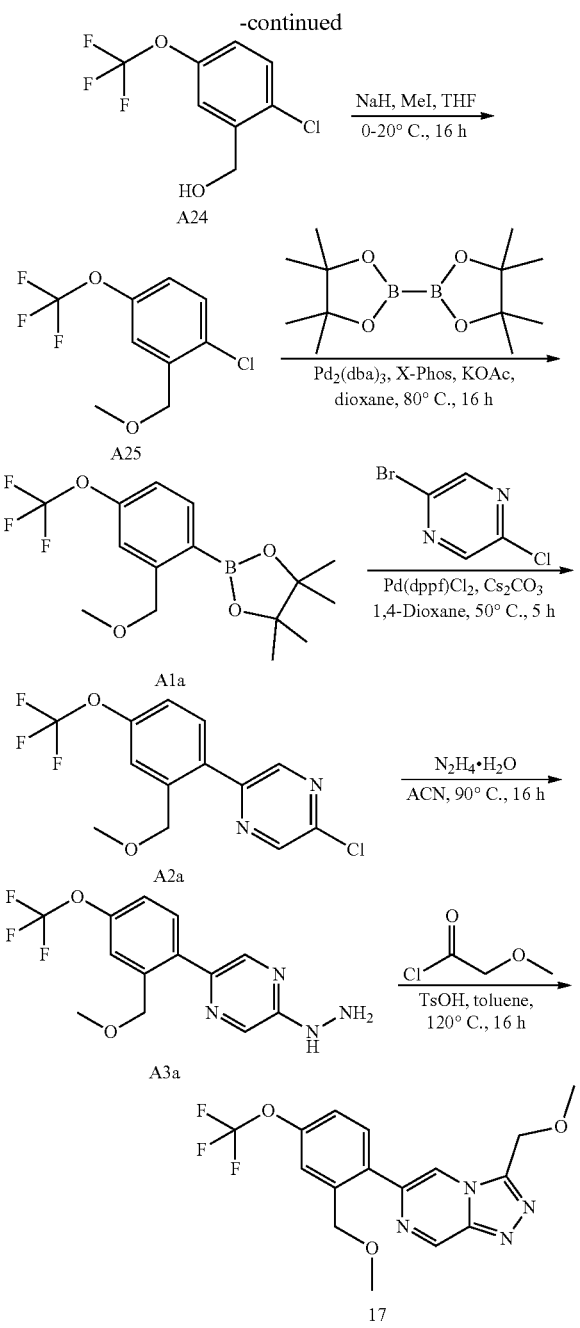

5% to 10%) to give the product (13.00 g, 48.40 mmol, 33% yield) as an oil. $^1$H NMR (400 MHz, CD$_3$OD) $\delta_H$ 7.69 (d, 1H), 7.52-7.46 (m, 1H), 7.32-7.27 (m, 1H), 4.49-4.37 (m, 2H), 1.42 (t, 3H).

A24: [2-(chloromethyl)-5-(trifluoromethoxy) phenyl]methanol

To a solution of ethyl 2-(chloromethyl)-5-(trifluoromethoxy) benzoate (12.0 g, 42.46 mmol) in THF (30.00 mL) at −40° C. was slowly added LiAlH$_4$ (1.93 g, 50.95 mmol). The reaction was stirred at −40° C. for 1 hour. The reaction was quenched with saturated aqueous NH$_4$Cl (0.4 mL), and diluted with EtOAc (30 mL). A solid formed and the mixture was filtered through a Celite pad and eluted with EtOAc (30 mL). The filtrate was concentrated to give a residue. The residue was purified by silica gel column (EtOAc in PE=0% to 10% to 20%) to give the product (10.00 g, 39.54 mmol, 93% yield) as a solid. $^1$H NMR (400 MHz, CD$_3$OD) $\delta_H$ 7.47-7.41 (m, 1H), 7.40-7.35 (m, 1H), 7.15-7.07 (m 1H), 4.80 (d, 2H).

A25: 1-chloro-2-(methoxymethyl)-4-(trifluoromethoxy) benzene

To a solution of [2-chloro-5-(trifluoromethoxy) phenyl]methanol (2.8 g, 12.36 mmol) in THF (30 mL) at 0° C. was slowly added NaH (355.9 mg, 14.83 mmol). The mixture was stirred at 0° C. for 30 min and then MeI (5.26 mg, 37.07 mmol) was added. The reaction mixture was stirred at 20° C. for 16 hours. The mixture was quenched with saturated aqueous NH$_4$Cl (40 mL), and the mixture was extracted with EtOAc (40 mL×2). The combined organic phase was washed with brine (40 mL), dried over Na$_2$SO$_4$, filtered and concentrated to give the crude product. The crude product was purified by flash chromatography on silica gel (EtOAc in PE=0 to 3% to 10% to 20% to 50%) to give the product (1.65 g, 6.86 mmol, 55% yield) as an oil. $^1$H NMR (400 MHz, CD$_3$OD) $\delta_H$ 7.43-7.33 (m, 2H), 7.15-7.05 (m, 1H), 4.54 (s, 2H), 3.50 (s, 3H).

A1a: 2-[2-(methoxymethyl)-4-(trifluoromethoxy) phenyl]-4, 4, 5, 5-tetramethyl-1, 3, 2-dioxaborolane A mixture of 4,4,5,5-tetramethyl-2-(4,4,5,5-tetramethyl-1,3,2-dioxaborolan-2-yl)-1,3,2-dioxaborolane (3.58 g, 14.11 mmol), KOAc (2.31 g, 23.52 mmol), 1-chloro-2-(methoxymethyl)-4-(trifluoromethoxy)benzene (2.83 g, 11.76 mmol) and Pd$_2$(dba)$_3$ (1.08 g, 1.18 mmol) in 1,4-dioxane (20.00 mL) was stirred at 80° C. for 16 hours under N$_2$. The mixture was cooled to 25° C. and concentrated to give a residue. The residue was quenched with saturated aqueous NH$_4$Cl (40 mL), and the mixture was extracted with EtOAc (40 mL×2). The combined organic phase was washed with brine (40 mL), dried over Na$_2$SO$_4$, filtered and concentrated to give the crude product. The crude product was purified by flash chromatography on silica gel (DCM in PE=0 to 10% to 50% to 80%) to give the product as an oil. $^1$H NMR (400 MHz, CD$_3$Cl$_3$) $\delta_H$ 7.82 (d, 1H), 7.33 (s, 1H), 7.11 (d, 1H), 4.72 (s, 2H), 3.44 (s, 3H), 1.35 (s, 12H).

A2a: 2-chloro-5-[2-(methoxymethyl)-4-(trifluoromethoxy) phenyl]pyrazine

A mixture of Pd(dppf)Cl$_2$ (330.47 mg, 0.45 mmol), Cs$_2$CO$_3$ (1.96 g, 6.02 mmol), 2-bromo-5-chloro-pyrazine A23: 4,4,5,5-tetramethyl-2-[3-methyl-4-(trifluoromethoxy)phenyl]-1,3,2-dioxaborolane A mixture of 2-bromo-1-chloro-4-(trifluoromethoxy)benzene (40.0 g, 145.22 mmol), Pd(dppf)Cl$_2$ (10.63 g, 14.52 mmol), and TEA (40.37 mL, 290.43 mmol) in ethanol (50.00 mL) was stirred at 80° C. for 32 hours under CO (50 psi). The mixture was cooled to 25° C. and concentrated to give a residue. The residue was diluted with saturated aqueous NaCl (50 mL), and the mixture was extracted with EtOAc (50 mL×2). The combined organic phase was washed with brine (50 mL), dried over Na$_2$SO$_4$, filtered and concentrated to give the crude product. The crude product was purified by flash chromatography on silica gel (EtOAc in PE=0 to 3% to (640.65 mg, 3.31 mmol), and 2-[2-(methoxymethyl)-4-(trifluoromethoxy)phenyl]-4,4,5,5-tetramethyl-1,3,2-dioxaborolane (1.00 g, 3.01 mmol) in 1,4-dioxane (10 mL) and water (2.5 mL) was stirred at 50° C. for 5 hours under $N_2$. After cooling to 25° C., the reaction mixture was diluted with EtOAc (100 mL) and filtered through a Celite pad which was eluted with EtOAc (100 mL). The filtrate was concentrated to give a residue, and the residue was purified by flash chromatography (EtOAc in PE, 0% to 10%) to give the product (610.00 mg, 1.81 mmol, 60% yield) as a solid. $^1$H NMR (400 MHz, $CD_3Cl_3$) $\delta_H$ 8.66-8.70 (m, 1H), 8.56-8.63 (m, 1H), 7.53-7.56 (m, 1H), 7.50-7.52 (m, 1H), 7.28-7.33 (m, 1H), 4.55 (s, 2H), 3.38 (s, 3H).

A3a: [5-[2-(methoxymethyl)-4-(trifluoromethoxy)phenyl]pyrazin-2-yl]hydrazine

A mixture of 2-chloro-5-[2-(methoxymethyl)-4-(trifluoromethoxy) phenyl]pyrazine (1.10 g, 3.45 mmol) and hydrazine (860.00 mg, 17.26 mmol) in MeCN (5 mL) was stirred at 90° C. for 16 hours under $N_2$. After cooling to 25° C., the reaction mixture was diluted with water, and extracted with EtOAc (30 mL×3). The combined organic phase was washed with brine (20 mL), dried over $Na_2SO_4$, filtered and concentrated to give the crude product (1.00 g, 3.18 mmol, 74% yield) as a liquid. LCMS Rt=0.71 min in 1.5 min chromatography, 5-95AB, MS ESI calcd. For $C_{13}H_{14}F_3N_4O_2$ [M+H]$^+$ 314.8, found 314.8.

Compound 17: 3-(methoxymethyl)-6-[2-(methoxymethyl)-4-(trifluoromethoxy) phenyl]-[1,2,4] triazolo[4,3-a]pyrazine A solution of [5-[2-(methoxymethyl)-4-(trifluoromethoxy) phenyl] pyrazin-2-yl]hydrazine (200 mg, 0.64 mmol) and 2-methoxyacetyl chloride (82.88 mg, 0.76 mmol) in toluene (5 mL) was stirred at 25° C. for 1 hour. Then to the mixture was added TsOH (219.18 mg, 1.27 mmol), and the mixture was heated to 120° C. and stirred for 16 hours. After cooling to 25° C., the reaction mixture was diluted with water (30 mL) and extracted with EtOAc (30 mL×3). The combined organic phase was washed with brine (20 mL), dried over $Na_2SO_4$, filtered and concentrated to give the crude product (150 mg, 0.40 mmol, 64% yield) as a liquid. The crude product was purified by prep-HPLC (Boston Green ODS (150 mm×30 mm, 5 µm) A=$H_2O$ (0.075% $NH_4OH$) and B=$CH_3CN$; 46-76% B over 7 min) to give the product (21.54 mg, 0.06 mmol, 43% yield) as a solid. $^1$H NMR (400 MHz, $CD_3Cl_3$) $\delta_H$ 9.26-9.58 (m, 1H), 8.37-8.62 (m, 1H), 7.60-7.75 (m, 1H), 7.38-7.54 (m, 1H), 7.30-7.36 (m, 1H), 4.98-5.18 (m, 2H), 4.43-4.59 (m, 2H), 3.34-3.54 (m, 6H). LCMS Rt=1.164 min in 2 min chromatography, 10-80AB, MS ESI calcd. for $C_{16}H_{16}F_3N_4O_3$ [M+H]$^+$ 369.0, found 369.0.

Example 18: Synthesis of Compound 18—(3-[cyclopropylmethoxy(difluoro)methyl]-6-[2-methyl-4-(trifluoromethoxy)phenyl]-[1,2,4]triazolo[4,3-a]pyrazine)

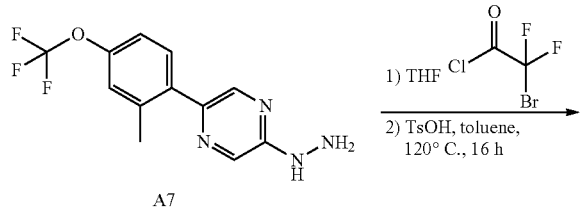

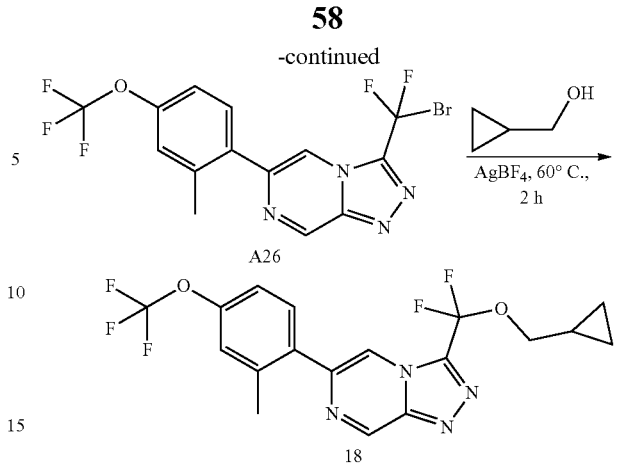

A26: 3-[bromo(difluoro)methyl]-6-[2-methyl-4-(trifluoromethoxy)phenyl]-[1,2,4]triazolo[4,3-a]pyrazine

[5-[2-Methyl-4-(trifluoromethoxy)phenyl]pyrazin-2-yl] hydrazine (1 g, 3.52 mmol) was added to a solution 2-bromo-2,2-difluoro-acetyl chloride (1.2 g, 6.21 mmol) in THF at 25° C. The mixture was stirred at 25° C. for 1 hour. The mixture was poured in to water (30 mL) and extracted with EtOAc (20 mL×2). The combined organic phase was washed with brine (30 mL), dried over $Na_2SO_4$ filtered and concentrated to give the crude product (1.5 g, 3.4 mmol, 97% yield) as a solid, which was used without purification in the next step.

A solution of 2-bromo-2,2-difluoro-N'-[5-[2-methyl-4-(trifluoromethoxy)phenyl]pyrazin-2-yl]acetohydrazide (1.2 g, 2.72 mmol) and TsOH (140.52 mg, 0.82 mmol) in toluene (20 mL) was stirred at 120° C. for 16 hours. After cooling to RT, the mixture was concentrated to give a residue. The residue was diluted with $H_2O$ (30 mL) and extracted with EtOAc (30 mL×2). The combined organic phase was washed with brine (30 mL), dried over $Na_2SO_4$, filtered and concentrated to give the crude product. The crude product was purified by flash chromatography on silica gel (EtOAc in PE=0% to 30% to 50%) to give the product (600 mg, 1.3371 mmol, 57% yield) as an oil. LCMS Rt=2.86 min in 4.0 min chromatography, 10-80AB, MS ESI calcd. $C_{14}H_9BrF_5N_4O$ [M+H]$^+$ 422.98, found 424.7.

Compound 18: 3-[cyclopropylmethoxy(difluoro)methyl]-6-[2-methyl-4-(trifluoromethoxy)phenyl]-[1,2,4]triazolo[4,3-a]pyrazine To a light protected suspension of 3-[bromo(difluoro) methyl]-6-[2-methyl-4-(trifluoromethoxy)phenyl]-[1,2,4] triazolo[4,3-a]pyrazine (150 mg, 0.35 mmol) in cyclopropanemethanol (127.81 mg, 1.77 mmol) was added AgBF4 (138.02 mg, 0.71 mmol) at 25° C. under $N_2$. The mixture was stirred at 60° C. for 2 hours. The solution was added to saturated aqueous NaCl (20 mL) and filtered. The filtrate was extracted with EtOAc (10 mL×2). The combined organic phase was washed with brine (10 mL), dried over $Na_2SO_4$, filtered and concentrated to give the crude product. The crude product was purified by prep-HPLC (Phenomenex Gemini-NX (150 mm×30 mm, 5 µm) A=$H_2O$ (0.05% $NH_4OH$) and B=$CH_3CN$; 51-81% B over 8 min) to give the product (55.12 mg, 0.13 mmol, 38% yield) as a solid. 1H NMR (400 MHz, $CDCl_3$) $\delta_H$ 9.52 (d, 1H), 8.30 (s, 1H), 7.49

(d, 1H), 7.25-7.17 (m, 2H), 4.09 (d, 2H), 2.46 (s, 3H), 1.36-1.24 (m, 1H), 0.74-0.64 (m, 2H), 0.48-0.35 (m, 2H). LCMS Rt=1.37 min in 2.0 min chromatography, 10-80AB, MS ESI calcd. $C_{18}H_{16}F_5N_4O_2$ [M+H]$^+$ 415.11, found 415.0.

Example 19: Synthesis of Compound 19—(3-[ethoxy (difluoro) methyl]-6-[2-(methoxymethyl)-4-(trifluoromethoxy) phenyl]-[1,2,4] triazolo [4,3-a] pyrazine)

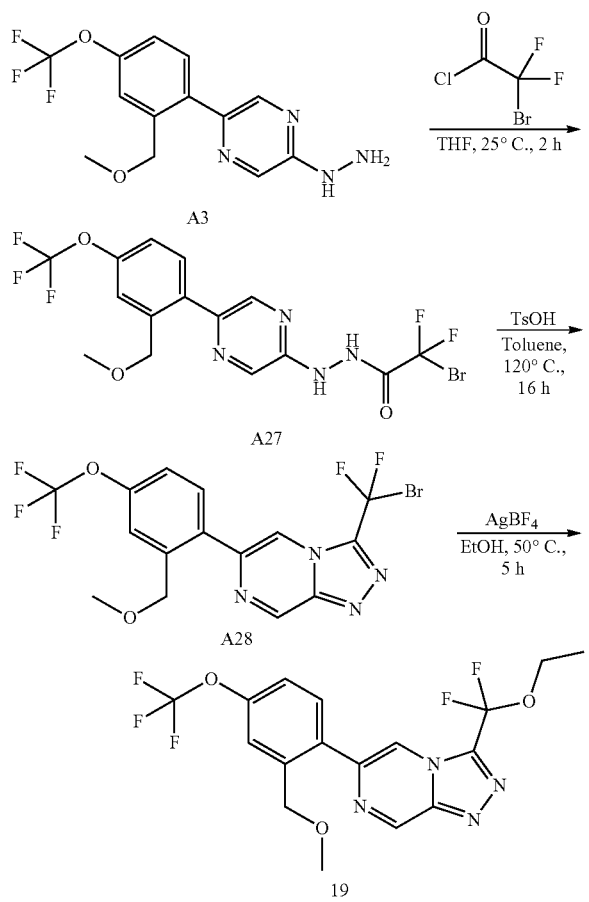

A27: 2-bromo-2, 2-difluoro-N'-[5-[2-(methoxymethyl)-4-(trifluoromethoxy) phenyl] pyrazin-2-yl] acetohydrazide A mixture of 2-bromo-2, 2-difluoro-acetic acid (267.19 mg, 1.53 mmol), DMF (0.05 mL) and oxalyl chloride (323.12 mg, 2.55 mmol) in THF (5 mL) was stirred at 25° C. for 2 hours under N$_2$. Then to the mixture [5-[2-(methoxymethyl)-4-(trifluoromethoxy) phenyl]pyrazin-2-yl] hydrazine (400 mg, 1.27 mmol) was added, and the mixture was stirred at 25° C. for 2 hours under N$_2$. The reaction was quenched with saturated aqueous NaCl (10 mL), and diluted with EtOAc (20 mL). The mixture was filtered, and the filtrate was extracted with EtOAc (20 mL×2). The combined organic phase was washed with brine (15 mL), dried over Na$_2$SO$_4$, filtered and concentrated to give the product (500 mg, 1.06 mmol) as an oil. LCMS Rt=0.96 min in 1.5 min chromatography, 5-95 AB, MS ESI calcd. for $C_{15}H_{13}BrF_5N_4O_3$ [M+H]$^+$ 471.0, found 470.8.

A28: 3-[bromo (difluoro) methyl]-6-[2-(methoxymethyl)-4-(trifluoromethoxy) phenyl]-[1,2,4]triazolo [4,3-a]pyrazine To a mixture of 2-bromo-2, 2-difluoro-N'-[5-[2-(methoxymethyl)-4-(trifluoromethoxy) phenyl] pyrazin-2-yl] acetohydrazide (500 mg, 1.06 mmol) in toluene (5 mL) was added TsOH (109.64 mg, 0.64 mmol) and the mixture was stirred at 120° C. for 16 hours under N$_2$. After cooling to 25° C., the mixture was quenched with saturated aqueous NaHCO$_3$ (20 mL), and the mixture was extracted with EtOAc (20 mL×3). The combined organic phase was washed with brine (20 mL), dried over Na$_2$SO$_4$, filtered and concentrated to give the crude product. The crude product was purified by flash chromatography on silica gel (EtOAc in PE=0% to 10% to 30%) to give the product (400 mg, 0.88 mmol) as an oil. LCMS Rt=2.80 min in 4.0 min chromatography, 10-80 AB, MS ESI calcd. for $C_{15}H_{11}BrF_5N_4O_2$ [M+H+2]$^+$455.0, found 454.7.

Compound 19: 3-[ethoxy (difluoro) methyl]-6-[2-(methoxymethyl)-4-(trifluoromethoxy) phenyl]-[1,2, 4] triazolo [4,3-a] pyrazine To a mixture of 3-[bromo(difluoro)methyl]-6-[2-(methoxymethyl)-4-(trifluoromethoxy)phenyl]-[1,2,4]triazolo[4,3-a]pyrazine (400 mg, 0.88 mmol) in ethanol (5 mL) was added AgBF$_4$ (343.67 mg, 1.77 mmol), and the mixture was stirred at 50° C. for 5 hours under N$_2$ while protected from light. The reaction was quenched with saturated aqueous NaCl (10 mL) and diluted with EtOAc (20 mL). The mixture was filtered and extracted with EtOAc (20 mL×2). The combined organic phase was washed with brine (15 mL), dried over Na$_2$SO$_4$, filtered and concentrated to give the crude product. The crude product was purified by prep-HPLC (Welch Xtimate C18 (150 mm×25 mm, 5 μm) A=H$_2$O (0.075% NH$_4$OH) and B=CH$_3$CN; 53-83% B over 11 min) to give the product (58.92 mg, 0.14 mmol) as an oil. 1H NMR (400 MHz, CDCl$_3$) δ$_H$ 9.51 (d, 1H), 8.62 (s, 1H), 7.70 (d, 1H), 7.47 (s, 1H), 7.32-7.37 (m, 1H), 4.50 (s, 2H), 4.34 (q, 2H), 3.44 (s, 3H), 1.47 (t, 3H). LCMS Rt=1.35 min in 2 min chromatography, 10-80AB, MS ESI calcd. for $C_{17}H_{16}F_5N_4O_3$ [M+H]$^+$ 419.1, found 418.9.

Example 20: Synthesis of Compound 20—(3-(cyclopropoxymethyl)-6-[2-methyl-4-(trifluoromethoxy)phenyl]-[1,2,4]triazolo[4,3-a]pyrazine)

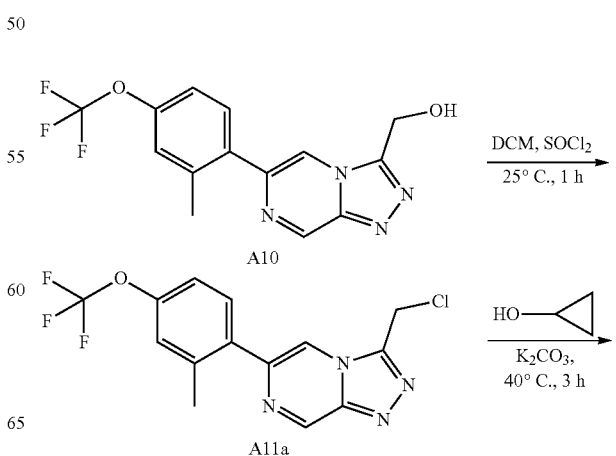

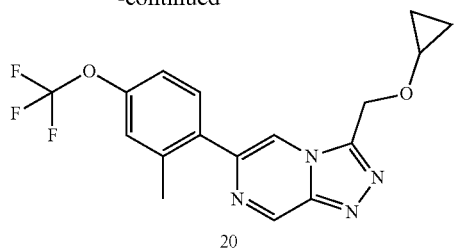

A11a: 3-(chloromethyl)-6-[2-methyl-4-(trifluoromethoxy)phenyl]-[1,2,4]triazolo[4,3-a]pyrazine To a solution of [6-[2-methyl-4-(trifluoromethoxy)phenyl]-[1,2,4]triazolo[4,3-a]pyrazin-3-yl] methanol (200 mg, 0.62 mmol) in DCM (5 mL) was added $SOCl_2$ (0.07 mL, 0.93 mmol) at 25° C. The mixture was stirred at 25° C. for 1 hour. The mixture was poured in to water (30 mL) and extracted with EtOAc (20 mL×2). The combined organic phase was washed with brine (50 mL), dried over $Na_2SO_4$ filtered and concentrated to give crude product (200 mg, 0.58 mmol) as a solid. $^1$H NMR (400 MHz, $CDCl_3$) δH=9.48 (d, 1H), 8.16 (d, 1H), 7.49 (d, 1H), 7.23-7.19 (m, 2H), 5.20 (s, 2H), 2.45 (s, 3H).

Compound 20: 3-(cyclopropoxymethyl)-6-[2-methyl-4-(trifluoromethoxy)phenyl]-[1,2,4]triazolo[4,3-a]pyrazine To 3-(chloromethyl)-6-[2-methyl-4-(trifluoromethoxy)phenyl]-[1,2,4]triazolo[4,3-a]pyrazine (211 mg, 0.62 mmol) and $K_2CO_3$ (170.15 mg, 1.23 mmol) was added in cyclopropanol (2 mL, 0.62 mmol) at 25° C. The mixture was stirred at 40° C. for 3 hours. The mixture was diluted with $H_2O$ (20 mL) and extracted with EtOAc (10 mL×2). The combined organic phase was washed with water (50 mL) and brine (50 mL), dried over $Na_2SO_4$, filtered and concentrated to give the crude product. The crude product was purified by Prep-HPLC (Welch Xtimate C18 (150 mm×25 mm, 5 μm); A=$H_2O$ (10 mM $NH_4HCO_3$) and B=$CH_3CN$; 50-80% B over 7.5 min) to give the product (74.38 mg, 0.2 mmol, 33% yield) as a solid. 1H NMR (400 MHz, $CDCl_3$) $δ_H$ 9.42 (d, 1H), 8.17 (d, 1H), 7.48 (d, 1H), 7.24-7.16 (m, 2H), 5.18 (s, 2H), 3.43-3.38 (m, 1H), 2.44 (s, 3H), 0.67-0.62 (m, 2H), 0.60-0.55 (m, 2H). LCMS $R_t$=1.28 min in 2.0 min chromatography, 10-80AB, MS ESI calcd. for $C_{17}H_{16}F_3N_4O_2$ [M+H]$^+$ 365.11, found 365.1.

Example 21: Synthesis of Compound 21—(3-(difluoro(methoxy)methyl)-6-(2-methyl-4-(2,2,2-trifluoroethoxy)phenyl)-[1,2,4]triazolo[4,3-a]pyrazine)

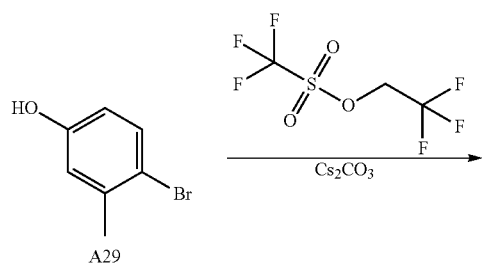

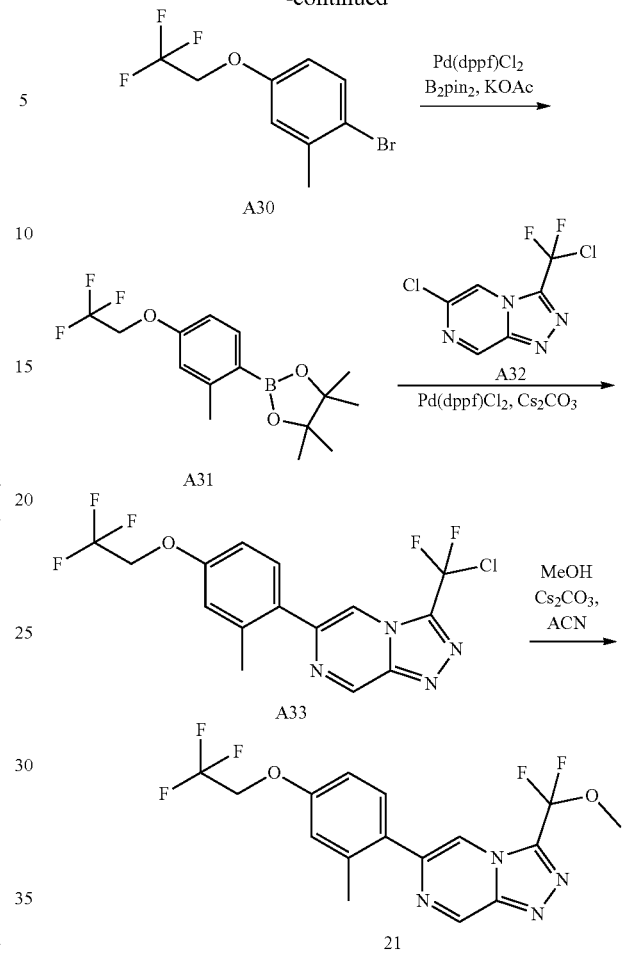

A30: 1-bromo-2-methyl-4-(2,2,2-trifluoroethoxy)benzene

To a stirred solution of 4-bromo-3-methyl-phenol (2.0 g, 10.69 mmol) in DMF (20.0 mL) at 0° C. was added 2,2,2-trifluoroethyl trifluoromethanesulfonate (2.48 g, 10.69 mmol) and cesium carbonate (4.53 g, 13.9 mmol). The reaction mixture was slowly warmed to RT and stirred for 12 hours. The reaction mixture was treated with water (40 mL) and extracted with EtOAc (2×30 mL). The organic layer was washed with brine (30 mL), dried over anhydrous $Na_2SO_4$ and concentrated to give the crude product. The crude product was purified by column chromatography on silica gel with 5% EtOAc/PE to afford the product as a liquid (2.7 g, 9.97 mmol, 93% yield). $^1$H NMR (400 MHz, $CDCl_3$): $δ_H$ 7.46 (d, 1H), 6.87 (d, 1H), 6.68 (dd, 1H), 4.33 (q, 2H), 2.40 (s, 3H).

A31: 4,4,5,5-tetramethyl-2-(2-methyl-4-(2,2,2-trifluoroethoxy)phenyl)-1,3,2-dioxaborolane To a stirred solution of 1-bromo-2-methyl-4-(2,2,2-trifluoroethoxy)benzene (2.7 g, 9.97 mmol) and bis(pinacolato)diboron (3.04 g, 11.97 mmol) in 1,4-dioxane (30 mL) was added potassium acetate (1.96 g, 19.95 mmol). Pd(dppf)$Cl_2$·DCM (0.81 g, 1.0 mmol) was added to the reaction mixture under nitrogen atmosphere and heated at 80° C. for 12 hours. The reaction mixture was cooled to RT, filtered through Celite and concentrated under reduced pressure to give the crude product. The crude product was purified by column chromatography on silica gel with 5% EtOAc/PE to afford the product as a liquid (2.93 g, 9.28 mmol, 93% yield). LCMS: Column: ZORBAX XDB C-18 (50×4.6 mm), 3.5 μm; Mobile Phase: A: 0.1% HCOOH in water:ACN (95:5), B: ACN; Flow Rate: 1.5 mL/min; 316.2 (M+H), $R_t$ 3.00 min.

A33: 3-(chlorodifluoromethyl)-6-(2-methyl-4-(2,2,2-trifluoroethoxy)phenyl)-[1,2,4]triazolo[4,3-a]pyrazine To a stirred solution of 6-chloro-3-[chloro(difluoro)methyl]-[1,2,4]triazolo[4,3-a]pyrazine (1.1 g, 4.6 mmol) and 4,4,5,5-tetramethyl-2-(2-methyl-4-(2,2,2-trifluoroethoxy)phenyl)-1,3,2-dioxaborolane (1.43 g, 4.6 mmol) in 1,4-dioxane (15 mL) was added water (1.5 mL) and $Cs_2CO_3$ (3.02 g, 9.28 mmol). Pd(dppf)$Cl_2$-DCM (0.38 g, 0.46 mmol) was added to the reaction mixture under nitrogen atmosphere and heated at 80° C. for 12 hours. The reaction mixture was cooled to RT, filtered through Celite and concentrated under reduced pressure to give the crude product. The crude product was purified by column chromatography on silica gel with 25% EtOAc/PE to afford the product (205 mg, 0.52 mmol, 11% yield) as a solid. LCMS: Column: ZORBAX XDB C-18 (50×4.6 mm), 3.5 μm; Mobile Phase: A: 0.1% HCOOH in water:ACN (95:5), B: ACN; Flow Rate: 1.5 mL/min; 393.1 (M+H), $R_t$ 2.42 min.

Compound 21: 3-(difluoro(methoxy)methyl)-6-(2-methyl-4-(2,2,2-trifluoroethoxy)phenyl)-[1,2,4]triazolo[4,3-a]pyrazine To a stirred solution of 3-(chlorodifluoromethyl)-6-(2-methyl-4-(2,2,2-trifluoroethoxy)phenyl)-[1,2,4]triazolo[4,3-a]pyrazine (165 mg, 0.42 mmol) in MeCN (8.0 mL) was added $Cs_2CO_3$ (810 mg, 2.5 mmol) and methanol (0.17 mL, 4.2 mmol). The reaction was stirred for 1 hour at RT. The reaction mixture was treated with water (20 mL) and extracted with EtOAc (2×20 mL). The organic layer was washed with brine (15 mL), dried over anhydrous $Na_2SO_4$ and concentrated to give the crude product. The crude product was purified by prep-HPLC to afford a the product as a solid (60 mg, 0.15 mmol, 36% yield). prep-HPLC method: Rt 8.9; Column: XBridge $C_8$ (150×19 mm), 5.0 μm; Mobile phase: 10% $NH_4OAc$ in water/acetonitrile; Flow Rate: 15.0 mL/min. HPLC: Rt 4.79 min, Column: XBridge C8 (50×4.6) mm, 3.5 μm; Mobile phase: A: 0.1% TFA in water, B: 0.1% TFA in ACN; Flow Rate: 2.0 mL/min. LCMS: 389.0 (M+H), Rt 2.23 min, Column: XBridge C8 (50×4.6 mm), 3.5 μm; Mobile Phase: A: 0.1% TFA in water:ACN (95:5), B: 0.1% TFA in ACN; Flow Rate: 1.5 mL/min. $^1$H NMR (400 MHz, $CD_3OD$): $δ_H$ 9.51 (d, 1H), 8.45 (s, 1H), 7.47 (d, 1H), 7.04-6.98 (m, 2H), 4.62 (q, 2H), 3.95 (s, 3H), 2.41 (s, 3H).

Example 22: Synthesis of Compound 22—(3-(difluoro(methoxy)methyl)-6-(4-isopropoxy-2-methylphenyl)-[1,2,4]triazolo [4,3-a]pyrazine)

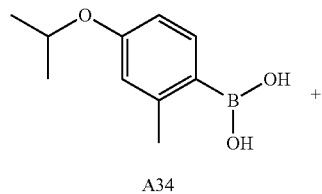

A34

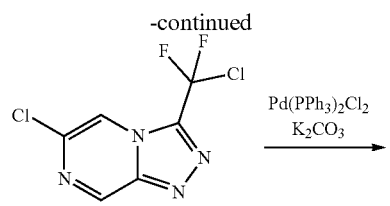

A32

A35

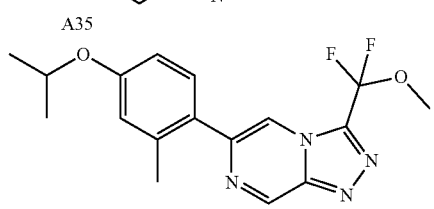

22

A35:3-(chlorodifluoromethyl)-6-(4-isopropoxy-2-methylphenyl)-[1,2,4]triazolo[4,3-a]pyrazine To a stirred solution of 6-chloro-3-[chloro(difluoro)methyl]-[1,2,4]triazolo[4,3-a]pyrazine (1.0 g, 4.18 mmol) and (4-isopropoxy-2-methylphenyl)boronic acid (0.97 g, 5.02 mmol) in 1,4-dioxane (18 mL) was added water (2 mL) and $K_2CO_3$ (1.16 g, 8.37 mmol). $PdCl_2(PPh_3)_2$ (0.29 g, 0.42 mmol) was added to the reaction mixture under nitrogen atmosphere and heated at 80° C. for 16 hours. The reaction mixture was cooled to RT, filtered through Celite and concentrated under reduced pressure to give the crude product. The crude product was purified by column chromatography on silica gel with 18% EtOAc/PE to afford the product (0.85 g, 2.41 mmol, 57% yield). LCMS: 353.2 (M+H), $R_t$ 2.54 min; Column: ZORBAX XDB C-18 (50×4.6 mm), 3.5 μm; Mobile Phase: A: 0.1% HCOOH in water: ACN (95:5), B: ACN; Flow Rate: 1.5 mL/min.

Compound 22: 3-(difluoro(methoxy)methyl)-6-(4-isopropoxy-2-methylphenyl)-[1,2,4]triazolo [4,3-a]pyrazine To a stirred solution of 3-(chlorodifluoromethyl)-6-(4-isopropoxy-2-methylphenyl)-[1,2,4]triazolo[4,3-a]pyrazine (200 mg, 0.56 mmol) in MeCN (9 mL) was added $Cs_2CO_3$ (1.1 g, 3.39 mmol) and methanol (0.46 mL, 11.29 mmol). The reaction was stirred for 3 hours at room temperature. The reaction mixture was treated with water (20.0 mL) and extracted with EtOAc (2×20 mL). The organic layer was washed with brine (15 mL), dried over anhydrous $Na_2SO_4$ and concentrated to give the crude product. The crude product was purified by column chromatography on silica gel with 18% EtOAc/PE to afford the product (147 mg, 0.42 mmol, 74% yield) as a solid. HPLC: $R_t$ 4.70 min, Column: XBridge $C_8$ (50×4.6) mm, 3.5 μm; Mobile phase: A: 0.10% TFA in water, B: 0.10% TFA in ACN; Flow Rate: 2.0 mL/min. LCMS: 349.1 (M+H), Rt 2.24 min, Column: XBridge $C_8$ (50×4.6 mm), 3.5 μm; Mobile Phase: A: 0.1% TFA in water:ACN (95:5), B: 0.1% TFA in ACN; Flow Rate: 1.5 mL/min. $^1$H NMR (400 MHz, $CD_3OD$): $δ_H$ 9.50 (d, 1H), 8.41 (d, 1H), 7.40 (d, 1H), 6.91-6.87 (m, 2H), 4.71-4.68 (m, 1H), 3.95 (s, 3H), 2.38 (s, 3H), 1.36 (d, 6H).

Example 23: Synthesis of Compound 23—(3-(ethoxydifluoromethyl)-6-(4-isopropoxy-2-methylphenyl)-[1,2,4]triazolo[4,3-a]pyrazine)

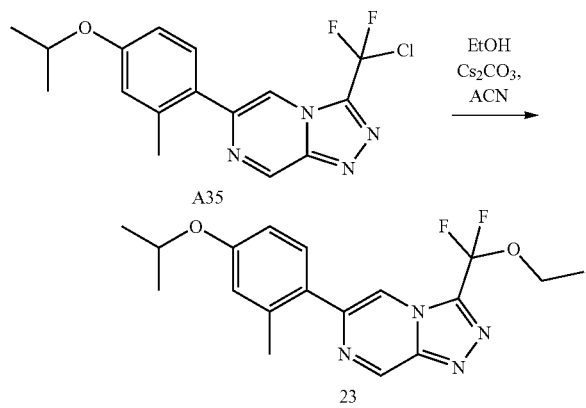

To a stirred solution of 3-(chlorodifluoromethyl)-6-(4-isopropoxy-2-methylphenyl)-[1,2,4]triazolo[4,3-a]pyrazine (200 mg, 0.56 mmol) in MeCN (9.0 mL) was added $Cs_2CO_3$ (1.1 g, 3.39 mmol) and ethanol (0.66 mL, 11.29 mmol). The reaction mixture was stirred for 4 hours at room temperature. The reaction mixture was treated with water (20.0 mL) and extracted with ethyl acetate (2×20 mL). The organic layer was washed with brine (20 mL), dried over anhydrous $Na_2SO_4$ and concentrated to give the crude product. The crude product was purified by column chromatography on silica gel with 11% EtOAc/PE to afford a solid (103 mg, 0.28 mmol, 50% yield). HPLC: $R_t$ 5.02 min, Column: XBridge $C_8$ (50×4.6) mm, 3.5 μm; Mobile phase: A: 0.10% TFA in water, B: 0.10% TFA in ACN; Flow Rate: 2.0 mL/min. LCMS: 363.2 (M+H), $R_t$ 2.50 min, Column: ZORBAX XDB C-18 (50×4.6 mm), 3.5 μm; Mobile Phase: A: 0.1% HCOOH in water:ACN (95:5), B: ACN; Flow Rate: 1.5 mL/min. $^1$H NMR (400 MHz, $CD_3OD$): $\delta_H$ 9.49 (d, 1H), 8.40 (d, 1H), 7.41 (d, 1H), 6.90-6.86 (m, 2H), 4.72-4.66 (m, 1H), 4.34 (q, 2H), 2.39 (s, 3H), 1.44 (t, 3H), 1.35 (d, 6H).

Example 24: Synthesis of Compound 24—(3-(difluoro(methoxy)methyl)-6-(4-isopropoxyphenyl)-[1,2,4]triazolo[4,3-a]pyrazine)

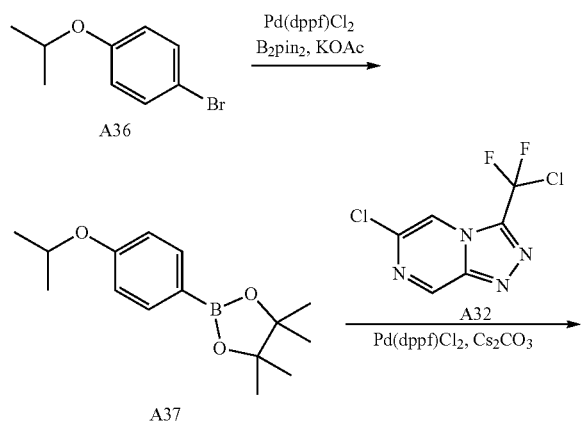

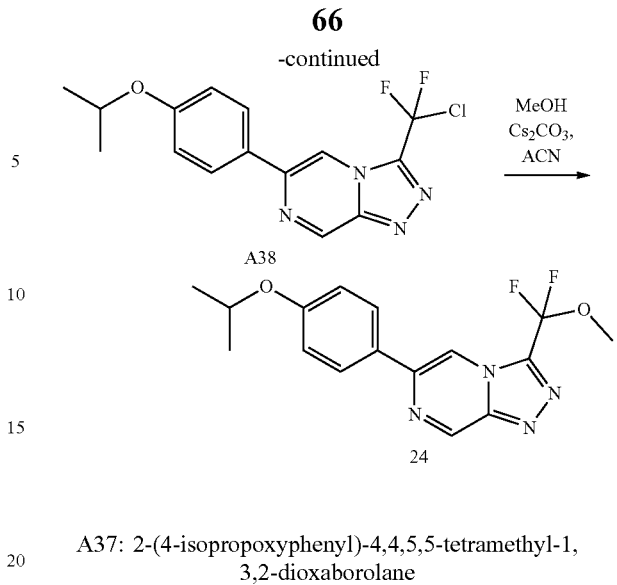

A37: 2-(4-isopropoxyphenyl)-4,4,5,5-tetramethyl-1,3,2-dioxaborolane

To a stirred solution of 1-bromo-4-isopropoxybenzene (3.0 g, 13.95 mmol) and bis(pinacolato)diboron (4.25 g, 16.74 mmol) in 1,4-dioxane (30 mL) was added potassium acetate (2.74 g, 27.9 mmol). $Pd(dppf)Cl_2$-DCM (1.14 g, 1.39 mmol) was added to the reaction mixture under nitrogen atmosphere and heated at 80° C. for 12 hours. The reaction mixture was cooled to room temperature, filtered through Celite and concentrated under reduced pressure to give the crude product. The crude product was purified by column chromatography on silica gel with 5% EtOAc/PE to afford the product (3.2 g, 12.1 mmol, 87% yield). $^1$H NMR (400 MHz, $CDCl_3$): $\delta_H$ 7.74 (d, 2H), 6.88 (d, 2H), 4.64-4.59 (m, 1H), 1.36 (s, 12H), 1.35 (d, 6H).

A38: 3-(chlorodifluoromethyl)-6-(4-isopropoxyphenyl)-[1,2,4]triazolo[4,3-a]pyrazine To a stirred solution of 6-chloro-3-[chloro(difluoro)methyl]-[1,2,4]triazolo[4,3-a]pyrazine (1.5 g, 6.27 mmol) and 2-(4-isopropoxyphenyl)-4,4,5,5-tetramethyl-1,3,2-dioxaborolane (1.5 g, 5.7 mmol) in 1,4-dioxane (15 mL) was added water (1.5 mL) and $Cs_2CO_3$ (3.71 g, 11.4 mmol). $Pd(dppf)Cl_2$-DCM (0.47 g, 0.57 mmol) was added to the reaction mixture under nitrogen atmosphere and heated at 80° C. for 12 hours. The reaction mixture was cooled to room temperature, filtered through Celite and concentrated under reduced pressure to give the crude product. The crude product was purified by column chromatography on silica gel with 8% EtOAc/PE to afford the product as a solid (340 mg, 1.0 mmol, 17% yield). LCMS: 339.0 (M+H), Rt 2.33 min Column: XBridge C8 (50×4.6 mm), 3.5 μm; Mobile Phase: A: 0.1% TFA in water:ACN (95:5), B: 0.1% TFA in ACN; Flow Rate: 1.5 mL/min.

Compound 24: 3-(difluoro(methoxy)methyl)-6-(4-isopropoxyphenyl)-[1,2,4]triazolo[4,3-a]pyrazine To a stirred solution of 3-(chlorodifluoromethyl)-6-(4-isopropoxyphenyl)-[1,2,4]triazolo[4,3-a]pyrazine (170 mg, 0.50 mmol) in MeCN (8 mL) was added $Cs_2CO_3$ (0.98 g, 3.0 mmol) and methanol (0.2 mL, 5.0 mmol). The reaction was stirred for 2 hours at room temperature. The reaction mixture was treated with water (20 mL) and extracted with ethyl acetate (2×20 mL). The organic layer was washed with brine (15 mL), dried over anhydrous $Na_2SO_4$ and concentrated to give the crude product. The crude product was purified by preparative HPLC to afford the product as a solid (45 mg, 0.13 mmol, 27% yield). Prep. HPLC method: Rt 11.51; Column: XBridge C8 (150×19 mm), 5.0 μm; Mobile phase: 0.1% TFA in water/acetonitrile; Flow Rate: 15.0 mL/min. HPLC: Rt 4.90 min, Column: XBridge C8 (50×4.6) mm, 3.5 μm; Mobile phase: A: 0.1% TFA in water, B: 0.1% TFA in ACN; Flow Rate: 2.0 mL/min. LCMS: 335.1 (M+H), Rt 2.53 min, Column: Atlantis dC18 (50×4.6 mm), 3.5 μm; Mobile Phase: A: 0.1% HCOOH in water:ACN (95:5), B: ACN; Flow Rate: 1.5 mL/min. $^1$H NMR (400 MHz, CD$_3$OD): $\delta_H$ 9.50 (d, 1H), 8.63 (s, 1H), 8.02-7.98 (m, 2H), 7.05 (dd, 2H), 4.75-4.68 (m, 1H), 3.99 (s, 3H), 1.37 (d, 3H). 1.36 (d, 3H).

Example 25: Synthesis of Compound 25—(3-(ethoxydifluoromethyl)-6-(4-isopropoxyphenyl)-[1,2,4]triazolo[4,3-a]pyrazine)

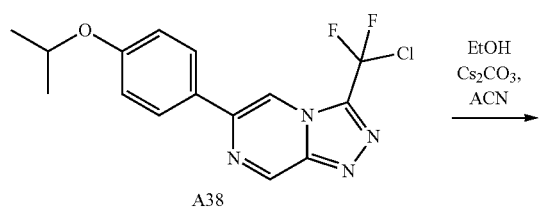

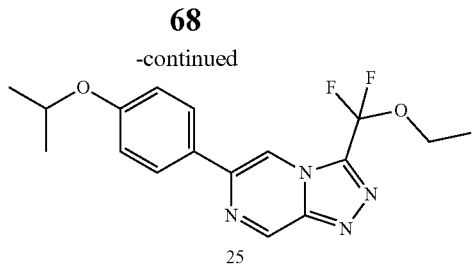

To a stirred solution of 3-(chlorodifluoromethyl)-6-(4-isopropoxyphenyl)-[1,2,4]triazolo[4,3-a]pyrazine (210 mg, 0.51 mmol) in MeCN (8.0 mL) was added Cs$_2$CO$_3$ (1.0 g, 3.06 mmol) and ethanol (0.3 mL, 5.1 mmol). The reaction mixture was stirred for 2 hours at room temperature. The reaction mixture was treated with water (15.0 mL) and extracted with ethyl acetate (2×25 mL). The organic layer was washed with brine (20 mL), dried over anhydrous Na$_2$SO$_4$ and concentrated to give the crude product. The crude product was purified by preparative HPLC to afford the product as a solid (18 mg, 0.05 mmol, 10% yield). Prep. HPLC method: Rt 16.21; Column: X-Select (150×19 mm), 5.0 μm; Mobile phase: 0.1% TFA in water/acetonitrile; Flow Rate: 15.0 mL/min. HPLC: Rt 4.95 min, 98.9% Column: XBridge C8 (50×4.6 mm), 3.5 μm; Mobile phase: A: 0.1% TFA in water, B: 0.1% TFA in ACN; Flow Rate: 2.0 mL/min. LCMS: 349.3 (M+H), Rt 2.51 min, 99.6% Column: ZORBAX XDB C-18 (50×4.6 mm), 3.5 μm; Mobile Phase: A: 0.1% HCOOH in water:ACN (95:5), B: ACN; Flow Rate: 1.5 mL/min. $^1$H NMR (400 MHz, CD$_3$OD): δ 9.51 (s, 1H), 8.64 (s, 1H), 7.98 (d, 2H), 7.06 (d, 2H), 4.74-4.70 (m, 1H), 4.38 (q, 2H), 1.50 (t, 3H), 1.37 (d, 6H).

Example 26: Synthesis of Compound 26—(3-[difluoro(methoxy)methyl]-6-[2-ethyl-4-(trifluoromethoxy)phenyl]-[1,2,4]triazolo[4,3-a]pyrazine)

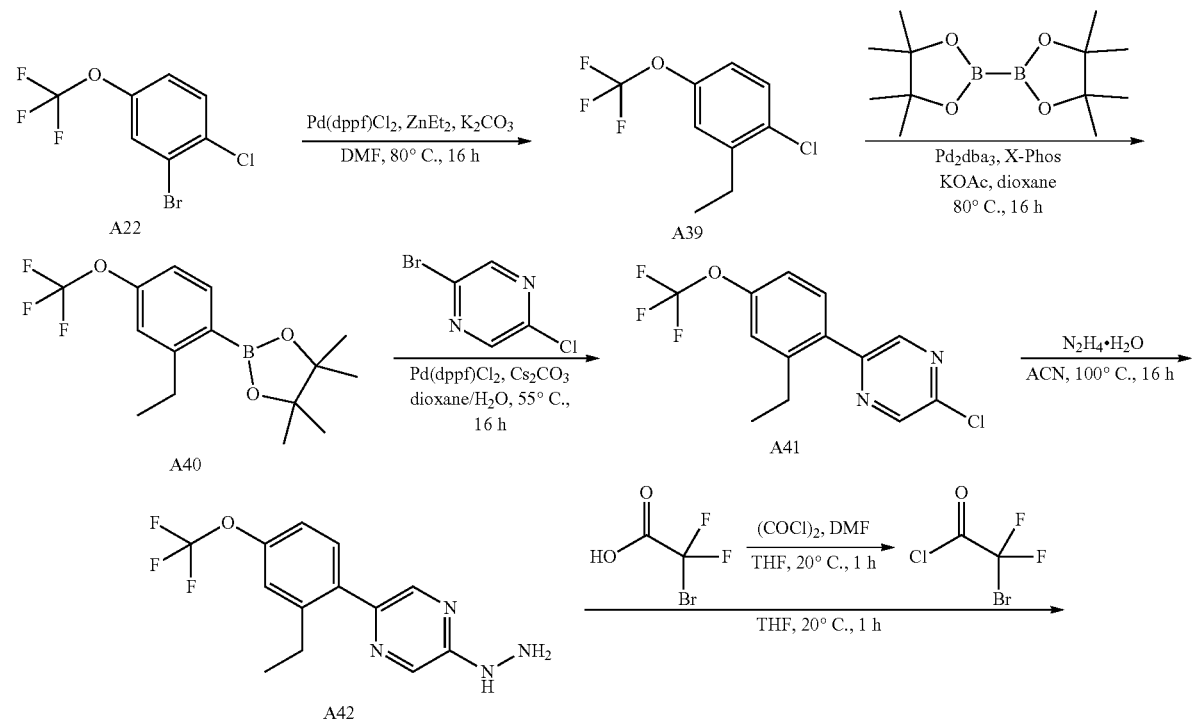

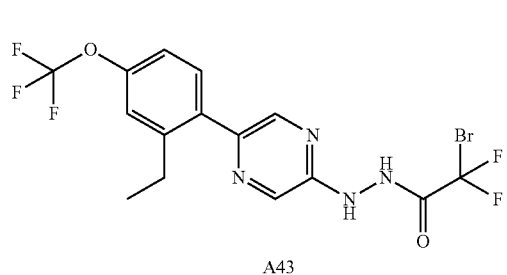 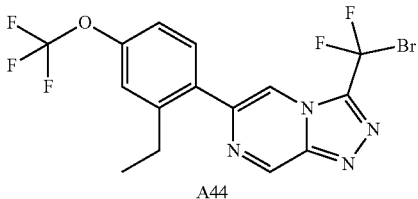

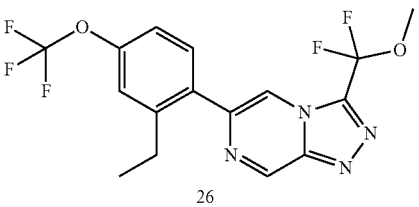

A39: 1-chloro-2-ethyl-4-(trifluoromethoxy)benzene

To a mixture of 2-bromo-1-chloro-4-(trifluoromethoxy) benzene (4.2 g, 15.25 mmol), Pd(dppf)Cl$_2$ (2.23 g, 3.05 mmol) and K$_2$CO$_3$ (4.21 g, 30.5 mmol) in DMF (75 mL) was added diethylzinc (60.99 mL, 60.99 mmol, 1 M in toluene). The resulting mixture was stirred at 80° C. for 16 hours under N$_2$. After cooling to room temperature, the reaction mixture was diluted with water (100 mL). The mixture was filtered through a Celite pad and eluted with EtOAc (100 mL). The filtrate was extracted with EtOAc (50 mL×2). The combined organic phase was washed with brine (300 mL), dried over anhydrous Na$_2$SO$_4$, filtered and concentrated to give the crude product. The crude product was purified by flash chromatography (PE) to give the product (2.3 g, 10.24 mmol, 67% yield) as an oil. 1H NMR (400 MHz, CDCl$_3$) δ$_H$=7.36 (d, 1H), 7.11 (d, 1H), 7.01 (dd, 1H), 2.77 (q, 2H), 1.26 (t, 3H).

A40: 2-[2-ethyl-4-(trifluoromethoxy)phenyl]-4,4,5,5-tetramethyl-1,3,2-dioxaborolane A mixture of 1-chloro-2-ethyl-4-(trifluoromethoxy)benzene (2.3 g, 10.24 mmol), 4,4,5,5-tetramethyl-2-(4,4,5,5-tetramethyl-1,3,2-dioxaborolan-2-yl)-1,3,2-dioxaborolane (3.12 g, 12.29 mmol), KOAc (2.01 g, 20.48 mmol), X-Phos (0.98 g, 2.05 mmol) and Pd$_2$(dba)$_3$ (0.94 g, 1.02 mmol) in 1,4-dioxane (25 mL) was stirred at 80° C. for 16 hours under N$_2$. After cooling to 25° C., the reaction mixture was filtered through a Celite pad. The filtrate was concentrated to give the crude product. The crude product was purified by flash chromatography (PE) to give the product (1.7 g, 5.15 mmol, 50% yield) as an oil. 1H NMR (400 MHz, CDCl$_3$) δ$_H$ 7.80 (d, 1H), 7.05-6.99 (m, 2H), 2.94 (q, 2H), 1.35 (s, 12H), 1.21 (t, 3H).

A41: 2-chloro-5-[2-ethyl-4-(trifluoromethoxy)phenyl]pyrazine

A mixture of 2-bromo-5-chloro-pyrazine (600 mg, 3.1 mmol), 2-[2-ethyl-4-(trifluoromethoxy)phenyl]-4,4,5,5-tetramethyl-1,3,2-dioxaborolane (1.16 g, 3.67 mmol), Cs$_2$CO$_3$ (2.02 g, 6.2 mmol) and Pd(dppf)Cl$_2$ (340.45 mg, 0.47 mmol) in 1,4-dioxane (15 mL) and water (1.5 mL) was stirred at 55° C. under N$_2$ for 16 hours. After cooling to room temperature, the mixture was filtered through Celite and concentrated to give a residue. The residue was redissolved in EtOAc (50 mL), washed with brine (50 mL), dried over anhydrous Na$_2$SO$_4$, filtered and concentrated to give the crude product. The crude product was purified by flash chromatography (EtOAc in PE=0% to 15%) to give the product (900 mg, 2.28 mmol, 73% yield) as an oil. 1H NMR (400 MHz, CDCl$_3$) δ$_H$ 8.68 (d, 1H), 8.47 (d, 1H), 7.40 (d, 1H), 7.22 (s, 1H), 7.18 (d, 1H), 2.74 (q, 2H), 1.17 (t, 3H). LCMS R$_t$=0.99 min in 1.5 min chromatography, 5-95AB, MS ESI calcd. for C$_{13}$H$_{11}$ClF$_3$N$_2$O [M+H]$^+$ 303.0, found 302.8.

A42: [5-[2-ethyl-4-(trifluoromethoxy)phenyl]pyrazin-2-yl]hydrazine

A mixture of 2-chloro-5-[2-ethyl-4-(trifluoromethoxy)phenyl]pyrazine (900 mg, 2.29 mmol) and hydrazine hydrate (1.15 g, 22.87 mmol) in MeCN (20 mL) was stirred at 100° C. for 16 hours. The mixture was cooled to room temperature and concentrated to give a residue. Water (20 mL) was added to the residue and the mixture was extracted with EtOAc (20 mL×2). The combined organic phase was washed with brine (50 mL), dried over anhydrous Na$_2$SO$_4$, filtered and concentrated to give the crude product. The crude product was purified by flash chromatography (EtOAc in PE=0% to 50% to 80%) to give the product (680 mg, 2.28 mmol, 99% yield) as an oil. 1H NMR (400 MHz, DMSO-d$_6$) δ$_H$ 8.21-8.17 (m, 1H), 8.14-8.06 (m, 2H), 7.43 (d, 1H), 7.29 (s, 1H), 7.24 (d, 1H), 4.33 (s, 2H), 2.71 (q, 2H), 1.05 (t, 3H).

A43: 2-bromo-N'-[5-[2-ethyl-4-(trifluoromethoxy)phenyl]pyrazin-2-yl]-2,2-difluoro-acetohydrazide To a solution of 2-bromo-2,2-difluoro-acetic acid (600 mg, 3.43 mmol) in THF (10 mL) was added one drop of DMF and (COCl)$_2$ (0.35 mL, 4.12 mmol). The resulting mixture was stirred at 20° C. for 1 hour. To the solution was added [5-[2-ethyl-4-(trifluoromethoxy)phenyl]pyrazin-2-yl]hydrazine (680 mg, 2.28 mmol). The resulting mixture was stirred at 20° C. for 1 hour. The mixture was poured into water (30 mL) and the mixture was extracted with EtOAc (30 mL×2). The combined organic phase was washed with brine (30 mL), dried over anhydrous Na$_2$SO$_4$, filtered and concentrated to give the crude product (1 g, 2.20 mmol, 96% yield) as an oil. LCMS R$_t$=0.92 min in 1.5 min chromatography, 5-95AB, MS ESI calcd. for C$_{15}$H$_{13}$BrF$_5$N$_4$O$_2$ [M+H]$^+$ 457.0, found 456.7.

A44: 3-[bromo(difluoro)methyl]-6-[2-ethyl-4-(trifluoromethoxy)phenyl]-[1,2,4]triazolo[4,3-a]pyrazine A mixture of 2-bromo-N'-[5-[2-ethyl-4-(trifluoromethoxy)phenyl]pyrazin-2-yl]-2,2-difluoro-acetohydrazide (1 g, 2.2 mmol) and TsOH (113.49 mg, 0.66 mmol) in toluene (10 mL) was stirred at 130° C. for 16 hours. After cooling to room temperature, water (20 mL) was added to the solution and the mixture was extracted with EtOAc (20 mL×2). The combined organic phase was washed with brine (30 mL), dried over anhydrous $Na_2SO_4$, filtered and concentrated to give the crude product. The crude was purified by flash chromatography (EtOAc in PE=0% to 15% to 30%) to give the product (660 mg, 1.51 mmol, 68% yield) as an oil. $^1$H NMR (400 MHz, $CDCl_3$) $\delta_H$ 9.60 (d, 1H), 8.22 (s, 1H), 7.45 (d, 1H), 7.27 (s, 1H), 7.22 (d, 1H), 2.76 (q, 2H), 1.23 (t, 3H).

Compound 26: 3-[difluoro(methoxy)methyl]-6-[2-ethyl-4-(trifluoromethoxy)phenyl]-[1,2,4]triazolo[4,3-a]pyrazine A mixture of 3-[bromo(difluoro)methyl]-6-[2-ethyl-4-(trifluoromethoxy)phenyl]-[1,2,4]triazolo[4,3-a]pyrazine (660 mg, 1.51 mmol) and $AgBF_4$ (585.78 mg, 3.02 mmol) in methanol (6 mL) was stirred at 60° C. for 1 hour in the dark. Brine (30 mL) and EtOAc (30 mL) were added and the mixture was filtered through Celite. The filtrate was separated and the aqueous layer was extracted with EtOAc (20 mL). The combined organic phase was washed with brine (30 mL), dried over anhydrous $Na_2SO_4$, filtered and concentrated to give the crude product. The crude product was purified by flash chromatography (EtOAc in PE=0% to 20% to 40%) to give the product (434.49 mg, 1.10 mmol, 73% yield) as a solid. $^1$H NMR (400 MHz, $CDCl_3$) $\delta_H$ 9.51 (d, 1H), 8.22 (d, 1H), 7.43 (d, 1H), 7.25 (s, 1H), 7.20 (d, 1H), 3.94 (s, 3H), 2.74 (q, 2H), 1.22 (t, 3H). LCMS $R_t$=1.36 min in 2.0 min chromatography, 10-80AB, MS ESI calcd. for $C_{16}H_{14}F_5N_4O_2$ $[M+H]^+$ 389.1, found 389.2.

Examples 27 and 28: Synthesis of Compounds 27 and 28 (R)-3-(difluoro(methoxy)methyl)-6-(2-methyl-4-((1,1,1-trifluoropropan-2-yl)oxy)phenyl)-[1,2,4]triazolo[4,3-a]pyrazine and (S)-3-(difluoro(methoxy)methyl)-6-(2-methyl-4-((1,1,1-trifluoropropan-2-yl)oxy)phenyl)-[1,2,4]triazolo[4,3-a]pyrazine

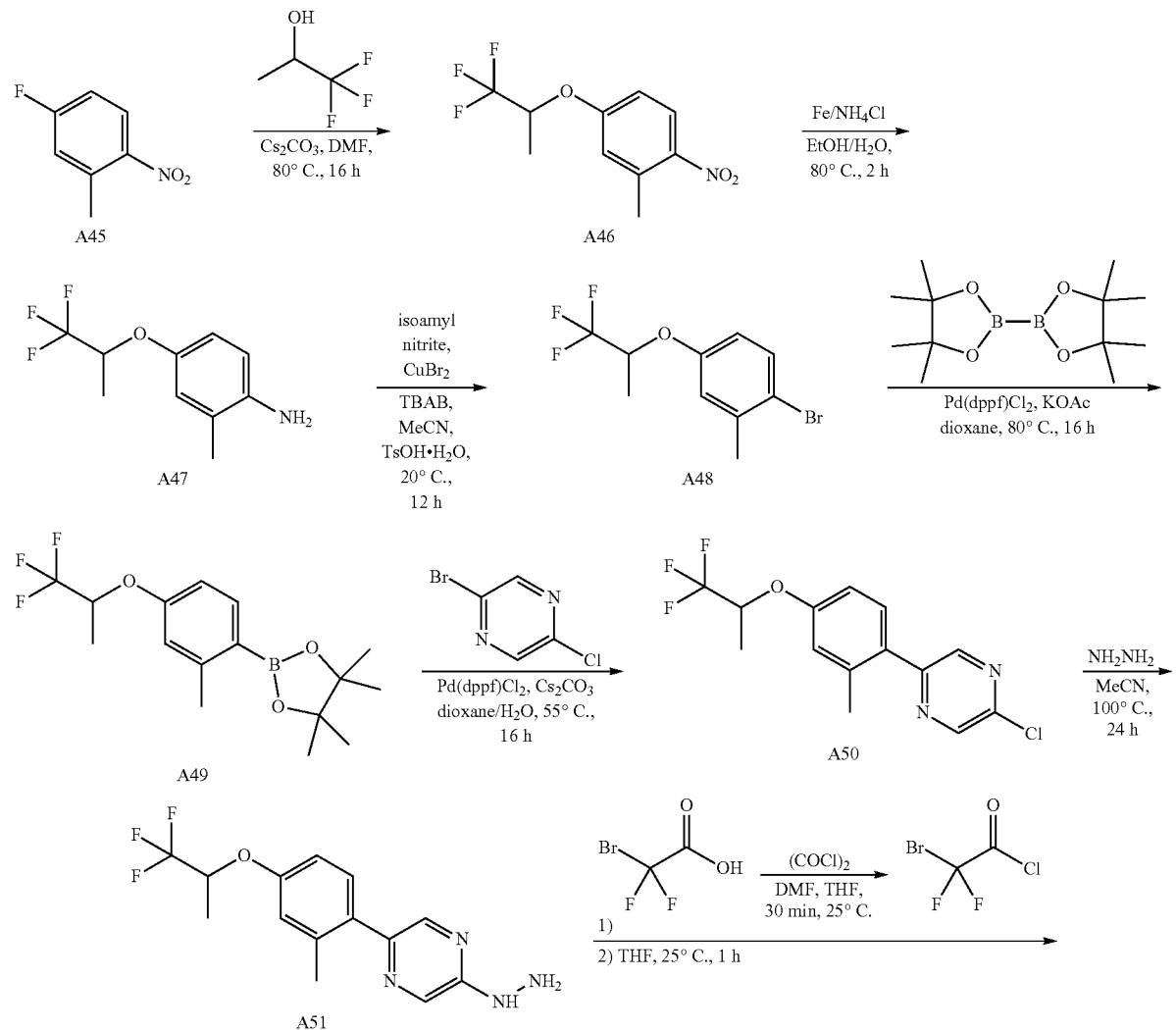

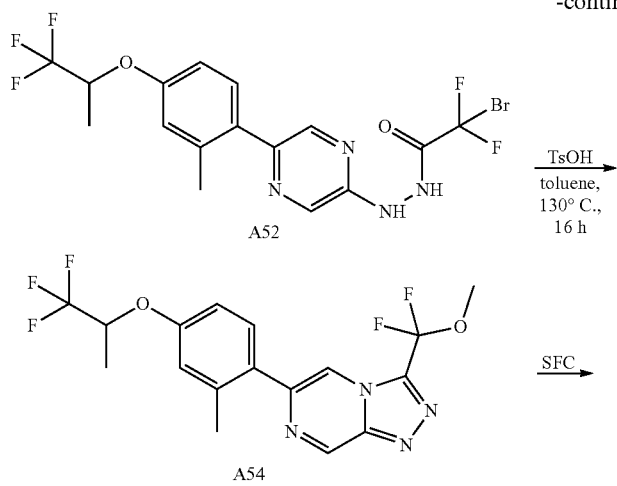
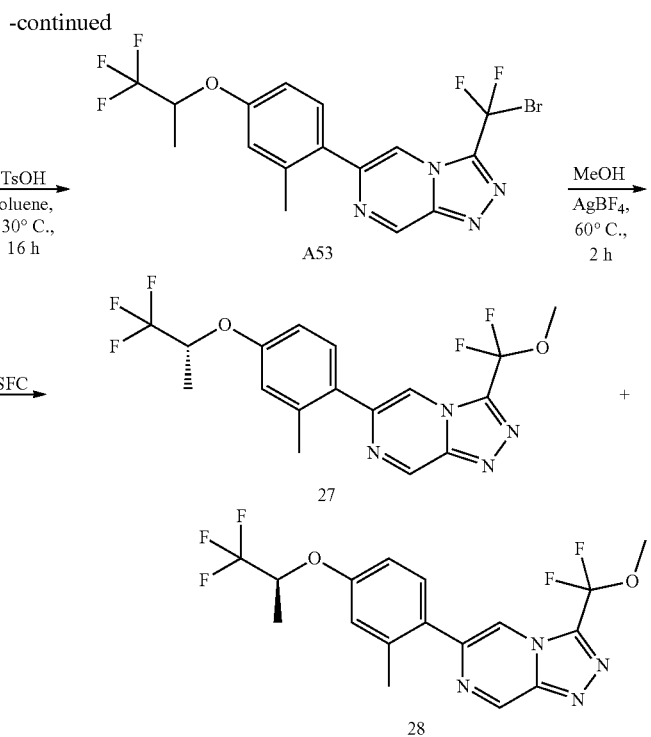

A46: 2-methyl-1-nitro-4-(2,2,2-trifluoro-1-methyl-ethoxy)benzene

To a solution of 4-fluoro-2-methyl-1-nitro-benzene (10 g, 64.46 mmol) and 1,1,1-trifluoropropan-2-ol (8.82 g, 77.35 mmol) in DMF (150 mL) was added $Cs_2CO_3$ (42 g, 128.92 mmol) at 25° C. The mixture was stirred at 80° C. for 16 hours. The mixture was poured into water (500 mL) and filtered. The filter cake was washed with water (100 mL×2) and concentrated to give the product (15 g, 60.2 mmol) as a solid. 1H NMR (400 MHz, $CDCl_3$) $\delta_H$ 8.10 (d, 1H), 6.88-6.85 (m, 2H), 4.80-4.74 (m, 1H), 2.64 (s, 3H), 1.56 (d, 3H).

A47: 2-methyl-4-(2,2,2-trifluoro-1-methyl-ethoxy)aniline

The mixture of 2-methyl-1-nitro-4-(2,2,2-trifluoro-1-methyl-ethoxy)benzene (15 g, 60.2 mmol), $NH_4Cl$ (6.44 g, 120.39 mmol) and Fe (6.72 g, 120.39 mmol) in ethanol (150 mL) and water (50 mL) was stirred at 80° C. for 2 hours. The mixture was poured into water (500 mL). The mixture was extracted with EtOAc (200 mL×2). The combined organic phase was washed with brine (200 mL), dried over anhydrous $Na_2SO_4$, filtered and concentrated to afford the product (13 g, 59.31 mmol) as an oil. $^1$H NMR (400 MHz, DMSO-$d_6$) $\delta_H$ 6.70 (d, 1H), 6.66-6.63 (m, 1H), 6.56-6.53 (m, 1H), 4.85-4.76 (m, 1H), 4.61 (brs, 2H), 2.03 (s, 3H), 1.34 (d, 3H).

A48: 1-bromo-2-methyl-4-(2,2,2-trifluoro-1-methyl-ethoxy)benzene

To a mixture of TBAB (11.03 g, 34.22 mmol), $CuBr_2$ (305.68 mg, 1.37 mmol) and isopentyl nitrite (1.92 g, 16.42 mmol) in MeCN (40 mL) were added 2-methyl-4-(2,2,2-trifluoro-1-methyl-ethoxy)aniline (3 g, 13.69 mmol) and TsOH-$H_2O$ (3.38 g, 17.79 mmol). The mixture was stirred at 20° C. for 12 hours. The mixture was diluted with $H_2O$ (100 mL) and the mixture was extracted with DCM (100 mL×2). The combined organic phase was washed with water (40 mL×2) and brine (50 mL), dried over anhydrous $Na_2SO_4$, filtered and concentrated to give the crude product. The crude product was purified by flash chromatography on silica gel (EtOAc in PE=0% to 2%) to give the product (3 g, 10.60 mmol, 77% yield) as an oil. 1H NMR (400 MHz, $CDCl_3$) $\delta_H$ 7.45 (d, 1H), 6.87 (d, 1H), 6.78 (dd, 8.8 Hz, 1H), 4.62-4.56 (m, 1H), 2.38 (s, 3H), 1.50 (d, 3H).

A49: 4,4,5,5-tetramethyl-2-[2-methyl-4-(2,2,2-trifluoro-1-methyl-ethoxy)phenyl]-1,3,2-dioxaborolane A mixture of 1-bromo-2-methyl-4-(2,2,2-trifluoro-1-methyl-ethoxy)benzene (3 g, 10.6 mmol), KOAc (2080.05 mg, 21.19 mmol) and 4,4,5,5-tetramethyl-2-(4,4,5,5-tetramethyl-1,3,2-dioxaborolan-2-yl)-1,3,2-dioxaborolane (3229.31 mg, 12.72 mmol) and Pd(dppf)$Cl_2$ (775.41 mg, 1.06 mmol) in 1,4-dioxane (30 mL) was stirred at 80° C. under $N_2$ for 16 hours. The mixture was poured into water (100 mL) and the aqueous layer was extracted with EtOAc (50 mL×2). The combined organic phase was washed with brine (100 mL), dried over anhydrous $Na_2SO_4$, filtered and concentrated to give the crude product. The crude product was purified by flash chromatography on silica gel (EtOAc in PE=0% to 5% to 10%) to give the product (2.5 g, 7.57 mmol, 71% yield) as an oil. $^1$H NMR (400 MHz, $CDCl_3$) $\delta_H$ 7.75 (d, 1H), 6.77-6.74 (m, 2H), 4.72-4.69 (m, 1H), 2.53 (s, 3H), 1.50 (d, 3H), 1.34 (s, 12H).

A50: 2-chloro-5-[2-methyl-4-(2,2,2-trifluoro-1-methyl-ethoxy)phenyl]pyrazine A mixture of Pd(dppf)$Cl_2$ (554.07 mg, 0.76 mmol), $Cs_2CO_3$ (4.93 g, 15.14 mmol), 2-bromo-5-chloro-pyrazine (1.76 g, 9.09 mmol) and 4,4,5,5-tetramethyl-2-[2-methyl-4-

(2,2,2-trifluoro-1-methyl-ethoxy)phenyl]-1,3,2-dioxaborolane (2.5 g, 7.57 mmol) in water (6 mL) and 1,4-dioxane (24 mL) was stirred at 55° C. under $N_2$ for 16 hours. The mixture was poured into water (100 mL) and the aqueous layer was extracted with EtOAc (50 mL×2). The combined organic phase was washed with brine (100 mL), dried over anhydrous $Na_2SO_4$, filtered and concentrated to give the crude product. The crude product was purified by flash chromatography on silica gel (EtOAc in PE=0% to 5% to 10%) to give the product (2 g, 6.31 mmol, 83% yield) as a solid. 1H NMR (400 MHz, $CDCl_3$) $\delta_H$ 8.66 (d, 1H), 8.47 (d, 1H), 7.41 (d, 1H), 6.93-6.90 (m, 2H), 4.74-4.71 (m, 1H), 2.41 (s, 3H), 1.55 (d, 3H).

A51: [5-[2-methyl-4-(2,2,2-trifluoro-1-methyl-ethoxy)phenyl]pyrazin-2-yl]hydrazine To a solution of 2-chloro-5-[2-methyl-4-(2,2,2-trifluoro-1-methyl-ethoxy)phenyl]pyrazine (2 g, 6.31 mmol) in MeCN (30 mL) was added $N_2H_4 \cdot H_2O$ (3.16 g, 63.15 mmol) at 25° C. The mixture was stirred at 100° C. for 24 hours. After cooling to 25° C., the reaction was poured into water (100 mL). The mixture was extracted with EtOAc (30 mL×2), washed with brine (50 mL), dried over anhydrous $Na_2SO_4$, filtered and concentrated to give the crude product (1.8 g, 5.8 mmol) as a solid. LCMS $R_t$=0.79 min in 1.5 min chromatography, 5-95AB, MS ESI calcd. for $C_{14}H_{16}F_3N_4O$ [M+H]$^+$ 313.1, found 313.0.

A52: 2-bromo-2,2-difluoro-N'-[5-[2-methyl-4-(2,2,2-trifluoro-1-methyl-ethoxy)phenyl]pyrazin-2-yl]acetohydrazide To a solution of 2-bromo-2,2-difluoro-acetic acid (1.51 g, 8.65 mmol), DMF (6.32 mg, 0.09 mmol) in THF (15 mL) was added (COCl)$_2$ (1.32 g, 10.37 mmol) at 25° C. The mixture was stirred at 25° C. for 30 mins. The [5-[2-methyl-4-(2,2,2-trifluoro-1-methyl-ethoxy)phenyl] pyrazin-2-yl]hydrazine (1.8 g, 5.76 mmol) in THF (20 mL) was added to the above mixture at 25° C. The resulting mixture was stirred at 25° C. for 1 hour. The mixture was poured into water (50 mL) and the aqueous layer was extracted with EtOAc (30 mL×2). The combined organic phase was washed with brine (100 mL), dried over anhydrous $Na_2SO_4$, filtered and concentrated to afford crude product (2.7 g, 5.75 mmol) as a solid. LCMS $R_t$=0.89 min in 1.5 min chromatography, 5-95AB, MS ESI calcd. for $C_{16}H_{15}BrF_5N_4O_2$ [M+H]$^+$ 469.0, found 468.9.

A53: 3-[bromo(difluoro)methyl]-6-[2-methyl-4-(2,2,2-trifluoro-1-methyl-ethoxy)phenyl]-[1,2,4]triazolo[4,3-a]pyrazine A solution of 2-bromo-2,2-difluoro-N'-[5-[2-methyl-4-(2,2,2-trifluoro-1-methyl-ethoxy)phenyl]pyrazin-2-yl]acetohydrazide (2.7 g, 5.75 mmol) and TsOH (297.28 mg, 1.73 mmol) in toluene (30 mL) was stirred at 130° C. for 16 hours. Water (50 mL) was added and the aqueous layer was extracted with EtOAc (30 mL×2). The combined organic phase was washed with brine (50 mL), dried over anhydrous $Na_2SO_4$, filtered and concentrated to give the crude product. The crude product was purified by flash chromatography on silica gel (EtOAc in PE=10% to 20%) to give the product (800 mg, 1.77 mmol, 31% yield) as a solid. $^1$H NMR (400 MHz, $CDCl_3$) $\delta_H$ 9.57 (s, 1H), 8.18 (s, 1H), 7.44 (d, 1H), 6.98-6.92 (m, 2H), 4.76-4.71 (m, 1H), 2.43 (s, 3H), 1.57 (d, 3H).

A54: 3-[difluoro(methoxy)methyl]-6-[2-methyl-4-(2,2,2-trifluoro-1-methyl-ethoxy)phenyl]-[1,2,4]triazolo[4,3-a]pyrazine To a suspension of 3-[bromo(difluoro)methyl]-6-[2-methyl-4-(2,2,2-trifluoro-1-methyl-ethoxy)phenyl]-[1,2,4]triazolo[4,3-a]pyrazine (300 mg, 0.66 mmol) in methanol (3 mL) was added AgBF$_4$ (257.98 mg, 1.33 mmol) at 25° C. under $N_2$. The mixture was protected from light and stirred at 60° C. for 2 hours. The solution was added to brine (10 mL) and filtered. The filtrate was extracted with EtOAC (20 mL×2). The combined organic phase was washed with brine (50 mL), dried over anhydrous $Na_2SO_4$, filtered and concentrated to give the crude product. The crude product was purified by flash chromatography on silica gel (EtOAc in PE=0% to 10% to 20%) to give the product (220 mg, 0.55 mmol, 82% yield) as a solid. LCMS $R_t$=1.23 min in 1.5 min chromatography, 5-95AB, MS ESI calcd. for $C_{17}H_{16}F_5N_4O_2$ [M+H]$^+$ 403.1, found 403.1.

Compounds 27 and 28: (R)-3-(difluoro(methoxy)methyl)-6-(2-methyl-4-((1,1,1-trifluoropropan-2-yl)oxy)phenyl)-[1,2,4]triazolo[4,3-a]pyrazine and (S)-3-(difluoro(methoxy)methyl)-6-(2-methyl-4-((1,1,1-trifluoropropan-2-yl)oxy)phenyl)-[1,2,4]triazolo[4,3-a]pyrazine 3-(difluoro(methoxy)methyl)-6-(2-methyl-4-((1,1,1-trifluoropropan-2-yl)oxy)phenyl)-[1,2,4]triazolo[4,3-a]pyrazine (220 mg, 0.55 mmol) was purified by SFC (DAICEL CHIRALCEL OJ-H (250 mm×30 mm, 5 mm); A=CO$_2$ and B=0.1% NH$_3$·H$_2$O-EtOH; 60 mL/min; 15% B; 80 injections to give the enantiomer 1, randomly assigned as Compound 27 (66.33 mg, 0.16 mmol, 30% yield) (Peak 1, $R_t$=1.450 min) as a solid and the enantiomer 2, randomly assigned as Compound 28 (70.41 mg, 0.17 mmol, 32% yield) (Peak 2: $R_t$=1.609 min) as a solid. The stererochemistry of the compounds was randomly assigned.

Analytical SFC: (Chiralcel OJ-3 100A 4.6 mm I.D., 3 mm, Mobile phase: A: CO$_2$ B: ethanol (0.05% DEA), Gradient: from 5% to 40% of B in 4 min and hold 40% for 2.5 min, then 5% of B for 1.5 min, Flow rate: 2.8 mL/min, Column temp.: 35° C., ABPR: 1500 psi) showed two peaks (Peak 1: $R_t$=1.450 min, Peak 2: $R_t$=1.609 min).

Compound 27: $^1$H NMR (400 MHz, CD$_3$CN) $\delta_H$ 9.40 (d, 1H), 8.32 (d, 1H), 7.43 (d, 1H), 7.02 (s, 1H), 6.97-6.95 (m, 1H), 5.03-4.96 (m, 1H), 3.88 (s, 3H), 2.36 (s, 3H), 1.51 (d, 3H). LCMS Rt=1.36 min in 2 min chromatography, 10-80AB, MS ESI calcd. for $C_{17}H_{16}F_5N_4O_2$ [M+H]$^+$ 403.1, found 403.2.

Compound 28: $^1$H NMR (400 MHz, CD$_3$CN) $\delta_H$ 9.40 (d, 1H), 8.32 (d, 1H), 7.43 (d, 1H), 7.02 (s, 1H), 6.97-6.95 (m, 1H), 5.03-4.96 (m, 1H), 3.88 (s, 3H), 2.36 (s, 3H), 1.51 (d, 3H). LCMS Rt=1.36 min in 2 min chromatography, 10-80AB, MS ESI calcd. for $C_{17}H_{16}F_5N_4O_2$ [M+H]$^+$ 403.1, found 403.2.

Examples 29 and 30: Synthesis of Compounds 29 and 30—(R)-3-(ethoxydifluoromethyl)-6-(2-methyl-4-((1,1,1-trifluoropropan-2-yl)oxy)phenyl)-[1,2,4]triazolo[4,3-a]pyrazine and (S)-3-(ethoxydifluoromethyl)-6-(2-methyl-4-((1,1,1-trifluoropropan-2-yl)oxy)phenyl)-[1,2,4]triazolo[4,3-a]pyrazine

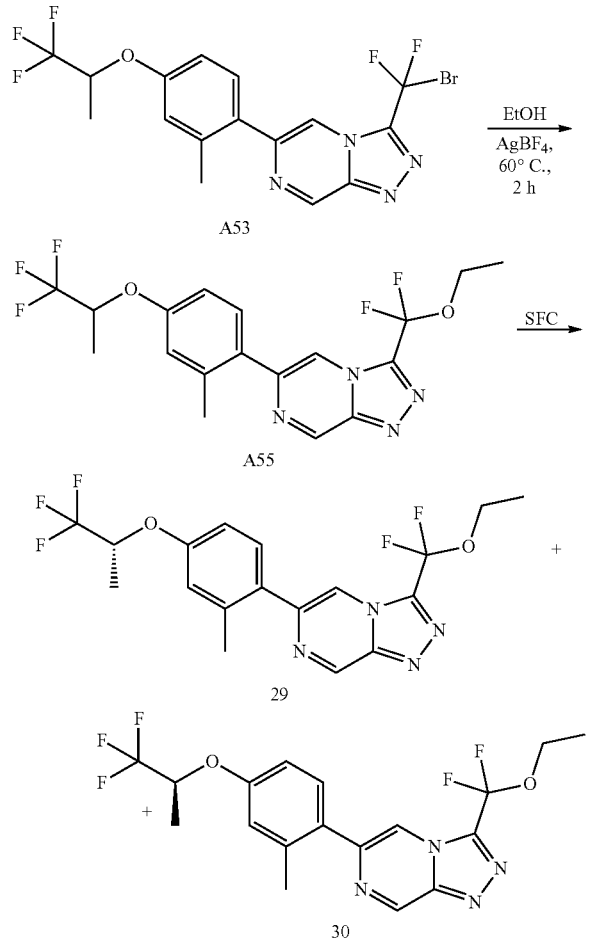

A55: 3-[difluoro(methoxy)methyl]-6-[2-methyl-4-(2,2,2-trifluoro-1-methyl-ethoxy)phenyl]-[1,2,4]triazolo[4,3-a]pyrazine To a suspension of 3-[bromo(difluoro)methyl]-6-[2-methyl-4-(2,2,2-trifluoro-1-methyl-ethoxy)phenyl]-[1,2,4]triazolo[4,3-a]pyrazine (300 mg, 0.66 mmol) in ethanol (3 mL) was added AgBF$_4$ (257.98 mg, 1.33 mmol) at 25° C. under N$_2$. The mixture was protected from light and stirred at 60° C. for 2 hours. The solution was added to brine (50 mL) and filtered. The filtrate was extracted with EtOAc (30 mL×2). The combined organic phase was washed with brine (100 mE), dried over anhydrous Na$_2$SO$_4$, filtered and concentrated to give the crude product. The crude product was purified by flash chromatography on silica gel (EtOAc in PE=0% to 10% to 20%) to give the product (222 mg, 0.53 mmol, 80% yield) as a solid. LCMS Rt=1.27 min in 1.5 min chromatography, 5-95AB, MS ESI calcd. for C$_{18}$H$_{18}$F$_5$N$_4$O$_2$ [M+H]$^+$ 417.1, found 417.1.

Compounds 29 and 30: (R)-3-(ethoxydifluoromethyl)-6-(2-methyl-4-((1,1,1-trifluoropropan-2-yl)oxy)phenyl)-[1,2,4]triazolo[4,3-a]pyrazine and (S)-3-(ethoxy difluoromethyl)-6-(2-methyl-4-((1,1,1-trifluoropropan-2-yl)oxy)phenyl)-[1,2,4]triazolo[4,3-a]pyrazine 3-(ethoxy difluoromethyl)-6-(2-methyl-4-((1,1,1-trifluoropropan-2-yl)oxy)phenyl)-[1,2,4]triazolo[4,3-a]pyrazine (222 mg, 0.53 mmol) was purified by SFC (DAICEL CHIRALCEL OJ-H (250 mm×30 mm, 5 mm); A=CO$_2$ and B=0.1% NH$_3$·H$_2$O-EtOH; 60 ml/min; 15% B; 80 injections to give the enantiomer 1, randomly assigned as Compound 29 (Peak 1, R$_t$=1.325 mi) as a solid and the enantiomer 2, randomly assigned as Compound 30 (63.55 mg, 0.15 mmol, 28% yield) (Peak 2: R$_t$=1.486 mi) as a solid. The stereochemistry of the compounds was randomly assigned.

Analytical SFC: (Chiralcel OJ-3 100 A 4.6 mm I.D., 3 um, Mobile phase: A: CO$_2$, B: ethanol (0.05% DEA), Gradient: from 5% to 40% of B in 4 mi and hold 40% for 2.5 min, then 5% of B for 1.5 min, Flow rate: 2.8 mL/min, Column temp.: 35° C., ABPR: 1500 psi) showed two peaks (Peak 1: R$_t$=1.325 min, Peak 2: R$_t$=1.486 min).

Compound 29: $^1$H NMR (400 MHz, CD$_3$CN) δ$_H$ 9.41 (d, 1H), 8.32 (s, 1H), 7.45 (d, 1H), 7.01 (s, 1H), 6.98-6.95 (m, 1H), 5.03-4.96 (m, 1H), 4.28 (q, 2H), 2.37 (s, 3H), 1.51 (d, 3H), 1.39 (t, 3H). LCMS Rt=1.39 min in 2 min chromatography, 10-80AB, MS ESI calcd. for C$_{18}$H$_{18}$F$_5$N$_4$O$_2$ [M+H]$^+$ 417.2, found 417.1.

Compound 30: $^1$H NMR (400 MHz, CD$_3$CN) δ$_H$ 9.41 (d, 1H), 8.32 (s, 1H), 7.45 (d, 1H), 7.02 (s, 1H), 6.98-6.95 (m, 1H), 5.03-4.96 (m, 1H), 4.28 (q, 2H), 2.37 (s, 3H), 1.51 (d, 3H), 1.39 (t, 3H). LCMS Rt=1.39 min in 2 min chromatography, 10-80AB, MS ESI calcd. for C$_{18}$H$_{18}$F$_5$N$_4$O$_2$ [M+H]$^+$ 417.3, found 417.1.

Examples 31 and 32: Synthesis of Compounds 31 and 32—(R)-3-(difluoro(methoxy)methyl)-6-(2-(1-methoxyethyl)-4-(trifluoromethoxy)phenyl)-[1,2,4]triazolo[4,3-a]pyrazine and (S)-3-(difluoro(methoxy)methyl)-6-(2-(1-methoxyethyl)-4-(trifluoromethoxy)phenyl)-[1,2,4]triazolo[4,3-a]pyrazine

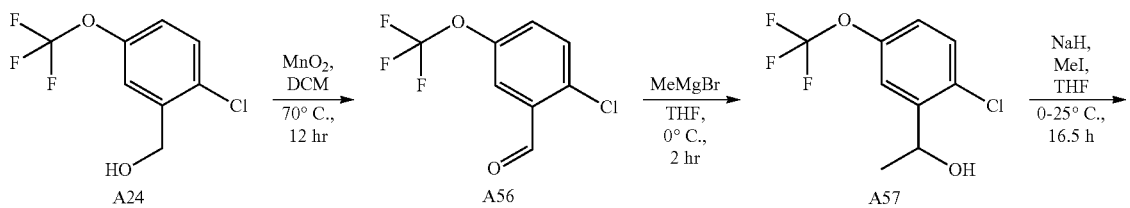

-continued
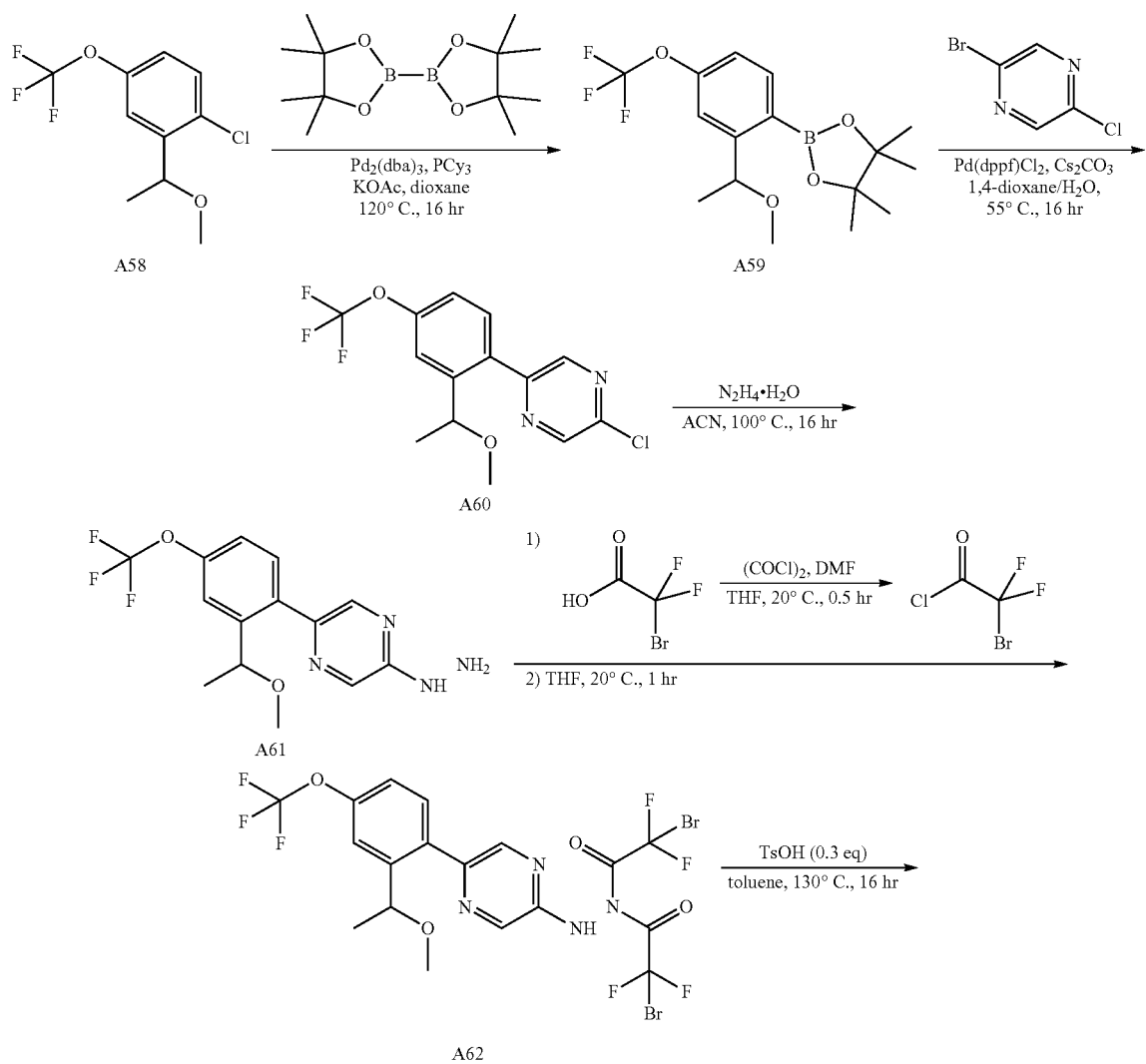
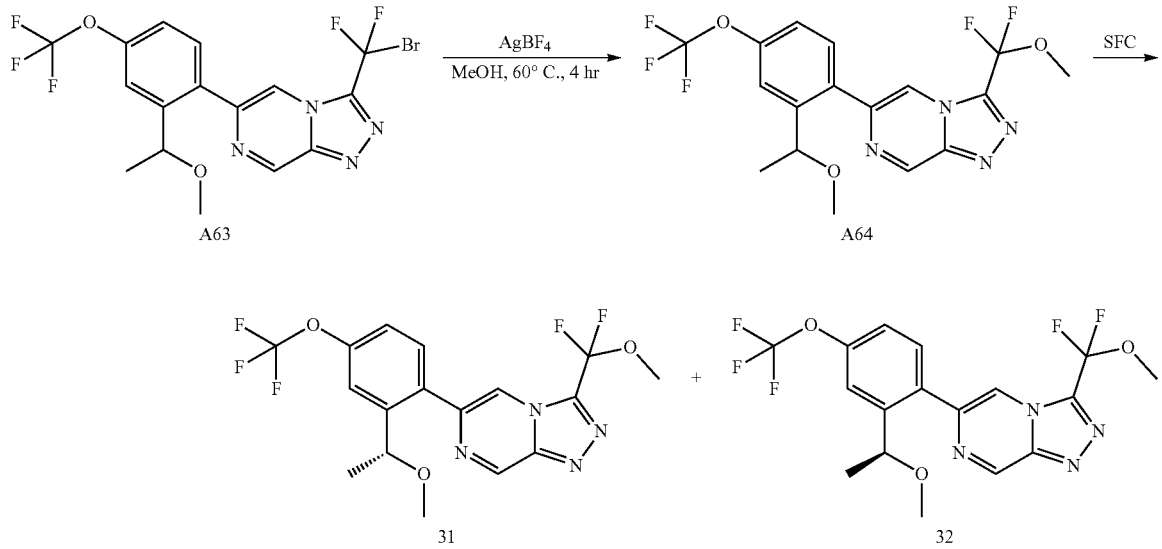

A56: 2-chloro-5-(trifluoromethoxy)benzaldehyde

To a solution of [2-chloro-5-(trifluoromethoxy)phenyl]methanol (3.7 g, 16.33 mmol) in chloroform (120 mL) was added $MnO_2$ (7.1 g, 81.65 mmol). The mixture was stirred at 70° C. for 12 hours. After cooling to RT, the mixture was filtered through Celite and the filter cake was eluted with DCM (20×2 mL). The filtrate was concentrated under reduced pressure to give the crude product (2.6 g, 11.58 mmol) as an oil. 1H NMR (400 MHz, DMSO-$d_6$) $\delta_H$ 10.27 (s, 1H), 7.84-7.66 (m, 3H).

A57: 1-[2-chloro-5-(trifluoromethoxy)phenyl]ethanol

To a solution of 2-chloro-5-(trifluoromethoxy)benzaldehyde (2.5 g, 11.13 mmol) in THF (30 mL) was added MeMgBr (5.57 mL, 16.7 mmol) (3 M in ether) at 0° C. The mixture was stirred at 0° C. for 2 hours. The mixture was quenched with saturated aqueous $NH_4Cl$ (20 mL). The aqueous layer was extracted with EtOAc (20 mL×2). The combined organic phase were washed with brine (30 mL), dried over anhydrous $Na_2SO_4$, filtered and concentrated to give the crude product. The crude product was purified by flash chromatography on silica gel (EtOAc in PE=0% to 10%) to give the product (2.5 g, 10.39 mmol, 93% yield) as an oil. $^1$H NMR (400 MHz, DMSO-$d_6$) $\delta_H$ 7.56-7.49 (m, 2H), 7.31-7.25 (m, 1H), 5.61 (d, 1H), 5.03-4.93 (m, 1H), 1.31 (d, 3H).

A58: 1-chloro-2-(1-methoxyethyl)-4-(trifluoromethoxy)benzene

To a solution of 1-[2-chloro-5-(trifluoromethoxy)phenyl]ethanol (2.5 g, 10.39 mmol) in THF (20 mL) was added NaH (831.22 mg, 20.78 mmol, 60% in oil) in three portions at 0° C. The mixture was stirred at 0° C. for 30 mins. Then $CH_3I$ (0.97 mL, 15.59 mmol) was added to the solution at 0° C. The mixture was stirred at 25° C. for 16 hours. The mixture was quenched with saturated aqueous $NH_4Cl$ (40 mL). The aqueous layer was extracted with EtOAc (30 mL×2). The combined organic phase was washed with brine (50 mL), dried over anhydrous $Na_2SO_4$, filtered and concentrated to give the crude product. The crude product was purified by flash chromatography on silica gel (EtOAc in PE=0% to 10%) to give the product (2.2 g, 8.64 mmol, 83% yield) as an oil. $^1$H NMR (400 MHz, CDCl$_3$) $\delta_H$ 7.41-7.33 (m, 2H), 7.12-7.02 (m, 1H), 4.71 (q, 1H), 3.28 (s, 3H), 1.41 (d, 3H).

A59: 2-[2-(1-methoxyethyl)-4-(trifluoromethoxy)phenyl]-4,4,5,5-tetramethyl-1,3,2-dioxaborolane A mixture of 1-chloro-2-(1-methoxyethyl)-4-(trifluoromethoxy)benzene (1.9 g, 7.46 mmol), 4,4,5,5-tetramethyl-2-(4,4,5,5-tetramethyl-1,3,2-dioxaborolan-2-yl)-1,3,2-dioxaborolane (2.27 g, 8.95 mmol), KOAc (1.46 g, 14.92 mmol), $Pd_2(dba)_3$ (683.29 mg, 0.75 mmol), tricyclohexylphosphine (523.13 mg, 1.87 mmol) in 1,4-dioxane (20 mL) was stirred at 120° C. for 16 hours. After cooling to 25° C., the reaction mixture was filtered through Celite. The filtrate was concentrated under reduced pressure to give the crude product. The crude product was purified by flash chromatography on silica gel (PE 100%) to give the product (1 g, 2.89 mmol, 38% yield) as an oil. 1H NMR (400 MHz, CDCl$_3$) $\delta_H$ 7.79 (d, 1H), 7.37-7.34 (m, 1H), 7.11-7.06 (m, 1H), 5.01 (q, 1H), 3.25 (s, 3H), 1.40 (d, 3H), 1.36 (s, 12H).

A60: 2-chloro-5-[2-(1-methoxyethyl)-4-(trifluoromethoxy)phenyl]pyrazine

A mixture of 2-[2-(1-methoxyethyl)-4-(trifluoromethoxy)phenyl]-4,4,5,5-tetramethyl-1,3,2-dioxaborolane (1 g, 2.89 mmol), 2-bromo-5-chloro-pyrazine (670.56 mg, 3.47 mmol), $Cs_2CO_3$ (1.88 g, 5.78 mmol), Pd(dppf)Cl$_2$ (211.38 mg, 0.29 mmol) in 1,4-dioxane (10 mL) and water (1 mL) was stirred at 55° C. for 16 hours. After cooling to RT, the mixture was diluted with $H_2O$ (20 mL). The aqueous layer was extracted with EtOAc (20 mL×2). The combined organic phase was washed with brine (30 mL), dried over anhydrous $Na_2SO_4$, filtered and concentrated to give the crude product. The crude product was purified by flash chromatography on silica gel (EtOAc in PE=0% to 10%) to give the product (400 mg, 0.97 mmol, 34% yield) as an oil. $^1$H NMR (400 MHz, CDCl$_3$) $\delta_H$ 8.69 (d, 1H), 8.49 (s, 1H), 7.54 (s, 1H), 7.44-7.38 (m, 1H), 7.26-7.23 (m, 1H), 4.56 (q, 1H), 3.15 (s, 3H), 1.43 (d, 3H).

A61: [5-[2-(1-methoxyethyl)-4-(trifluoromethoxy)phenyl]pyrazin-2-yl]hydrazine To a solution of 2-chloro-5-[2-(1-methoxyethyl)-4-(trifluoromethoxy)phenyl]pyrazine (400 mg, 0.97 mmol) in MeCN (8 mL) was added $N_2H_4 \cdot H_2O$ (486.61 mg, 9.73 mmol) at 25° C. The mixture was stirred at 100° C. for 16 hours. After cooling to 20° C., the reaction was poured into water (20 mL). The aqueous layer was extracted with EtOAc (20 mL×2). The combined organic layers were washed with brine (30 mL), dried over anhydrous $Na_2SO_4$, filtered and concentrated to give the product (330 mg, 0.96 mmol) as an oil. $^1$H NMR (400 MHz, DMSO-$d_6$) $\delta_H$ 8.20-8.15 (m, 2H), 8.11 (s, 1H), 7.49 (d, 1H), 7.39 (s, 1H), 7.36-7.30 (m, 1H), 4.66-4.58 (m, 1H), 4.34 (brs, 2H), 3.03 (s, 3H), 1.32 (d, 3H). LCMS Rt=0.76 min in 1.5 min chromatography, 5-95AB, MS ESI calcd. for $C_{14}H_{16}F_3N_4O_2$ [M+H]$^+$ 329.1, found 328.9.

A62: 2-bromo-N-(2-bromo-2,2-difluoro-acetyl)-2,2-difluoro-N'-[5-[2-(1-methoxyethyl)-4-(trifluoromethoxy)phenyl]pyrazin-2-yl]acetohydrazide To a solution of 2-bromo-2,2-difluoro-acetic acid (300 mg, 1.71 mmol) in THF (3 mL) were added DMF (6.27 mg, 0.09 mmol) and (COCl)$_2$ (0.17 mL, 2.06 mmol). The resulting mixture was stirred at 20° C. for 30 min. The resulting solution was used directly into next step. A solution of [5-[2-(1-methoxyethyl)-4-(trifluoromethoxy)phenyl]pyrazin-2-yl]hydrazine (330 mg, 0.96 mmol) in THF (2 mL) was added to the above mixture. The mixture was stirred at 20° C. for 1 hour. Water (20 mL) was added and the aqueous layer was extracted with EtOAc (20 mL×2). The combined organic layers were washed with brine (30 mL), dried over anhydrous $Na_2SO_4$, filtered and concentrated to afford the product (600 mg, 0.93 mmol) as an oil. LCMS Rt=1.0 min in 1.5 min chromatography, 5-95AB, MS ESI calcd. for $C_{18}H_{14}BrF_7N_4O_4$ [M+H]$^+$ 642.9, found 642.7.

A63: 3-[bromo(difluoro)methyl]-6-[2-(1-methoxyethyl)-4-(trifluoromethoxy)phenyl]-[1,2,4]triazolo[4,3-a]pyrazine To a solution of 2-bromo-N-(2-bromo-2,2-difluoro-acetyl)-2,2-difluoro-N'-[5-[2-(1-methoxyethyl)-4-(trifluoromethoxy)phenyl]pyrazin-2-yl]acetohydrazide (600 mg, 0.93 mmol) in toluene (20 mL) was added TsOH (48.27 mg, 0.28 mmol). The mixture was stirred at 130° C. for 16 hours. Water (30 mL) was added and the aqueous layer was extracted with EtOAc (30 mL×2). The combined organic layers were washed with brine (30 mL), dried over anhydrous $Na_2SO_4$, filtered and concentrated to give the crude product. The crude was purified by flash chromatography on silica gel (EtOAc in PE 0~20%) to afford the product (200 mg, 0.35 mmol, 37% yield) as an oil. $^1$H NMR (400 MHz, $CDCl_3$) $\delta_H$ 9.57 (s, 1H), 8.27 (s, 1H), 7.56 (s, 1H), 7.48-7.45 (m, 1H), 7.32-7.27 (m, 1H), 4.60-4.52 (m, 1H), 3.21 (s, 3H), 1.46 (d, 3H).

A64: 3-[difluoro(methoxy)methyl]-6-[2-(1-methoxyethyl)-4-(trifluoromethoxy)phenyl]-[1,2,4]triazolo[4,3-a]pyrazine To a solution of 3-[bromo(difluoro)methyl]-6-[2-(1-methoxyethyl)-4-(trifluoromethoxy)phenyl]-[1,2,4]triazolo[4,3-a]pyrazine (200 mg, 0.35 mmol) in methanol (2 mL) was added $AgBF_4$ (135.12 mg, 0.70 mmol). The mixture was stirred at 60° C. for 4 hours. Brine (10 mL) was added and the mixture was filtered through Celite. The filtrate was separated and the aqueous phase was extracted with EtOAc (10 mL×2). The combined organic phase was washed with brine (20 mL), dried over anhydrous $Na_2SO_4$, filtered and concentrated to give the crude product. The crude product was purified by flash chromatography on silica gel (EtOAc in PE 0~30%) to afford the product (70 mg, 164.7 mmol, 47% yield) as a solid. LCMS Rt=0.90 min in 1.5 min chromatography, 5-95AB, MS ESI calcd. for $C_{17}H_{16}F_5N_4O_3$ $[M+H]^+$ 419.1, found 419.0.

Compounds 31 and 32: (R)-3-(difluoro(methoxy)methyl)-6-(2-(1-methoxyethyl)-4-(trifluoromethoxy)phenyl)-[1,2,4]triazolo[4,3-a]pyrazine and (S)-3-(difluoro(methoxy)methyl)-6-(2-(1-methoxyethyl)-4-(trifluoromethoxy)phenyl)-[1,2,4]triazolo[4,3-a]pyrazine 3-(difluoro(methoxy)methyl)-6-(2-(1-methoxyethyl)-4-(trifluoromethoxy)phenyl)-[1,2,4]triazolo[4,3-a]pyrazine (70 mg, 164.7 mmol) was separated by SFC (DAICEL CHIRALPAK AS (250 mm×30 mm, 10 mm); A=Hexane and B=EtOH (0.5% ammonia); 38° C.; 30 mL/min; 10% B; 11 min run; 12 injections) to give the enantiomer 1, randomly assigned as Compound 31 (15.98 mg, 38.2 mmol, 23% yield) (Rt of Peak 1=6.14 min) as a solid and the enantiomer 2, randomly assigned as Compound 32 (15.45 mg, 36.9 mmol, 22% yield) (Rt of Peak 2=8.0 min) as a solid. The stereochemistry of the compounds was randomly assigned.

Analytical SFC: Analysis by SFC (Chiralpak AS-3 100× 46 mm I.D, 3 mm; Mobile phase: A: Hexane (0.1% DEA) B: IPA, Isocratic: A:B=90:10, Flow rate: 1 mL/min; Column temperature: 25° C.) showed two peaks at 6.14 min (50%) and 8.00 min (50%).

Compound 31: $^1$H NMR (400 MHz, DMSO-$d_6$) $\delta_H$ 9.66 (s, 1H), 8.65 (s, 1H), 7.64-7.58 (m, 1H), 7.49-7.42 (m, 2H), 4.62-4.53 (m, 1H), 3.87 (s, 3H), 3.06 (s, 3H), 1.36 (d, 3H). LCMS Rt=1.22 min in 2.0 min chromatography, 10-80AB, MS ESI calcd. for $C_{17}H_{16}F_5N_4O_3$ $[M+H]^+$ 419.1, found 419.1.

Compound 32: 1H NMR (400 MHz DMSO-$d_6$) $\delta_H$ 9.65 (s, 1H), 8.65 (s, 1H), 7.65-7.55 (m, 1H), 7.48-7.39 (m, 2H), 4.62-4.51 (m, 1H), 3.86 (s, 3H), 3.05 (s, 3H), 1.35 (d, 3H). LCMS Rt=1.21 min in 2.0 min chromatography, 10-80AB, MS ESI calcd. for $C_{17}H_{16}F_5N_4O_3$ $[M+H]^+$ 419.1, found 419.1.

Example 33: Synthesis of Compound 33—6-[2-cyclopropyl-4-(trifluoromethoxy)phenyl]-3-[difluoro(methoxy)methyl]-[1,2,4]triazolo[4,3-a]pyrazine

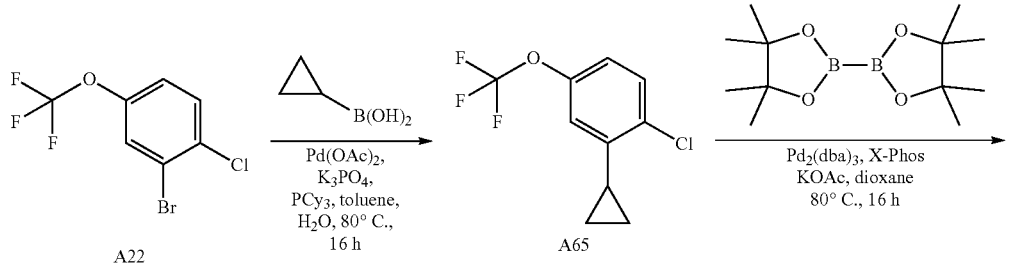

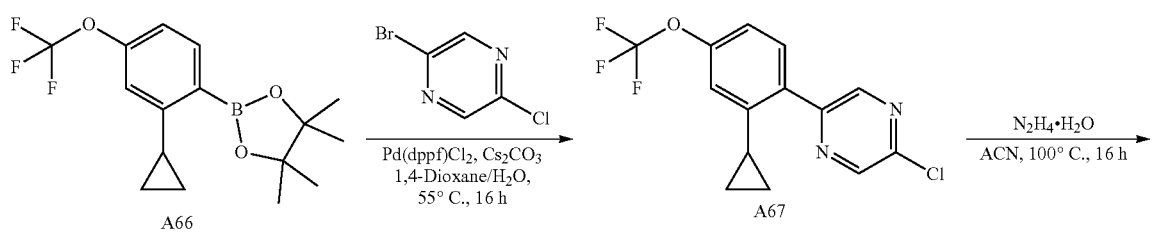

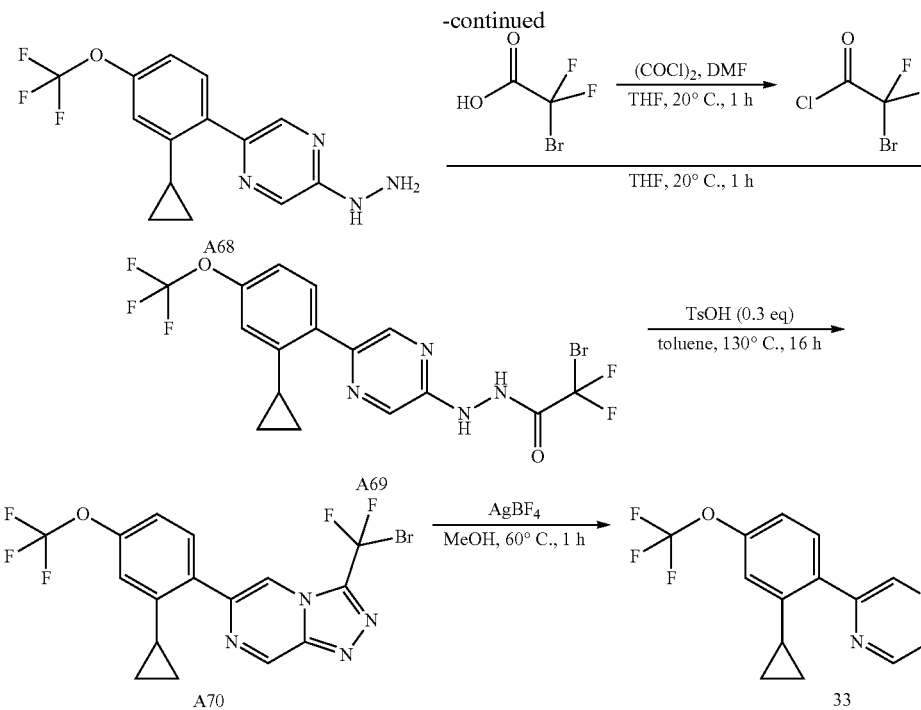

A65: 1-chloro-2-cyclopropyl-4-(trifluoromethoxy)benzene

A mixture of 2-bromo-1-chloro-4-(trifluoromethoxy)benzene (3 g, 10.89 mmol), cyclopropylboronic acid (982.34 mg, 11.44 mmol), $K_3PO_4$ (8.09 g, 38.12 mmol), $PCy_3$ (610.85 mg, 2.18 mmol) and Pd(OAc)$_2$ (244.52 mg, 1.09 mmol) in toluene (50 mL) and water (5 mL) was stirred at 80° C. under $N_2$ for 16 hours. After cooling to RT, water (50 mL) was added and the mixture was filtered through Celite. The filtrate was extracted with EtOAc (50 mL×2). The combined organic phase was washed with brine (50 mL), dried over anhydrous $Na_2SO_4$, filtered and concentrated to give the crude product. The crude product was purified by flash chromatography on silica gel (EtOAc in PE=0% to 2%) to give the product (2.57 g, 10.86 mmol, 99% yield) as an oil. $^1H$ NMR (400 MHz, CDCl$_3$) $\delta_H$ 7.36 (d, 1H), 7.01-6.95 (m, 1H), 6.78 (d, 1H), 2.21 (tt, 1H), 1.13-1.04 (m, 2H), 0.73-0.67 (m, 2H).

A66: 2-[2-cyclopropyl-4-(trifluoromethoxy)phenyl]-4,4,5,5-tetramethyl-1,3,2-dioxaborolane A mixture of 1-chloro-2-cyclopropyl-4-(trifluoromethoxy)benzene (2.57 g, 10.86 mmol), 4,4,5,5-tetramethyl-2-(4,4,5,5-tetramethyl-1,3,2-dioxaborolan-2-yl)-1,3,2-dioxaborolane (3.31 g, 13.03 mmol), KOAc (2.13 g, 21.72 mmol), X-phos (1.04 g, 2.17 mmol) and Pd$_2$(dba)$_3$ (0.99 g, 1.09 mmol) in 1,4-dioxane (50 mL) was stirred at 80° C. under $N_2$ for 16 hours. After cooling to room temperature, water (50 mL) was added and the mixture was filtered through Celite. The filtrate was extracted with EtOAc (80 mL×2). The combined organic phase was washed with brine (50 mL), dried over anhydrous $Na_2SO_4$, filtered and concentrated to give the crude product. The crude product was purified by flash chromatography on silica gel (EtOAc in PE=0% to 2%) to give the product (2.5 g, 7.62 mmol, 70% yield) as an oil. $^1H$ NMR (400 MHz, CDCl$_3$) $\delta_H$ 7.77 (d, 1H), 6.98-6.96 (m, 1H), 6.64 (s, 1H), 2.75-2.68 (m, 1H), 1.36 (s, 12H), 1.04-1.00 (m, 2H), 0.70-0.66 (m, 2H).

A67: 2-chloro-5-[2-cyclopropyl-4-(trifluoromethoxy)phenyl]pyrazine

A mixture of 2-bromo-5-chloro-pyrazine (1.35 g, 6.98 mmol), 2-[2-cyclopropyl-4-(trifluoromethoxy)phenyl]-4,4,5,5-tetramethyl-1,3,2-dioxaborolane (2.5 g, 7.62 mmol), Cs$_2$CO$_3$ (4.55 g, 13.96 mmol) and Pd(dppf)Cl$_2$ (766.01 mg, 1.05 mmol) in 1,4-dioxane (20 mL) and water (1.5 mL) was stirred at 55° C. under $N_2$ for 16 hours. After cooling to room temperature, water (20 mL) was added and the mixture was filtered through Celite. The filtrate was extracted with EtOAc (50 mL×2). The combined organic phase was washed with brine (50 mL), dried over anhydrous $Na_2SO_4$, filtered and concentrated to give the crude product. The crude product was purified by flash chromatography on silica gel (EtOAc in PE=0% to 2% to 5%) to give the product (1.9 g, 4.64 mmol, 66% yield) as an oil. 1H NMR (400 MHz, CDCl$_3$) $\delta_H$ 8.70 (d, 1H), 8.65 (d, 1H), 7.48 (d, 1H), 7.17-7.14 (m, 1H), 6.94-6.90 (m, 1H), 2.05-2.00 (m, 1H), 0.99-0.93 (m, 2H), 0.72-0.67 (m, 2H).

A68: [5-[2-cyclopropyl-4-(trifluoromethoxy)phenyl]pyrazin-2-yl]hydrazine

A solution of 2-chloro-5-[2-cyclopropyl-4-(trifluoromethoxy)phenyl]pyrazine (1.9 g, 4.64 mmol) and hydrazine hydrate (2.33 g, 46.45 mmol) in MeCN (20 mL) was stirred at 100° C. for 16 hours. After cooling to room temperature, water (50 mL) was added and the mixture was extracted with EtOAc (50 mL×2). The combined organic phase was washed with brine (50 mL), dried over anhydrous $Na_2SO_4$, filtered and concentrated to give the crude product. The crude product was purified by flash chromatography on silica gel (EtOAc in PE=30% to 50% to 80%) to give the product (1.44 g, 4.64 mmol, 99% yield) as an oil. 1H NMR (400 MHz, DMSO-d$_6$) $\delta_H$ 8.23-8.18 (m, 2H), 8.11 (s, 1H), 7.47 (d, 1H), 7.25-7.19 (m, 1H), 6.93 (s, 1H), 4.33 (brs, 2H), 2.17-2.06 (m, 1H), 0.92-0.85 (m, 2H), 0.70-0.63 (m, 2H).

A69: 2-bromo-N'-[5-[2-cyclopropyl-4-(trifluoromethoxy)phenyl]pyrazin-2-yl]-2,2-difluoro-acetohydrazide To a solution of 2-bromo-2,2-difluoro-acetic acid (680 mg, 3.89 mmol) in THF (10 mL) were added one drop DMF and (COCl)$_2$ (0.39 mL, 4.66 mmol). The resulting mixture was stirred at 20° C. for 1 hour. Then a solution of [5-[2-cyclopropyl-4-(trifluoromethoxy)phenyl]pyrazin-2-yl]hydrazine (0.8 g, 2.58 mmol) in THF (3 mL) was added to the above mixture. The resulting mixture was stirred at 20° C. for 1 hour. The mixture was poured into water (30 mL) and the aqueous layer was extracted with EtOAc (30 mL×2). The combined organic phase was washed with brine (30 mL), dried over anhydrous Na$_2$SO$_4$, filtered and concentrated to give the crude product (1.2 g, 2.57 mmol, 99% yield) as an oil. LCMS R$_f$=0.90 min in 1.5 min chromatography, 5-95AB, MS ESI calcd. for C$_{16}$H$_{13}$BrF$_5$N$_4$O$_2$ [M+H]$^+$ 469.0, found 468.7.

A70: 3-[bromo(difluoro)methyl]-6-[2-cyclopropyl-4-(trifluoromethoxy)phenyl]-[1,2,4]triazolo[4,3-a]pyrazine A mixture of 2-bromo-N'-[5-[2-cyclopropyl-4-(trifluoromethoxy)phenyl]pyrazin-2-yl]-2,2-difluoro-acetohydrazide (1.2 g, 2.57 mmol) and TsOH (132.69 mg, 0.77 mmol) in toluene (15 mL) was stirred at 130° C. for 16 hours. After cooling to room temperature, water (30 mL) was added and the mixture was extracted with EtOAc (30 mL×2). The combined organic phase was washed with brine (50 mL), dried over anhydrous Na$_2$SO$_4$, filtered and concentrated to give the crude product. The crude product was purified by flash chromatography on silica gel (EtOAc in PE=0% to 20% to 40%) to give the product (630 mg, 1.40 mmol, 54% yield) as an oil. $^1$H NMR (400 MHz, CDCl$_3$) $\delta_H$ 9.63 (d, 1H), 8.47 (s, 1H), 7.61 (d, 1H), 7.25-7.18 (m, 1H), 6.98 (d, 1H), 2.10-2.02 (m, 1H), 1.05-0.98 (m, 2H), 0.82-0.75 (m, 2H).

Compound 33: 6-[2-cyclopropyl-4-(trifluoromethoxy)phenyl]-3-[difluoro(methoxy)methyl]-[1,2,4]triazolo[4,3-a]pyrazine A mixture of 3-[bromo(difluoro)methyl]-6-[2-cyclopropyl-4-(trifluoromethoxy)phenyl]-[1,2,4]triazolo[4,3-a]pyrazine (630 mg, 1.4 mmol) and AgBF$_4$ (544.2 mg, 2.81 mmol) in methanol (10 mL) was stirred at 60° C. under dark for 1 hour. After cooling to room temperature, brine (50 mL) and EtOAc (50 mL) were added and the mixture was filtered through Celite. The filtrate was separated and the aqueous layer was extracted with EtOAc (30 mL×2). The combined organic phase was washed with brine (30 mL), dried over anhydrous Na$_2$SO$_4$, filtered and concentrated to give the crude product. The crude product was purified by Prep-HPLC (YMC Triart C$_{18}$ (150 mm×25 mm, 5 mm) A=H$_2$O (10 mM NH$_4$HCO$_3$) and B=CH$_3$CN; 53-83% B over 8 minutes) to give the product (327.19 mg, 817.4 mmol, 58% yield) as an oil. $^1$H NMR (400 MHz, CDCl$_3$) $\delta_H$ 9.53 (d, 1H), 8.45 (s, 1H), 7.57 (d, 1H), 7.19 (dd, 1H), 6.95 (s, 1H), 3.94 (s, 3H), 2.09-2.02 (m, 1H), 1.02-0.96 (m, 2H), 0.80-0.75 (m, 2H). LCMS R$_f$=1.27 min in 2.0 min chromatography, 10-80AB, MS ESI calcd. for C$_{17}$H$_{14}$F$_5$N$_4$O$_2$ [M+H]$^+$ 401.1, found 401.0.

Example 34: Synthesis of Compound 34—6-[2-cyclopropyl-4-(trifluoromethoxy)phenyl]-3-[ethoxy(difluoro)methyl]-[1,2,4]triazolo[4,3-a]pyrazine

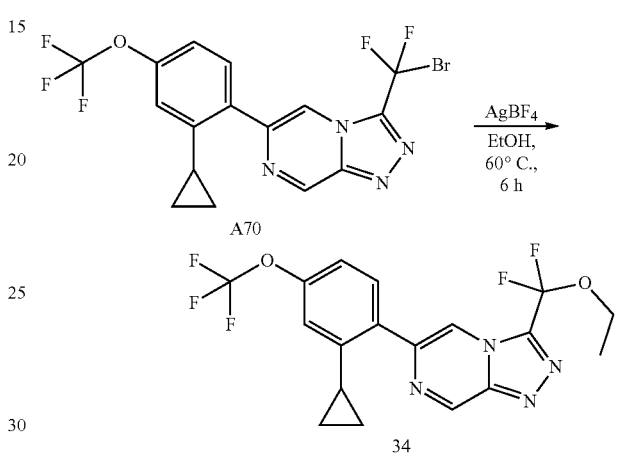

To a solution of 3-[bromo(difluoro)methyl]-6-[2-cyclopropyl-4-(trifluoromethoxy)phenyl]-[1,2,4]triazolo[4,3-a]pyrazine (140 mg, 0.31 mmol) in ethanol (5 mL) was added AgBF$_4$ (120.93 mg, 0.62 mmol). The mixture was stirred at 60° C. for 6 hours. Brine (20 mL) was added and the mixture was filtered through Celite. The filtrate was separated and the aqueous phase was extracted with EtOAc (20 mL×2). The combined organic phase was washed with brine (20 mL), dried over anhydrous Na$_2$SO$_4$, filtered and concentrated to give the crude product. The crude product was purified by prep-HPLC [Welch Xtimate C18 (150 mm×25 mm, 5 μm) A=H$_2$O (10 mM NH$_4$HCO$_3$) and B=CH$_3$CN; 60-80% B over 8 minutes)] to afford the product (32.74 mg, 0.079 mmol, 25% yield) as an oil. $^1$H NMR (400 MHz, CDCl$_3$) $\delta_H$ 9.52 (d, 1H), 8.45 (s, 1H), 7.57 (d, 1H), 7.22-7.15 (m, 1H), 6.95 (s, 1H), 4.33 (q, 2H), 2.12-1.98 (m, 1H), 1.46 (t, 3H), 1.05-0.95 (m, 2H), 0.82-0.72 (m, 2H). LCMS R$_f$=1.46 min in 2.0 min chromatography, 10-80AB, MS ESI calcd. for C$_{18}$H$_{16}$F$_5$N$_4$O$_2$ [M+H]$^+$ 414.9, found 415.2.

Example 35: Synthesis of Compound 35—6-[2-(cyclopropoxymethyl)-4-(trifluoromethoxy)phenyl]-3-[difluoro(methoxy)methyl]-[1,2,4]triazolo[4,3-a]pyrazine

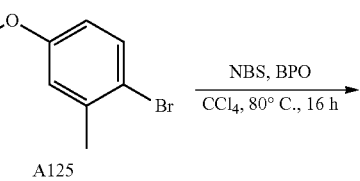

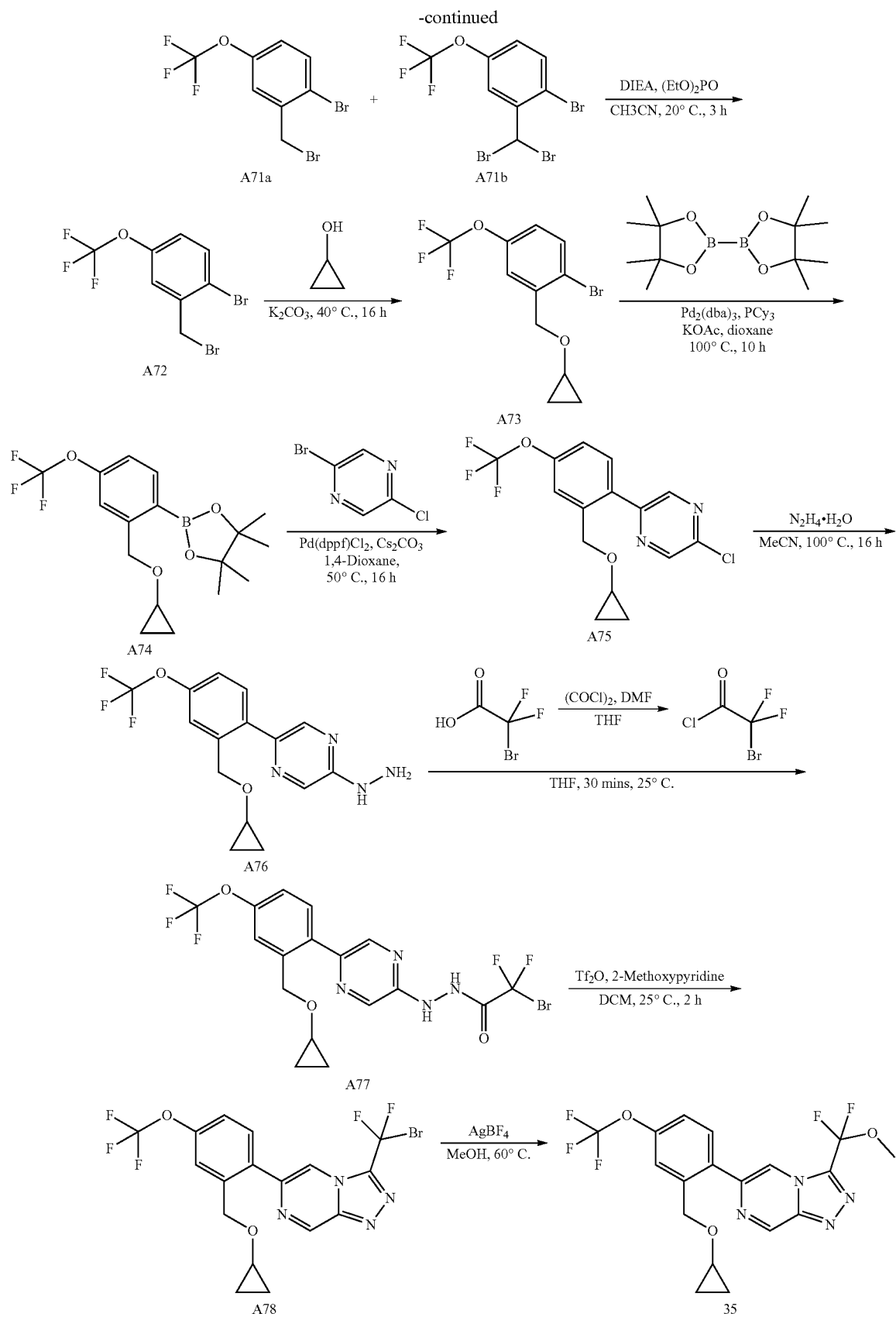

A125: 1-bromo-2-methyl-4-(trifluoromethoxy)benzene

To a mixture of 2-methyl-4-(trifluoromethoxy)aniline (5 g, 26.16 mmol), isopentyl nitrite (3.68 g, 31.39 mmol) and CuBr$_2$ (584.23 mg, 2.62 mmol) and TBAB (18.55 g, 57.55 mmol) in MeCN (100 mL) was added TsOH·H$_2$O (5.97 g, 31.39 mmol) slowly. The mixture was stirred at 25° C. for 12 hours. The mixture was diluted with H$_2$O (200 mL) and the mixture was extracted with EtOAc (50 mL×2). The combined organic phase was washed with water (50 mL) and brine (50 mL), dried over anhydrous Na$_2$SO$_4$, filtered and concentrated to give the crude product. The crude product was purified by flash chromatography on silica gel (EtOAc in PE=0% to 2%) to give the product (3.7 g, 14.51 mmol, 55% yield) as an oil. 1H NMR (400 MHz, CDCl$_3$) $\delta_H$ 7.56 (d, 1H), 7.11 (s, 1H), 6.95 (d, 1H), 2.42 (s, 3H).

A72: 1-bromo-2-(bromomethyl)-4-(trifluoromethoxy)benzene

To a mixture of 1-bromo-2-methyl-4-(trifluoromethoxy)benzene (4.4 g, 17.25 mmol) and NBS (3.68 g, 20.7 mmol) in CCl$_4$ (40 mL) was added BPO (417.92 mg, 1.73 mmol). The mixture was stirred at 80° C. for 16 hours. Water (50 mL) was added and the aqueous layer was extracted with DCM (50 mL×3). The combined organic layers were washed with brine (50 mL), dried over anhydrous Na$_2$SO$_4$, filtered and concentrated under reduced pressure to afford the mixture of A71a and A71b (5.6 g, 16.77 mmol) as an oil.

To a mixture of A71a and A71b (5.6 g, 16.77 mmol) and diethylphosphite (3471.39 mg, 25.15 mmol) in MeCN (50 mL) was added DIEA (8.3 mL, 50.31 mmol). The mixture was stirred at 20° C. for 3 hours. The mixture was concentrated under reduced pressure to remove MeCN. Water (150 mL) was added and the aqueous layer was extracted with EtOAc (50 mL×2). The combined organic layers were washed with brine (100 mL), dried over anhydrous Na$_2$SO$_4$, filtered and concentrated under reduced pressure to give the crude product. The crude was purified by flash chromatography on silica gel (PE) to afford the product (2.5 g, 7.49 mmol, 45% yield) as an oil. $^1$H NMR (400 MHz, CDCl$_3$) $\delta_H$ 7.62 (d, 1H), 7.34 (d, 1H), 7.08 (d, 1H), 4.57 (s, 2H).

A73: 1-bromo-2-(cyclopropoxymethyl)-4-(trifluoromethoxy)benzene

To a solution of 1-bromo-2-(bromomethyl)-4-(trifluoromethoxy)benzene (2.5 g, 7.49 mmol) in DMF (25 mL) was added cyclopropanol (1.42 mL, 22.46 mmol) and K$_2$CO$_3$ (3103.94 mg, 22.46 mmol). The mixture was stirred at 40° C. for 16 hours. Water (50 mL) was added and the aqueous layer was extracted with EtOAc (20 mL×2). The combined organic layers were washed with brine (50 mL), dried over anhydrous Na$_2$SO$_4$, filtered and concentrated under reduced pressure to give the crude product. The crude product was purified by flash chromatography on silica gel (PE) to afford the product (1.2 g, 3.86 mmol, 52% yield) as an oil. $^1$H NMR (400 MHz, CDCl$_3$) $\delta_H$ 7.56 (d, 1H), 7.35 (s, 1H), 7.03 (d, 1H), 4.60 (s, 2H), 3.48-3.43 (m, 1H), 0.72-0.69 (m, 2H), 0.57-0.54 (m, 2H).

A74: 2-[2-(cyclopropoxymethyl)-4-(trifluoromethoxy)phenyl]-4,4,5,5-tetramethyl-1,3,2-dioxaborolane To a mixture of 1-bromo-2-(cyclopropoxymethyl)-4-(trifluoromethoxy)benzene (1.2 g, 3.86 mmol) and 4,4,5,5-tetramethyl-2-(4,4,5,5-tetramethyl-1,3,2-dioxaborolan-2-yl)-1,3,2-dioxaborolane (1.18 g, 4.63 mmol) and KOAc (757.11 mg, 7.71 mmol) and PCy$_3$ (216.34 mg, 0.77 mmol) in 1,4-dioxane (5 mL) was added Pd$_2$dba$_3$ (353.33 mg, 0.39 mmol). The mixture was stirred at 100° C. for 10 hours. The mixture was filtered and the filtrate was concentrated under reduced pressure to give the crude product. The crude was purified by flash chromatography on silica gel (PE) to afford the product (900 mg, 2.51 mmol, 65% yield) as an oil. $^1$H NMR (400 MHz, CDCl$_3$) $\delta_H$ 7.83 (d, 1H), 7.31 (s, 1H), 7.11 (d, 1H), 4.81 (s, 2H), 3.42-3.39 (m, 1H), 1.36 (s, 12H), 0.68-0.67 (m, 2H), 0.52-0.49 (m, 2H).

A75: 2-chloro-5-[2-(cyclopropoxymethyl)-4-(trifluoromethoxy)phenyl]pyrazine

A mixture of 2-[2-(cyclopropoxymethyl)-4-(trifluoromethoxy)phenyl]-4,4,5,5-tetramethyl-1,3,2-dioxaborolane (900 mg, 2.51 mmol) and 2-bromo-5-chloro-pyrazine (583.27 mg, 3.02 mmol) and Pd(dppf)Cl$_2$ (183.86 mg, 0.25 mmol) and Cs$_2$CO$_3$ (1.64 g, 5.03 mmol) in 1,4-dioxane (10 mL) and water (2 mL) was stirred at 50° C. under N$_2$ for 16 hours. After cooling to 25° C., the reaction was poured into water (50 mL). The mixture was extracted with EtOAc (20 mL×2). The combined organic phase was washed with water (50 mL) and brine (50 mL), dried over anhydrous Na$_2$SO$_4$, filtered and concentrated to give the crude product. The crude product was purified by flash chromatography on silica gel (EtOAc in PE=0% to 1% to 3% to 5%) to give the product (550 mg, 1.60 mmol, 63% yield) as an oil. $^1$H NMR (400 MHz, CDCl$_3$) $\delta_H$ 8.68 (s, 1H), 8.59 (s, 1H), 7.54 (d, 1H), 7.48 (s, 1H), 7.22 (d, 1H), 4.64 (s, 2H), 3.34-3.31 (m, 1H), 0.68-0.67 (m, 2H), 0.52-0.49 (m, 2H).

A76: [5-[2-(cyclopropoxymethyl)-4-(trifluoromethoxy)phenyl]pyrazin-2-yl]hydrazine To a solution of 2-chloro-5-[2-(cyclopropoxymethyl)-4-(trifluoromethoxy)phenyl]pyrazine (550 mg, 1.6 mmol) in MeCN (5 mL) was added N$_2$H$_4$·H$_2$O (797.75 mg, 15.95 mmol) at 25° C. The mixture was stirred at 100° C. for 16 hours. After cooling to 25° C., the reaction was poured into water (20 mL). The mixture was extracted with EtOAc (10 mL×2). The combined organic layer was washed with brine (30 mL), dried over anhydrous Na$_2$SO$_4$, filtered and concentrated to give the crude product (500 mg, 1.47 mmol) as a solid. LCMS Rt=0.77 min in 1.5 min chromatography, 5-95AB, MS ESI calcd. for C$_{15}$H$_{16}$F$_3$N$_4$O$_2$ [M+H]$^+$ 341.1, found 340.9.

A77: 2-bromo-N'-[5-[2-(cyclopropoxymethyl)-4-(trifluoromethoxy)phenyl]pyrazin-2-yl]-2,2-difluoroacetohydrazide To a solution of 2-bromo-2,2-difluoro-acetic acid (51.25 mg, 0.29 mmol) and one drop DMF in DCM (1 mL) was added (COCl)$_2$ (44.63 mg, 0.35 mmol) at 25° C. The mixture was stirred at 25° C. for 15 mins. The [5-[2-(cyclopropoxymethyl)-4-(trifluoromethoxy)phenyl] pyrazin-2-yl] hydrazine (100 mg, 0.29 mmol) in DCM (2 mL) was added to the above solution at 25° C. The mixture was stirred at 25° C. for 1 hour. The mixture was poured into water (10 mL) and the aqueous layer was extracted with EtOAc (10 mL). The combined organic phase was washed with brine (30 mL), dried over anhydrous Na$_2$SO$_4$, filtered and concentrated to give the crude product. The crude product was purified by flash chromatography on silica gel column (EtOAc in PE=15% to 30%) to give the product (80 mg, 0.16 mmol, 55% yield) as an oil. $^1$H NMR (400 MHz, DMSO-$d_6$) $\delta_H$ 11.41 (brs, 1H), 9.53 (s, 1H), 8.35 (s, 1H), 8.16 (s, 1H), 7.64 (d, 1H), 7.46 (s, 1H), 7.41 (d, 1H), 4.64 (s, 2H), 3.35-3.28 (m, 1H), 0.48-0.45 (m, 2H), 0.43-0.41 (m, 2H).

A78: 3-[bromo(difluoro)methyl]-6-[2-methyl-4-(2,2, 2-trifluoro-1-methyl-ethoxy)phenyl]-[1,2,4]triazolo [4,3-a]pyrazine To a mixture of 2-bromo-N'-[5-[2-(cyclopropoxymethyl)-4-(trifluoromethoxy)phenyl]pyrazin-2-yl]-2,2-difluoro-acetohydrazide (80 mg, 0.16 mmol) in DCM (2 mL) were added 2-methoxypyridine (0.04 mL, 0.35 mmol) and Tf$_2$O (0.03 mL, 0.19 mmol). The mixture was stirred at 25° C. for 2 hours. Water (20 mL) was added and the aqueous layer was extracted with EtOAc (10 mL×2). The combined organic phase was washed with brine (30 mL), dried over anhydrous Na$_2$SO$_4$, filtered and concentrated to give the crude product. The crude product was purified by flash chromatography on silica gel (EtOAc in PE=0% to 15%) to give the product (30 mg, 0.06 mmol, 39% yield) as an oil. $^1$H NMR (400 MHz, CDCl$_3$) $\delta_H$ 9.59 (s, 1H), 8.69 (s, 1H), 7.73 (d, 1H), 7.45 (s, 1H), 7.37 (d, 1H), 4.62 (s, 2H), 3.38-3.35 (m, 1H), 0.63-0.62 (m, 2H), 0.54-0.53 (m, 2H).

Compound 35: 6-[2-(cyclopropoxymethyl)-4-(trifluoromethoxy)phenyl]-3-[difluoro(methoxy)methyl]-[1,2,4]triazolo[4,3-a]pyrazine To a suspension of 3-[bromo(difluoro)methyl]-6-[2-(cyclopropoxymethyl)-4-(trifluoromethoxy)phenyl]-[1,2,4]triazolo[4,3-a]pyrazine (30 mg, 0.06 mmol) in methanol (1 mL) was added AgBF$_4$ (24.29 mg, 0.13 mmol) at 25° C. under N$_2$. The mixture was protected from light and stirred at 60° C. for 2 hours. The mixture was added to brine (10 mL) and filtered. The filtrate was extracted with EtOAc (10 mL). The combined organic phase was washed with brine (20 mL), dried over anhydrous Na$_2$SO$_4$, filtered and concentrated to give the crude product. The crude product was purified by prep-HPLC (YMC Triart C18 150×25 mm×5 µm, A=H$_2$O (10 mM NH$_4$HCO$_3$) and B=CH$_3$CN; 52-82% over 9.5 minutes) to give the product (4.7 mg, 0.01 mmol, 17% yield) as a solid. $^1$H NMR (400 MHz, CDCl$_3$) $\delta_H$ 9.52 (s, 1H), 8.63 (s, 1H), 7.69 (d, 1H), 7.45 (s, 1H), 7.35 (d, 1H), 4.60 (s, 2H), 3.95 (s, 3H), 3.38-3.36 (m, 1H), 0.63-0.60 (m, 2H), 0.54-0.52 (m, 2H). LCMS R$_t$=1.43 min in 2 min chromatography, 10-80AB, MS ESI calcd. for C$_{18}$H$_{16}$F$_5$N$_4$O$_3$ [M+H]$^+$ 431.1, found 431.2.

Example 36: Synthesis of Compound 36—6-[2-(cyclopropoxymethyl)-4-(trifluoromethoxy)phenyl]-3-[ethoxy(difluoro)methyl]-[1,2,4]triazolo[4,3-a] pyrazine

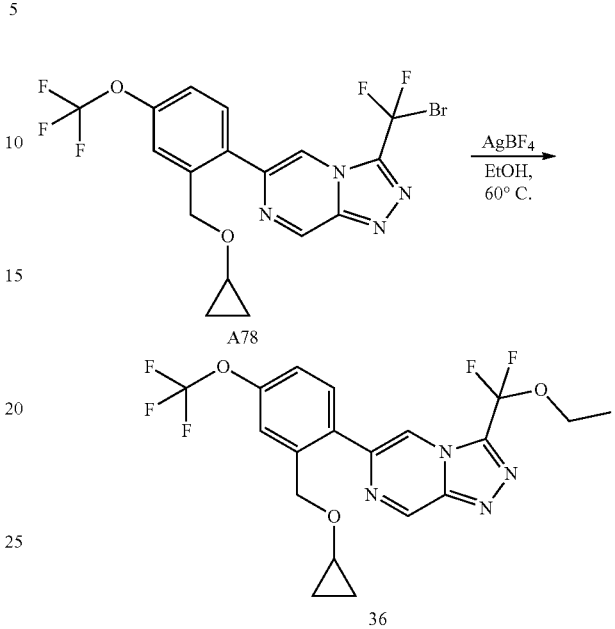

To a suspension of 3-[bromo(difluoro)methyl]-6-[2-(cyclopropoxymethyl)-4-(trifluoromethoxy)phenyl]-[1,2,4]triazolo[4,3-a]pyrazine (35 mg, 0.07 mmol) in ethanol (1 mL) was added AgBF$_4$ (28.34 mg, 0.15 mmol) at 25° C. under N$_2$. The mixture was protected from light and stirred at 60° C. for 2 hours. The solution was added to saturated aqueous NaCl (10 mL) and filtered. The filtrate was extracted with EtOAc (10 mL). The organic phase was washed with brine (20 mL), dried over anhydrous Na$_2$SO$_4$, filtered and concentrated to give the crude product. The crude product was purified by prep-HPLC (YMC Triart C18 150×25 mm×5 µm, A=H$_2$O (10 mM NH$_4$HCO$_3$) and B=CH$_3$CN; 60-90% over 9.5 minutes) to give the product (15.76 mg, 0.04 mmol, 48% yield) as a solid. $^1$H NMR (400 MHz, CDCl$_3$) $\delta_H$ 9.52 (s, 1H), 8.60 (s, 1H), 7.68 (d, 1H), 7.45 (s, 1H), 7.35 (d, 1H), 4.61 (s, 2H), 4.34 (q, 2H), 3.39-3.34 (m, 1H), 1.46 (t, 3H), 0.62-0.60 (m, 2H), 0.54-0.52 (m, 2H). LCMS R$_t$=1.47 min in 2 min chromatography, 10-80AB, MS ESI calcd. for C$_{19}$H$_{18}$F$_5$N$_4$O$_3$ [M+H]$^+$ 445.1, found 445.3.

Example 37: Synthesis of Compound 37—6-[4-(3, 3-difluorocyclobutoxy)phenyl]-3-[ethoxy(difluoro) methyl]-[1,2,4]triazolo[4,3-a]pyrazine

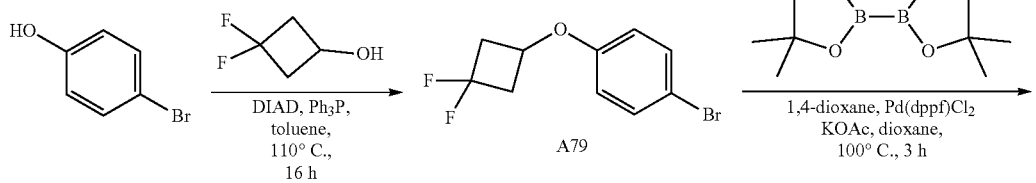

-continued

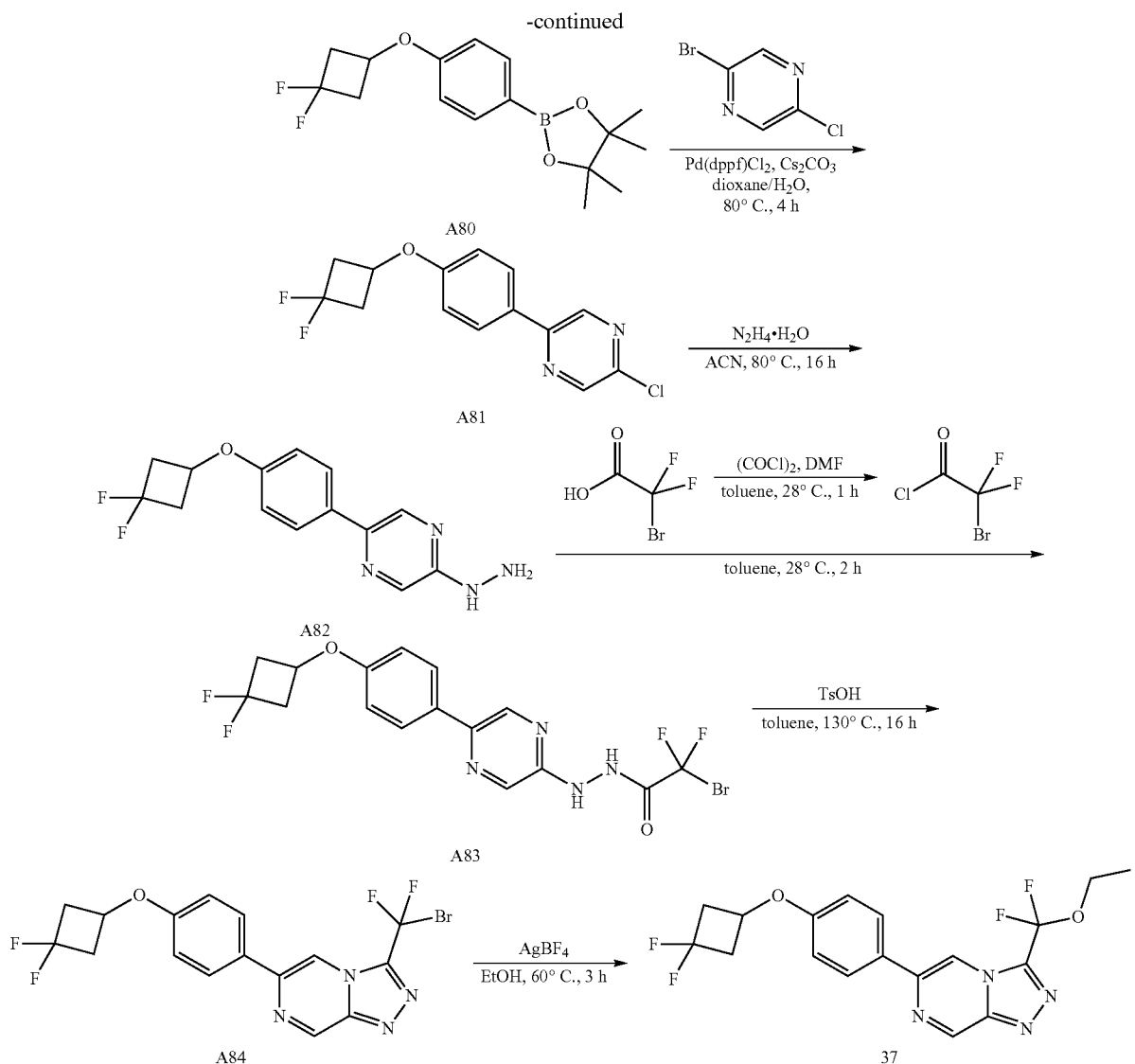

A79: bromo-4-(2,2-difluorocyclopropyl)benzene

To a solution of Ph₃P (2.67 g, 10.18 mmol) in toluene (15 mL) was added DIAD (2.1 g, 10.18 mmol) under N$_2$. Then the mixture was stirred at 0° C. for 10 min. Then, a solution of 3,3-difluorocyclobutanol (1 g, 9.25 mmol) in toluene (3 mL) was added to the mixture. The mixture was stirred at 25° C. for 10 min. Then, 4-bromophenol (1.6 g, 9.25 mmol) was added to the mixture and the resulting mixture was stirred at 110° C. for 16 hours. The mixture was extracted with EtOAc (20 mL×3). The combined organic layer was washed with brine (20 mL), dried over anhydrous Na$_2$SO$_4$, filtered and concentrated to give the crude product. The crude product was purified by flash chromatography on silica gel (PE) to afford the product (380 mg, 1.44 mmol, 15% yield) as an oil. $^1$H NMR (400 MHz, CDCl$_3$) $\delta_H$ 7.46-7.40 (m, 2H), 6.76-6.68 (m, 2H), 4.67-4.57 (m, 1H), 3.15-3.03 (m, 2H), 2.87-2.70 (m, 2H).

A80: 2-[4-(3,3-difluorocyclobutoxy)phenyl]-4,4,5,5-tetramethyl-1,3,2-dioxaborolane To a mixture of 1-bromo-4-(3,3-difluorocyclobutoxy) benzene (380 mg, 1.44 mmol) and 4,4,5,5-tetramethyl-2-(4, 4,5,5-tetramethyl-1,3,2-dioxaborolan-2-yl)-1,3,2-dioxaborolane (440 mg, 1.73 mmol) and KOAc (284 mg, 2.89 mmol) in 1,4-dioxane (5 mL) was added Pd(dppf)Cl$_2$ (106 mg, 0.14 mmol). The mixture was stirred at 100° C. for 3 hours. The mixture was filtered and the filtrate was concentrated under reduced pressure. Water (20 mL) was added and the aqueous layer was extracted with EtOAc (20 mL×3). The combined organic layers were washed with brine (20 mL), dried over anhydrous Na$_2$SO$_4$, filtered and concentrated to give a residue. The residue was purified by flash chromatography on silica gel (EtOAc in PE 0~10%) to afford the product (400 mg, 1.29 mmol, 89% yield) as an oil. $^1$H NMR (400 MHz, CDCl$_3$) $\delta_H$ 7.80-7.75 (m, 2H), 6.82-6.73 (m, 2H), 4.75-4.62 (m, 1H), 3.15-3.05 (m, 2H), 2.83-2.70 (m, 2H), 1.34 (s, 12H).

A81: 2-chloro-5-[4-(3,3-difluorocyclobutoxy)phenyl]pyrazine

To a mixture of 2-[4-(3,3-difluorocyclobutoxy)phenyl]-4, 4,5,5-tetramethyl-1,3,2-dioxaborolane (400 mg, 1.29 mmol) and 2-bromo-5-chloro-pyrazine (299 mg, 1.55 mmol) and $Cs_2CO_3$ (840 mg, 2.58 mmol) in 1,4-dioxane (5 mL) and water (0.5 mL) was added Pd(dppf)Cl$_2$ (94 mg, 0.13 mmol). The mixture was stirred at 80° C. for 4 hours. The mixture was filtered and the mixture was concentrated under reduced pressure. Water (10 mL) was added and the aqueous layer was extracted with EtOAc (10 mL×3). The combined organic layers were washed with brine (10 mL), dried over anhydrous Na$_2$SO$_4$, filtered concentrated to give the crude product. The crude product was purified by flash chromatography on silica gel (EtOAc in PE 0~20%) to afford the product (180 mg, 0.61 mmol, 47% yield) as a solid. $^1$H NMR (400 MHz, CDCl$_3$) $\delta_H$ 8.74 (s, 1H), 8.60 (s, 1H), 7.96 (dd, 2H), 6.94 (dd, 2H), 4.78-4.65 (m, 1H), 3.20-3.08 (m, 2H), 2.88-2.75 (m, 2H).

A82: [5-[4-(2,2-difluorocyclopropyl)phenyl]pyrazin-2-yl]hydrazine

To a solution of 2-chloro-5-[4-(3,3-difluorocyclobutoxy)phenyl]pyrazine (180 mg, 0.61 mmol) in MeCN (3 mL) was added N$_2$H$_4$·H$_2$O (303 mg, 6.07 mmol). The mixture was stirred at 80° C. for 16 hours. After cooling to RT, water (10 mL) was added and the mixture was extracted with EtOAc (10 mL×3). The combined organic layers were washed with brine (10 mL), dried over anhydrous Na$_2$SO$_4$, filtered and concentrated to give the crude product. The crude product was purified by flash chromatography on silica gel (MeOH in DCM 0~20%) to afford the product (140 mg, 0.48 mmol, 79% yield) as a solid. LCMS R$_t$=0.78 min in 1.5 min chromatography, 5-95AB, MS ESI calcd. for $C_{14}H_{15}F_2N_4O$ [M+H]$^+$ 293.0, found 293.0.

A84: 2-bromo-N'-[5-[4-(3,3-difluorocyclobutoxy)phenyl]pyrazin-2-yl]-2,2-difluoro-acetohydrazide To a solution of 2-bromo-2,2-difluoro-acetic acid (0.13 g, 0.72 mmol) in toluene (2 mL) was added DMF (2.62 mg, 0.04 mmol) and (COCl)$_2$ (0.07 mL, 0.86 mmol). The resulting mixture was stirred at 28° C. for 1 hour. A solution of [5-[4-(3,3-difluorocyclobutoxy)phenyl]pyrazin-2-yl]hydrazine (140 mg, 0.48 mmol) in toluene (3 mL) was added to the above mixture. The mixture was stirred at 28° C. for 2 hours.

TsOH (25 mg, 0.14 mmol) was added to the mixture. The mixture was stirred at 130° C. for 16 hours. After cooling to RT, water (20 mL) was added and the aqueous layer was extracted with EtOAc (20 mL×3). The combined organic layers were washed with brine (20 mL), dried over anhydrous Na$_2$SO$_4$, filtered and concentrated to give the crude product. The crude was purified by flash chromatography on silica gel (EtOAc in PE 0~20%) to afford the product (30 mg, 0.07 mmol, 15% yield) as a solid. $^1$H NMR (400 MHz, CDCl$_3$) $\delta_H$ 9.55 (d, 1H), 8.37 (s, 1H), 8.00-7.96 (m, 2H), 7.02-6.95 (m, 2H), 4.80-4.65 (m, 1H), 3.23-3.05 (m, 2H), 2.90-2.75 (m, 2H).

Compound 37: 6-[4-(3,3-difluorocyclobutoxy)phenyl]-3-[ethoxy(difluoro)methyl]-[1,2,4]triazolo[4,3-a]pyrazine To a solution of 3-[bromo(difluoro)methyl]-6-[4-(3,3-difluorocyclobutoxy)phenyl]-[1,2,4]triazolo[4,3-a]pyrazine (30 mg, 0.07 mmol) in ethanol (3 mL) was added AgBF$_4$ (27 mg, 0.14 mmol). The mixture was stirred at 60° C. for 3 hours. After cooling to RT, brine (10 mL) and EtOAc (10 mL) was added. The mixture was filtered and the filter cake was washed with EtOAc (10 mL×3). The filtrate was separated and the organic layer was washed with brine (10 mL), dried over anhydrous Na$_2$SO$_4$, filtered and concentrated to give the crude product. The crude product was purified by prep-HPLC [YMC Triart C18 150*25 mm*5 μm. A=water (10 mM NH$_4$HCO$_3$) and B=CH$_3$CN; 62-92% B over 9.5 minutes)] to give the product (5.04 mg, 0.013 mmol, 19% yield) as a solid. $^1$H NMR (400 MHz, CDCl$_3$) $\delta_H$ 9.50 (s, 1H), 8.42 (s, 1H), 7.90 (d, 2H), 6.96 (d, 2H), 4.80-4.67 (m, 1H), 3.36 (q, 2H), 3.21-3.10 (m, 2H), 2.90-2.72 (m, 2H), 1.50 (t, 3H). LCMS Rt=1.39 min in 2.0 min chromatography, 10-80AB, MS ESI calcd. for $C_{18}H_{17}F_4N_4O_2$ [M+H]$^+$ 397.1, found 397.2.

Example 38: Synthesis of Compound 38—6-[4-(3,3-difluorocyclobutoxy)-2-methyl-phenyl]-3-[ethoxy(difluoro)methyl]-[1,2,4]triazolo[4,3-a]pyrazine

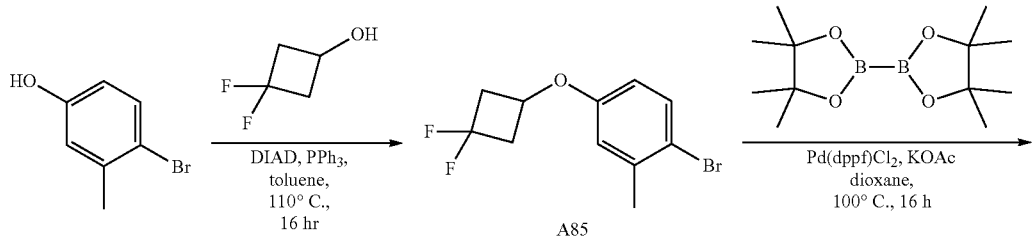

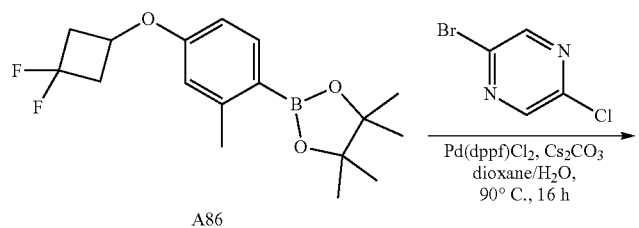

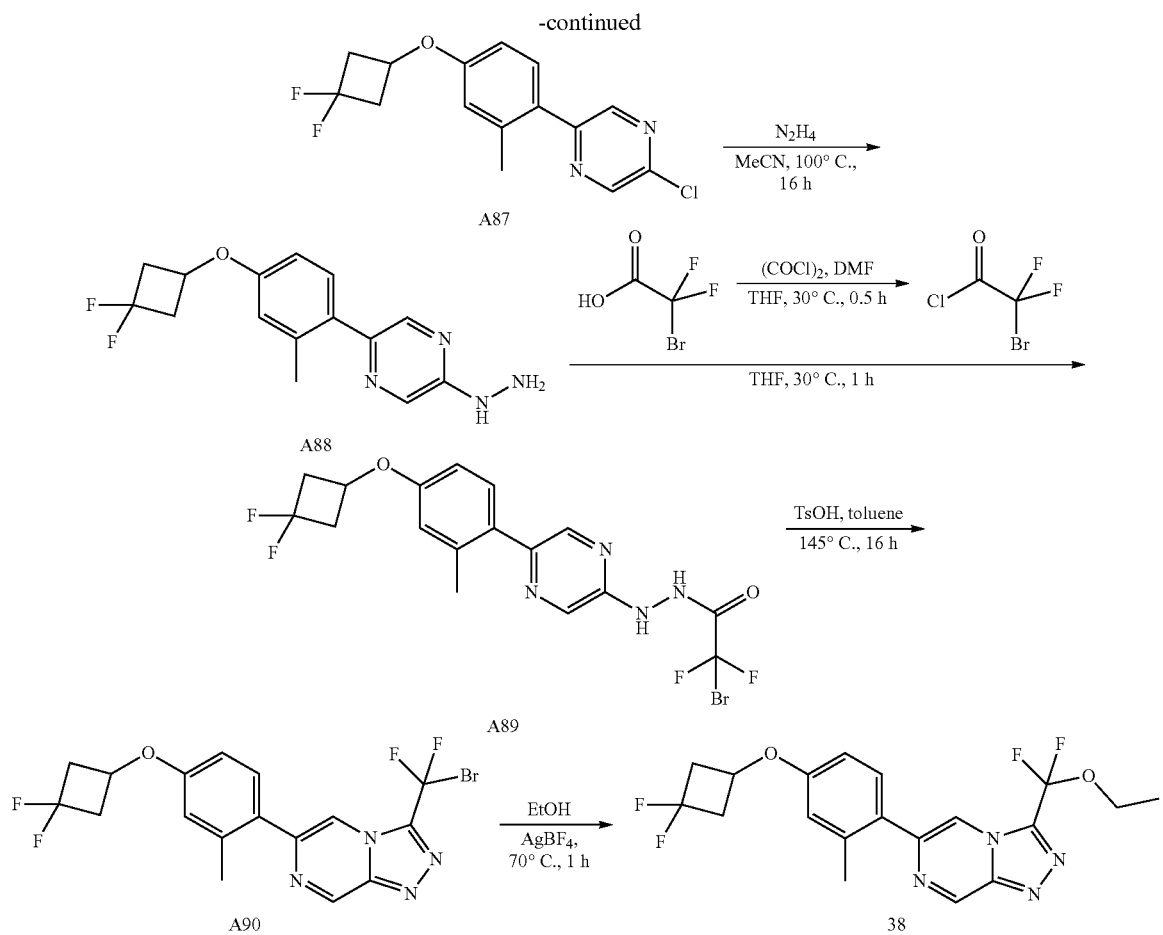

A85: 1-bromo-4-(3,3-difluorocyclobutoxy)-2-methyl-1-benzene

To a solution of Ph₃P (3.64 g, 13.88 mmol) in toluene (50 mL) was added DIAD (2.81 g, 13.88 mmol) dropwise at 0° C. The mixture was stirred at 2° C. for 30 min. Then a solution of 3,3-difluorocyclobutanol (1 g, 9.25 mmol) in toluene (5 mL) was added to the mixture. The mixture was stirred at 25° C. for 30 min. Then 4-bromo-3-methyl-phenol (2.07 g, 11.1 mmol) was added to the mixture and the resulting mixture was stirred at 110° C. for 16 hours. The mixture was concentrated under reduced pressure to give the crude product. The crude product was purified by flash chromatography on silica gel (EtOAc in PE 0~30%) to give the product (770 mg, 2.78 mmol, 30% yield) as an oil. ¹H NMR (400 MHz, CDCl₃) $δ_H$ 7.41 (d, 1H), 6.71 (d, 1H), 6.52 (dd, 1H), 4.65-4.55 (m, 1H), 3.16-3.00 (m, 2H), 2.81-2.67 (m, 2H), 2.37 (s, 3H).

A86: 2-[4-(3,3-difluorocyclobutoxy)-2-methyl-phenyl]-4,4,5,5-tetramethyl-1,3,2-dioxaborolane To a solution of 1-bromo-4-(3,3-difluorocyclobutoxy)-2-methyl-benzene (770 mg, 2.78 mmol) in 1,4-dioxane (10 mL) were added 4,4,5,5-tetramethyl-2-(4,4,5,5-tetramethyl-1,3,2-dioxaborolan-2-yl)-1,3,2-dioxaborolane (847 mg, 3.33 mmol) and KOAc (545 mg, 5.56 mmol). Then Pd(dppf)Cl₂ (203 mg, 0.28 mmol) was added to the above mixture under N₂. The mixture was stirred at 100° C. for 16 hours. The mixture was filtered and the filtrate was concentrated to give the crude product. The crude product was purified by flash chromatography on silica gel (EtOAc in PE 0~4%) to afford the product (900 mg, 2.78 mmol, 100% yield) as an oil. ¹H NMR (400 MHz, CDCl₃) $δ_H$ 7.72 (d, 1H), 6.67-6.57 (m, 2H), 4.72-4.62 (m, 1H), 3.15-3.02 (m, 2H), 2.82-2.68 (m, 2H), 2.52 (s, 3H), 1.34 (s, 12H).

A87: 2-chloro-5-[4-(3,3-difluorocyclobutoxy)-2-methyl-phenyl]pyrazine

To a solution of 2-[4-(3,3-difluorocyclobutoxy)-2-methyl-phenyl]-4,4,5,5-tetramethyl-1,3,2-dioxaborolane (900 mg, 2.78 mmol) in 1,4-dioxane (10 mL) and water (1 mL) were added 2-bromo-5-chloro-pyrazine (591 mg, 3.05 mmol) and Cs₂CO₃ (1.8 g, 5.55 mmol). Then Pd(dppf)Cl₂ (203 mg, 0.28 mmol) was added to the mixture and the resulting mixture was stirred at 90° C. for 16 hours. Water (20 mL) was added and the mixture was filtered. The filtrate was concentrated under reduced pressure and the aqueous layer was extracted with EtOAc (20 mL×3). The combined organic layers were washed with brine (20 mL), dried over anhydrous Na₂SO₄, filtered and concentrated under reduced pressure to give the crude product. The crude product was purified by flash chromatography on silica gel (EtOAc in PE 0~10%) to afford the product (500 mg, 1.61 mmol, 58% yield) as a solid. ¹H NMR (400 MHz, CDCl₃) $δ_H$ 8.65 (s, 1H), 8.47 (s, 1H), 7.38 (d, 1H), 6.80-6.72 (m, 2H), 4.76-4.65 (m, 1H), 3.20-3.06 (m, 2H), 2.87-2.75 (m, 2H), 2.40 (s, 3H).

A88: [5-[4-(3,3-difluorocyclobutoxy)-2-methyl-phenyl]pyrazin-2-yl]hydrazine

To a solution of 2-chloro-5-[4-(3,3-difluorocyclobutoxy)-2-methyl-phenyl]pyrazine (500 mg, 1.61 mmol) in acetonitrile (5 mL) was added hydrazine hydrate (806 mg, 16.09 mmol). The mixture was stirred at 100° C. for 16 hours. After cooling to RT, water (20 mL) was added and the aqueous layer was extracted with EtOAc (20 mL×3). The combined organic layers were washed with brine (20 mL), dried over anhydrous $Na_2SO_4$, filtered and concentrated to give the crude product. The crude product was purified by flash chromatography on silica gel (EtOAc in PE 0~50%) to afford the product (320 mg, 1.04 mmol, 65% yield) as a solid. $^1$H NMR (400 MHz, DMSO-$d_6$) $\delta_H$ 8.16 (d, 1H), 8.05 (d, 1H), 7.97 (s, 1H), 7.28 (d, 1H), 6.83-6.73 (m, 2H), 4.83-4.73 (m, 1H), 4.30 (brs, 2H), 3.27-3.15 (m, 2H), 2.77-2.60 (m, 2H), 2.30 (s, 3H).

A89: 2-bromo-N'-[5-[4-(3,3-difluorocyclobutoxy)-2-methyl-phenyl]pyrazin-2-yl]-2,2-difluoro-acetohydrazide To a solution of 2-bromo-2,2-difluoro-acetic acid (219 mg, 1.25 mmol) in THF (2 mL) were added $(COCl)_2$ (0.13 mL, 1.5 mmol) and 1 drop of DMF. The mixture was stirred at 30° C. for 0.5 hour. Then a solution of [5-[4-(3,3-difluorocyclobutoxy)-2-methyl-phenyl]pyrazin-2-yl]hydrazine (320 mg, 1.04 mmol) in THF (2 mL) was added to the mixture. The mixture was stirred at 30° C. for 1 hour. Water (20 mL) was added and the aqueous layer was extracted with EtOAc (20 mL×3). The combined organic layers were washed with brine (20 mL), dried over anhydrous $Na_2SO_4$, filtered and concentrated to afford the product (483 mg, 1.04 mmol) as an oil, which was used in the next step.

A90: 3-[bromo(difluoro)methyl]-6-[4-(3,3-difluoro-cyclobutoxy)-2-methyl-phenyl]-[1,2,4]triazolo[4,3-a]pyrazine To a solution of 2-bromo-N'-[5-[4-(3,3-difluorocyclobutoxy)-2-methyl-phenyl]pyrazin-2-yl]-2,2-difluoro-acetohydrazide (483 mg, 1.04 mmol) in toluene (5 mL) was added TsOH (54 mg, 0.31 mmol). The mixture was stirred at 145° C. for 16 hours. Water (20 mL) was added and the aqueous layer was extracted with EtOAc (20 mL×3). The combined organic layer was washed with brine (20 mL), dried over anhydrous $Na_2SO_4$, filtered and concentrated to give the crude product. The crude product was purified by flash chromatography on silica gel (EtOAc in PE 0~30%) to afford the product (280 mg, 0.63 mmol, 60% yield) as a solid. $^1$H NMR (400 MHz, CDCl$_3$) $\delta_H$ 9.56 (s, 1H), 8.17 (s, 1H), 7.50-7.37 (m, 1H), 6.85-6.75 (m, 2H), 4.80-4.68 (m, 1H), 3.23-3.05 (m, 2H), 2.90-2.72 (m, 2H), 2.43 (s, 3H).

Compound 38: 6-[4-(3,3-difluorocyclobutoxy)-2-methyl-phenyl]-3-[ethoxy(difluoro)methyl]-[1,2,4]triazolo[4,3-a]pyrazine To a solution of 3-[bromo(difluoro)methyl]-6-[4-(3,3-difluorocyclobutoxy)-2-methyl-phenyl]-[1,2,4]triazolo[4,3-a]pyrazine (140 mg, 0.31 mmol) in ethanol (2 mL) were added AgBF$_4$ (122 mg, 0.63 mmol) and Na$_2$CO$_3$ (67 mg, 0.63 mmol). The mixture was stirred at 70° C. for 1 hour. Water (10 mL) was added and the aqueous layer was extracted with EtOAc (10 mL×3). The combined organic layers were washed with brine (10 mL), dried over anhydrous Na$_2$SO$_4$, filtered and concentrated under reduced pressure to give the crude product. The crude product was purified by flash chromatography on silica gel (EtOAc in PE 0~30%) to afford the product (54.29 mg, 0.13 mmol, 42% yield) as a solid. $^1$H NMR (400 MHz, CDCl$_3$) $\delta_H$ 9.49 (s, 1H), 8.19 (s, 1H), 7.40 (d, 1H), 6.82-6.72 (m, 2H), 4.78-4.67 (m, 1H), 4.32 (q, 2H), 3.22-3.07 (m, 2H), 2.88-2.74 (m, 2H), 2.41 (s, 3H), 1.46 (t, 3H). LCMS Rt=1.20 min in 2.0 min chromatography, 10-80AB, MS ESI calcd. for $C_{19}H_{19}F_4N_4O_2$ [M+H]$^+$ 411.1, found 411.1.

Example 39: Synthesis of Compound 39—6-[4-(3,3-difluorocyclobutoxy)-2-methyl-phenyl]-3-[difluoro(methoxy)methyl]-[1,2,4]triazolo[4,3-a]pyrazine

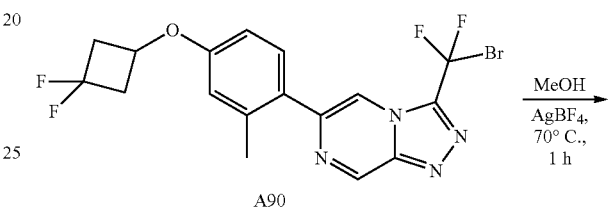

A90

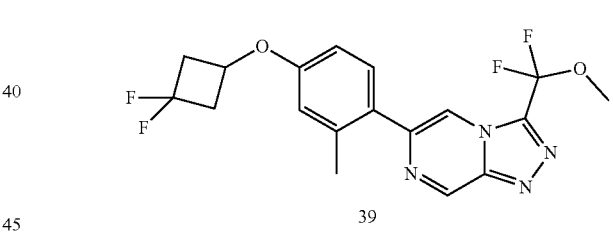

39

To a solution of 3-[bromo(difluoro)methyl]-6-[4-(3,3-difluorocyclobutoxy)-2-methyl-phenyl]-[1,2,4]triazolo[4,3-a]pyrazine (140 mg, 0.31 mmol) in methanol (2 mL) were added AgBF$_4$ (122 mg, 0.63 mmol) and Na$_2$CO$_3$ (67 mg, 0.63 mmol). The mixture was stirred at 70° C. for 1 hour. Water (10 mL) was added and the aqueous layer was extracted with EtOAc (10 mL×3). The combined organic layers were washed with brine (10 mL), dried over anhydrous Na$_2$SO$_4$, filtered and concentrated under reduced pressure to give the crude product. The crude product was purified by flash chromatography on silica gel (EtOAc in PE 0~30%) to afford the product (73.04 mg, 0.18 mmol, 57% yield) as a solid. $^1$H NMR (400 MHz, CDCl$_3$) $\delta_H$ 9.50 (s, 1H), 8.18 (s, 1H), 7.38 (d, 1H), 6.82-6.72 (m, 2H), 4.78-4.67 (m, 1H), 3.94 (s, 3H), 3.22-3.07 (m, 2H), 2.87-2.72 (m, 2H), 2.40 (s, 3H). LCMS R$_t$=1.17 min in 2.0 min chromatography, 10-80AB, MS ESI calcd. for $C_{18}H_{17}F_4N_4O_2$ [M+H]$^+$ 397.1, found 397.1.

Example 40: Synthesis of Compound 40—3-[difluoro(methoxy)methyl]-6-[5-fluoro-2-methyl-4-(trifluoromethoxy)phenyl]-[1,2,4]triazolo[4,3-a]pyrazine
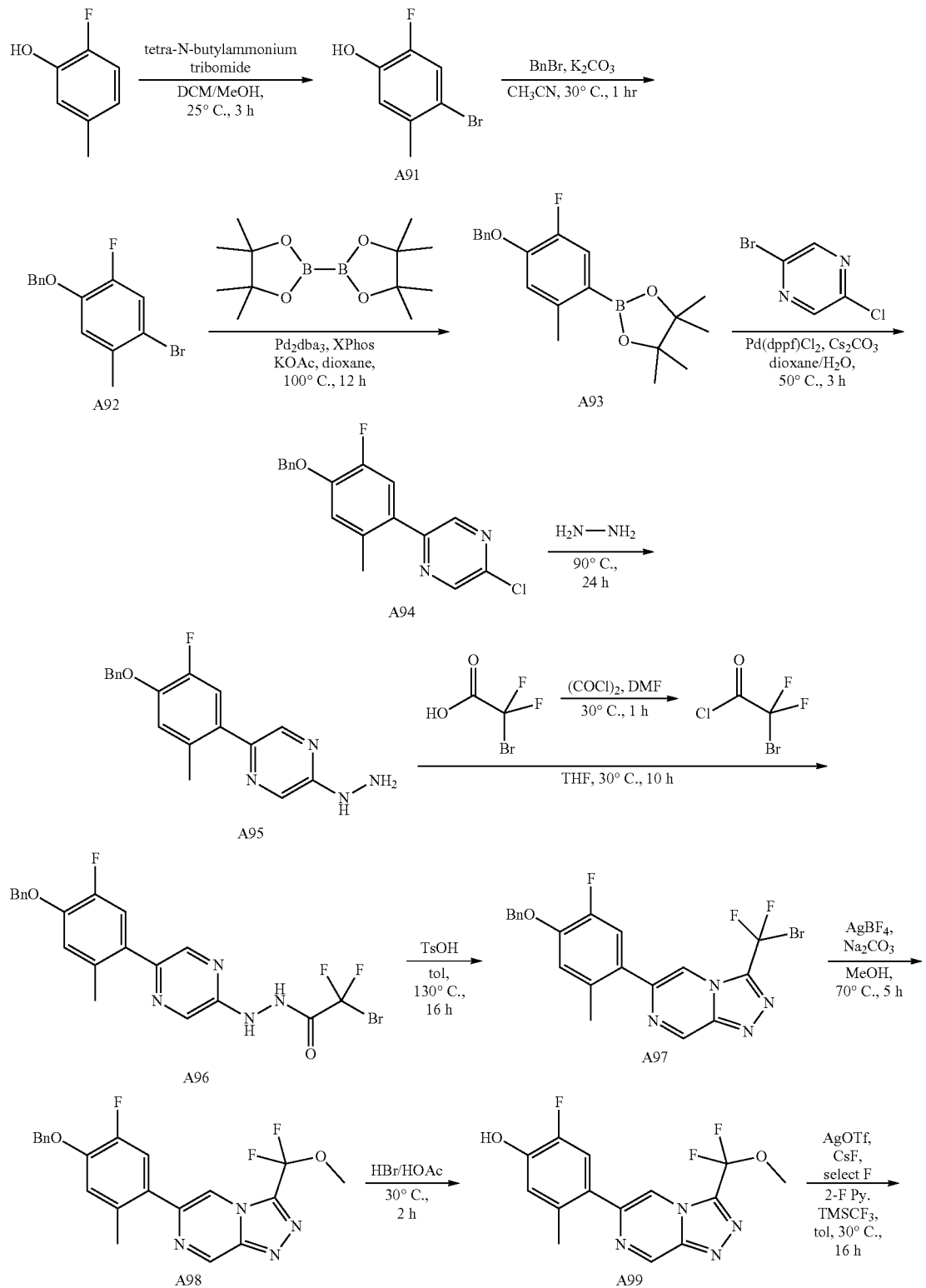

-continued

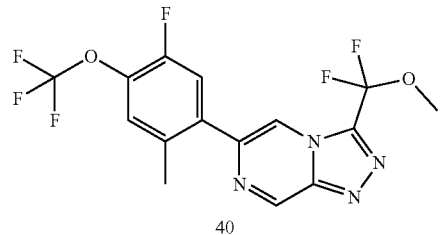

40

A91: 4-bromo-2-fluoro-5-methyl-phenol

To a solution of 2-fluoro-5-methyl-phenol (20.0 g, 158.57 mmol) in DCM (1200 mL) and methanol (800 mL) was added tetrabutylammonium tribromide (76.46 g, 158.57 mmol) dropwise while stirring. The mixture was stirred at 25° C. for 3 hours. Water (150 mL) was added and the mixture was concentrated under reduced pressure. The aqueous layer was extracted with DCM (300 mL×3). The combined organic layers were washed with brine (600 mL), dried over anhydrous $Na_2SO_4$, filtered and concentrated to give the crude product. The crude product was purified by flash chromatography on silica gel (EtOAc in petroleum ether=0~15%) to give the product (30.0 g, 146.33 mmol, 92% yield) as an oil. $^1$H NMR (400 MHz, CDCl$_3$) $\delta_H$ 7.22 (d, 1H), 6.96 (d, 1H), 2.29 (s, 3H).

A92: 1-benzyloxy-4-bromo-2-fluoro-5-methyl-benzene

To a solution of 4-bromo-2-fluoro-5-methyl-phenol (29.0 g, 141.45 mmol) in MeCN (300 mL) were added BnBr (24.19 g, 141.45 mmol) and $K_2CO_3$ (29.32 g, 212.17 mmol). The mixture was stirred at 30° C. for 1 hour. The mixture was filtered and the filtrate was concentrated to afford the product (35.1 g, 118.92 mmol) as a solid. $^1$H NMR (400 MHz, CDCl$_3$) $\delta_H$ 7.45-7.25 (m, 6H), 6.87 (d, 1H), 5.09 (s, 2H), 2.30 (s, 3H).

A93: 2-(4-benzyloxy-5-fluoro-2-methyl-phenyl)-4,4,5,5-tetramethyl-1,3,2-dioxaborolane To a mixture of 1-benzyloxy-4-bromo-2-fluoro-5-methyl-benzene (35.0 g, 118.58 mmol), 4,4,5,5-tetramethyl-2-(4,4,5,5-tetramethyl-1,3,2-dioxaborolan-2-yl)-1,3,2-dioxaborolane (33.12 g, 130.44 mmol), KOAc (23.28 g, 237.17 mmol), XPhos (5.65 g, 11.86 mmol) in 1,4-dioxane (300 mL) was added Pd$_2$(dba)$_3$ (5.43 g, 5.93 mmol). The mixture was stirred at 100° C. for 12 hours under $N_2$. After cooling to 30° C., the reaction mixture was filtered through Celite. The filtrate was concentrated under reduced pressure. Water (300 mL) was added and the aqueous layer was extracted with EtOAc (300 mL×3). The combined organic layer was washed with brine (300 mL), dried over anhydrous $Na_2SO_4$, filtered and concentrated to give the crude product. The crude product was purified by flash chromatography on silica gel (EtOAc in petroleum ether=0~10%) to give the product (30.0 g, 61.37 mmol, 52% yield) as a solid. $^1$H NMR (400 MHz, CDCl$_3$) $\delta_H$ 7.50-7.25 (m, 6H), 6.83-6.78 (m, 1H), 5.15 (s, 2H), 2.47 (s, 3H), 1.33 (s, 12H).

A94: 2-(4-benzyloxy-5-fluoro-2-methyl-phenyl)-5-chloro-pyrazine

To a mixture of 2-(4-benzyloxy-5-fluoro-2-methyl-phenyl)-4,4,5,5-tetramethyl-1,3,2-dioxaborolane (25.0 g, 51.14 mmol, 70% pure) and 2-bromo-5-chloro-pyrazine (9.89 g, 51.14 mmol) in 1,4-dioxane (250 mL) and water (50 mL) was added Cs$_2$CO$_3$ (33.32 g, 102.28 mmol). Then Pd(dppf)Cl$_2$ (3.74 g, 5.11 mmol) was added to the mixture. The resulting mixture was stirred at 50° C. for 3 hours. The mixture was blended with the other batch (obtained from 5.0 g of compound A93). The mixture was filtered and the filtrate was concentrated. Water (300 mL) was added and the aqueous layer was extracted with EtOAc (300 mL×3). The combined organic layers were washed with brine (300 mL), dried over anhydrous $Na_2SO_4$, filtered and concentrated to give the crude product. The crude product was purified by flash chromatography on silica gel (EtOAc in petroleum ether 0~10%) to afford the product (15.0 g, 45.62 mmol, 74% yield) as a solid. $^1$H NMR (400 MHz, CDCl$_3$) $\delta_H$ 8.66 (s, 1H), 8.46 (s, 1H), 7.52-7.30 (m, 5H), 7.24 (d, 1H), 6.95 (d, 1H), 5.20 (s, 2H), 2.36 (s, 3H).

A95: [5-(4-benzyloxy-5-fluoro-2-methyl-phenyl)pyrazin-2-yl]hydrazine

To a solution of 2-(4-benzyloxy-5-fluoro-2-methyl-phenyl)-5-chloro-pyrazine (15.0 g, 45.62 mmol) in MeCN (100 mL) was added hydrazine hydrate (22.8 g, 456.25 mmol). The mixture was stirred at 90° C. for 24 hours. Water (500 mL) was added and the aqueous layer was extracted with EtOAc (300 mL×3). The combined organic layers were washed with brine (300 mL), dried over anhydrous $Na_2SO_4$, filtered and concentrated to give the crude product. The crude product was purified by flash chromatography on silica gel (EtOAc in petroleum ether 0~60%) to afford the product (9.8 g, 30.21 mmol, 66% yield). 1H NMR (400 MHz, DMSO-d$_6$) $\delta_H$ 8.17 (s, 1H), 8.10 (s, 1H), 8.05 (s, 1H), 7.50-7.30 (m, 5H), 7.24 (d, 1H), 7.18 (d, 1H), 5.21 (s, 2H), 4.30 (s, 2H), 1.99 (s, 3H). LCMS Rt=1.04 min in 2.0 min chromatography, 10-80AB, MS ESI calcd. for $C_{18}H_{18}FN_4O$ [M+H]$^+$ 325.1, found 325.2.

A96: N'-[5-(4-benzyloxy-5-fluoro-2-methyl-phenyl)pyrazin-2-yl]-2-bromo-2,2-difluoro-acetohydrazide To a solution of 2-bromo-2,2-difluoro-acetic acid (4.04 g, 23.12 mmol) in THF (40 mL) was added (COCl)$_2$ (2.4 mL, 27.75 mmol) and 5 drops of DMF. The mixture was stirred at 30° C. for 1 hour. A solution of [5-(4-benzyloxy-5-fluoro-2-methyl-phenyl)pyrazin-2-yl]hydrazine (5.0 g, 15.42 mmol) in THF (10 mL) was added dropwise to the mixture. The mixture was stirred at 30° C. for 10 hours. Water (50 mL) was added and the aqueous layer was extracted with EtOAc (50 mL×3). The combined organic layers were washed with brine (50 mL), dried over anhydrous $Na_2SO_4$, filtered and concentrated to give the crude product. The crude product was purified by flash chromatography on silica gel (EtOAc in petroleum ether 0~20%) to afford the product (2.9 g, 6.03 mmol, 39% yield) as an oil. $^1$H NMR (400 MHz, CDCl$_3$) $\delta_H$ 8.27 (s, 1H), 8.22 (s, 1H), 7.50-7.32 (m, 5H), 7.24 (d, 1H), 6.92 (d, 1H), 5.18 (s, 2H), 2.31 (s, 3H). LCMS Rt=1.00 min in 1.5 min chromatography, 5-95AB, MS ESI calcd. for C$_{20}$H$_{17}$BrF$_3$N$_4$O$_2$ [M+H]$^+$ 481.0, found 480.8.

A97: 6-(4-benzyloxy-5-fluoro-2-methyl-phenyl)-3-[bromo(difluoro)methyl]-[1,2,4]triazolo[4,3-a]pyrazine To a solution of N'-[5-(4-benzyloxy-5-fluoro-2-methyl-phenyl)pyrazin-2-yl]-2-bromo-2,2-difluoro-acetohydrazide (2.9 g, 6.03 mmol) in toluene (50 mL) were added TsOH (311 mg, 1.81 mmol). The mixture was stirred at 130° C. for 16 hours. Water (50 mL) was added and the aqueous layer was extracted with EtOAc (50 mL×3). The combined organic layers were washed with brine (50 mL), dried over anhydrous Na$_2$SO$_4$, filtered and concentrated to give the crude product. The crude product was purified by flash chromatography on silica gel (EtOAc in petroleum ether 0~15%) to afford the product (2.2 g, 4.75 mmol, 79% yield) as a solid. $^1$H NMR (400 MHz, CDCl$_3$) $\delta_H$ 9.56 (d, 1H), 8.17 (s, 1H), 7.50-7.25 (m, 6H), 6.99 (d, 2H), 5.23 (s, 2H), 2.40 (s, 3H).

A98: 6-(4-benzyloxy-5-fluoro-2-methyl-phenyl)-3-[difluoro(methoxy)methyl]-[1,2,4]triazolo[4,3-a]pyrazine To a solution of 6-(4-benzyloxy-5-fluoro-2-methyl-phenyl)-3-[bromo(difluoro)methyl]-[1,2,4]triazolo[4,3-a]pyrazine (2.2 g, 4.75 mmol) in methanol (30 mL) was added AgBF$_4$ (2.76 g, 14.25 mmol) and Na$_2$CO$_3$ (1.51 g, 14.25 mmol). The mixture was stirred at 70° C. for 5 hours. Brine (100 mL) was added and the suspension was filtered. The filtrate was extracted with EtOAc (50 mL×3). The combined organic layers were washed with brine (50 mL), dried over anhydrous Na$_2$SO$_4$, filtered and concentrated to give the crude product. The crude product was purified by flash chromatography on silica gel (EtOAc in petroleum ether 0~30%) to afford the product (1.3 g, 3.14 mmol, 66% yield) as a solid. $^1$H NMR (400 MHz, CDCl$_3$) $\delta_H$ 9.49 (s, 1H), 8.18 (s, 1H), 7.50-7.35 (m, 5H), 7.24 (s, 1H), 6.98 (d, 1H), 5.22 (s, 2H), 3.94 (s, 3H), 2.36 (s, 3H).

A99: 4-[3-[difluoro(methoxy)methyl]-[1,2,4]triazolo[4,3-a]pyrazin-6-yl]-2-fluoro-5-methyl-phenol A solution of 6-(4-benzyloxy-5-fluoro-2-methyl-phenyl)-3-[difluoro(methoxy)methyl]-[1,2,4]triazolo[4,3-a]pyrazine (1.3 g, 3.14 mmol) in HBr/HOAc (15 mL, 33%) was stirred at 30° C. for 2 hours. Water (50 mL) was added and the aqueous layer was extracted with EtOAc (50 mL×3). The combined organic layers were washed with saturated NaHCO$_3$ solution (30 mL×3) and brine (30 mL), dried over anhydrous Na$_2$SO$_4$, filtered and concentrated to give the crude product. The crude was purified by flash chromatography on silica gel (EtOAc in petroleum ether 0~90%) to afford the product (710 mg, 2.19 mmol, 70% yield) as a solid. $^1$H NMR (400 MHz, DMSO-d$_6$) $\delta_H$ 10.11 (s, 1H), 9.62 (d, 1H), 8.49 (s, 1H), 7.30 (d, 1H), 6.91 (d, 1H), 3.87 (s, 3H), 2.26 (s, 3H).

Compound 40: 3-[difluoro(methoxy)methyl]-6-[5-fluoro-2-methyl-4-(trifluoromethoxy)phenyl]-[1,2,4]triazolo[4,3-a]pyrazine AgOTf (2.38 g, 9.25 mmol) was dried at 200° C. (heat gun) in vacuum for 20 mins. Then 4-[3-[difluoro(methoxy) methyl]-[1,2,4]triazolo[4,3-a]pyrazin-6-yl]-2-fluoro-5-methyl-phenol (600 mg, 1.85 mmol), select F (3.28 g, 9.25 mmol), CsF (1.69 g, 11.1 mmol), followed by toluene (10 mL), 2-fluoropyridine (0.9 g, 9.25 mmol) and TMSCF$_3$ (1.32 g, 9.25 mmol) were added in a glove box. The mixture was stirred at 30° C. for 16 hours. The mixture was filtered through Celite and the filter cake was washed with DCM (20 mL×4). The filtrate was concentrated and purified by flash chromatography (DCM in MeOH 0~5%) and prep-HPLC ([Phenomenex Gemini-NX 80×30 mm×3 mm, A=H$_2$O (10 mM NH$_4$HCO$_3$) and B=CH$_3$CN; 41-71% over 9.5 minutes] to afford the product (7.27 mg, 0.0185 mmol, 10% yield) as an oil. $^1$H NMR (400 MHz, CDCl$_3$) $\delta_H$ 9.52 (s, 1H), 8.24 (s, 1H), 7.35 (d, 1H), 7.30 (d, 1H), 3.95 (s, 3H), 2.40 (s, 3H). LCMS R$_t$=1.95 min in 3.0 min chromatography, 10-80CD, MS ESI calcd. for C$_{15}$H$_{11}$F$_6$N$_4$O$_2$ [M+H]$^+$ 393.1, found 393.1.

Example 41: Synthesis of Compound 41—3-(1-ethoxy-1-methyl-ethyl)-6-[2-methyl-4-(trifluoromethoxy)phenyl]-[1,2,4]triazolo[4,3-a]pyrazine

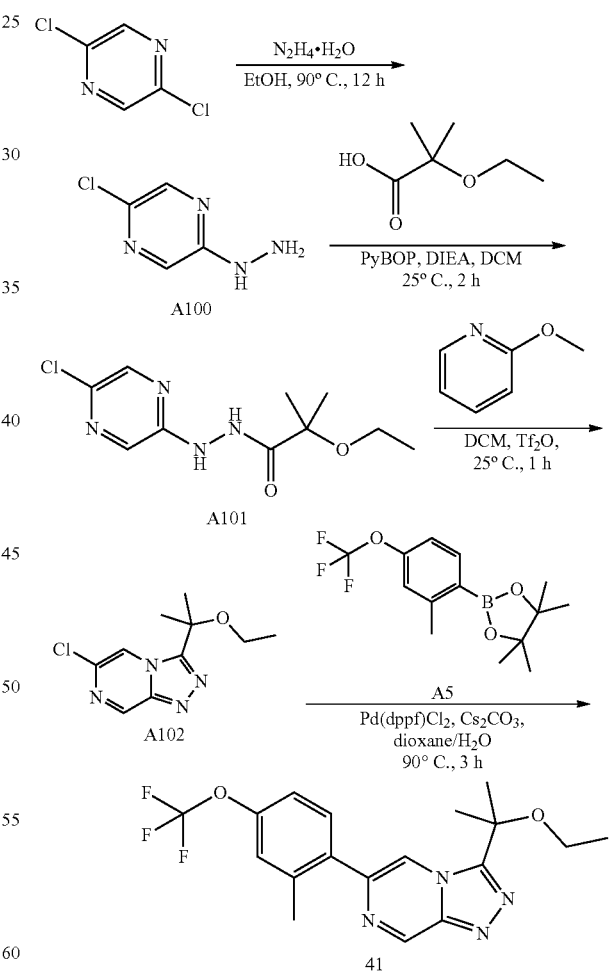

A100: (5-chloropyrazin-2-yl)hydrazine

A mixture of N$_2$H$_4$·H$_2$O (50.34 g, 1 mol) and 2,5-dichloropyrazine (30 g, 201.37 mmol) in ethanol (150 mL)

was stirred at 90° C. for 12 hours. After cooling to RT, water (500 mL) was added and the aqueous layer was stirred for 1 hour. The aqueous layer was filtered and the filtered cake was dried to give the product (22 g, 152.19 mmol, 75% yield) as a solid. $^1$H NMR (400 MHz, CDCl$_3$) $\delta_H$ 8.05-8.03 (m, 2H), 6.00 (brs, 1H), 3.84 (brs, 2H).

A101: N'-(5-chloropyrazin-2-yl)-2-ethoxy-2-methyl-propanehydrazide

To a mixture of 2-ethoxy-2-methyl-propanoic acid (2 g, 15.13 mmol), PyBOP (11.81 g, 22.7 mmol) and DIPEA (5.27 mL, 30.27 mmol) in DCM (25 mL) was added (5-chloropyrazin-2-yl)hydrazine (2.2 g, 15.22 mmol). The mixture was stirred at 25° C. for 2 hours. Water (100 mL) was added and the mixture was extracted with EtOAc (100 mL×2). The combined organic phase was washed with brine (100 mL), dried over anhydrous Na$_2$SO$_4$, filtered and concentrated to give the crude product. The crude product was purified by flash chromatography on silica gel (EtOAc in petroleum ether=0% to 15% to 30%) to give the product (3.9 g, 15.08 mmol, 99% yield) as an oil. $^1$H NMR (400 MHz, CDCl$_3$) $\delta_H$ 8.70 (d, 1H), 8.08 (s, 1H), 7.86 (s, 1H), 7.36 (s, 1H), 3.55 (q, 2H), 1.45 (s, 6H), 1.25 (t, 3H).

A102: 6-chloro-3-(1-ethoxy-1-methyl-ethyl)-[1,2,4]triazolo[4,3-a]pyrazine

To a solution of N'-(5-chloropyrazin-2-yl)-2-ethoxy-2-methyl-propanehydrazide (3.9 g, 15.08 mmol) in DCM (40 mL) was added 2-methoxy pyridine (3.17 mL, 30.15 mmol) and then Tf$_2$O (3.06 mL, 18.09 mmol) at 0° C. The mixture was stirred at 25° C. for 1 hour. Water (100 mL) was added and the mixture was extracted with EtOAc (100 mL×2). The combined organic phase was washed with brine (100 mL), dried over anhydrous Na$_2$SO$_4$, filtered and concentrated to give the crude product. The crude product was purified by flash chromatography on silica gel (EtOAc in petroleum ether=0% to 15% to 30%) to give the product (1.1 g). The product (1.1 g) was further purified by Prep-HPLC (Xtimate C18 (150 mm×40 mm, 5 mm) A=H$_2$O (0.1% TFA) and B=CH$_3$CN; 26% B over 8 minutes) to give the product (350 mg, 1.45 mmol, 9% yield) as a solid. LCMS R$_t$=2.17 min in 4.0 min chromatography, 0-60AB, MS ESI calcd. for C$_{10}$H$_{14}$ClN$_4$O [M+H]$^+$ 241.1, found 241.1.

Compound 41: 3-(1-ethoxy-1-methyl-ethyl)-6-[2-methyl-4-(trifluoromethoxy)phenyl]-[1,2,4]triazolo[4,3-a]pyrazine A mixture of 6-chloro-3-(1-ethoxy-1-methyl-ethyl)-[1,2,4]triazolo[4,3-a]pyrazine (350 mg, 1.45 mmol), 4,4,5,5-tetramethyl-2-[2-methyl-4-(trifluoromethoxy)phenyl]-1,3,2-dioxaborolane (439.3 mg, 1.45 mmol), Cs$_2$CO$_3$ (947.53 mg, 2.91 mmol) and then Pd(dppf)Cl$_2$ (159.6 mg, 0.22 mmol) in 1,4-dioxane (5 mL) and water (0.5 mL) was stirred at 90° C. under N$_2$ for 3 hours. After cooling to RT, water (50 mL) and EtOAc (50 mL) were added and the mixture was filtered through Celite. After separating the layers, the aqueous phase was extracted with EtOAc (50 mL). The combined organic phase was washed with brine (50 mL), dried over anhydrous Na$_2$SO$_4$, filtered and concentrated to give the crude product. The crude was purified by Prep-HPLC (Kromasil (150 mm×25 mm, 10 mm) A=H$_2$O (0.05% NH$_4$OH) and B=CH$_3$CN; 50-80% B over 8 minutes) to give the product (103.24 mg, 270.9 mmol, 18% yield) as a solid. $^1$H NMR (400 MHz, CDCl$_3$) $\delta_H$ 9.42 (d, 1H), 8.51 (s, 1H), 7.45 (d, 1H), 7.23-7.16 (m, 2H), 3.28 (q, 2H), 2.45 (s, 3H), 1.84 (s, 6H), 1.17 (t, 3H). LCMS R$_t$=1.22 min in 2.0 min chromatography, 10-80AB, MS ESI calcd. for C$_{18}$H$_{20}$F$_3$N$_4$O$_2$ [M+H]$^+$ 381.1, found 381.1.

Example 42: Synthesis of Compound 42—3-[difluoro(methoxy)methyl]-6-[2-fluoro-5-methyl-4-(trifluoromethoxy)phenyl]-[1,2,4]triazolo[4,3-a]pyrazine

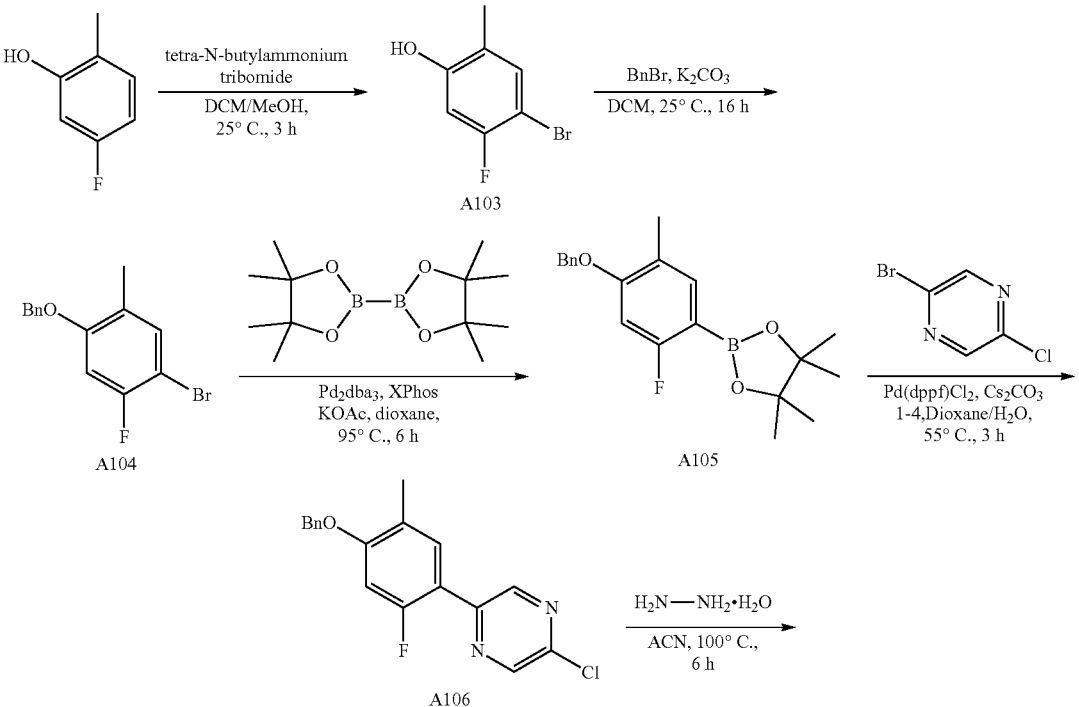

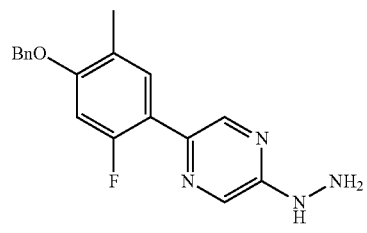
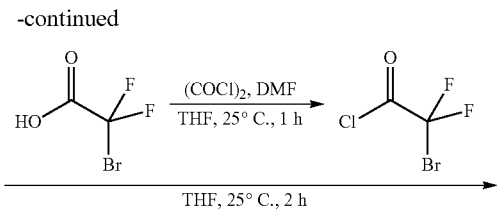
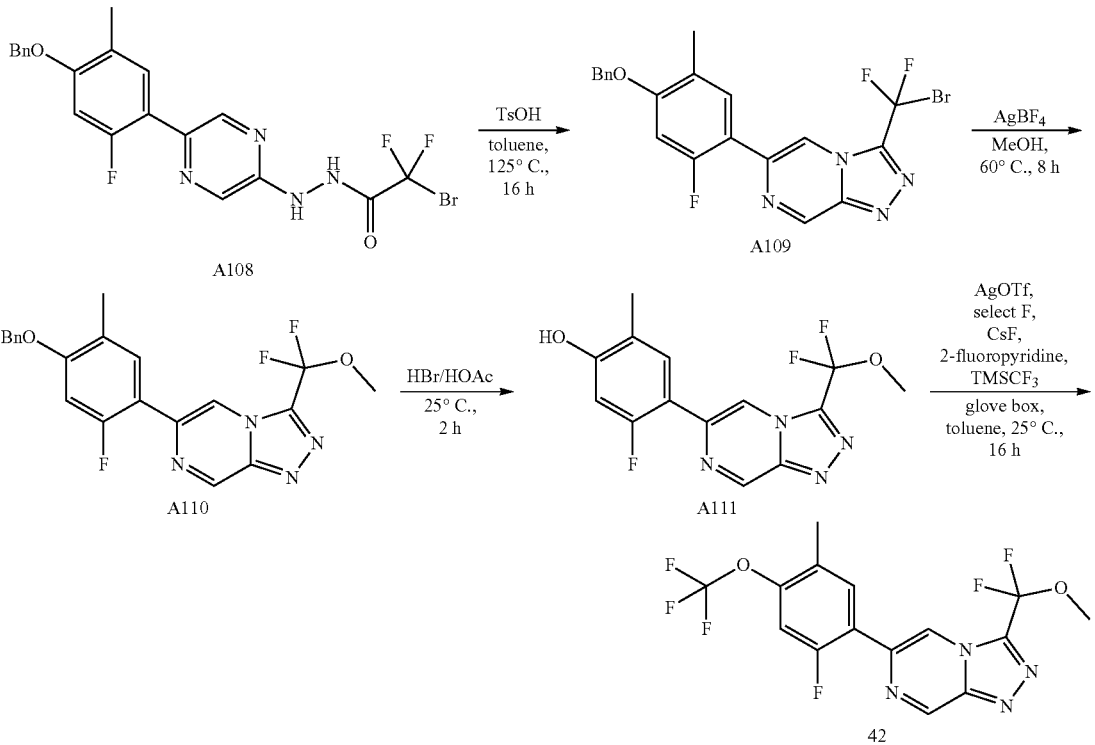

A103: 4-bromo-5-fluoro-2-methyl-phenol

To a solution of 5-fluoro-2-methyl-phenol (20 g, 158.57 mmol) in DCM (1.2 L) and methanol (800 mL) was added tetrabutylammonium tribromide (76.46 g, 158.57 mmol). The mixture was stirred at 25° C. for 3 hours. The solution was concentrated to give a residue and the residue was re-dissolved in petroleum ether:EtOAc=5:1 (2 L) and filtered through 300-400 mesh silica gel. The silica cake was washed with petroleum ether:EtOAc=5:1 (5 L) and concentrated to give the product (23 g, 112.18 mmol, 70% yield) as an oil. $^1$H NMR (400 MHz, CDCl$_3$) $\delta_H$ 7.25 (d, 1H), 6.63 (d, 1H), 5.93 (brs, 1H), 2.18 (s, 3H).

A104: 1-benzyloxy-4-bromo-5-fluoro-2-methyl-benzene

To a mixture of 4-bromo-5-fluoro-2-methyl-phenol (23 g, 112.18 mmol) and K$_2$CO$_3$ (23.25 g, 168.28 mmol) in MeCN (200 mL) was added bromomethylbenzene (13.32 mL, 112.18 mmol). The mixture was stirred at 25° C. for 16 hours. The mixture was filtered through Celite. The filter cake was washed with EtOAc (50 mL×2). The combined organic phase was concentrated to give the crude product (32 g, 108.42 mmol) as an oil. 1H NMR (400 MHz, CDCl$_3$) $\delta_H$ 7.27-7.11 (m, 6H), 6.54 (d, 1H), 4.89 (s, 2H), 2.07 (s, 3H).

A105: 2-(4-benzyloxy-2-fluoro-5-methyl-phenyl)-4,4,5,5-tetramethyl-1,3,2-dioxaborolane To a mixture of 1-benzyloxy-4-bromo-5-fluoro-2-methyl-benzene (32 g, 108.42 mmol), 4,4,5,5-tetramethyl-2-(4,4,5,5-tetramethyl-1,3,2-dioxaborolan-2-yl)-1,3,2-dioxaborolane (30.29 g, 119.26 mmol), KOAc (21.28 g, 216.84 mmol), XPhos (5.17 g, 10.84 mmol) in 1,4-dioxane (200 mL) was added Pd$_2$(dba)$_3$ (4.96 g, 5.42 mmol). The mixture was stirred at 95° C. for 6 hours under N$_2$. After cooling to RT, the mixture was filtered through Celite. The filter cake was washed with EtOAc (50 mL×2). The combined organic phase was concentrated to give the crude product. The crude product was purified by flash chromatography on silica gel (EtOAc in petroleum ether=0~2%) to give the product (33 g, 96.43 mmol, 88% yield) as an oil. $^1$H NMR (400 MHz, CDCl$_3$) $\delta_H$ 7.51 (d, 1H), 7.45-7.35 (m, 5H), 6.60 (d, 1H), 5.08 (s, 2H), 2.23 (s, 3H), 1.36 (s, 12H).

A106: 2-(4-benzyloxy-2-fluoro-5-methyl-phenyl)-5-chloro-pyrazine

A mixture of 2-(4-benzyloxy-2-fluoro-5-methyl-phenyl)-4,4,5,5-tetramethyl-1,3,2-dioxaborolane (33 g, 96.43 mmol), 2-bromo-5-chloro-pyrazine (15.5 g, 80.13 mmol), Cs$_2$CO$_3$ (52.21 g, 160.26 mmol) and then Pd(dppf)Cl$_2$ (2.93 g, 4.01 mmol) in 1,4-dioxane (350 mL) and water (35 mL) was stirred at 55° C. under N$_2$ for 3 hours. After cooling to RT, the mixture was concentrated under reduced pressure. Water (500 mL) and EtOAc (500 mL) were added and the mixture was filtered through Celite. After separating the phases, the aqueous phase was extracted with EtOAc (250 mL×2). The combined organic phase was washed with brine (500 mL), dried over anhydrous Na$_2$SO$_4$, filtered and concentrated to give the crude product. The crude product was purified by flash chromatography on silica gel (EtOAc in petroleum ether=0% to 10% to 20%) to give the product (24 g, 73 mmol, 91% yield) as a solid. LCMS R$_t$=1.44 min in 2.0 min chromatography, 10-80AB, MS ESI calcd. for C$_{18}$H$_{15}$ClFN$_2$O [M+H]$^+$ 329.1, found 329.1.

A107: [5-(4-benzyloxy-2-fluoro-5-methyl-phenyl) pyrazin-2-yl]hydrazine

A mixture of 2-(4-benzyloxy-2-fluoro-5-methyl-phenyl)-5-chloro-pyrazine (24 g, 73 mmol) and hydrazine hydrate (36.54 g, 730 mmol) in MeCN (300 mL) was stirred at 100° C. for 6 hours. After cooling to RT, the mixture was poured into water (500 mL). The mixture was extracted with EtOAc (500 mL×2). The combined organic phase was washed with brine (500 mL), dried over anhydrous Na$_2$SO$_4$, filtered and concentrated to give the crude product. The crude was purified by flash chromatography on silica gel (EtOAc in petroleum ether=0% to 30% to 50%) to give the product (7.2 g, 22.20 mmol, 30% yield) as a solid. $^1$H NMR (400 MHz, DMSO-d$_6$) δ$_H$ 8.31 (s, 1H), 8.22 (s, 1H), 8.10 (s, 1H), 7.67 (d, 1H), 7.51-7.47 (m, 2H), 7.42 (t, 2H), 7.37-7.32 (m, 1H), 7.01 (d, 1H), 5.19 (s, 2H), 4.33 (brs, 2H), 2.21 (s, 3H).

A108: N'-[5-(4-benzyloxy-2-fluoro-5-methyl-phenyl)pyrazin-2-yl]-2-bromo-2,2-difluoro-acetohydrazide To a solution of 2-bromo-2,2-difluoro-acetic acid (6.5 g, 37.16 mmol) in THF (100 mL) were added one drop DMF and then oxalyl dichloride (3.77 mL, 44.59 mmol) at 0° C. The resulting mixture was stirred at 25° C. for 1 hour. [5-(4-benzyloxy-2-fluoro-5-methyl-phenyl)pyrazin-2-yl]hydrazine (6 g, 18.5 mmol) was added to the mixture and the mixture was stirred at 25° C. for 2 hours. The mixture was concentrated to give the crude product (8.9 g, 18.49 mmol) as a solid. LCMS R$_t$=1.35 min in 2.0 min chromatography, 10-80AB, MS ESI calcd. for C$_{20}$H$_{17}$BrF$_3$N$_4$O$_2$ [M+H]$^+$ 481.0, found 480.9.

A109: 6-(4-benzyloxy-2-fluoro-5-methyl-phenyl)-3-[bromo(difluoro)methyl]-[1,2,4]triazolo[4,3-a]pyrazine A mixture of N'-[5-(4-benzyloxy-2-fluoro-5-methyl-phenyl)pyrazin-2-yl]-2-bromo-2,2-difluoro-acetohydrazide (9.9 g, 20.57 mmol) and TsOH (1.06 g, 6.17 mmol) in toluene (100 mL) was stirred at 125° C. for 16 hours. After cooling to RT, the mixture was concentrated under reduced pressure. Water (200 mL) was added and the aqueous layer was extracted with EtOAc (200 mL×3). The combined organic phase was washed with brine (300 mL×2), dried over anhydrous Na$_2$SO$_4$, filtered and concentrated to give the crude product. The crude product was purified by flash chromatography on silica gel (EtOAc in petroleum ether=0% to 40% to 80%) and then recrystallized from MeOH (30 mL) to give the product (6.6 g, 14.25 mmol, 69% yield) as a solid. LCMS R$_t$=4.10 min in 7.0 min chromatography, 10-80AB, MS ESI calcd. for C$_{20}$H$_{15}$BrF$_3$N$_4$O [M+H]$^+$ 463.0, found 463.2.

A110: 6-(4-benzyloxy-2-fluoro-5-methyl-phenyl)-3-[difluoro(methoxy)methyl]-[1,2,4]triazolo[4,3-a]pyrazine A mixture of 6-(4-benzyloxy-2-fluoro-5-methyl-phenyl)-3-[bromo(difluoro)methyl]-[1,2,4]triazolo[4,3-a]pyrazine (2.6 g, 5.61 mmol), Na$_2$CO$_3$ (1.19 g, 11.23 mmol) and AgBF$_4$ (2.18 g, 11.23 mmol) in methanol (25 mL) was stirred at 60° C. under dark for 8 hours. After cooling to RT, brine (100 mL) and EtOAc (100 mL) were added and the mixture was filtered through Celite. After separating the phases, the organic phase was washed with brine (100 mL), dried over anhydrous Na$_2$SO$_4$, filtered and concentrated to give the crude product. The crude product was purified by flash chromatography on silica gel (EtOAc in petroleum ether=0% to 50% to 80%) and then by Prep-HPLC (Phenomenex luna C18 (250 mm×50 mm, 10 mm) A=H$_2$O (0.1% TFA) and B=CH$_3$CN; 50-80% B over 8 minutes) to give the product (310 mg, 748.1 mmol, 13% yield) as a solid. LCMS R$_t$=3.85 min in 7.0 min chromatography, 10-80AB, MS ESI calcd. for C$_{21}$H$_{18}$F$_3$N$_4$O$_2$ [M+H]$^+$ 415.1, found 415.3.

A11: 4-[3-[difluoro(methoxy)methyl]-[1,2,4]triazolo[4,3-a]pyrazin-6-yl]-5-fluoro-2-methyl-phenol A solution of 6-(4-benzyloxy-2-fluoro-5-methyl-phenyl)-3-[difluoro(methoxy)methyl]-[1,2,4]triazolo[4,3-a]pyrazine (310 mg, 0.75 mmol) in HBr/AcOH (5 mL, 33% in HOAc) was stirred at 25° C. for 2 hours. Water (20 mL) was added and the mixture was extracted with EtOAc (30 mL×2). The combined organic phase was washed with saturated aqueous NaHCO$_3$ solution (30 mL×2) and brine (50 mL), dried over anhydrous Na$_2$SO$_4$, filtered and concentrated to give the crude product. The crude product was purified by flash chromatography on silica gel (EtOAc in petroleum ether=0% to 50% to 100%) to give the product (130 mg, 0.4 mmol, 53% yield) as a solid. $^1$H NMR (400 MHz, DMSO-d$_6$) δ$_H$ 10.33 (s, 1H), 9.66 (s, 1H), 8.58 (s, 1H), 7.84 (d, 1H), 6.74 (d, 1H), 3.88 (s, 3H), 2.17 (s, 3H). LCMS R$_t$=2.35 min in 7.0 min chromatography, 10-80AB, MS ESI calcd. for C$_{14}$H$_{12}$F$_3$N$_4$O$_2$ [M+H]$^+$ 325.1, found 325.1.

Compound 42: 3-[difluoro(methoxy)methyl]-6-[2-fluoro-5-methyl-4-(trifluoromethoxy)phenyl]-[1,2,4]triazolo[4,3-a]pyrazine AgOTf (400 mg, 1.54 mmol) was placed in a three-neck bottle, and dried at 200° C. in vacuum for 20 mins. 4-[3-[difluoro(methoxy)methyl]-[1,2,4]triazolo[4,3-a]pyrazin-6-yl]-5-fluoro-2-methyl-phenol (100 mg, 0.31 mmol), select F (546.26 mg, 1.54 mmol), CsF (281.07 mg, 1.85 mmol), toluene (10 mL), 2-fluoropyridine (149.73 mg, 1.54 mmol) and TMSCF$_3$ (219.25 mg, 1.54 mmol) were added in a glove box. The mixture was stirred at 25° C. for 16 hours. The mixture was filtered through Celite and the filter cake was eluted with DCM (20 mL×2). The filtrate was concentrated under reduced pressure to give the crude product. The crude product was purified by flash chromatography on silica gel (MeOH in DCM=0% to 4% to 8%) and then by prep-HPLC [Phenomenex Gemini-NX 80×30 mm×3 mm, A=H$_2$O (10 mM NH$_4$HCO$_3$) and B=CH$_3$CN; 47-77% over 8 minutes] to give the product (12.11 mg, 30.3 mmol, 9% yield) as a solid. $^1$H NMR (400 MHz, CDCl$_3$) δ$_H$ 9.53 (s, 1H), 8.75 (s, 1H), 8.16 (d, 1H), 7.15 (d, 1H), 3.97 (s, 3H), 2.39 (s, 3H). LCMS Rt=1.35 min in 2.0 min chromatography, 10-80AB, MS ESI calcd. for C$_{15}$H$_{11}$F$_6$N$_4$O$_2$ [M+H]$^+$ 393.1, found 393.0.

Example 43: Synthesis of Compound 43—3-[difluoro(methoxy)methyl]-6-[2-fluoro-6-methyl-4-(trifluoromethoxy)phenyl]-[1,2,4]triazolo[4,3-a]pyrazine
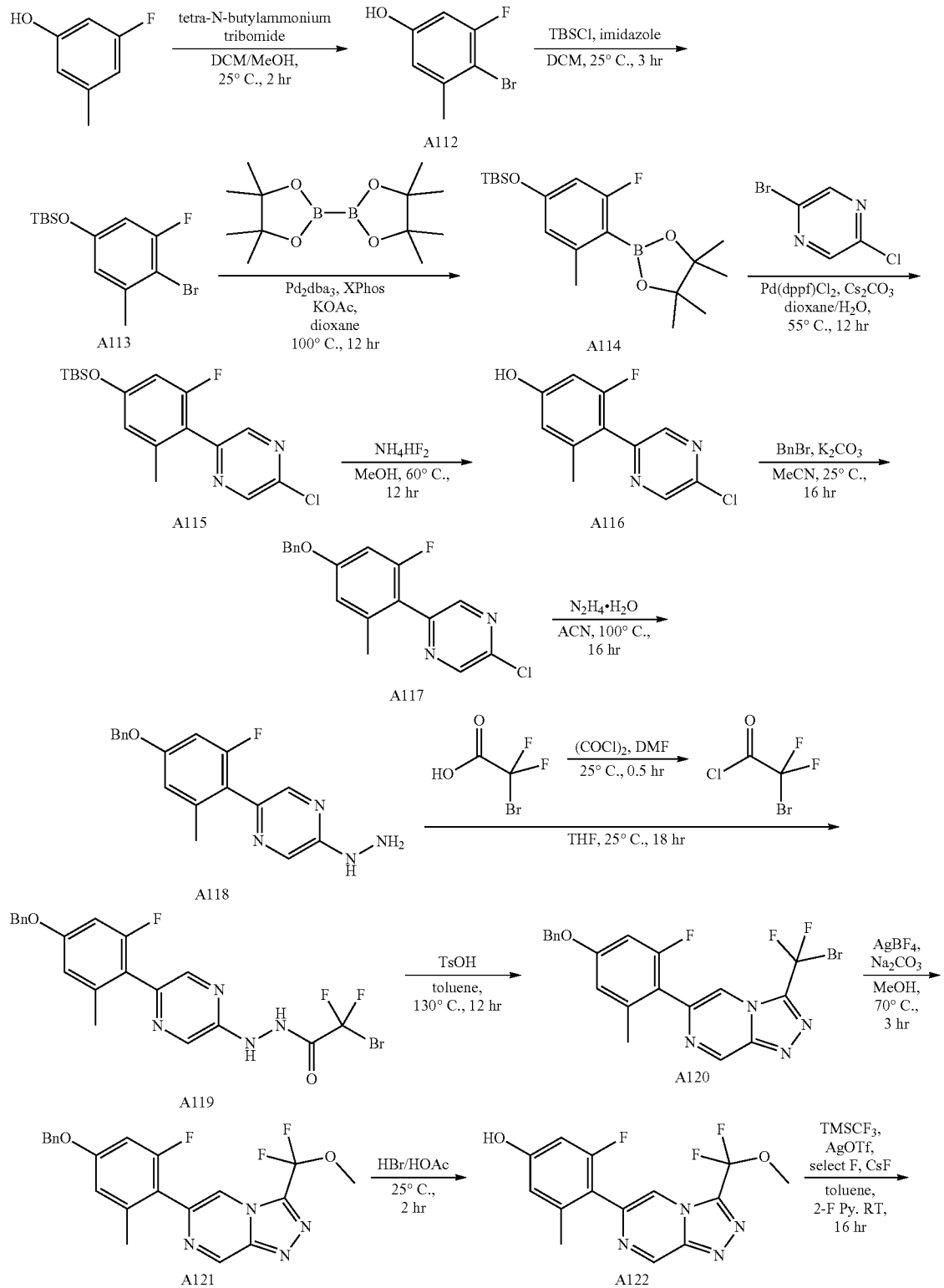

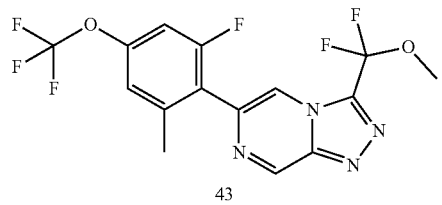

43

A112: 4-bromo-3-fluoro-5-methyl-phenol

To a solution of 3-fluoro-5-methyl-phenol (30.0 g, 237.85 mmol) in DCM (1.8 L) and methanol (1.2 L) was added dropwise tetrabutylammonium tribromide (114.69 g, 237.85 mmol) under stirring at 25° C. The mixture was stirred at 25° C. for 2 hours. The mixture was concentrated. Water (500 mL) was added and the aqueous layer was extracted with DCM (500 mL×3). The combined organic layers were washed with brine (1 L), dried over anhydrous $Na_2SO_4$, filtered and concentrated to give the crude product. The crude product was purified by flash chromatography on silica gel (EtOAc in petroleum ether=0% to 15%) to give the product (25.0 g, 121.94 mmol) as an oil. $^1H$ NMR (400 MHz, $CDCl_3$) $\delta_H$ 6.56-6.49 (m, 2H), 2.37 (s, 1H)

A113: (4-bromo-3-fluoro-5-methyl-phenoxy)-tert-butyl-dimethyl-silane

To a solution of 4-bromo-3-fluoro-5-methyl-phenol (8.0 g, 39.02 mmol) in DCM (100 mL) were added tert-butyl-chloro-dimethyl-silane (8.82 g, 58.53 mmol) and imidazole (5.3 g, 78.04 mmol). The mixture was stirred at 25° C. for 3 hours. After cooling to 25° C., water (200 mL) was added to the mixture and the aqueous layer was extracted with EtOAc (100 mL×3). The combined organic phase was washed with brine (100 mL), dried over anhydrous $Na_2SO_4$, filtered and concentrated to give the crude product. The crude product was purified by flash chromatography on silica gel (petroleum ether) to give the product (10.0 g, 31.32 mmol, 80% yield) as an oil. $^1H$ NMR (400 MHz, $CDCl_3$) $\delta_H$ 6.55 (s, 1H), 6.48 (dd, 1H), 2.37 (s, 3H), 0.98 (s, 9H), 0.22 (s, 6H).

A114: tert-butyl-[3-fluoro-5-methyl-4-(4,4,5,5-tetramethyl-1,3,2-dioxaborolan-2-yl)phenoxy]-dimethyl-silane To a mixture of (4-bromo-3-fluoro-5-methyl-phenoxy)-tert-butyl-dimethyl-silane (5.0 g, 15.66 mmol) in 1,4-dioxane (50 mL) were added 4,4,5,5-tetramethyl-2-(4,4,5,5-tetramethyl-1,3,2-dioxaborolan-2-yl)-1,3,2-dioxaborolane (4.8 g, 18.79 mmol) and KOAc (3.07 g, 31.32 mmol). Then $Pd_2(dba)_3$ (1.43 g, 1.57 mmol) and XPhos (1.49 g, 3.13 mmol) were added to the mixture. The mixture was stirred at 100° C. under $N_2$ for 12 hours. After cooling to room temperature, the mixture was filtered through the Celite. The filtrate was concentrated under reduced pressure to remove 1,4-dioxane. Water (50 mL) was added and the aqueous layer extracted with EtOAc (100 mL×3). The combined organic phase was washed with brine (100 mL), dried over anhydrous $Na_2SO_4$, filtered and concentrated to give the crude product. The crude product was purified by flash chromatography on silica gel (EtOAc in petroleum ether=0% to 20%) to give the product (4.0 g, 8.73 mmol) as an oil. $^1H$ NMR (400 MHz, $CDCl_3$) $\delta_H$ 6.45 (s, 1H), 6.33 (dd, 1H), 2.41 (s, 3H), 1.37 (s, 12H), 0.97 (s, 9H), 0.19 (s, 6H)

A115: tert-butyl-[4-(5-chloropyrazin-2-yl)-3-fluoro-5-methyl-phenoxy]-dimethyl-silane A mixture of 2-bromo-5-chloro-pyrazine (1.86 g, 9.61 mmol), tert-butyl-[3-fluoro-5-methyl-4-(4,4,5,5-tetramethyl-1,3,2-dioxaborolan-2-yl)phenoxy]-dimethyl-silane (4 g, 8.73 mmol), $Cs_2CO_3$ (5.69 g, 17.47 mmol) and Pd(dppf)$Cl_2$ (639 mg, 0.87 mmol) in 1,4-dioxane (40 mL) and water (4 mL) was stirred at 55° C. for 4 hours under $N_2$. After cooling to 25° C., water (50 mL) was added. The aqueous layer was extracted with EtOAc (30 mL×2). The combined organic layers were washed with brine (100 mL), dried over anhydrous $Na_2SO_4$, filtered and concentrated to give a residue. The residue was purified by flash chromatography on silica gel (EtOAc in petroleum ether=0~5%) to give the product (2 g, 5.67 mmol, 65% yield) as an oil. 1H NMR (400 MHz, $CDCl_3$) $\delta_H$ 8.70 (s 1H), 8.44 (s, 1H), 6.61 (s, 1H), 6.52 (d, 1H), 2.22 (s, 3H), 1.00 (s, 9H), 0.25 (s, 6H). LCMS $R_t$=1.13 min in 1.5 min chromatography, 5-95AB, MS ESI calcd. for $C_{17}H_{23}ClFN_2OSi$ [M+H]$^+$ 353.1, found 353.3.

A116: 4-(5-chloropyrazin-2-yl)-3-fluoro-5-methyl-phenol

To a solution of tert-butyl-[4-(5-chloropyrazin-2-yl)-3-fluoro-5-methyl-phenoxy]-dimethyl-silane (2 g, 5.67 mmol) in methanol (30 mL) was added $NH_4HF_2$ (1.62 g, 28.34 mmol) at 25° C. The mixture was stirred at 60° C. for 12 hours. After cooling to RT, the mixture was concentrated and purified by flash chromatography on silica gel (EtOAc in petroleum ether=0% to 30%) to give (900 mg, 3.77 mmol, 66% yield) as a solid. 1H NMR (400 MHz, $CDCl_3$) $\delta_H$ 8.70 (s, 1H), 8.44 (s, 1H), 6.59 (s, 1H), 6.53 (d, 1H), 5.62 (brs, 1H), 2.22 (s, 3H). LCMS $R_t$=0.80 min in 1.5 min chromatography, 5-95AB, MS ESI calcd. for $C_{11}H_9ClFN_2O$ [M+H]$^+$ 239.0, found 238.9.

A117: 2-(4-benzyloxy-2-fluoro-6-methyl-phenyl)-5-chloro-pyrazine

To a solution of 4-(5-chloropyrazin-2-yl)-3-fluoro-5-methyl-phenol (900 mg, 3.77 mmol) in MeCN (10 mL) was added $K_2CO_3$ (729.55 mg, 5.28 mmol). Then bromomethylbenzene (644.99 mg, 3.77 mmol) was added dropwise to the mixture. The mixture was stirred at 25° C. for 16 hours under $N_2$. The mixture was filtered and the filtrate was concentrated under reduced pressure to give the crude product. The crude product was purified by flash chromatography on silica gel (EtOAc in petroleum ether=0% to 15%) to give the product (1 g, 3.04 mmol, 80% yield) as a solid. 1H NMR (400 MHz, $CDCl_3$) $\delta_H$ 8.70 (s, 1H), 8.44 (s, 1H), 7.47-7.32 (m, 5H), 6.76 (s, 1H), 6.66 (d, 1H), 5.10 (s, 2H), 2.25 (s, 3H). LCMS R$_t$=1.01 min in 1.5 min chromatography, 5-95AB, MS ESI calcd. for C$_{18}$H$_{15}$ClFN$_2$O [M+H]$^+$ 329.1, found 328.9.

A118: [5-(4-benzyloxy-2-fluoro-6-methyl-phenyl)pyrazin-2-yl]hydrazine

To a solution of 2-(4-benzyloxy-2-fluoro-6-methyl-phenyl)-5-chloro-pyrazine (1 g, 3.04 mmol) in MeCN (10 mL) was added N$_2$H$_4$·H$_2$O (1.52 g, 30.42 mmol) at 25° C. The mixture was stirred at 100° C. for 16 hours. After cooling to 25° C., water (20 mL) was added to the mixture. After separating the layers, the aqueous layer was extracted with EtOAc (20 mL×2). The combined organic layers were washed with brine (40 mL), dried over anhydrous Na$_2$SO$_4$, filtered and concentrated to give the product (980 mg, 3.02 mmol) as a solid. $^1$H NMR (400 MHz, DMSO-d$_6$) δ$_H$ 8.19 (s, 1H), 8.06 (s, 1H), 7.95 (s, 1H), 7.49-7.30 (m, 5H), 6.87-6.77 (m, 2H), 5.14 (s, 2H), 4.31 (brs, 2H), 2.14 (s, 3H). LCMS R$_t$=0.77 min in 1.5 min chromatography, 5-95AB, MS ESI calcd. for C$_{18}$H$_{18}$FN$_4$O$_2$ [M+H]$^+$ 325.1, found 325.3.

A119: N'-[5-(4-benzyloxy-2-fluoro-6-methyl-phenyl)pyrazin-2-yl]-2-bromo-2,2-difluoro-acetohydrazide To a solution of 2-bromo-2,2-difluoro-acetic acid (205 mg, 1.17 mmol) in THF (2 mL) was added a drop of DMF and (COCl)$_2$ (0.12 mL, 1.41 mmol). The resulting mixture was stirred at 25° C. for 30 minutes. [5-(4-benzyloxy-2-fluoro-6-methyl-phenyl)pyrazin-2-yl]hydrazine (250 mg, 0.77 mmol) was added to the mixture. The mixture was stirred at 25° C. for 18 hours. Water (20 mL) was added and the aqueous layer was extracted with EtOAc (20 mL×2). The combined organic layers were washed with brine (30 mL), dried over anhydrous Na$_2$SO$_4$, filtered and concentrated to give the crude product. The crude product was purified by flash chromatography on silica gel (EtOAc in petroleum ether=0% to 40% to 100%) to afford the product (270 mg, 0.56 mmol, 72% yield) as a solid. 1H NMR (400 MHz, DMSO-d$_6$) δ$_H$ 11.35 (br s, 1H), 9.46 (s, 1H), 8.15 (s, 2H), 7.49-7.31 (m, 5H), 6.89-6.81 (m, 2H), 5.16 (s, 2H), 2.15 (s, 3H). LCMS R$_t$=1.01 min in 1.5 min chromatography, 5-95AB, MS ESI calcd. for C$_{20}$H$_{17}$BrF$_3$N$_4$O$_2$ [M+H]$^+$ 481.0, found 482.8.

A120: 6-(4-benzyloxy-2-fluoro-6-methyl-phenyl)-3-[bromo(difluoro)methyl]-[1,2,4]triazolo[4,3-a]pyrazine To a solution of N'-[5-(4-benzyloxy-2-fluoro-6-methyl-phenyl)pyrazin-2-yl]-2-bromo-2,2-difluoro-acetohydrazide (390 mg, 0.81 mmol) in toluene (5 mL) was added TsOH (41.86 mg, 0.24 mmol). The mixture was stirred at 130° C. for 12 hours. Water (30 mL) was added and the aqueous layer was extracted with EtOAc (30 mL×2). The combined organic layers were washed with brine (30 mL), dried over anhydrous Na$_2$SO$_4$, filtered and concentrated to give the crude product. The crude product was purified by flash chromatography on silica gel (EtOAc in petroleum ether=0% to 30% to 40%) to afford the product (210 mg, 0.45 mmol, 55% yield) as a solid. $^1$H NMR (400 MHz, CDCl$_3$) δ$_H$ 9.58 (s, 1H), 8.21 (s, 1H), 7.51-7.30 (m, 5H), 6.80 (s, 1H), 6.69 (dd, 1H), 5.12 (s, 2H), 2.31 (s, 3H). LCMS R$_t$=1.05 min in 1.5 min chromatography, 5-95AB, MS ESI calcd. for C$_{20}$H$_{15}$BrF$_3$N$_4$O [M+H]$^+$ 463.0, found 464.8.

A121: 6-(4-benzyloxy-2-fluoro-6-methyl-phenyl)-3-[difluoro(methoxy)methyl]-[1,2,4]triazolo[4,3-a]pyrazine To a solution of 6-(4-benzyloxy-2-fluoro-6-methyl-phenyl)-3-[bromo(difluoro)methyl]-[1,2,4]triazolo[4,3-a]pyrazine (210 mg, 0.45 mmol) in methanol (2 mL) were added AgBF$_4$ (175.89 mg, 0.91 mmol) and Na$_2$CO$_3$ (96.09 mg, 0.91 mmol) at 28° C. The mixture was stirred at 70° C. for 3 hours. Brine (20 mL) was added and the mixture was filtered through Celite. The filter cake was washed with EtOAc (10 mL×2). The filtrate was separated and the aqueous layer was extracted with EtOAc (30 mL×2). The combined organic layer was washed with brine (100 mL), dried over anhydrous Na$_2$SO$_4$, filtered and concentrated to give the crude product. The crude product was purified by flash chromatography on silica gel (EtOAc in petroleum ether=0% to 15% to 30%) to afford the product (130 mg, 0.31 mmol, 69% yield) as a solid. The product (50 mg, 0.12 mmol) was dried in vacuo to afford the product (43.8 mg, 105.7 μmol, 87% yield) as a solid. $^1$H NMR (400 MHz, CDCl$_3$) δ$_H$ 9.52 (s, 1H), 8.21 (s, 1H), 7.50-7.34 (m, 5H), 6.79 (s, 1H), 6.68 (dd, 1H), 5.12 (s, 2H), 3.93 (s, 3H), 2.28 (s, 3H). LCMS R$_t$=1.21 min in 2.0 min chromatography, 10-80AB, MS ESI calcd. for C$_{21}$H$_{18}$F$_3$N$_4$O$_2$ [M+H]$^+$ 415.1, found 415.2.

A122: 4-[3-[difluoro(methoxy)methyl]-[1,2,4]triazolo[4,3-a]pyrazin-6-yl]-3-fluoro-5-methyl-phenol A mixture of 6-(4-benzyloxy-2-fluoro-6-methyl-phenyl)-3-[difluoro(methoxy)methyl]-[1,2,4]triazolo[4,3-a]pyrazine (80 mg, 0.19 mmol) in HBr/HOAc (1 mL, 33% in HOAc) was stirred at 25° C. for 2 hours. Water (10 mL) was added and the mixture was extracted with EtOAc (15 mL×3). The combined organic phase was washed with saturated aqueous NaHCO$_3$ (20 mL×1) and brine (30 mL), dried over anhydrous Na$_2$SO$_4$, filtered and concentrated to give the crude product. The crude product was purified by flash chromatography on silica gel (EtOAc in petroleum ether=0% to 20% to 50%) and prep-HPLC [YMC Triart C18 (150×25 mm×5 μm) A=H$_2$O (10 mM NH$_4$HCO$_3$) and B=CH$_3$CN; 36-66% B over 9.5 minutes) to afford the product (6.71 mg, 20.7 μmol, 10% yield) as a solid. $^1$H NMR (400 MHz, CDCl$_3$) δ$_H$ 9.52 (d, 1H), 8.21 (s, 1H), 6.65 (s, 1H), 6.58-6.57 (m, 1H), 5.80 (s, 1H), 3.93 (s, 3H), 2.26 (s, 3H). LCMS R$_t$=1.20 min in 2.0 min chromatography, 10-80AB, MS ESI calcd. for C$_{14}$H$_{11}$F$_3$N$_4$O$_2$ [M+H]$^+$ 325.1, found 325.1.

Compound 43: 3-[difluoro(methoxy)methyl]-6-[2-fluoro-6-methyl-4-(trifluoromethoxy)phenyl]-[1,2,4]triazolo[4,3-a]pyrazine AgOTf (435.81 mg, 1.7 mmol) was placed in a three-neck bottle, and dried at 200° C. (heat gun) in vacuum for 20 minutes. Then 4-[3-[difluoro(methoxy)methyl]-[1,2,4]triazolo[4,3-a]pyrazin-6-yl]-3-fluoro-5-methyl-phenol (110 mg, 0.34 mmol), select F (600.89 mg, 1.7 mmol), CsF (309.18 mg, 2.04 mmol) followed by toluene (3 mL), 2-fluoropyridine (164.7 mg, 1.7 mmol) and TMSCF$_3$ (241.18 mg, 1.7 mmol) were added in glove box to give a mixture. The mixture was stirred at 28° C. for 16 hours. The mixture was filtered through Celite and the filter cake was eluted with DCM (20 mL×2). The filtrate was concentrated under reduced pressure to give the crude product. The crude product was purified by flash chromatography on silica gel (MeOH in DCM=0% to 10%) and prep-HPLC [Phenomenex Gemini-NX8 80×30 mm×3 μm, A=H₂O (10 mM NH₄HCO₃) and B=CH₃CN; 40-70% over 9.5 minutes] to afford the product (8.85 mg, 22.4 μmol, 6% yield) as a solid. $^1$H NMR (400 MHz, CDCl₃) $\delta_H$ 9.54 (s, 1H), 8.26 (s, 1H), 7.05 (s, 1H), 6.98 (d, 1H), 3.94 (s, 3H), 2.34 (s, 3H). LCMS R$_t$=1.17 min in 2.0 min chromatography, 10-80AB, MS ESI calcd. for $C_{15}H_{11}F_6N_4O_2$ [M+H]$^+$ 393.1, found 393.0.

Example 44: Synthesis of A12—6-chloro-3-(methoxymethyl)-[1,2,4]triazolo[4,3-b]pyridazine

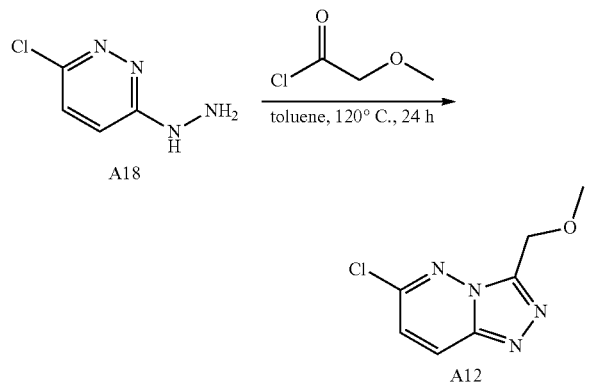

To a solution of (6-chloropyridazin-3-yl)hydrazine (3 g, 20.75 mmol) in toluene (80 mL) was added 2-methoxyacetyl chloride (2.48 g, 22.83 mmol) dropwise at 25° C. The solution was stirred at 25° C. for 30 min, and refluxed at 120° C. for 24 hours. After cooling to room temperature, the mixture was diluted with H₂O (40 mL) and extracted with EtOAc (40 mL×2). The combined organic phase was washed with brine (40 mL), dried over Na₂SO₄, filtered and concentrated to give the crude product. The crude product was triturated from i-Pr₂O (10 mL), to give the product (1500 mg, 7.31 mmol, 35% yield) as a solid. LCMS R$_t$=0.43 min in 1.5 min chromatography, 5-95AB, MS ESI calcd. for $C_7H_8ClN_4O$ [M+H]$^+$ 198.0, found 199.0.

Example 45: Synthesis of A32—6-chloro-3-(chlorodifluoromethyl)-[1,2,4]triazolo[4,3-a]pyrazine

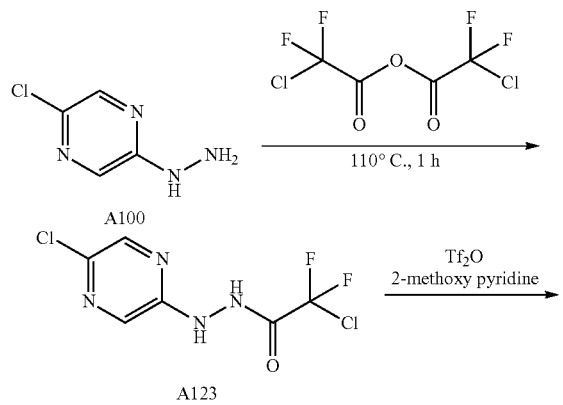

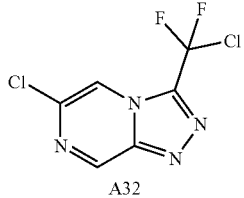

A123: 2-chloro-N'-(5-chloropyrazin-2-yl)-2,2-difluoroacetohydrazide

To stirred solution of 2-chloro-5-hydrazineylpyrazine (5.0 g, 33.99 mmol) in toluene (50 mL) was added chlorodifluoroacetic anhydride (6.54 mL, 37.39 mmol) at 0° C. The reaction mixture was heated at 110° C. for 1 hour. The reaction mixture was cooled to room temperature and concentrated to give a residue. The residue was treated with water (50 mL) and extracted with ethyl acetate (2×50 mL). The organic layer was washed with brine (30 mL), dried over Na₂SO₄ and concentrated to a solid (6 g). It was used for the next step without further purification.

A32: 6-chloro-3-(chlorodifluoromethyl)-[1,2,4]triazolo[4,3-a]pyrazine

To a stirred solution of 2-chloro-N'-(5-chloropyrazin-2-yl)-2,2-difluoroacetohydrazide (6.0 mg, 23.34 mmol) in DCM (120 mL) was added trifluoromethanesulfonic anhydride (4.73 mL, 28.01 mmol) and 2-methoxypridine (4.91 mL, 46.69 mmol) at 0° C. The reaction mixture was slowly warmed to room temperature and stirred for 2 hours. The reaction mixture was treated with 10% sodium bicarbonate solution (50 mL) and extracted with ethyl acetate (2×50 mL). The organic layer was washed with brine (50 mL), dried over Na₂SO₄ and concentrated to give the crude product. The crude product was purified by column chromatography on silica gel with 15% EtOAc/PE to afford the product (4.0 g, 16.5 mmol, 71% yield) as a solid. LCMS: 239.0 (M+H), R$_t$ 1.66 min Column: ZORBAX XDB C-18 (50×4.6 mm), 3.5 μm Mobile Phase: A: 0.1% HCOOH in water: ACN (95:5), B: ACN; Flow Rate: 1.5 mL/min.

Example 46: Efficacy of Exemplary Compounds in the Modulation of Late Sodium Current (INaL)

Functional characterization of exemplary compounds to modulate INaL expressed by the NaV1.6 voltage-gated sodium channel was accomplished using the PatchXpress™ high throughput electrophysiology platform (Molecular Devices, Sunnyvale, CA). HEK-293 cells expressing recombinant, human NaV1.6 (hNaV1.6) were grown in DMEM/high-glucose Dulbecco's modified, 10% FBS, 2 mM sodium pyruvate, 10 mM HEPES and 400 μg/mL G418. Cells were grown to 50%-80% confluency prior to harvesting. Trypsinized cells were washed, allowed to recover for 1 hour and then resuspended in extracellular recording solution at a concentration of 1×106 cells/ml. The onboard liquid handling facility of the PatchXpress was used for dispensing cells and applying test compounds. NaV late currents were evoked by the application of 300 nM ATX-II. INaL was evoked by depolarizing pulses to 0 mV for 200 ms from a non-inactivating holding potential (e.g., −120 mV) at a frequency of 0.1 Hz. INaL amplitude and stability were determined by analyzing the mean current amplitude over the final 20 ms of the test pulse. Following steady state block with exemplary compounds (e.g., as described herein), a Na+ free solution containing an impermeant cation (e.g., Choline or NDMG) was added to confirm the identify of the sodium current. Percent steady-state inhibition of INaL was calculated as: [(INaL_compound)/(INaL_control)]*100, where INaL_compound and INaL_control represent INaL recorded in the presence or absence of compound, respectively.

Results from this assay relating to percent inhibition of INaL at hNaV1.6 (measured using a procedure similar to described above but using HEK-293 cells expressing recombinant, human NaV 1.6 (h NaV 1.6) at 1 µM are summarized in Table 1 below. In this table, "A" indicates inhibition of less than 30%; "B" indicates inhibition of between about 30% to about 70%; and "C" indicates inhibition of greater than 70%.

TABLE 1

| No. | NaV 1.6 Assay Data |
|-----|--------------------|
| 1   | C                  |
| 2   | C                  |
| 3   | A                  |
| 4   | C                  |
| 5   | B                  |
| 6   | C                  |
| 7   | B                  |
| 8   | B                  |
| 9   | B                  |
| 10  | B                  |
| 11  | A                  |
| 12  | B                  |
| 13  | A                  |
| 14  | B                  |
| 15  | A                  |
| 16  | B                  |
| 17  | A                  |
| 18  | C                  |
| 19  | C                  |
| 20  | B                  |
| 21  | B                  |
| 22  | B                  |
| 23  | B                  |
| 24  | C                  |
| 25  | C                  |
| 26  | C                  |
| 27  | B                  |
| 28  | B                  |
| 29  | C                  |
| 30  | B                  |
| 31  | A                  |
| 32  | A                  |
| 33  | C                  |
| 34  | C                  |
| 35  | B                  |
| 36  | B                  |
| 37  | C                  |
| 38  | C                  |
| 39  | B                  |
| 40  | C                  |
| 41  | A                  |
| 42  | C                  |
| 43  | B                  |

While we have described a number of embodiments, it is apparent that our basic examples may be altered to provide other embodiments that utilize the compounds and methods of this invention. Therefore, it will be appreciated that the scope of this invention is to be defined by the appended claims rather than by the specific embodiments that have been represented by way of example.

The contents of all references (including literature references, issued patents, published patent applications, and co-pending patent applications) cited throughout this application are hereby expressly incorporated herein in their entireties by reference. Unless otherwise defined, all technical and scientific terms used herein are accorded the meaning commonly known to one with ordinary skill in the art.

The invention claimed is:

1. A compound selected from the group consisting of:

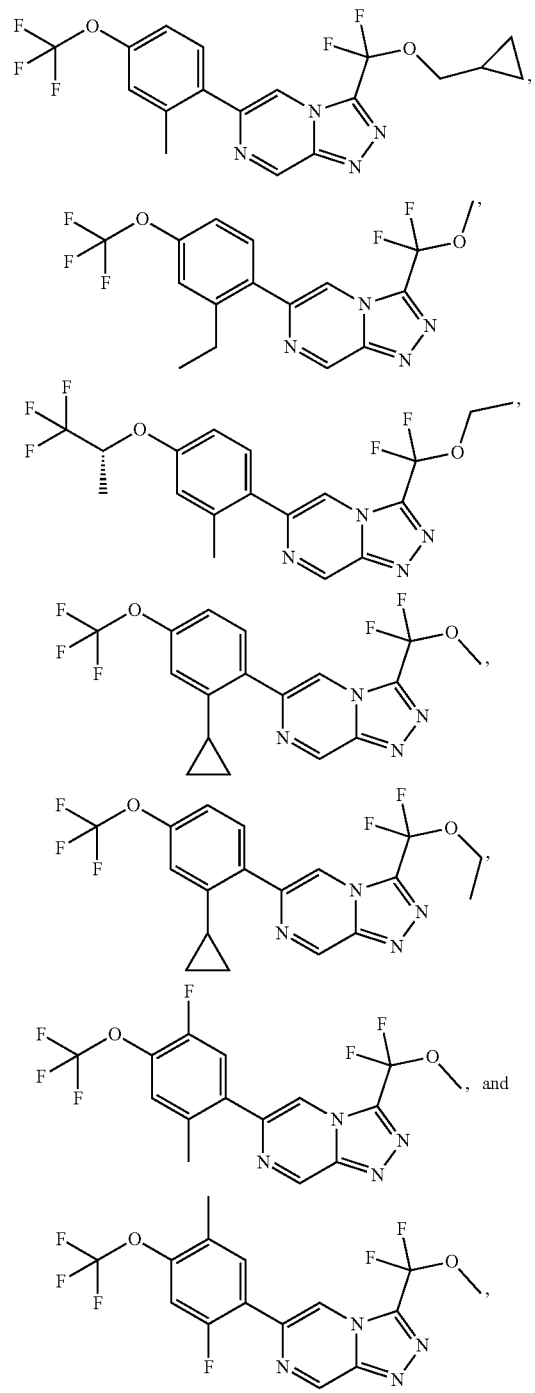

or a pharmaceutically acceptable salt thereof.

2. A pharmaceutical composition comprising an effective amount of the compound of claim 1, or a pharmaceutically acceptable salt thereof, and a pharmaceutically acceptable carrier.

* * * * *